(12) United States Patent
Sasada et al.

(10) Patent No.: US 10,208,249 B2
(45) Date of Patent: Feb. 19, 2019

(54) LIQUID CRYSTAL COMPOUND, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yasuyuki Sasada, Tokyo (JP); Michiko Sawada, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/708,472

(22) Filed: Sep. 19, 2017

(65) Prior Publication Data

US 2018/0086979 A1    Mar. 29, 2018

(30) Foreign Application Priority Data

Sep. 27, 2016  (JP) .................................. 2016-188634

(51) Int. Cl.

| | |
|---|---|
| *G02F 1/1333* | (2006.01) |
| *C09K 19/18* | (2006.01) |
| *C09K 19/06* | (2006.01) |
| *C09K 19/32* | (2006.01) |
| *C09K 19/04* | (2006.01) |
| *C09K 19/20* | (2006.01) |
| *C09K 19/30* | (2006.01) |
| *C09K 19/34* | (2006.01) |

(52) U.S. Cl.
CPC .......... *C09K 19/18* (2013.01); *C09K 19/0403* (2013.01); *C09K 19/062* (2013.01); *C09K 19/20* (2013.01); *C09K 19/3059* (2013.01); *C09K 19/322* (2013.01); *C09K 19/3402* (2013.01); *C09K 19/3461* (2013.01); *C09K 2019/0407* (2013.01); *C09K 2019/0459* (2013.01); *C09K 2019/0466* (2013.01); *C09K 2019/181* (2013.01); *C09K 2019/183* (2013.01); *C09K 2019/3422* (2013.01)

(58) Field of Classification Search
CPC .... C09K 19/18; C09K 19/062; C09K 19/322; C09K 19/0403; C09K 19/20; C09K 19/3059; C09K 19/3402; C09K 19/3461; C09K 2019/407; C09K 2019/181; C09K 2019/0459; C09K 2019/0466; C09K 2019/183; C09K 2019/3422; G02F 1/1333
USPC .................................................... 252/299.62
See application file for complete search history.

(56) References Cited

U.S. PATENT DOCUMENTS

| | | | |
|---|---|---|---|
| 7,981,486 B2 * | 7/2011 | Sasada ............... | C09K 19/0403 |
| | | | 252/299.61 |
| 9,523,037 B2 * | 12/2016 | Manabe ................. | C09K 19/18 |
| 9,752,077 B2 * | 9/2017 | Manabe ................. | C09K 19/18 |
| 9,790,426 B2 * | 10/2017 | Manabe ................. | G02F 1/292 |
| 9,868,905 B2 * | 1/2018 | Brocke .................. | C09K 19/18 |
| 2006/0097226 A1 | 5/2006 | Sasada | |
| 2014/0021405 A1 | 1/2014 | Manabe et al. | |
| 2014/0061536 A1 | 3/2014 | Reiffenrath et al. | |

* cited by examiner

*Primary Examiner* — Geraldina Visconti
(74) *Attorney, Agent, or Firm* — Wenderoth, Lind & Ponack, L.L.P.

(57) ABSTRACT

Provided are a liquid crystal compound satisfying at least one of physical properties such as high stability to heat or light, high maximum temperature of a liquid-crystal phase, low minimum temperature thereof, small viscosity, suitable optical anisotropy, large dielectric anisotropy and good compatibility with other liquid-crystal compounds, a liquid crystal composition containing the compound and a liquid crystal display device including the composition.

A compound is represented by formula (1), a liquid crystal composition contains the compound and a liquid crystal display device includes the composition.

(1)

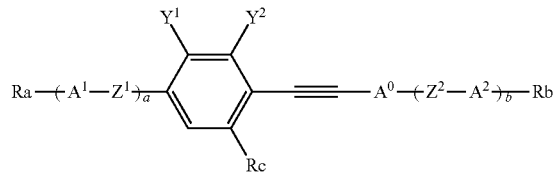

In formula (1), Ra and Rb are fluorine or alkyl; $A^0$, $A^1$ and $A^2$ are 1,4-phenylene; $Z^1$ and $Z^2$ are a single bond or alkylene; one of $Y^1$ and $Y^2$ is fluorine, and the other is hydrogen; Rc is alkyl; and a and b are independently 0, 1, 2 or 3, and a sum of a and b is 0, 1, 2 or 3.

20 Claims, No Drawings

LIQUID CRYSTAL COMPOUND, LIQUID CRYSTAL COMPOSITION AND LIQUID CRYSTAL DISPLAY DEVICE

TECHNICAL FIELD

The invention relates to a liquid crystal compound, a liquid crystal composition and a liquid crystal display device. More specifically, the invention relates to a liquid crystal compound having a triple bond, a liquid crystal composition having a nematic phase and containing the compound, and a liquid crystal display device including the composition.

BACKGROUND ART

A liquid crystal display device has been widely utilized in a display of a personal computer, a television and so forth. The device utilizes physical properties such as optical anisotropy and dielectric anisotropy of a liquid crystal compound. As an operating mode of the liquid crystal display device, such a mode exists as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, a fringe field switching (FFS) mode and a polymer sustained alignment (PSA) mode. In the device having the PSA mode, a liquid crystal composition containing a polymer is used. In the composition, alignment of liquid crystal molecules can be controlled by the polymer.

In such a liquid crystal display device, a liquid crystal composition having suitable physical properties is used. In order to further improve characteristics of the device, the liquid crystal compound contained in the composition preferably has physical properties described in (1) to (8) below: (1) high stability to heat or light, (2) a high clearing point, (3) low minimum temperature of a liquid crystal phase, (4) small viscosity ($\eta$), (5) suitable optical anisotropy ($\Delta n$), (6) large dielectric anisotropy ($\Delta \varepsilon$), (7) a suitable elastic constant (K) and (8) good compatibility with other liquid crystal compounds.

An effect of the physical properties of the liquid crystal compound on the characteristics of the device is as described below. A compound having the high stability to heat or light as described in (1) increases a voltage holding ratio of the device. Thus, a service life of the device becomes longer. A compound having the high clearing point as described in (2) extends a temperature range in which the device can be used. A compound having the low minimum temperature of the liquid crystal phase such as a nematic phase and a smectic phase as described in (3), in particular, a compound having the low minimum temperature of the nematic phase, extends the temperature range in which the device can be used. A compound having the small viscosity as described in (4) shortens a response time of the device.

According to a design of the device, a compound having the suitable optical anisotropy, more specifically, a compound having large optical anisotropy or small optical anisotropy as described in (5) is required. When the response time is shortened by decreasing a cell gap of the device, the compound having large optical anisotropy is suitable. A compound having large dielectric anisotropy as described in (6) decreases threshold voltage of the device. Thus, electric power consumption of the device is reduced. On the other hand, a compound having small dielectric anisotropy shortens the response time of the device by decreasing viscosity of the composition. The compound extends the temperature range in which the device can be used by increasing the maximum temperature of the nematic phase.

With regard to (7), a compound having a large elastic constant shortens the response time of the device. A compound having a small elastic constant decreases the threshold voltage of the device. Therefore, the suitable elastic constant is required according to the characteristics to be desirably improved. A compound having the good compatibility with other liquid crystal compounds as described in (8) is preferred. The reason is that the physical properties of the composition are adjusted by mixing liquid crystal compounds having different physical properties.

A variety of liquid crystal compounds having large dielectric anisotropy have been so far synthesized. A variety of liquid crystal compounds having a triple bond have also been synthesized. The reason is that good physical properties that are not found in conventional compounds are expected from a new compound. The reason is that the new compound may be occasionally provided with a suitable balance regarding at least two physical properties in the composition. In view of such a situation, with regard to the physical properties (1) to (8) described above, a compound having good physical properties and a suitable balance has been desired.

On page 75 (in the paragraph [0243]) of Patent literature No. 1, a compound as described below is disclosed.

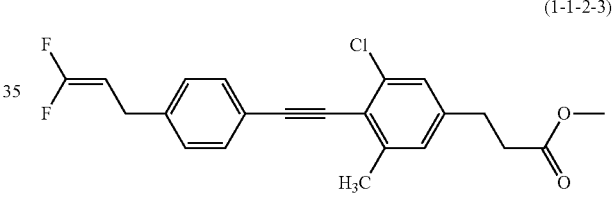

(1-1-2-3)

On page 126 and page 128 of Patent literature No. 2, a compound as described below is disclosed.

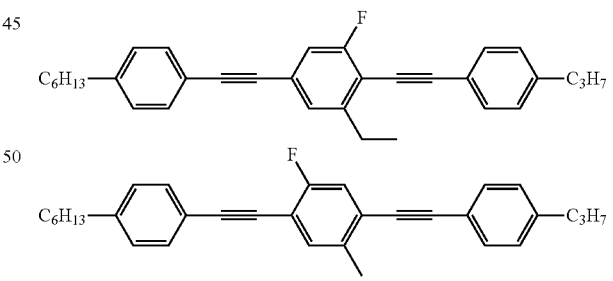

On page 31 and page 128 of Patent literature No. 3, a compound as described below is disclosed.

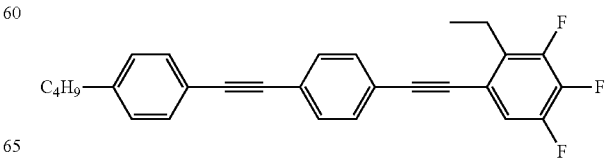

CITATION LIST

Patent Literature

Patent literature No. 1: JP 2006-160727 A.
Patent literature No. 2: WO 2012-126565 A.
Patent literature No. 3: WO 2012-146340 A.

SUMMARY OF INVENTION

Technical Problem

A first object is to provide a liquid crystal compound satisfying at least one of physical properties such as high stability to heat or light, a high clearing point (or high maximum temperature of a nematic phase), low minimum temperature of a liquid crystal phase, small viscosity, suitable optical anisotropy, large dielectric anisotropy, a suitable elastic constant and good compatibility with other liquid crystal compounds. The object is to provide a compound having higher stability to light in comparison with a similar compound. A second object is to provide a liquid crystal composition that contains the compound and satisfies at least one of physical properties such as high stability to heat or light, high maximum temperature of the nematic phase, low minimum temperature of the nematic phase, small viscosity, suitable optical anisotropy, large dielectric anisotropy, large specific resistance and a suitable elastic constant. The object is to provide a liquid crystal composition having a suitable balance regarding at least two of the physical properties. A third object is to provide a liquid crystal display device including the composition and having a wide temperature range in which the device can be used, a short response time, a large voltage holding ratio, low threshold voltage, a large contrast ratio, a small flicker rate and a long service life.

Solution to Problem

The invention relates to a compound represented by formula (1), a liquid crystal composition containing the compound, and a liquid crystal display device including the composition.

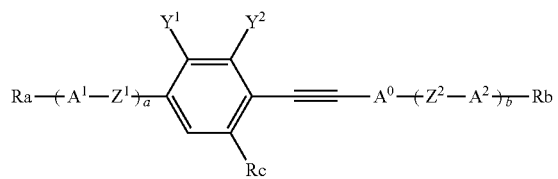

(1)

In formula (1), Ra and Rb are independently hydrogen, fluorine, chlorine, —CN, —SF$_5$, —C≡C—SF$_5$ or alkyl having 1 to 20 carbons, and in the alkyl, at least one piece of —CH$_2$— may be replaced by —O—, —S—, —CO— or —SiH$_2$—, and at least one piece of —CH$_2$CH$_2$— may be replaced by —CH=CH— or —C≡C—, and in the groups, at least one hydrogen may be replaced by fluorine or chlorine; A$^0$, A$^1$ and A$^2$ are independently 1,4-cyclohexylene, 1,4-phenylene, pyridine-2,5-diyl, pyrimidine-2,5-diyl, pyridazine-3,6-diyl, decahydronaphthalene-2,6-diyl, 1,2,3,4-tetrahydronaphthalene-2,6-diyl or naphthalene-2,6-diyl, and in the rings, at least one piece of —CH$_2$— may be replaced by —O—, —S—, —CO— or —SiH$_2$—, and at least one piece of —CH$_2$CH$_2$— may be replaced by —CH=CH—, and in the groups, at least one hydrogen may be replaced by fluorine, chlorine, —CF$_3$, —CHF$_2$, —CH$_2$F, —OCF$_3$, —OCHF$_2$ or —OCH$_2$F; Z$^1$ and Z$^2$ are independently a single bond or alkylene having 1 to 4 carbons, and in the alkylene, at least one piece of —CH$_2$— may be replaced by —O—, —S—, —CO— or —SiH$_2$—, and at least one piece of —CH$_2$CH$_2$— may be replaced by —CH=CH—, and in the groups, at least one hydrogen may be replaced by fluorine or chlorine; one of Y$^1$ and Y$^2$ is fluorine, and the other is hydrogen; Rc is alkyl having 1 to 4 carbons, and in the alkyl, at least one piece of —CH$_2$— may be replaced by —O—, —S—, —CO— or —SiH$_2$—, and at least one piece of —CH$_2$CH$_2$— may be replaced by —CH=CH— or —C≡C—; and a and b are independently 0, 1, 2 or 3, and a sum of a and b is 0, 1, 2 or 3.

Advantageous Effects of Invention

A first advantage is to provide a liquid crystal compound satisfying at least one of physical properties such as high stability to heat or light, a high clearing point (or high maximum temperature of a nematic phase), low minimum temperature of a liquid crystal phase, small viscosity, suitable optical anisotropy, large dielectric anisotropy, a suitable elastic constant and good compatibility with other liquid crystal compounds. The advantage is to provide a compound having higher stability to light in comparison with a similar compound (see Comparative Examples 1 and 2). A second advantage is to provide a liquid crystal composition that contains the compound and satisfies at least one of physical properties such as high stability to heat or light, high maximum temperature of the nematic phase, low minimum temperature of the nematic phase, small viscosity, suitable optical anisotropy, large dielectric anisotropy, large specific resistance and a suitable elastic constant. The advantage is to provide a liquid crystal composition having a suitable balance regarding at least two of the physical properties. A third advantage is to provide a liquid crystal display device including the composition and having a wide temperature range in which the device can be used, a short response time, a large voltage holding ratio, low threshold voltage, a large contrast ratio, a small flicker rate and a long service life.

DESCRIPTION OF EMBODIMENTS

Usage of terms herein is as described below. Terms "liquid crystal compound," "liquid crystal composition" and "liquid crystal display device" may be occasionally abbreviated as "compound," "composition" and "device," respectively. "Liquid crystal compound" is a generic term for a compound having a liquid crystal phase such as a nematic phase and a smectic phase, and a compound having no liquid crystal phase but to be added for the purpose of adjusting physical properties of a composition, such as maximum temperature, minimum temperature, viscosity and dielectric anisotropy. The compound has a six-membered ring such as 1,4-cyclohexylene and 1,4-phenylene, and has rod-like molecular structure. "Liquid crystal display device" is a generic term for a liquid crystal display panel and a liquid crystal display module. "Polymerizable compound" is a compound to be added for the purpose of forming a polymer in the composition.

The liquid crystal composition is prepared by mixing a plurality of liquid crystal compounds. An additive is added to the composition for the purpose of further adjusting the physical properties. The additive such as the polymerizable compound, a polymerization initiator, a polymerization inhibitor, an optically active compound, an antioxidant, an ultraviolet light absorber, a light stabilizer, a heat stabilizer, a dye and an antifoaming agent is added thereto when necessary. The liquid crystal compound and the additive are mixed in such a procedure. A proportion of the liquid crystal compound is expressed in terms of weight percent (% by weight) based on the weight of the liquid crystal composition containing no additive even after the additive has been added. A proportion of the additive is expressed in terms of weight percent (% by weight) based on the weight of the liquid crystal composition containing no additive. More specifically, a proportion of the liquid crystal compound or the additive is calculated based on the total weight of the liquid crystal compound. Weight parts per million (ppm) may be occasionally used. A proportion of the polymerization initiator and the polymerization inhibitor is exceptionally expressed based on the weight of the polymerizable compound.

"Clearing point" is a transition temperature between the liquid crystal phase and an isotropic phase in the liquid crystal compound. "Minimum temperature of the liquid crystal phase" is a transition temperature between a solid and the liquid crystal phase (the smectic phase, the nematic phase or the like) in the liquid crystal compound. "Maximum temperature of the nematic phase" is a transition temperature between the nematic phase and the isotropic phase in a mixture of the liquid crystal compound and a base liquid crystal or in the liquid crystal composition, and may be occasionally abbreviated as "maximum temperature." "Minimum temperature of the nematic phase" may be occasionally abbreviated as "minimum temperature." An expression "increase the dielectric anisotropy" means that a value of dielectric anisotropy positively increases in a composition having positive dielectric anisotropy, and the value of dielectric anisotropy negatively increases in a composition having negative dielectric anisotropy. An expression "having a large voltage holding ratio" means that the device has a large voltage holding ratio at room temperature and also at a temperature close to the maximum temperature in an initial stage, and the device has the large voltage holding ratio at room temperature and also at a temperature close to the maximum temperature even after the device has been used for a long period of time. In order to examine characteristics of a composition or a device, an ageing testing may be occasionally carried out.

A compound represented by formula (1) may be occasionally abbreviated as compound (1). At least one compound selected from the group of compounds represented by formula (1) may be occasionally abbreviated as compound (1). "Compound (1)" means one compound, a mixture of two compounds or a mixture of three or more compounds represented by formula (1). A same rule applies also to any other compound represented by any other formula. In formulas (1) to (15), a symbol of $A^1$, $B^1$, $C^1$ or the like represents a six-membered ring such as cyclohexane or benzene. The symbol may occasionally represents a fused ring such as naphthalene or a bridged ring such as adamantane.

A symbol of terminal group $R^{11}$ is used in a plurality of compounds in chemical formulas of component compounds. In the compounds, two groups represented by two pieces of arbitrary $R^{11}$ may be identical or different. For example, in one case, $R^{11}$ of compound (2) is ethyl and $R^{11}$ of compound (3) is ethyl. In another case, $R^{11}$ of compound (2) is ethyl and $R^{11}$ of compound (3) is propyl. A same rule applies also to a symbol of $R^{12}$, $R^{13}$, $Z^{11}$ or the like. In compound (8), when a subscript 'i' is 2, two of ring $D^1$ exists. In the compound, two groups represented by two of ring $D^1$ may be identical or different. A same rule applies also to two of arbitrary ring $D^1$ when the subscript 'i' is larger than 2. A same rule applies also to other symbols.

An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without restriction. A same rule applies also to an expression "at least one piece of 'A' is replaced by 'B'." An expression "at least one piece of 'A' may be replaced by 'B', 'C' or 'D'" includes a case where arbitrary 'A' is replaced by 'B', a case where arbitrary 'A' is replaced by 'C', and a case where arbitrary 'A' is replaced by 'D', and also a case where a plurality of pieces of 'A' are replaced by at least two pieces of 'B', 'C' and/or 'D'. For example, "alkyl in which at least one piece of —$CH_2$— may be replaced by —O— or —CH═CH—" includes alkyl, alkoxy, alkoxyalkyl, alkenyl, alkoxyalkenyl and alkenyloxyalkyl. In addition, a case where two pieces of consecutive —$CH_2$— are replaced by —O— to form —O—O— is not preferred. In alkyl or the like, a case where —$CH_2$— of a methyl part (—$CH_2$—H) is replaced by —O— to form —O—H is not preferred, either.

An expression "$R^{11}$ and $R^{12}$ are independently alkyl having 1 to 10 carbons or alkenyl having 2 to 10 carbons, and in the alkyl and the alkenyl, at least one piece of —$CH_2$— may be replaced by —O—, and in the groups, at least one hydrogen may be replaced by fluorine" may be occasionally used. In the expression, "in the groups" may be interpreted according to wording. In the expression, "the groups" means alkyl, alkenyl, alkoxy, alkenyloxy or the like. More specifically, "the groups" represents all of the groups described before the term "in the groups." The common interpretation is applied also to terms of "in the monovalent groups" or "in the divalent groups." For example, "the monovalent groups" represents all of the groups described before the term "in the monovalent groups."

In the liquid crystal compound, alkyl is straight-chain alkyl or branched-chain alkyl, but includes no cyclic alkyl. In general, straight-chain alkyl is preferred to branched-chain alkyl. A same rule applies also to a terminal group such as alkoxy and alkenyl. "Fluoroalkyl" means alkyl in which at least one hydrogen is replaced by fluorine. The fluoroalkyl is a generic term of monofluoroalkyl, polyfluoroalkyl and perfluoroalkyl. A same rule applies also to fluoroalkoxy or the like. With regard to a configuration of 1,4-cyclohexylene, trans is generally preferred to cis. Then, 2-fluoro-1, 4-phenylene means two divalent groups described below. In a chemical formula, fluorine may be leftward (L) or rightward (R). A same rule applies also to an asymmetrical divalent group induced by removing two hydrogens from a ring, such as tetrahydropyran-2,5-diyl.

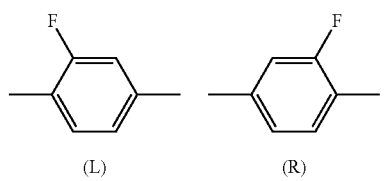

(L)        (R)

The invention includes items described below.
Item 1. A compound, represented by formula (1):

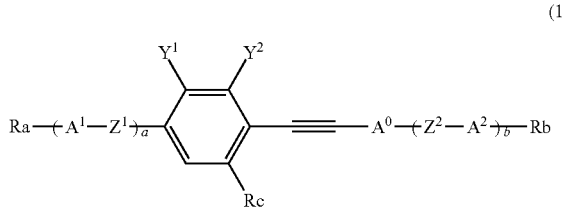

(1)

wherein, in formula (1), Ra and Rb are independently hydrogen, fluorine, chlorine, —CN, —SF$_5$, —C≡C—SF$_5$ or alkyl having 1 to 20 carbons, and in Ra and Rb, at least one piece of —CH$_2$— may be replaced by —O—, —S—, —CO— or —SiH$_2$—, and at least one piece of —CH$_2$CH$_2$— may be replaced by —CH═CH— or —C≡C—, and in the groups, at least one hydrogen may be replaced by fluorine or chlorine; A$^0$, A$^1$ and A$^2$ are independently 1,4-cyclohexylene, 1,4-phenylene, pyridine-2,5-diyl, pyrimidine-2,5-diyl, pyridazine-3,6-diyl, decahydronaphthalene-2,6-diyl, 1,2,3,4-tetrahydronaphthalene-2,6-diyl or naphthalene-2,6-diyl, and in A$^0$, A$^1$ and A$^2$, at least one piece of —CH$_2$— may be replaced by —O—, —S—, —CO— or —SiH$_2$—, and at least one piece of —CH$_2$CH$_2$— may be replaced by —CH═CH—, and in the groups, at least one hydrogen may be replaced by fluorine, chlorine, —CF$_3$, —CHF$_2$, —CH$_2$F, —OCF$_3$, —OCHF$_2$ or —OCH$_2$F; Z$^1$ and Z$^2$ are independently a single bond or alkylene having 1 to 4 carbons, and in Z$^1$ and Z$^2$, at least one piece of —CH$_2$— may be replaced by —O—, —S—, —CO— or —SiH$_2$—, and at least one piece of —CH$_2$CH$_2$— may be replaced by —CH═CH—, and in the groups, at least one hydrogen may be replaced by fluorine or chlorine; one of Y$^1$ and Y$^2$ is fluorine, and the other is hydrogen; Rc is alkyl having 1 to 4 carbons, and in Rc, at least one piece of —CH$_2$— may be replaced by —O—, —S—, —CO— or —SiH$_2$—, and at least one piece of —CH$_2$CH$_2$— may be replaced by —CH═CH— or —C≡C—; and a and b are independently 0, 1, 2 or 3, and a sum of a and b is 0, 1, 2 or 3.

Item 2. The compound according to item 1, wherein, in formula (1), Ra and Rb are independently fluorine, chlorine, alkyl having 1 to 20 carbons, alkoxy having 1 to 19 carbons, alkoxyalkyl having 2 to 19 carbons, alkenyl having 2 to 20 carbons, alkynyl having 2 to 20 carbons, fluoroalkyl having 1 to 20 carbons or fluoroalkoxy having 1 to 19 carbons; A$^0$, A$^1$ and A$^2$ are independently 1,4-cyclohexylene, 1,3-dioxane-2,5-diyl, 1,4-phenylene, 2-fluoro-1,4-phenylene, 2,5-difluoro-1,4-phenylene, 2,6-difluoro-1,4-phenylene, pyridine-2,5-diyl, pyrimidine-2,5-diyl, pyridazine-3,6-diyl, naphthalene-2,6-diyl, 1-fluoronaphthalene-2,6-diyl, 1,3-difluoronaphthalene-2,6-diyl or 1,3,8-trifluoronaphthalene-2,6-diyl; Z$^1$ and Z$^2$ are independently a single bond, —CH$_2$CH$_2$—, —COO—, —OCO—, —CH$_2$O—, —OCH$_2$—, —CF$_2$O—, —OCF$_2$—, —CH═CH—, —CF═CF—, —CH$_2$CO—, —COCH$_2$—, —CH$_2$SiH$_2$—, —SiH$_2$CH$_2$—, —(CH$_2$)$_2$COO—, —OCO(CH$_2$)$_2$—, —(CH$_2$)$_2$CF$_2$O—, —OCF$_2$(CH$_2$)$_2$—, —(CH$_2$)$_3$O—, —O(CH$_2$)$_3$— or —(CH$_2$)$_4$—; one of Y$^1$ and Y$^2$ is fluorine, and the other is hydrogen; Rc is alkyl having 1 to 4 carbons, alkoxy having 1 to 3 carbons, alkoxyalkyl having 2 to 3 carbons or alkenyl having 2 to 4 carbons; and a and b are independently 0, 1 or 2, and a sum of a and b is 0, 1, 2 or 3.

Item 3. The compound according to item 1, wherein, in formula (1), Ra and Rb are independently fluorine, alkyl having 1 to 20 carbons, alkoxy having 1 to 19 carbons, alkoxyalkyl having 2 to 19 carbons, alkenyl having 2 to 20 carbons, fluoroalkyl having 1 to 20 carbons or fluoroalkoxy having 1 to 19 carbons; A$^0$, A$^1$ and A$^2$ are independently 1,4-cyclohexylene, 1,3-dioxane-2,5-diyl, 1,4-phenylene, 2-fluoro-1,4-phenylene, 2,6-difluoro-1,4-phenylene, pyridine-2,5-diyl, pyrimidine-2,5-diyl, pyridazine-3,6-diyl, naphthalene-2,6-diyl, 1-fluoronaphthalene-2,6-diyl, 1,3-difluoronaphthalene-2,6-diyl or 1,3,8-trifluoronaphthalene-2,6-diyl; Z$^1$ and Z$^2$ are independently a single bond, —CH$_2$CH$_2$—, —CH$_2$O—, —OCH$_2$—, —CF$_2$O—, —OCF$_2$—, —CH═CH—, —CF═CF—, —(CH$_2$)$_2$CF$_2$O— or —OCF$_2$(CH$_2$)$_2$—; one of Y$^1$ and Y$^2$ is fluorine, and the other is hydrogen; Rc is alkyl having 1 to 4 carbons or alkoxy having 1 to 3 carbons; and a and b are independently 0, 1, 2 or 3, and a sum of a and b is 0, 1 or 2.

Item 4. The compound according to item 1, represented by any one of formula (1-1) to formula (1-10):

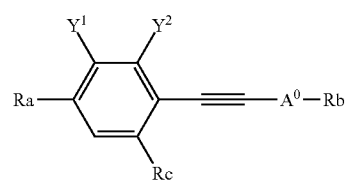

(1-1)

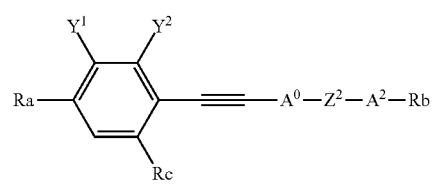

(1-2)

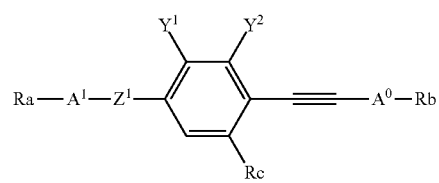

(1-3)

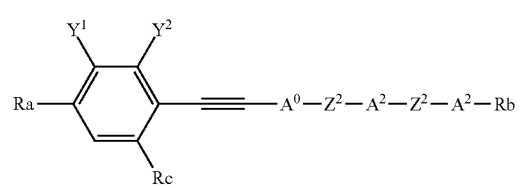

(1-4)

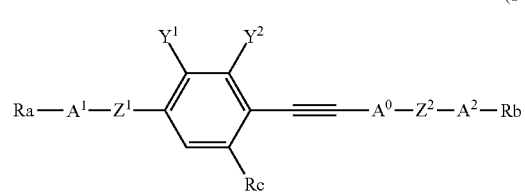

(1-5)

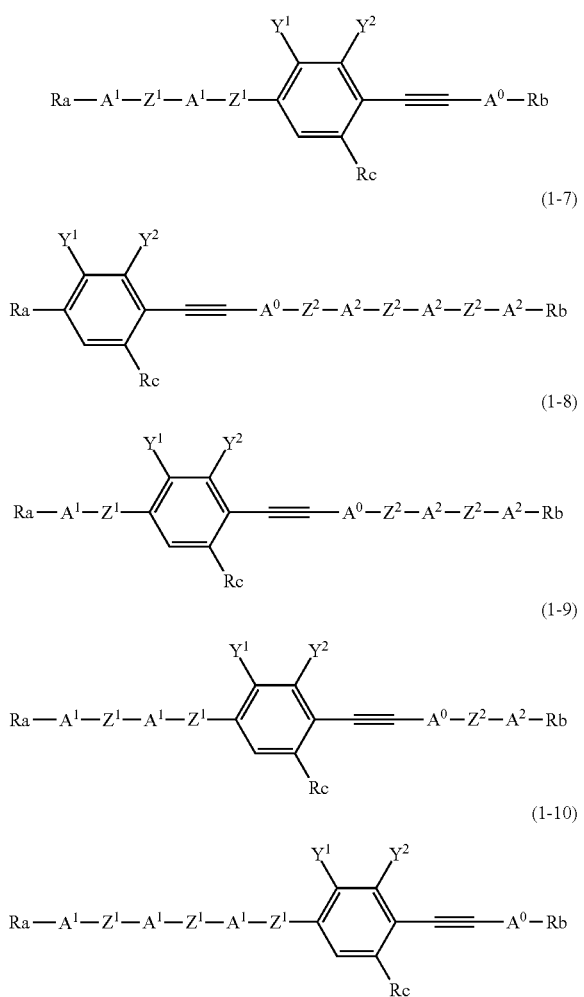

wherein, in formula (1-1) to formula (1-10), Ra and Rb are independently hydrogen, fluorine, chlorine or alkyl having 1 to 10 carbons, and in Ra and Rb, at least one piece of —CH$_2$— may be replaced by —O—, and at least one piece of —CH$_2$CH$_2$— may be replaced by —CH═CH— or —C≡C—, and in the groups, at least one hydrogen may be replaced by fluorine or chlorine; $A^0$, $A^1$ and $A^2$ are independently 1,4-cyclohexylene, 1,4-phenylene, decahydronaphthalene-2,6-diyl, 1,2,3,4-tetrahydronaphthalene-2,6-diyl or naphthalene-2,6-diyl, and in the rings, at least one piece of —CH$_2$— may be replaced by —O—, and at least one piece of —CH$_2$CH$_2$— may be replaced by —CH═CH—, and in the rings, at least one hydrogen may be replaced by fluorine, chlorine, —CF$_3$, —CHF$_2$ or —CH$_2$F; $Z^1$ and $Z^2$ are independently a single bond or alkylene having 1 to 4 carbons, and in the alkylene, at least one piece of —CH$_2$— may be replaced by —O— or —CO—, and at least one piece of —CH$_2$CH$_2$— may be replaced by —CH═CH—, and in the groups, at least one hydrogen may be replaced by fluorine or chlorine; one of $Y^1$ and $Y^2$ is fluorine, and the other is hydrogen; and Rc is alkyl having 1 to 4 carbons, and in the alkyl, at least one piece of —CH$_2$— may be replaced by —O—, and at least one piece of —CH$_2$CH$_2$— may be replaced by —CH═CH— or —C≡C—.

Item 5. The compound according to item 4, wherein, in formula (1-1) to formula (1-10), Ra and Rb are independently fluorine, alkyl having 1 to 10 carbons, alkoxy having 1 to 9 carbons, alkoxyalkyl having 2 to 9 carbons, alkenyl having 2 to 10 carbons, alkynyl having 2 to 10 carbons, fluoroalkyl having 1 to 10 carbons or fluoroalkoxy having 2 to 10 carbons; $A^0$, $A^1$ and $A^2$ are independently 1,4-cyclohexylene, 1,3-dioxane-2,5-diyl, 1,4-phenylene, 2-fluoro-1,4-phenylene, 2,5-difluoro-1,4-phenylene, 2,6-difluoro-1,4-phenylene, naphthalene-2,6-diyl, 1-fluoronaphthalene-2,6-diyl, 1,3-difluoronaphthalene-2,6-diyl or 1,3,8-trifluoronaphthalene-2,6-diyl; $Z^1$ and $Z^2$ are independently a single bond, —CH$_2$CH$_2$—, —COO—, —OCO—, —CH$_2$O—, —OCH$_2$—, —CF$_2$O—, —OCF$_2$—, —CH═CH—, —CF═CF—, —(CH$_2$)$_2$COO—, —OCO(CH$_2$)$_2$—, —(CH$_2$)$_2$CF$_2$O—, —OCF$_2$(CH$_2$)$_2$—, —(CH$_2$)$_3$O—, —O(CH$_2$)$_3$— or —(CH$_2$)$_4$—; one of $Y^1$ and $Y^2$ is fluorine, and the other is hydrogen; and Rc is alkyl having 1 to 4 carbons, alkoxy having 1 to 4 carbons, alkoxyalkyl having 2 to 4 carbons or alkenyl having 2 to 4 carbons.

Item 6. The compound according to item 4, wherein, in formula (1-1) to formula (1-10), Ra and Rb are independently fluorine, alkyl having 1 to 10 carbons, alkoxy having 1 to 9 carbons, alkenyl having 2 to 10 carbons, fluoroalkyl having 1 to 10 carbons or fluoroalkoxy having 2 to 10 carbons; $A^0$, $A^1$ and $A^2$ are independently 1,3-dioxane-2,5-diyl, 1,4-phenylene, 2-fluoro-1,4-phenylene, 2,5-difluoro-1,4-phenylene, 2,6-difluoro-1,4-phenylene, naphthalene-2,6-diyl, 1-fluoronaphthalene-2,6-diyl, 1,3-difluoronaphthalene-2,6-diyl or 1,3,8-trifluoronaphthalene-2,6-diyl; $Z^1$ and $Z^2$ are independently a single bond, —CH$_2$CH$_2$—, —CH$_2$O—, —OCH$_2$—, —CF$_2$O—, —OCF$_2$—, —CH═CH—, —CF═CF—, —(CH$_2$)$_2$CF$_2$O—, —OCF$_2$(CH$_2$)$_2$—, —(CH$_2$)$_3$O—, —O(CH$_2$)$_3$— or —(CH$_2$)$_4$—; one of $Y^1$ and $Y^2$ is fluorine, and the other is hydrogen; and Rc is alkyl having 1 to 4 carbons, alkoxy having 1 to 4 carbons, alkoxyalkyl having 2 to 4 carbons or alkenyl having 2 to 4 carbons.

Item 7. The compound according to item 4, wherein, in formula (1-1) to formula (1-10), Ra and Rb are independently fluorine, alkyl having 1 to 8 carbons, alkoxy having 1 to 8 carbons, alkenyl having 2 to 8 carbons, fluoroalkyl having 1 to 8 carbons or fluoroalkoxy having 1 to 8 carbons; $A^0$, $A^1$ and A are independently 1,4-phenylene, 2-fluoro-1,4-phenylene, 2,6-difluoro-1,4-phenylene, naphthalene-2,6-diyl, 1-fluoronaphthalene-2,6-diyl, 1,3-difluoronaphthalene-2,6-diyl or 1,3,8-trifluoronaphthalene-2,6-diyl; $Z^1$ and $Z^2$ are independently a single bond, —CF$_2$O—, —OCF$_2$—, —CH═CH—, —CF═CF—, —(CH$_2$)$_2$CF$_2$O— or —OCF$_2$(CH$_2$)$_2$—; one of $Y^1$ and $Y^2$ is fluorine, and the other is hydrogen; and Rc is alkyl having 1 to 4 carbons or alkoxy having 1 to 4 carbons.

Item 8. The compound according to item 4, wherein, in formula (1-1) to formula (1-6), Ra and Rb are independently fluorine, alkyl having 1 to 8 carbons, alkoxy having 1 to 8 carbons or fluoroalkyl having 1 to 8 carbons; $A^0$, $A^1$ and $A^2$ are independently 1,4-phenylene, 2-fluoro-1,4-phenylene or 2,6-difluoro-1,4-phenylene; $Z^1$ and $Z^2$ are independently a single bond, —CF$_2$O— or —OCF$_2$—; one of $Y^1$ and $Y^2$ is fluorine, and the other is hydrogen; and Rc is alkyl having 1 to 4 carbons.

Item 9. The compound according to item 1, represented by any one of formula (1-1A) to formula (1-1B), formula (1-2A) to formula (1-2C), formula (1-3A) to formula (1-3C), formula (1-4A) to formula (1-4D), formula (1-5A) to formula (1-5D) and formula (1-6A) to formula (1-6D):

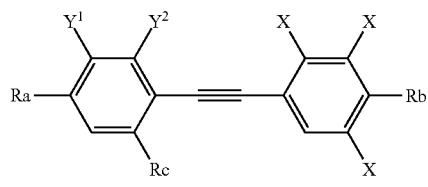
(1-1A)
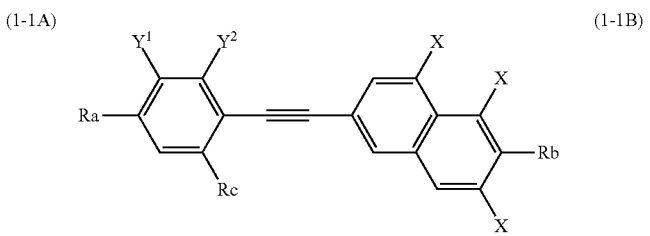
(1-1B)
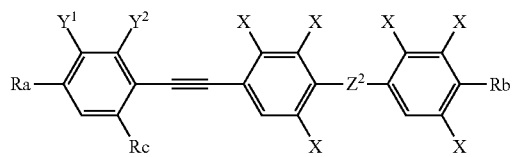
(1-2A)
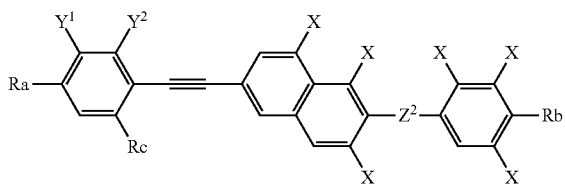
(1-2B)
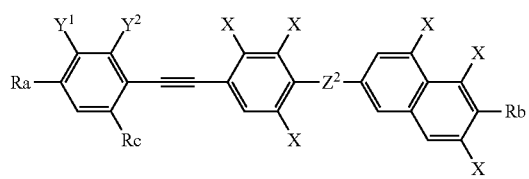
(1-2C)
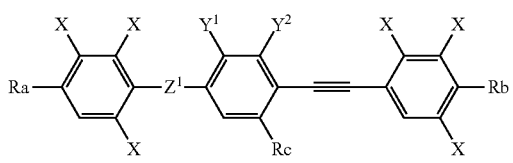
(1-3A)
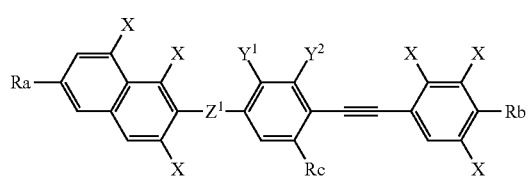
(1-3B)
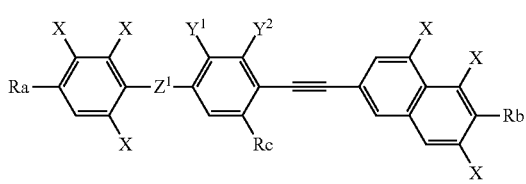
(1-3C)
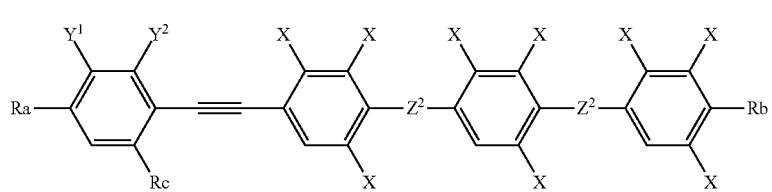
(1-4A)
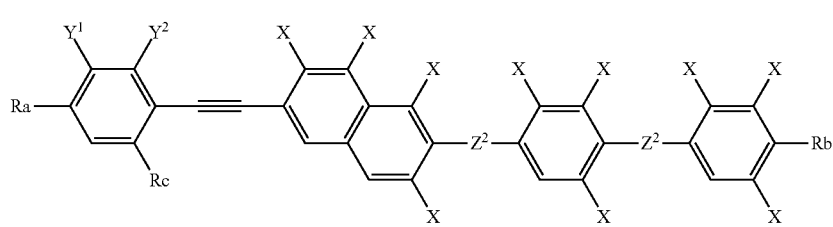
(1-4B)
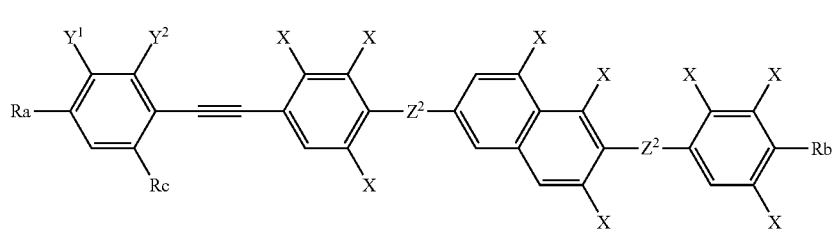
(1-4C)

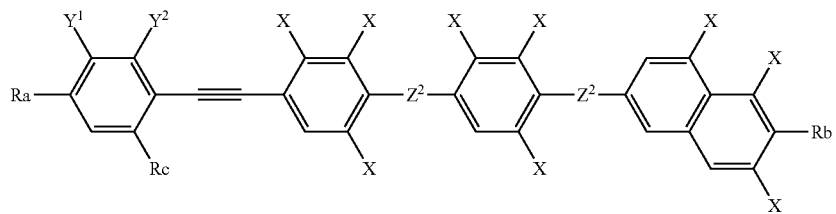
(1-4D)
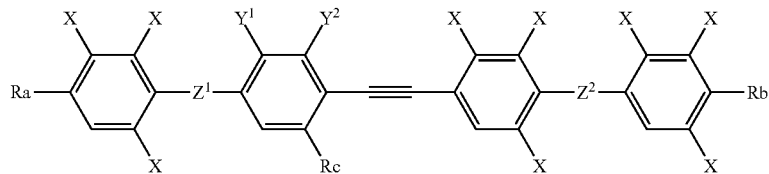
(1-5A)
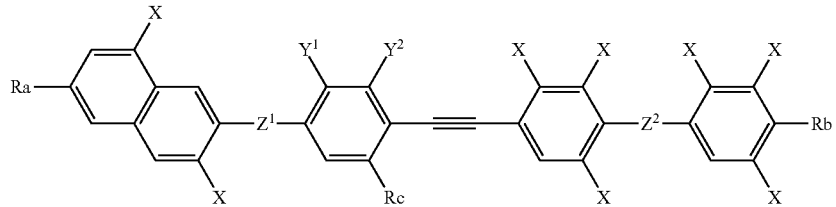
(1-5B)
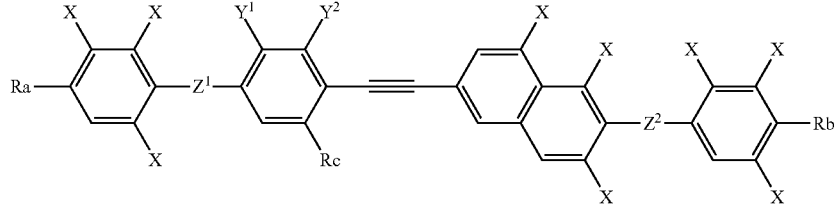
(1-5C)
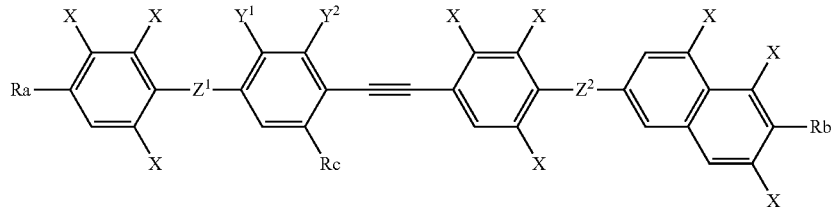
(1-5D)
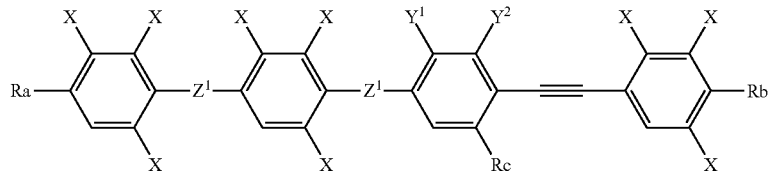
(1-6A)
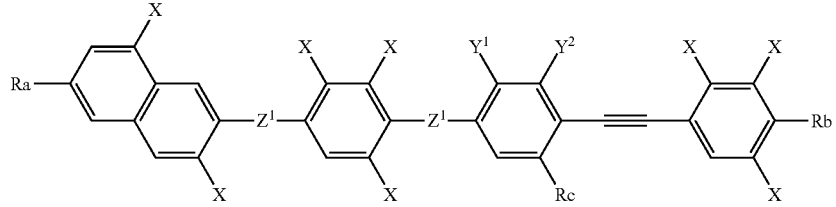
(1-6B)

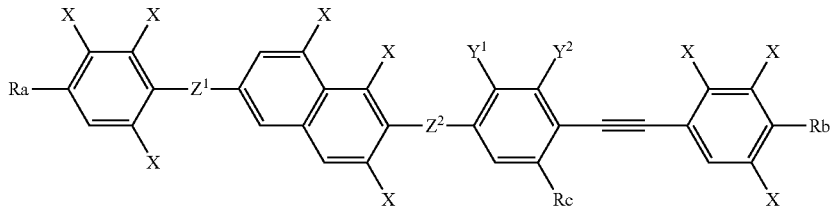

(1-6C)

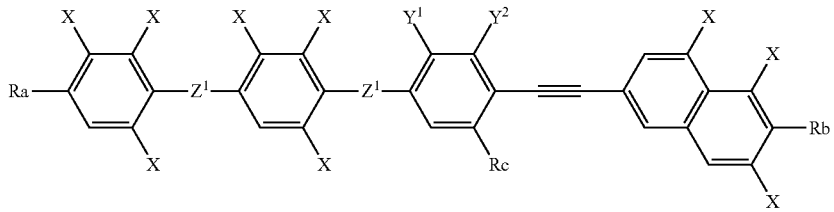

(1-6D)

wherein, in formula (1-1A) to formula (1-1B), formula (1-2A) to formula (1-2C), formula (1-3A) to formula (1-3C), formula (1-4A) to formula (1-4D), formula (1-5A) to formula (1-5D) and formula (1-6A) to formula (1-6D), Ra and Rb are independently hydrogen, fluorine, —$CF_3$, —$CHF_2$, —$CH_2F$, —$OCF_3$, —$OCHF_2$, —$OCF_2CHF_2$, —$OCF_2CHFCF_3$ or alkyl having 1 to 10 carbons, and in the alkyl, at least one piece of —$CH_2$— may be replaced by —O—, and at least one piece of —$CH_2CH_2$— may be replaced by —CH=CH—; $Z^1$ and $Z^2$ are independently a single bond, —$CF_2O$— or —$OCF_2$—; one of $Y^1$ and $Y^2$ is fluorine, and the other is hydrogen; Rc is methyl, ethyl or propyl; and X is hydrogen or fluorine.

Item 10. The compound according to item 9, wherein, in formula (1-1A), formula (1-2A), formula (1-3A), formula (1-4A), formula (1-5A) or formula (1-6A), Ra and Rb are alkyl having 1 to 10 carbons or alkoxy having 1 to 10 carbons; $Z^1$ and $Z^2$ are a single bond; one of $Y^1$ and $Y^2$ is fluorine, and the other is hydrogen; Rc is methyl, ethyl or propyl; and X is hydrogen or fluorine.

Item 11. The compound according to item 9, wherein, in formula (1-1B), formula (1-2B), formula (1-2C), formula (1-3B), formula (1-3C), formula (1-4B), formula (1-4C), formula (1-4D), formula (1-5B), formula (1-5C), formula (1-5D), formula (1-6B), formula (1-6C) or formula (1-6D), Ra and Rb are alkyl having 1 to 10 carbons or alkoxy having 1 to 10 carbons; $Z^1$ and $Z^2$ are a single bond; Rc is methyl, ethyl or propyl, one of $Y^1$ and $Y^2$ is fluorine, and the other is hydrogen; and X is hydrogen or fluorine.

Item 12. The compound according to item 9, wherein, in formula (1-1A), formula (1-2A), formula (1-3A), formula (1-4A), formula (1-5A) or formula (1-6A), one of Ra and Rb is fluorine, —$CF_3$ or —$OCF_3$, and the other is alkyl having 1 to 10 carbons or alkoxy having 1 to 10 carbons; $Z^1$ and $Z^2$ are a single bond, —$C_F2O$— or —$OCF_2$—; Rc is methyl, ethyl or propyl; one of $Y^1$ and $Y^2$ is fluorine, and the other is hydrogen; and X is hydrogen or fluorine.

Item 13. The compound according to item 9, wherein, in formula (1-1B), formula (1-2B), formula (1-2C), formula (1-3B), formula (1-3C), formula (1-4B), formula (1-4C), formula (1-4D), formula (1-5B), formula (1-5C), formula (1-5D), formula (1-6B), formula (1-6C) or formula (1-6D), one of Ra and Rb is fluorine, —$CF_3$ or —$OCF_3$, and the other is alkyl having 1 to 10 carbons or alkoxy having 1 to 10 carbons; $Z^1$ and $Z^2$ are a single bond, —$CF_2O$— or —$OCF_2$—; Rc is methyl, ethyl or propyl; one of $Y^1$ and $Y^2$ is fluorine, and the other is hydrogen; and X is hydrogen or fluorine.

Item 14. A liquid crystal composition, containing at least one compound according to any one of items 1 to 13.

Item 15. The liquid crystal composition according to item 14, further containing at least one compound selected from the group of compounds represented by formulas (2) to (4):

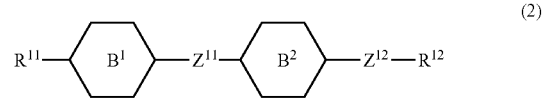

(2)

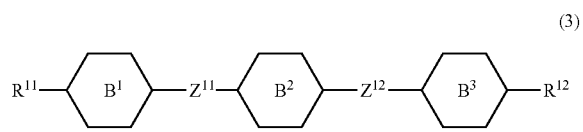

(3)

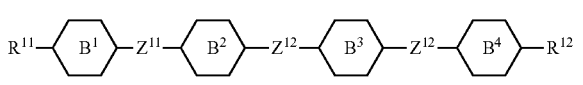

(4)

wherein, in formulas (2) to (4), $R^{11}$ and $R^{12}$ are independently, alkyl having 1 to 10 carbons or alkenyl having 2 to 10 carbons, and in $R^{11}$ and $R^{12}$, at least one piece of —$CH_2$— may be replaced by —O—, and in the groups, at least one hydrogen may be replaced by fluorine;

ring $B^1$, ring $B^2$, ring $B^3$ and ring $B^4$ are independently 1,4-cyclohexylene, 1,4-phenylene, 2-fluoro-1,4-phenylene, 2,5-difluoro-1,4-phenylene or pyrimidine-2,5-diyl; and $Z^{11}$, $Z^{12}$ and $Z^{13}$ are independently a single bond, —COO—, —$CH_2CH_2$—, —CH=CH— or —C≡C—.

Item 16. The liquid crystal composition according to item 14 or 15, further containing at least one compound selected from the group of compounds represented by formulas (5) to (7):

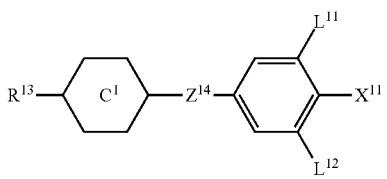
(5)

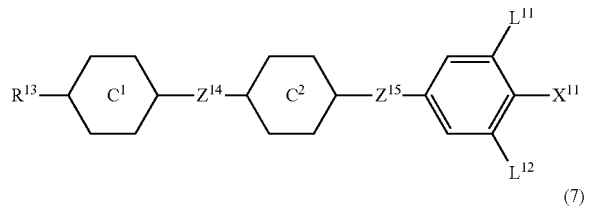
(6)

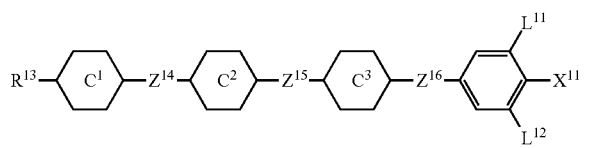
(7)

wherein, in formulas (5) to (7), $R^{13}$ is alkyl having 1 to 10 carbons or alkenyl having 2 to 10 carbons, and in the alkyl and the alkenyl, at least one piece of —$CH_2$— may be replaced by —O—, and in the groups, at least one hydrogen may be replaced by fluorine;

$X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$;

ring $C^1$, ring $C^2$ and ring $C^3$ are independently 1,4-cyclohexylene, 1,4-phenylene, 1,4-phenylene in which at least one hydrogen is replaced by fluorine, tetrahydropyran-2,5-diyl, 1,3-dioxane-2,5-diyl or pyrimidine-2,5-diyl;

$Z^{14}$, $Z^{15}$ and $Z^{16}$ are independently a single bond, —COO—, —OCO—, —$CH_2O$—, —$OCH_2$—, —$CF_2O$—, —$OCF_2$—, —$CH_2CH_2$—, —CH=CH—, —C≡C— or —$(CH_2)_4$—; and $L^{11}$ and $L^{12}$ are independently hydrogen or fluorine.

Item 17. The liquid crystal composition according to any one of items 14 to 16, further containing at least one compound selected from the group of compounds represented by formula (8):

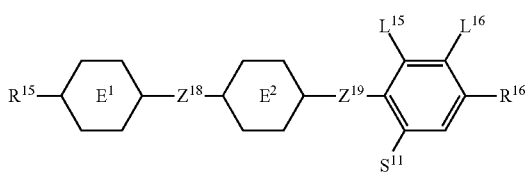
(8)

wherein, in formula (8), $R^{14}$ is alkyl having 1 to 10 carbons or alkenyl having 2 to 10 carbons, and in $R^{14}$, at least one piece of —$CH_2$— may be replaced by —O—, and in the groups, at least one hydrogen may be replaced by fluorine;

$X^{12}$ is —C≡N or —C≡C—C≡N;

ring $D^1$ is 1,4-cyclohexylene, 1,4-phenylene, 1,4-phenylene in which at least one hydrogen is replaced by fluorine, tetrahydropyran-2,5-diyl, 1,3-dioxane-2,5-diyl or pyrimidine-2,5-diyl;

$Z^{17}$ is a single bond, —COO—, —OCO—, —$CH_2O$—, —$OCH_2$—, —$CF_2O$—, —$OCF_2$—, —$CH_2CH_2$— or —C≡C—;

$L^{13}$ and $L^{14}$ are independently hydrogen or fluorine; and i is 1, 2, 3 or 4.

Item 18. The liquid crystal composition according to any one of items 14 to 17, further containing at least one compound selected from the group of compounds represented by formulas (9) to (15):

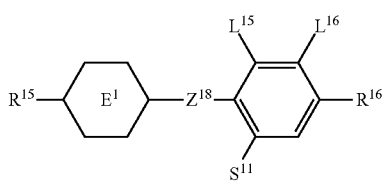
(9)

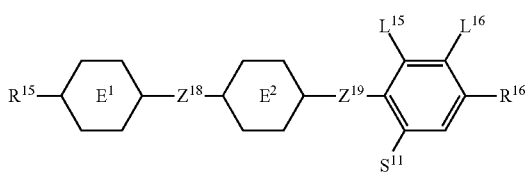
(10)

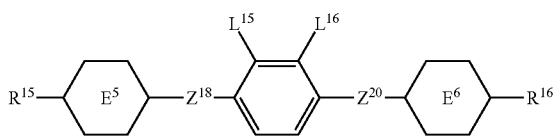
(11)

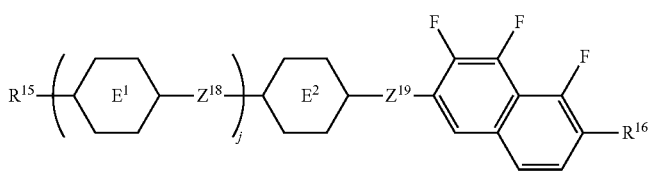
(12)

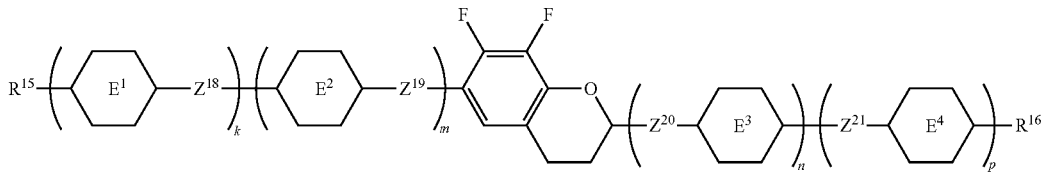

(13)

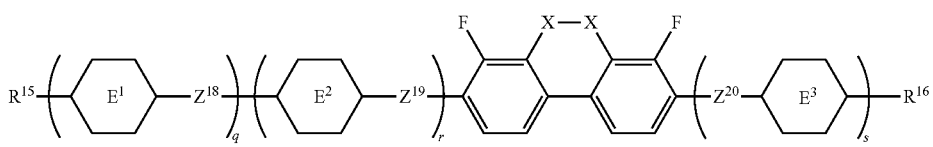

(14)

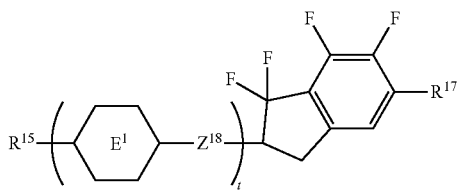

(15)

wherein, in formulas (9) to (15), $R^{15}$, $R^{16}$ and $R^{17}$ are independently alkyl having 1 to 10 carbons or alkenyl having 2 to 10 carbons, and in $R^{15}$, $R^{16}$ and $R^{17}$, at least one piece of —CH$_2$— may be replaced by —O—, and in the groups, at least one hydrogen may be replaced by fluorine, in which $R^{17}$ may be hydrogen or fluorine;

ring $E^1$, ring $E^2$, ring $E^3$ and ring $E^4$ are independently 1,4-cyclohexylene, 1,4-cyclohexenylene, 1,4-phenylene, 1,4-phenylene in which at least one hydrogen is replaced by fluorine, tetrahydropyran-2,5-diyl or decahydronaphthalene-2,6-diyl;

ring $E^5$ and ring $E^6$ are independently 1,4-cyclohexylene, 1,4-cyclohexenylene, 1,4-phenylene, tetrahydropyran-2,5-diyl or decahydronaphthalene-2,6-diyl;

$Z^{18}$, $Z^{19}$, $Z^{20}$ and $Z^{21}$ are independently a single bond, —COO—, —OCO—, —CH$_2$O—, —OCH$_2$—, —CF$_2$O—, —OCF$_2$—, —CH$_2$CH$_2$—, —CF$_2$OCH$_2$CH$_2$— or —OCF$_2$CH$_2$CH$_2$—;

$L^{15}$ and $L^{16}$ are independently fluorine or chlorine;

$S^{11}$ is hydrogen or methyl;

X is —CHF— or —CF$_2$—; and j, k, m, n, p, q, r and s are independently 0 or 1, a sum of k, m, n and p is 1 or 2, a sum of q, r and s is 0, 1, 2 or 3, and t is 1, 2 or 3.

Item 19. A liquid crystal display device, including the liquid crystal composition according to any one of items 14 to 18.

Item 20. The liquid crystal display device according to item 19, wherein the liquid crystal composition according to any one of items 14 to 18 is encapsulated.

Item 21. The liquid crystal display device according to item 19, wherein the liquid crystal composition according to any one of items 14 to 18 is used in a lens to be utilized in switching between 2D and 3D.

The invention further includes the following items: (a) the composition, further containing one, two or at least three additives selected from the group of a polymerizable compound, a polymerization initiator, a polymerization inhibitor, an optically active compound, an antioxidant, an ultraviolet light absorber, a light stabilizer, a heat stabilizer, a dye and an antifoaming agent; (b) the liquid crystal composition, wherein a maximum temperature of a nematic phase is 70° C. or higher, an optical anisotropy (measured at 25° C.) at a wavelength of 589 nanometers is 0.07 or more, and a dielectric anisotropy (measured at 25° C.) at a frequency of 1 kHz is 2 or more; and (c) the liquid crystal display device, wherein an operating mode in the liquid crystal display device is a TN mode, an ECB mode, an OCB mode, an IPS mode, a VA mode, an FFS mode or an FPA mode, and a driving mode in the liquid crystal display device is an active matrix (AM) mode.

An aspect of compound (1), a synthesis method of compound (1), the liquid crystal composition and the liquid crystal display device will be described in the order.

1. Aspect of Compound (1)

Compound (1) of the invention has a 1,4-phenylene ring in which Rc such as alkyl is replaced in 5-position. Compound (1) has a feature of having higher stability to light in comparison with a similar compound (see Comparative Examples 1 and 2). In a compound having a triple bond, stability to light is generally decreased. However, Rc in the 5-position is effective in preventing decrease of the stability.

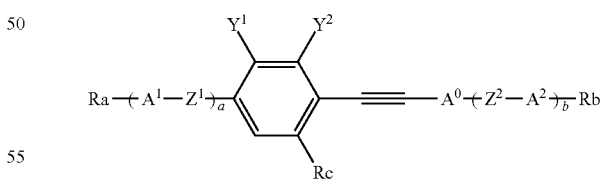

(1)

In compound (1), magnitude of dielectric anisotropy depends on a kind of terminal group (Ra or Rb). When the terminal group is an electron donating group such as alkyl, dielectric anisotropy of compound (1) is small. When at least one terminal group is an electron withdrawing group such as fluorine, dielectric anisotropy of compound (1) is positive and large.

Preferred examples of compound (1) will be described. Preferred examples of terminal group Ra, ring A and bonding group Z in compound (1) apply also to a subordinate formula of formula (1) for compound (1). In compound (1), physical properties can be arbitrarily adjusted by suitably combining the groups. Compound (1) may contain a larger amount of isotope such as $^2$H (deuterium) and $^{13}$C than the amount of natural abundance because no significant difference exists in the physical properties of the compound. In addition, symbols in compound (1) are defined according to item 1.

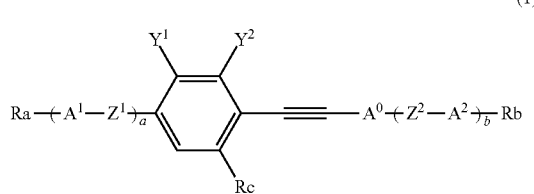

(1)

In formula (1), Ra and Rb are independently hydrogen, fluorine, chlorine, —CN, —SF$_5$, —C≡C—SF$_5$ or alkyl having 1 to 20 carbons, and in the alkyl, at least one piece of —CH$_2$— may be replaced by —O—, —S—, —CO— or —SiH$_2$—, and at least one piece of —CH$_2$CH$_2$— may be replaced by —CH=CH— or —C≡C—, and in the groups, at least one hydrogen may be replaced by fluorine or chlorine.

"Alkyl in which at least one piece of —CH$_2$— may be replaced by —O— or —CO—" includes not only a group having —O— or —CO—, but also a group having —COO— or —OCO—. A same rule applies also to a ring and a bonding group. Examples of Ra or Rb include hydrogen (—H), alkyl (—R), alkoxy (—OR), alkoxyalkyl (—(CH$_2$)$_n$—OR), alkoxyalkoxy (—O—(CH$_2$)$_n$—OR), alkylthio (—SR), alkylthioalkyl (—(CH$_2$)$_n$—SR), alkylthioalkoxy (—O(CH$_2$)$_n$—SR), acyl (—COR), acylalkyl (—(CH$_2$)$_n$—COR), acyloxy (—OCOR), acyloxyalkyl (—(CH$_2$)$_n$—OCOR), alkoxycarbonyl (—COOR), alkoxycarbonylalkyl (—(CH$_2$)$_n$—COOR), alkenyl (—(CH$_2$)$_n$—CH=CH—R), alkenyloxy (—O(CH$_2$)$_n$—CH=CH—R), alkenyloxyalkyl (—(CH$_2$)$_n$—O(CH$_2$)$_n$—CH=CH—R), alkoxyalkenyl (—(CH$_2$)$_n$—CH=CH—OR), alkynyl (—(CH$_2$)$_n$—C≡C—R), alkynyloxy (—O(CH$_2$)$_n$—C≡C—R), alkylsilyl (—SiH$_2$—R) or alkylsilylalkyl (—(CH$_2$)$_n$—SiH$_2$—R). Examples of Ra or Rb is also include the above described groups in which at least one hydrogen is replaced by fluorine, and preferably include fluoroalkyl or fluoroalkoxy.

Preferred Ra or Rb is alkyl, alkoxy, alkoxyalkyl, alkoxyalkoxy, alkenyl, alkenyloxy, alkenyloxyalkyl or alkoxyalkenyl. Preferred Ra or Rb is alkyl, alkoxy, alkoxyalkyl, alkoxyalkoxy, alkenyl, alkenyloxy, alkylthio or alkylthioalkyl. Further preferred Ra or Rb is alkyl, alkoxy, alkoxyalkyl, alkenyl or alkenyloxy. Still further preferred Ra or Rb is also alkyl, alkoxy, alkenyl or alkenyloxy. Particularly preferred Ra or Rb is alkyl or alkenyl. Most preferred Ra or Rb is alkyl.

Preferred alkyl is —CH$_3$, —C$_2$H$_5$, —C$_3$H$_7$, —C$_4$H$_9$, —C$_5$H$_{11}$, —C$_6$H$_{13}$ or —C$_7$H$_{15}$.

Preferred alkoxy is —OCH$_3$, —OC$_2$H$_5$, —OC$_3$H$_7$, —OC$_4$H$_9$, —OC$_5$H$_{11}$, —OC$_6$H$_{13}$ or —OC$_7$H$_{15}$.

Preferred alkoxyalkyl is —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$ or —(CH$_2$)$_5$—OCH$_3$.

Preferred alkenyl is —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$ or —(CH$_2$)$_3$—CH=CH$_2$.

Preferred alkenyloxy is —OCH$_2$CH=CH$_2$, —OCH$_2$CH=CHCH$_3$ or —OCH$_2$CH=CHC$_2$H$_5$.

Preferred Ra or Rb is hydrogen, —CH$_3$, —C$_2$H$_5$, —C$_3$H$_7$, —C$_4$H$_9$, —C$_5$H$_{11}$, —C$_6$H$_{13}$, —OCH$_3$, —OC$_2$H$_5$, —OC$_3$H$_7$, —OC$_4$H$_9$, —OC$_5$H$_{11}$, —CH$_2$OCH$_3$, —CH=CH$_2$, —CH=CHCH$_3$, —(CH$_2$)$_2$—CH=CH$_2$, —CH$_2$CH=CHC$_2$H$_5$, —(CH$_2$)$_2$—CH=CHCH$_3$, —OCH$_2$CH=CH$_2$, —OCH$_2$CH=CHCH$_3$ or —OCH$_2$CH=CHC$_2$H$_5$. Further preferred Ra or Rb is —C$_3$H$_7$, —C$_4$H$_9$, —C$_5$H$_{11}$, —C$_6$H$_{13}$ or —(CH$_2$)$_2$—CH=CH$_2$—(CH$_2$)$_2$—CH=CHCH$_3$.

Both of Ra and Rb may be an electron withdrawing group, but one may be preferably the electron withdrawing group. Examples of the electron withdrawing group include fluorine, chlorine, —CN, —SF$_5$, —C≡C—SF$_5$, fluoroalkyl, fluoroalkoxy or fluoroalkoxyfluoroalkyl. Examples of fluoroalkyl or fluoroalkoxy include —CF$_3$, —CHF$_2$, —CH$_2$F, —OCF$_3$, —OCHF$_2$, —OCF$_2$CHF$_2$, —OCF$_2$CHFCF$_3$, perfluoroalkyl having 2 to 15 carbons or perfluoroalkoxy having 2 to 15 carbons. Examples of fluoroalkoxyfluoroalkyl include —CF$_2$OCF$_3$. A preferred electron withdrawing group is fluorine, —CF$_3$ or —OCF$_3$.

In formula (1), $A^0$, $A^1$ and $A^2$ are independently 1,4-cyclohexylene, 1,4-phenylene, pyridine-2,5-diyl, pyrimidine-2,5-diyl, pyridazine-3,6-diyl, decahydronaphthalene-2,6-diyl, 1,2,3,4-tetrahydronaphthalene-2,6-diyl or naphthalene-2,6-diyl, and in the rings, at least one piece of —CH$_2$— may be replaced by —O—, —S—, —CO— or —SiH$_2$—, and at least one piece of —CH$_2$CH$_2$— may be replaced by —CH=CH—, and in the groups, at least one hydrogen may be replaced by fluorine, chlorine, —CF$_3$, —CHF$_2$, —CH$_2$F, —OCF$_3$, —OCHF$_2$ or —OCH$_2$F.

Preferred examples of "in the rings, at least one piece of —CH$_2$— may be replaced by —O—, —S—, —CO— or —SiH$_2$—, and at least one piece of —CH$_2$CH$_2$— may be replaced by —CH=CH—" include a divalent group represented by formulas (16-1) to (16-50) described below. Further preferred examples include the divalent group represented by formulas (16-1) to (16-4), formula (16-15), formula (16-23), formulas (16-27) to (16-29), formula (16-36), formula (16-39) and formula (16-45).

(16-1)

(16-2)

(16-3)

(16-4)

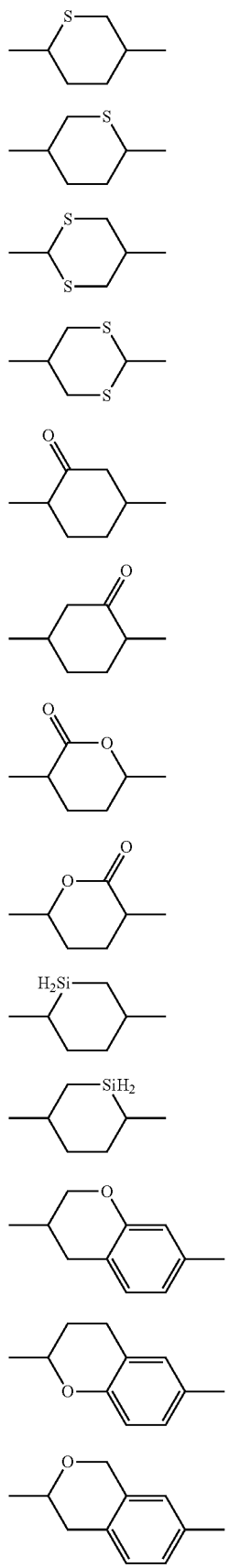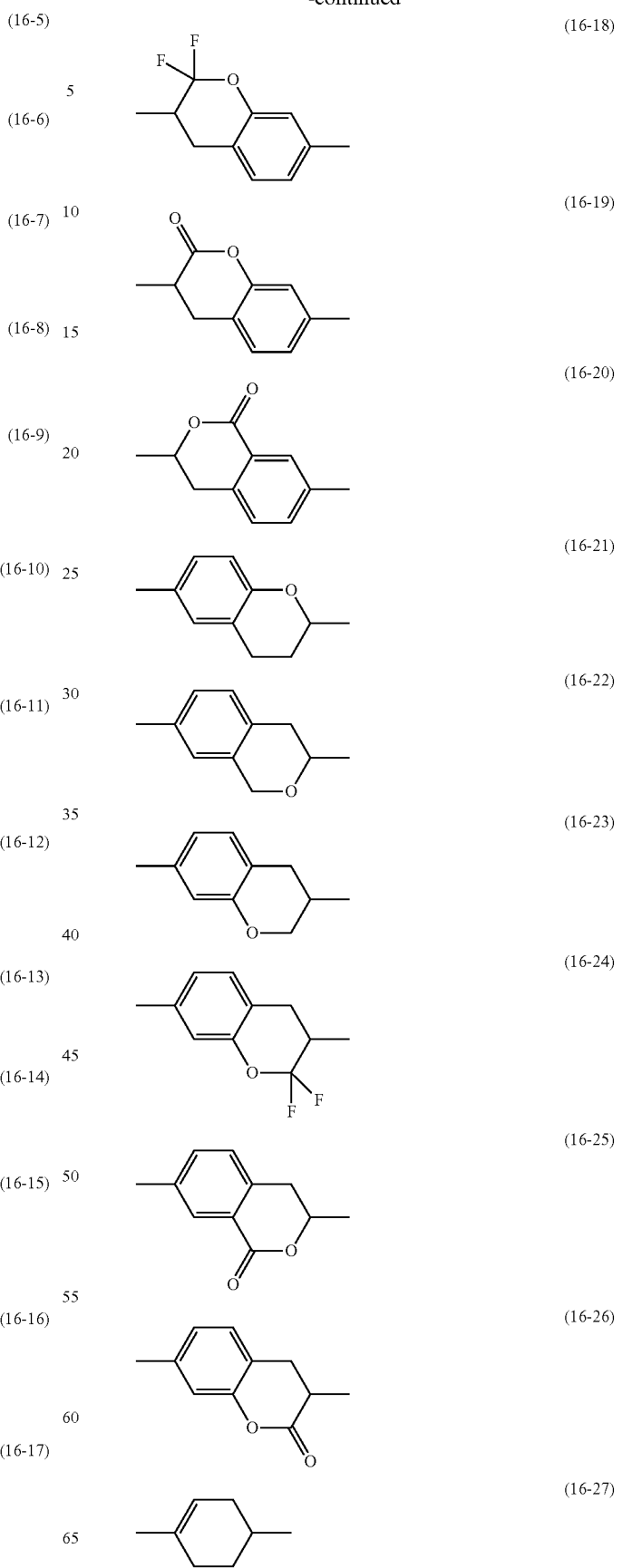

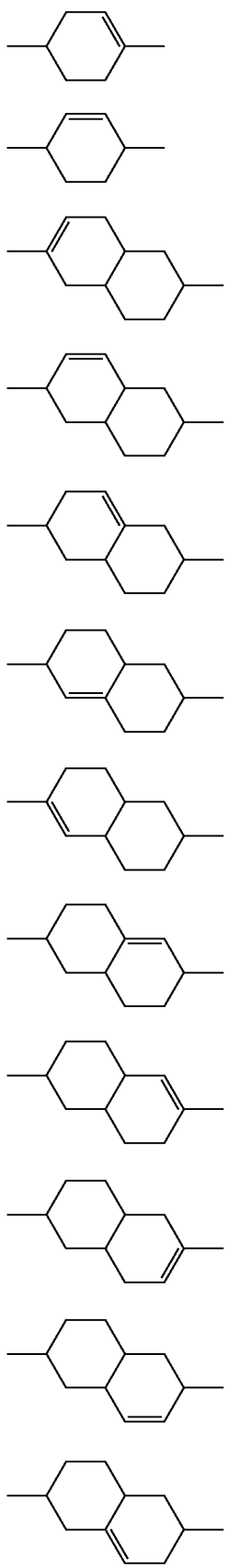
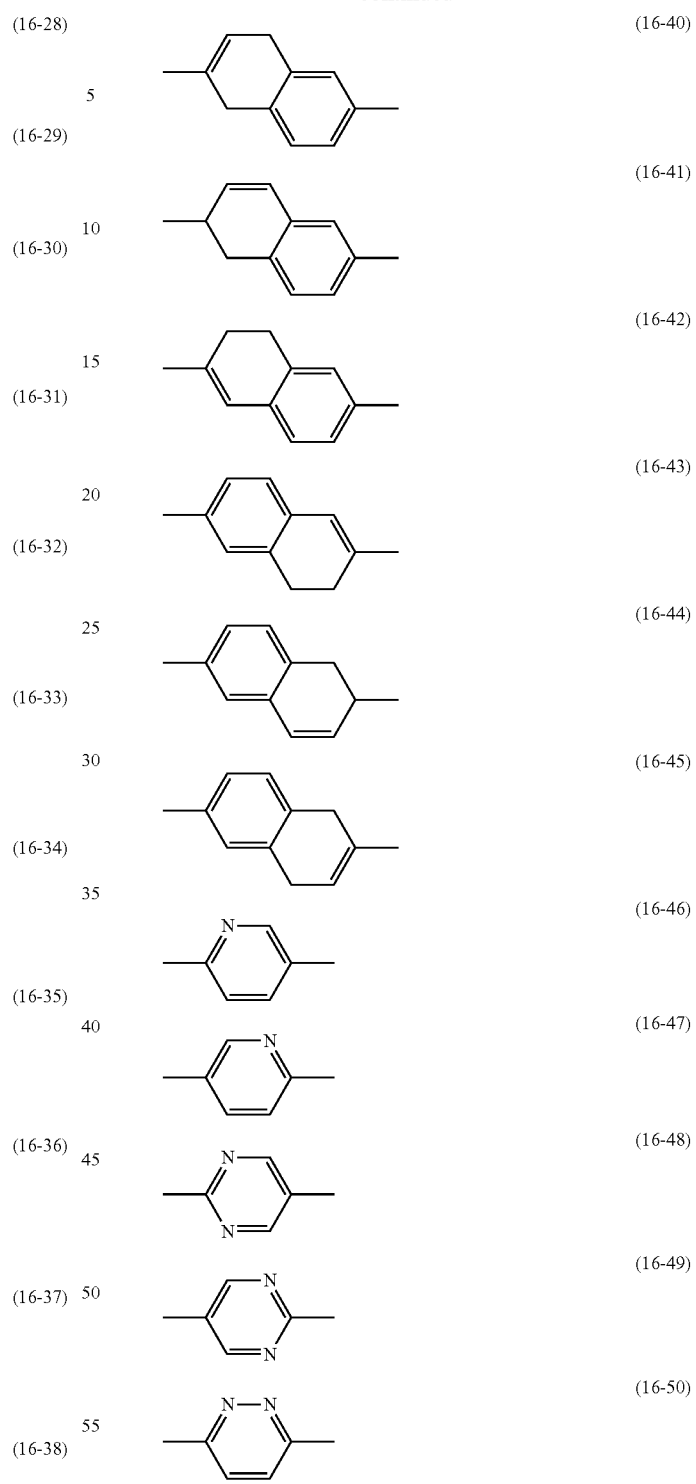
Preferred examples of "in the groups, at least one hydrogen may be replaced by fluorine, chlorine, —$CF_3$, —$CHF_2$, —$CH_2F$, —$OCF_3$, —$OCHF_2$ or —$OCH_2F$" include a divalent group represented by formulas (17-1) to (17-77) described below. Further preferred examples include the divalent group represented by formulas (17-1) to (17-4), formula (17-6), formulas (17-10) to (17-15), formulas (17-54) to (17-59) and formulas (17-72) to (17-77).

(17-1) 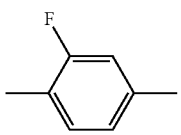
(17-2) 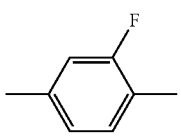
(17-3) 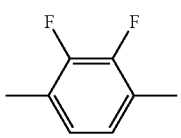
(17-4) 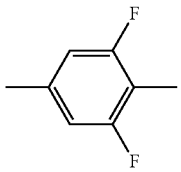
(17-5) 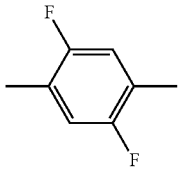
(17-6) 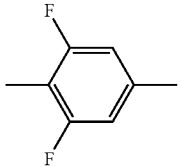
(17-7) 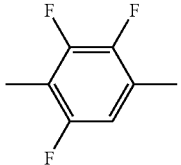
(17-8) 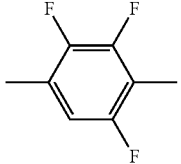
(17-9) 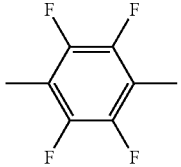
-continued
(17-10) 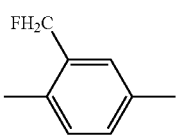
(17-11) 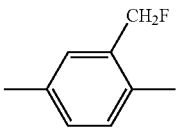
(17-12) 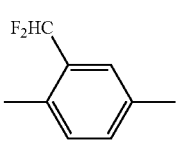
(17-13) 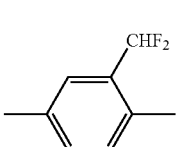
(17-14) 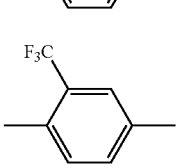
(17-15) 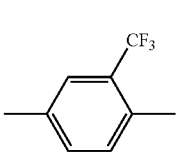
(17-16) 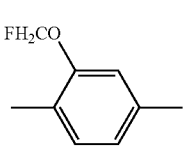
(17-17) 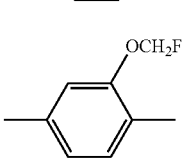
(17-18) 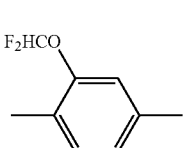
(17-19) 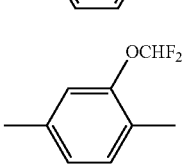
(17-20) 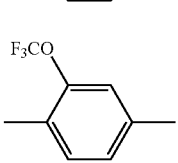

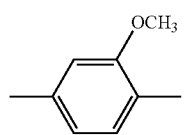 (17-21)
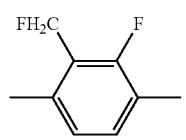 (17-22)
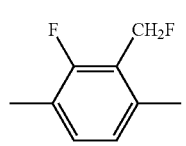 (17-23)
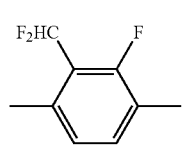 (17-24)
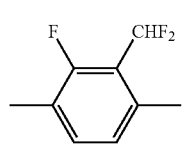 (17-25)
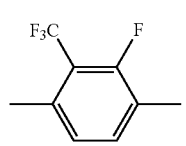 (17-25)
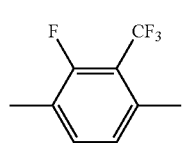 (17-27)
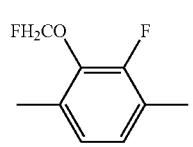 (17-28)
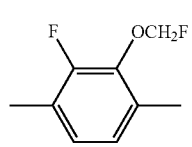 (17-29)
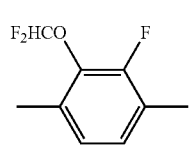 (17-30)
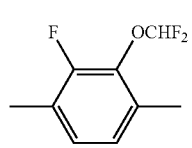 (17-31)
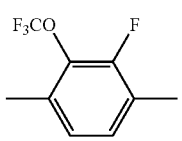 (17-32)
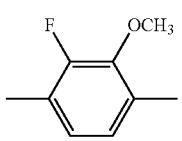 (17-33)
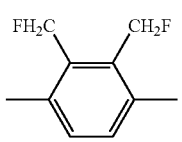 (17-34)
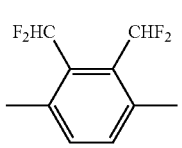 (17-35)
 (17-36)
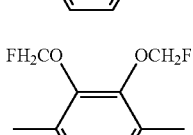 (17-37)
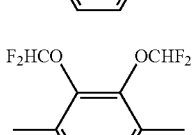 (17-38)
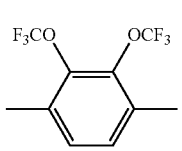 (17-39)
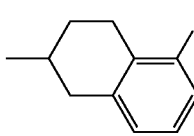 (17-40)
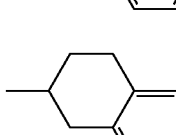 (17-41)
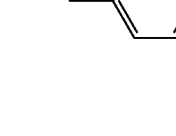 (17-42)

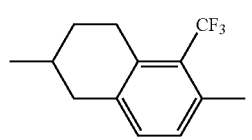 (17-43)
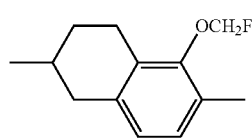 (17-44)
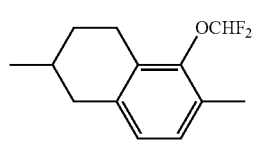 (17-45)
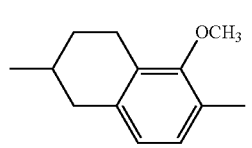 (17-46)
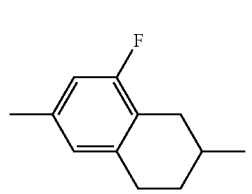 (17-47)
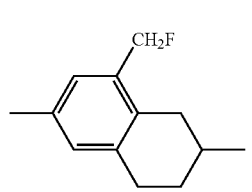 (17-48)
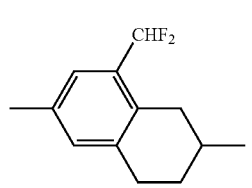 (17-49)
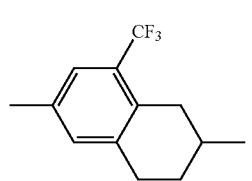 (17-50)
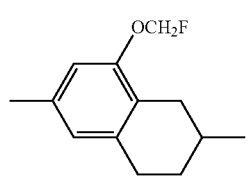 (17-51)
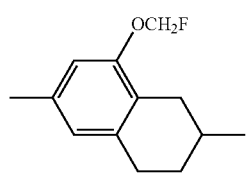 (17-52)
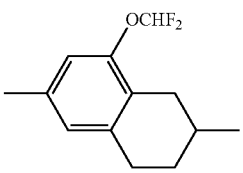 (17-53)
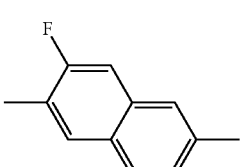 (17-54)
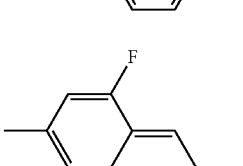 (17-55)
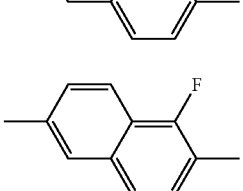 (17-56)
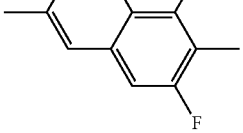 (17-57)
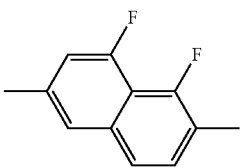 (17-58)
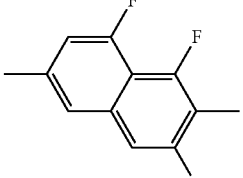 (17-59)
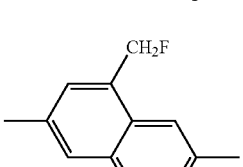 (17-60)
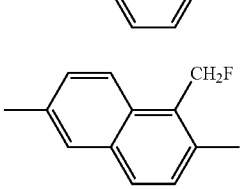 (17-61)

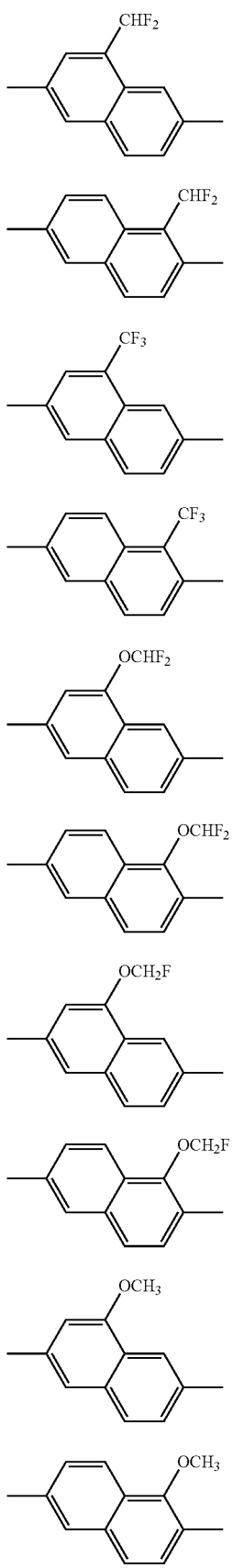
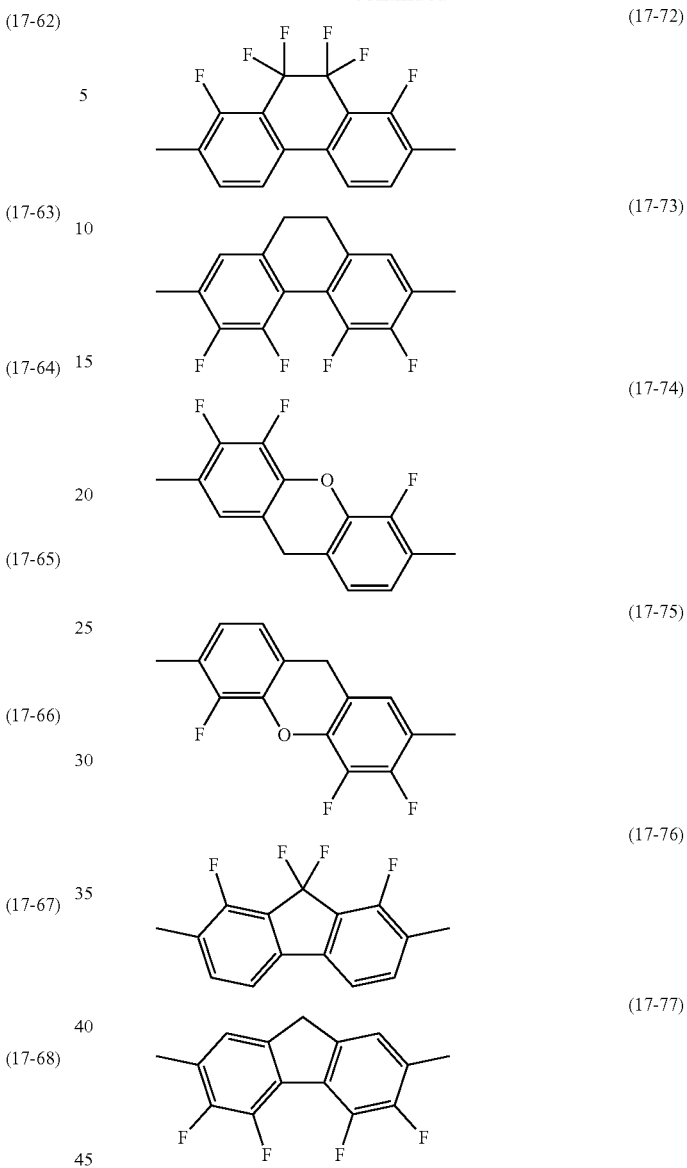

Preferred ring $A^0$, $A^1$ or $A^2$ is 1,4-cyclohexylene, 1,4-cyclohexenylene, tetrahydropyran-2,5-diyl, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5-trifluoro-1,4-phenylene, pyridine-2,5-diyl, 3-fluoropyridine-2,5-diyl, pyrimidine-2,5-diyl, pyridazine-2,5-diyl, decahydronaphthalene-2,6-diyl, 1,2,3,4-tetrahydronaphthalene-2,6-diyl or naphthalene-2,6-diyl. With regard to a configuration of 1,4-cyclohexylene and 1,3-dioxane-2,5-diyl, trans is preferred to cis.

A further preferred ring is 1,4-cyclohexylene, tetrahydropyran-2,5-diyl, 1,3-dioxane-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, pyridine-2,5-diyl, pyrimidine-2,5-diyl or naphthalene-2,6-diyl. A particularly preferred ring is 1,4-cyclohexylene, 1,4-phenylene, 2-fluoro-1,4-phenylene, 2,3-difluoro-1,4-phenylene, 2,6-difluoro-1,4-phenylene or naphthalene-2,6-diyl. A most preferred ring is 1,4-cyclohexylene, 1,4-phenylene, 2-fluoro-1,4-phenylene or 2,6-difluoro-1,4-phenylene. A most preferred ring is also 1,4-cyclohexylene, 1,4-phenylene, 2-fluoro-1,4-phenylene or 2,3-difluoro-1,4-phenylene. A most preferred ring is also 1,4-cyclohexylene, 1,4-phenylene, 2-fluoro-1,4-phenylene, 2,6-difluoro-1,4-phenylene or naphthalene-2,6-diyl.

In formula (1), $Z^1$ and $Z^2$ are independently a single bond or alkylene having 1 to 4 carbons, and in the alkylene, at least one piece of —$CH_2$— may be replaced by —O—, —S—, —CO— or —$SiH_2$—, and at least one piece of —$CH_2CH_2$— may be replaced by —CH=CH—, and in the groups, at least one hydrogen may be replaced by fluorine or chlorine.

Preferred $Z^1$ or $Z^2$ is a single bond, —COO—, —OCO—, —$CH_2O$—, —$OCH_2$—, —$CF_2O$—, —$OCF_2$—, —$CH_2CH_2$—, —CH=CH—, —CF=CH—, —CH=CF—, —CF=CF—, —$CH_2CO$—, —$COCH_2$—, —$CH_2SiH_2$—, —$SiH_2CH_2$—, —$(CH_2)_4$—, —$(CH_2)_2COO$—, —$(CH_2)_2OCO$—, —$OCO(CH_2)_2$—, —$COO(CH_2)_2$—, —$(CH_2)_2CF_2O$—, —$(CH_2)_2OCF_2$—, —$OCF_2(CH_2)_2$—, —$CF_2O(CH_2)_2$—, —$(CH_2)_{30}$— or —$O(CH_2)_3$—. With regard to a configuration of a double bond in a bonding group such as —CH=CH—, —CF=CF—, —CH=CH—$CH_2O$— and —$OCH_2$—CH=CH—, trans is preferred to cis.

Further preferred $Z^1$ or $Z^2$ is a single bond, —COO—, —OCO—, —$CH_2O$—, —$OCH_2$—, —$CF_2O$—, —$OCF_2$—, —$CH_2CH_2$—, —CH=CH— or —$(CH_2)_4$—. Particularly preferred $Z^1$ or $Z^2$ is a single bond, —$CH_2CH_2$—, —COO—, —OCO—, —$CF_2O$—, —$OCF_2$— and —CH=CH—. Most preferred $Z^1$ or $Z^2$ is a single bond.

In formula (1), one of $Y^1$ and $Y^2$ is fluorine, and the other is hydrogen. A compound in which $Y^1$ is fluorine and Ra is the electron withdrawing group is preferred from a viewpoint of dielectric anisotropy. A compound in which $Y^2$ is fluorine and Rb is the electron withdrawing group is preferred from a viewpoint of dielectric anisotropy.

In formula (1), Rc is alkyl having 1 to 4 carbons, and in the alkyl, at least one piece of —$CH_2$— may be replaced by —O—, —S—, —CO— or —$SiH_2$—, and at least one piece of —$CH_2CH_2$— may be replaced by —CH=CH— or —C≡C—.

Preferred Rc is alkyl, alkoxy, alkoxyalkyl, alkoxyalkoxy, alkenyl, alkenyloxy, alkenyloxyalkyl or alkoxyalkenyl. Preferred Rc is also alkyl, alkoxy, alkoxyalkyl, alkoxyalkoxy, alkenyl, alkenyloxy, alkylthio, alkylthioalkyl, fluoroalkyl or fluoroalkoxy. Further preferred Rc is alkyl, alkoxy, alkoxyalkyl, alkenyl or alkenyloxy. Still further preferred Rc is also alkyl, alkoxy, alkenyl or alkenyloxy. Particularly preferred Rc is alkyl or alkenyl. Most preferred Rc is alkyl.

Preferred Rc is —$CH_3$, —$C_2H_5$, —$C_3H_7$, —$C_4H_9$, —$OCH_3$, —$OC_2H_5$, —$OC_3H_7$, —$OC_4H_9$, —$CH_2OCH_3$, —CH=$CH_2$, —CH=$CHCH_3$, —$(CH_2)_2$—CH=$CH_2$, —$CH_2CH$=$CHC_2H_5$, —$(CH_2)_2$—CH=$CHCH_3$, —$OCH_2CH$=$CH_2$, —$OCH_2CH$=$CHCH_3$ or —$OCH_2CH$=$CHC_2H_5$. Further preferred Rc is —$CH_3$, —$C_2H_5$, —$C_3H_7$, —$OCH_3$, —$OC_2H_5$, —$OC_3H_7$, —$CH_2OCH_3$ or —CH=$CH_2$. Particularly preferred Rc is —$CH_3$, —$C_2H_5$, —$OCH_3$ or —$OC_2H_5$.

In formula (1), a and b are independently 0, 1, 2 or 3, and a sum of a and b is 0, 1, 2 or 3. More specifically, compound (1) has a bicyclic ring to a pentacyclic ring. The rings include a fused ring in addition to a six-membered ring such as 1,4-phenylene. Such a ring is also counted as a monocyclic ring. When compound (1) has the bicyclic ring, compatibility with other liquid crystal compounds is good. When compound (1) has the bicyclic ring or a tricyclic ring, the viscosity is low. When compound (1) has the tricyclic ring or a tetracyclic ring, the maximum temperature is high. When compound (1) has the tetracyclic ring, the temperature range of the liquid crystal phase is wide.

Physical properties such as optical anisotropy and dielectric anisotropy can be arbitrarily adjusted by suitably selecting a terminal group, a ring and a bonding group in compound (1). An effect of kinds of the groups for providing physical properties of compound (1) will be described below.

When terminal group Ra or Rb has a straight chain, the temperature range of liquid crystal phase is wide and the viscosity is low. When Ra or Rb has a branched chain, compatibility with other liquid crystal compounds is good. A compound in which Ra or Rb is optically active is useful as a chiral dopant. A reverse twisted domain to be generated in the liquid crystal display device can be prevented by adding the compound to the composition. A compound in which Ra or Rb is not optically active is useful as a component of the composition. When Ra or Rb is alkenyl, a preferred configuration depends on a position of a double bond. An alkenyl compound having the preferred configuration has low viscosity, high maximum temperature or the wide temperature range of the liquid crystal phase.

A preferred configuration of —CH=CH— in the alkenyl depends on a position of a double bond. A trans configuration is preferred in alkenyl having the double bond in an odd-numbered position, such as —CH=$CHCH_3$, —CH=$CHC_2H_5$, —CH=$CHC_3H_7$, —CH=$CHC_4H_9$, —$C_2H_4CH$=$CHCH_3$ and —$C_2H_4CH$=$CHC_2H_5$. A cis configuration is preferred in alkenyl having the double bond in an even-numbered position, such as —$CH_2CH$=$CHCH_3$, —$CH_2CH$=$CHC_2H_5$ and —$CH_2CH$=$CHC_3H_7$. The alkenyl compound having the preferred configuration has a high clearing point or the wide temperature range of the liquid crystal phase. A detailed description is found in Mol. Cryst. Liq. Cryst., 1985, 131, 109, and Mol. Cryst. Liq. Cryst., 1985, 131, 327.

When ring $A^0$, $A^1$ or $A^2$ is 1,4-phenylene in which at least one hydrogen is replaced by fluorine or chlorine, pyridine-2,5-diyl or 1,3-dioxane-2,5-diyl, dielectric anisotropy is positively large. When the ring thereof is 1,4-phenylene in which at least one hydrogen may be replaced by fluorine or chlorine, pyridine-2,5-diyl, pyrimidine-2,5-diyl or pyridazine-3,6-diyl, the optical anisotropy is large. When the ring thereof is 1,4-cyclohexylene, 1,4-cyclohexenylene or 1,3-dioxane-2,5-diyl, the optical anisotropy is small.

When at least two rings are 1,4-cyclohexylene, the maximum temperature is high, the optical anisotropy is small, and the viscosity is small. When at least one ring is 1,4-phenylene, the optical anisotropy is comparatively large and an orientational order parameter is large. When at least two rings are 1,4-phenylene, the optical anisotropy is large, the temperature range of the liquid crystal phase is wide, and the maximum temperature is high.

When bonding group $Z^1$ or $Z^2$ is a single bond, —$CH_2O$—, —$CF_2O$—, —$OCF_2$—, —$CH_2CH_2$—, —CH=CH—, —CF=CF— or —$(CH_2)_4$—, the viscosity is small. When the bonding group is a single bond, —$OCF_2$—, —$CF_2O$—, —$CH_2CH_2$— or —CH=CH—, the viscosity is further small. When the bonding group is —CH=CH—, the temperature range of the liquid crystal phase is wide, and an elastic constant ratio $K_{33}/K_{11}$ ($K_{33}$: a bend elastic constant, $K_{11}$: a splay elastic constant) is large. When the bonding group is —C≡C—, the optical anisotropy is large.

When compound (1) has the bicyclic ring or the tricyclic ring, the viscosity is small. When compound (1) has the tetracyclic ring or the pentacyclic ring, the maximum temperature is high. As described above, a compound having objective physical properties can be obtained by suitably selecting a kind of the terminal group, the ring and the bonding group, and the number of the rings. Accordingly, compound (1) is useful as a component of a composition used in a device having a mode such as the PC mode, the TN mode, the STN mode, the ECB mode, the OCB mode, the IPS mode and the VA mode.

2. Synthesis of Compound (1)

A synthesis method of compound (1) will be described. Compound (1) can be prepared by suitably combining methods in organic synthetic chemistry. A method for introducing a required terminal group, ring and bonding group into a starting material is described in books such as "Organic Syntheses" (John Wiley & Sons, Inc.), "Organic Reactions" (John Wiley & Sons, Inc.), "Comprehensive Organic Synthesis" (Pergamon Press) and "New Experimental Chemistry Course (Shin Jikken Kagaku Koza in Japanese)" (Maruzen Co., Ltd.).

2-1. Formation of Bonding Group Z

First, a scheme is shown with regard to a method for forming bonding group $Z^1$ or $Z^2$. Next, reactions described in the scheme will be described in formations (1) to (11). In the scheme, $MSG^1$ (or $MSG^2$) is a monovalent organic group having at least one ring. A plurality of $MSG^1$ (or $MSG^2$) used in the scheme may be identical or different. Compounds (1A) to (1K) correspond to compound (1)

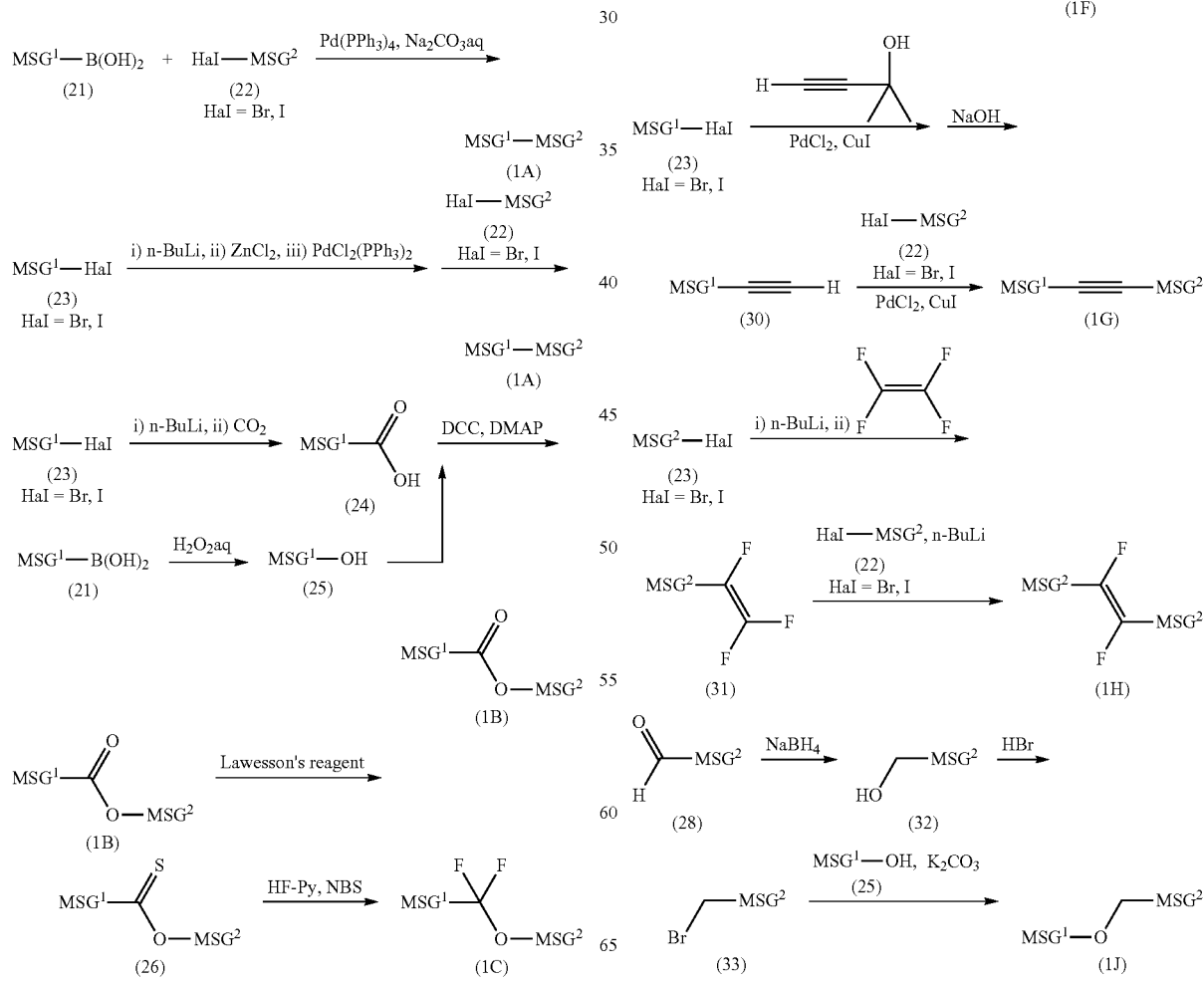

-continued

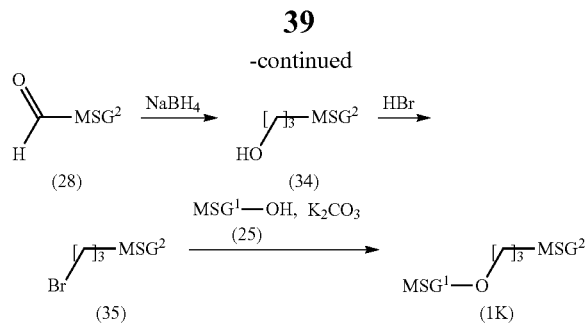

(1) Formation of a Single Bond

Compound (1A) is prepared by allowing aryl boronic acid (21) to react, in an aqueous solution of carbonate, with compound (22) prepared according to a publicly known method in the presence of a catalyst such as tetrakis(triphenylphosphine)palladium. Compound (1A) is also prepared by allowing compound (23) prepared according to a publicly known method to react with n-butyllithium and subsequently with zinc chloride, and further with compound (22) in the presence of a catalyst such as dichlorobis(triphenylphosphine)palladium.

(2) Formation of —OCO— and —COO—

Carboxylic acid (24) is obtained by allowing compound (23) to react with n-butyllithium and subsequently with carbon dioxide. Compound (1B) having —COO— is prepared by dehydration of carboxylic acid (24) and phenol (25) prepared according to a publicly known method in the presence of 1,3-dicyclohexylcarbodiimide (DCC) and 4-dimethylaminopyridine (DMAP). A compound having —OCO— can also be prepared according to the method.

(3) Formation of —CF$_2$O— and —OCF$_2$—

Compound (26) is obtained by treating compound (1B) with a thiation reagent such as Lawesson's reagent. Compound (1C) having —CF$_2$O— is prepared by fluorinating compound (26) with a hydrogen fluoride-pyridine complex and N-bromosuccinimide (NBS). Refer to M. Kuroboshi et al., Chem. Lett., 1992, 827. Compound (1C) can also be prepared by fluorinating compound (26) with (diethylamino)sulfur trifluoride (DAST). Refer to W. H. Bunnelle et al., J. Org. Chem. 1990, 55, 768. A compound having —OCF$_2$— can also be prepared according to the method. The bonding groups can also be formed according to a method described in Peer. Kirsch et al., Angew. Chem. Int. Ed. 2001, 40, 1480.

(4) Formation of —CH=CH—

Aldehyde (28) is obtained by treating compound (23) with n-butyllithium and then allowing the treated compound to react with formamide such as N,N-dimethylformamide (DMF). Compound (1D) is prepared by allowing phosphorus ylide generated by treating phosphonium salt (27) prepared according to a publicly known method with a base such as potassium t-butoxide to react with aldehyde (28). A cis isomer may be generated depending on reaction conditions, and therefore the cis isomer is isomerized into a trans isomer according to a publicly known method when necessary.

(5) Formation of —CH$_2$CH$_2$—

Compound (1E) is prepared by hydrogenating compound (1D) in the presence of a catalyst such as palladium on carbon.

(6) Formation of —(CH$_2$)$_4$—

A compound having —(CH$_2$)$_2$—CH=CH— is obtained by using phosphonium salt (29) in place of phosphonium salt (27) according to the method in section (IV). Compound (1F) is prepared by performing catalytic hydrogenation of the compound obtained.

(7) Formation of —C≡C—

Compound (30) is obtained by allowing compound (23) to react with 2-methyl-3-butyn-2-ol in the presence of a catalyst of dichloropalladium and copper halide, and then performing deprotection under basic conditions. Compound (1G) is prepared by allowing compound (30) to react with compound (22) in the presence of the catalyst of dichloropalladium and copper halide.

(8) Formation of —CF=CF—

Compound (31) is obtained by treating compound (23) with n-butyllithium and then allowing the treated compound to react with tetrafluoroethylene. Compound (1H) is prepared by treating compound (22) with n-butyllithium and then allowing the treated compound to react with compound (31).

(9) Formation of —CH$_2$O— and —OCH$_2$—

Compound (32) is obtained by reducing aldehyde (28) with a reducing agent such as sodium borohydride. Compound (33) is obtained by halogenizing compound (32) with hydrobromic acid or the like. Compound (1J) is prepared by allowing compound (33) to react with compound (25) in the presence of potassium carbonate or the like.

(10) Formation of —(CH$_2$)$_3$O— and —O(CH$_2$)$_3$—

Compound (1K) is prepared by using compound (34) in place of compound (32) according to the method in section (9).

(11) Formation of —CF$_2$CF$_2$—

A compound having —(CF$_2$)$_2$— is obtained by fluorinating diketone (—COCO—) with sulfur tetrafluoride, in the presence of a hydrogen fluoride catalyst, according to a method described in J. Am. Chem. Soc., 2001, 123, 5414.

2-2. Formation of Ring A

With regard to a ring such as 1,4-cyclohexylene, 1,4-phenylene, 2-fluoro-1,4-phenylene and 2,6-difluoro-1,4-phenylene, a starting material is commercially available or formation method thereof is well known. With regard to the formation of tetrahydropyran-2,5-diyl, see paragraphs from [0084] to [0107] in JP 2013-241397 A. With regard to the formation of 1,3-dioxane-2,5-diyl, see paragraphs from [0096] to [0119] in JP 2009-132927 A. With regard to the formation of pyrimidine-2,5-diyl and pyridine-2,5-diyl, see paragraphs from [0086] to [0094] in WO 2010/047260 A.

2-3. Method for Preparing Compound (1)

An example of a method for preparing compound (1) in which $Z^1$ is a single bond is as described below. In compound (1) in which $Z^1$ is any other bonding groups, a variety of compounds can be prepared by suitably selecting a synthetic intermediate.

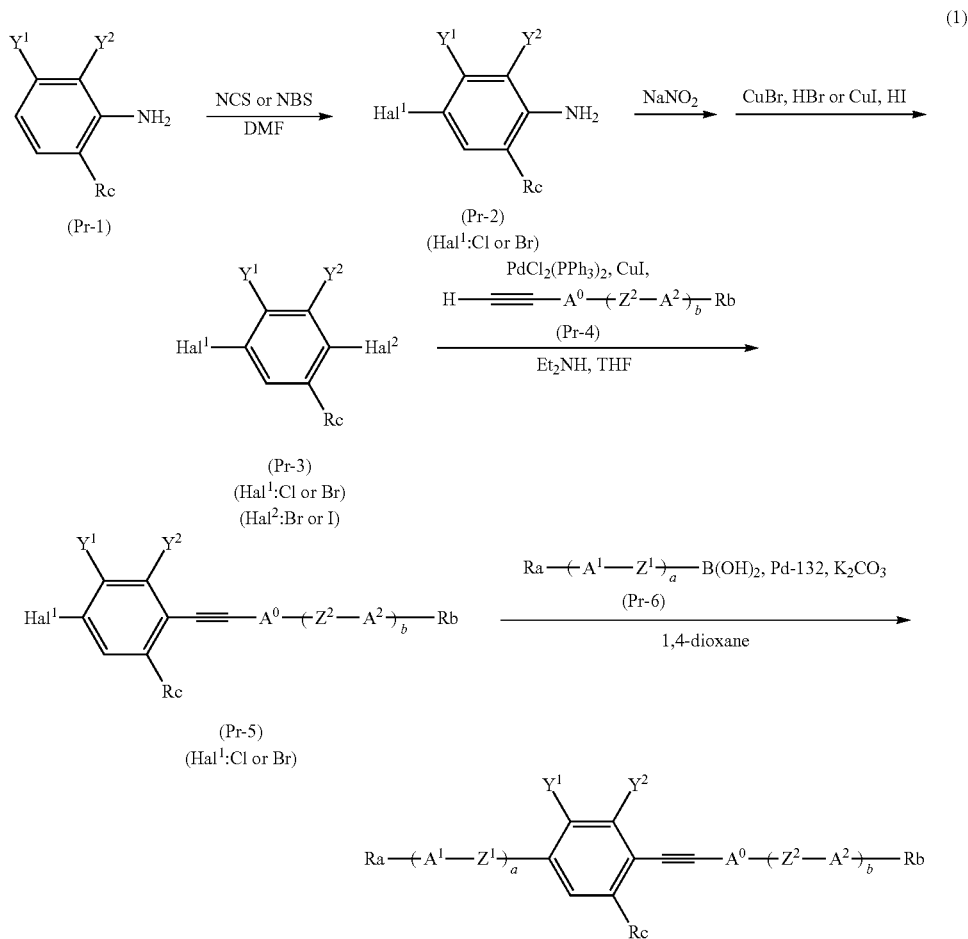

Compound (Pr-1) is prepared according to a publicly known method. Compound (Pr-2) is derived from halogenizing compound (Pr-1) by using N-chlorosuccinimide (NCS) or N-bromosuccinimide (NBS). Compound (Pr-3) in which an amino group is replaced by halogen is derived therefrom by performing a Sandmeyer reaction. On the other hand, compound (Pr-4) having a triple bond is prepared according to a publicly known method. Compound (Pr-5) is derived from the compound obtained and a halide by performing a Sonogashira reaction. Compound (1) is derived from compound (Pr-5) and compound (Pr-6) by performing a Suzuki-Miyaura coupling reaction.

3. Liquid Crystal Composition 3-1. Component Compound

A liquid crystal composition of the invention will be described. The composition contains at least one compound (1) as component A. The composition may contain two, three or more compounds (1). A component in the composition may be only compound (1). In order to develop excellent physical properties, the composition preferably contains at least one of compounds (1) in the range of about 1% by weight to about 99% by weight based on the weight of the liquid crystal composition. When the dielectric anisotropy of compound (1) is small, a preferred proportion of compound (1) is about 5% by weight or more based thereon. A further preferred proportion is about 10% by weight or more or about 20% by weight or more based thereon. On the other hand, in a composition having positive dielectric anisotropy, when the dielectric anisotropy of compound (1) is large, a preferred proportion of compound (1) is in the range of about 5% by weight to about 60% by weight based thereon. In a composition having negative dielectric anisotropy, a preferred proportion of compound (1) is about 30% by weight or less based thereon.

TABLE 1

Dielectric anisotropy of component compound

| Component of composition | Component compound | Dielectric anisotropy |
|---|---|---|
| Component A | Compound (1)[1] | Small or positively large |
| Component B | Compound (2) to compound (4) | Small |
| Component C | Compound (5) to compound (7) | Positively large |
| Component D | Compound (8) | Positively large |
| Component E | Compound (9) to compound (15) | Negatively large |

[1]Dielectric anisotropy of compound (1) may occasionally be small or positively large depending on a kind of terminal group Ra or Rb.

The composition contains compound (1) as component A, and further preferably contains a liquid crystal compound selected from components B, C, D and E shown in Table 1. When the composition is prepared, components B, C, D and E are preferably selected by taking into account the positive or negative dielectric anisotropy and magnitude of the dielectric anisotropy. The composition may contain a liquid crystal compound different from compounds (1) to (15). The composition may not contain such a liquid crystal compound.

Component B is a compound in which two terminal groups are alkyl or the like. Specific examples of preferred component B include compounds (2-1) to (2-11), compounds (3-1) to (3-19) and compounds (4-1) to (4-7). In the compounds, $R^{11}$ and $R^{12}$ are independently alkyl having 1 to 10 carbons or alkenyl having 2 to 10 carbons, and in the alkyl and the alkenyl, at least one piece of —$CH_2$— may be replaced by —O—, and in the groups, at least one hydrogen may be replaced by fluorine.

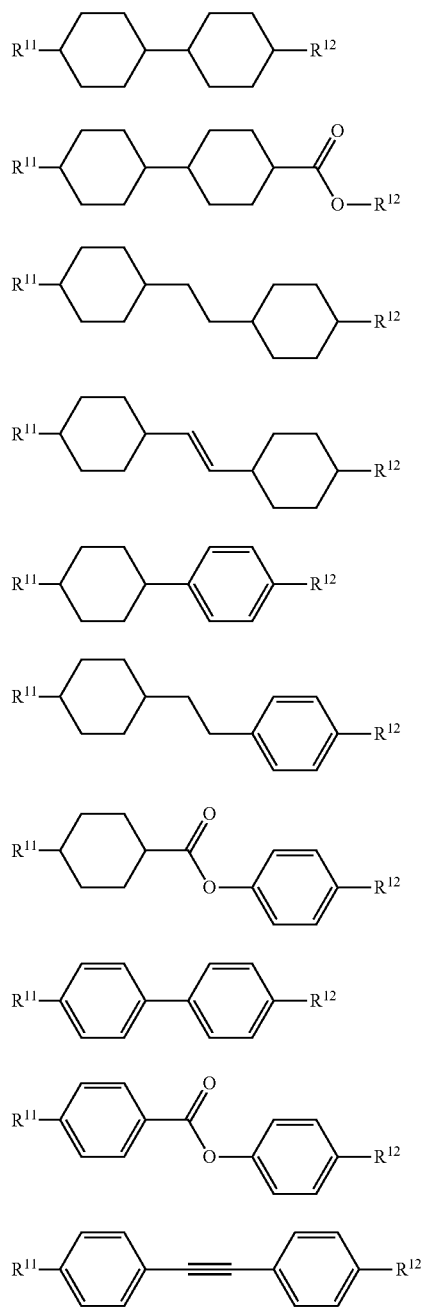

-continued

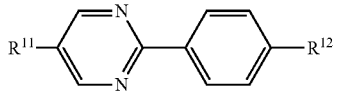
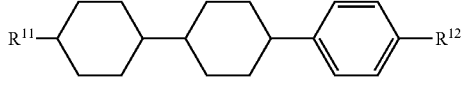
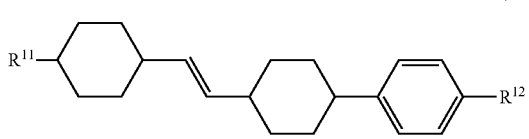
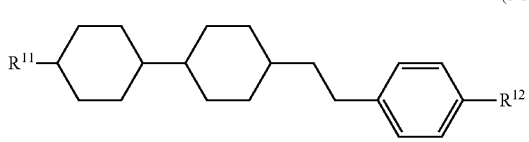
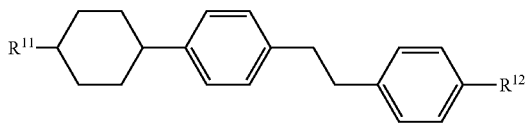
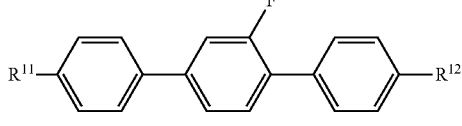
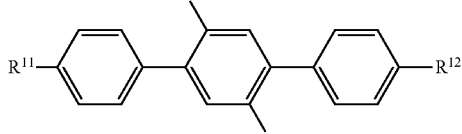
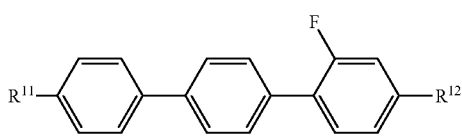
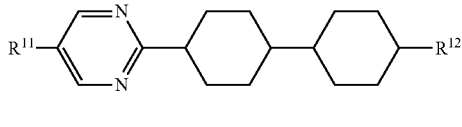
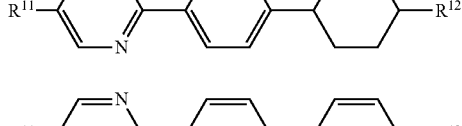

(3-12) 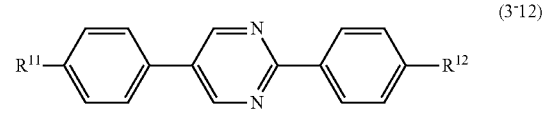

(3-13) 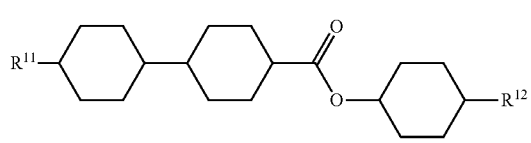

(3-14) 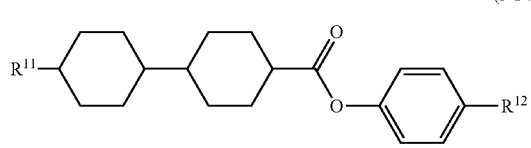

(3-15) 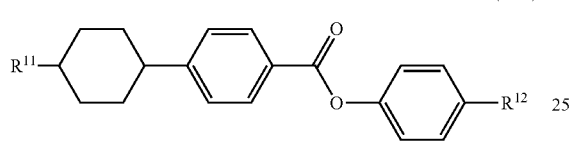

(3-16) 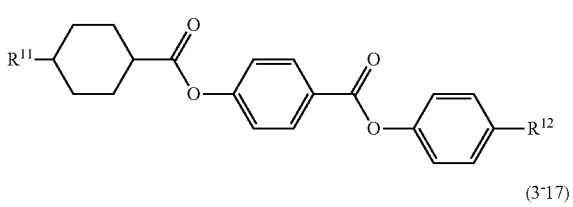

(3-17) 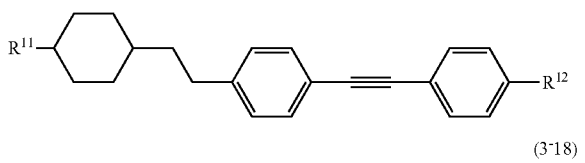

(3-18) 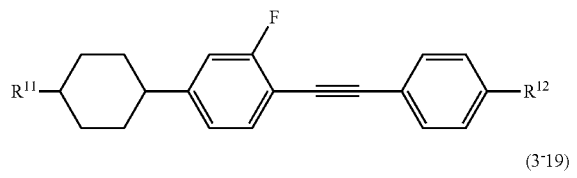

(3-19) 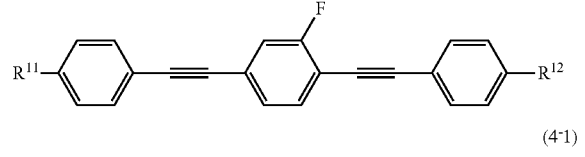

(4-1) 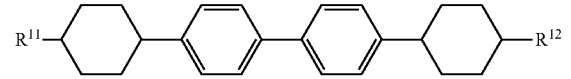

(4-2) 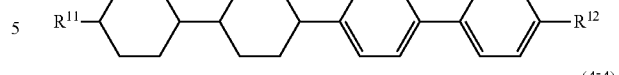

(4-3) 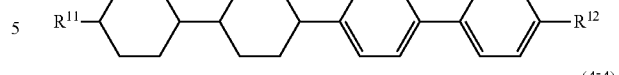

(4-4) 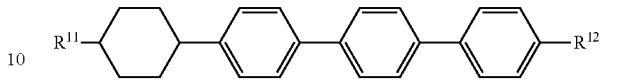

(4-5) 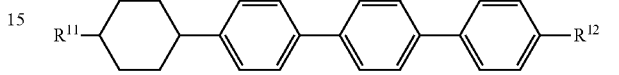

(4-6) 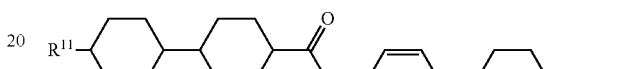

(4-7) 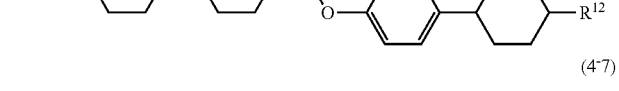

Component B has small dielectric anisotropy. Component B close to neutrality. Compound (2) is effective in decreasing the viscosity or adjusting the optical anisotropy. Compounds (3) and (4) are effective in extending the temperature range of the nematic phase by increasing the maximum temperature, or adjusting the optical anisotropy.

As a proportion of component B is increased, the viscosity of the composition is decreased, but the dielectric anisotropy is decreased. Thus, as long as a desired value of threshold voltage of a device is met, the proportion is preferably as large as possible. When a composition for the IPS mode, the VA mode or the like is prepared, the proportion of component B is preferably about 30% by weight or more, and further preferably about 40% by weight or more, based thereon.

Component C is a compound having a halogen-containing group or a fluorine-containing group at a right terminal. Specific examples of preferred component C include compounds (5-1) to (5-16), compounds (6-1) to (6-113) and compounds (7-1) to (7-57) In the compounds, $R^{13}$ is alkyl having 1 to 10 carbons or alkenyl having 2 to 10 carbons, and in the alkyl or the alkenyl, at least one piece of —$CH_2$— may be replaced by —O—, and in the groups, at least one hydrogen may be replaced by fluorine, $X^{11}$ is fluorine, chlorine, —$OCF_3$, —$OCHF_2$, —$CF_3$, —$CHF_2$, —$CH_2F$, —$OCF_2CHF_2$ or —$OCF_2CHFCF_3$.

(5-1) 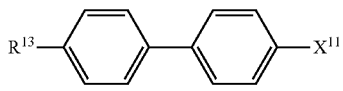

(5-2) 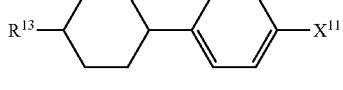

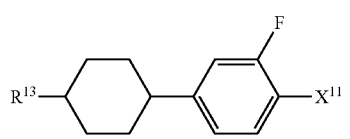 (5-3)
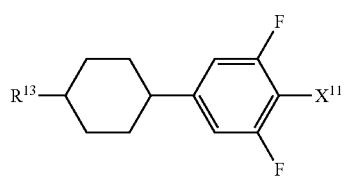 (5-4)
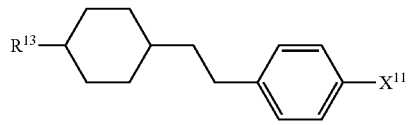 (5-5)
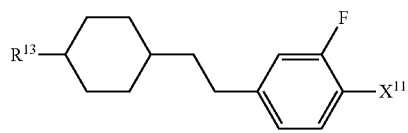 (5-6)
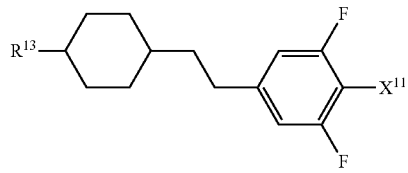 (5-7)
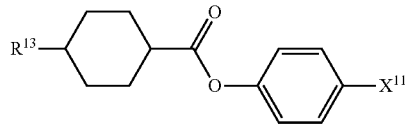 (5-8)
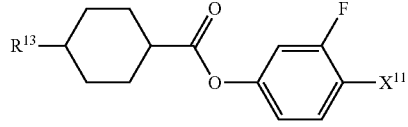 (5-9)
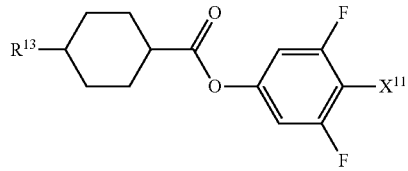 (5-10)
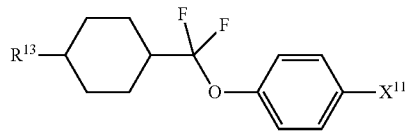 (5-11)
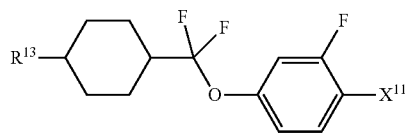 (5-12)
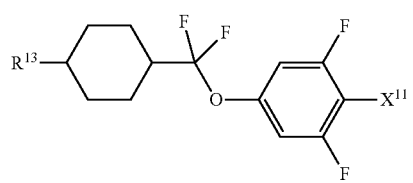 (5-13)
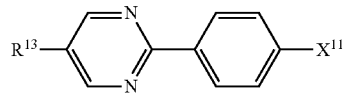 (5-14)
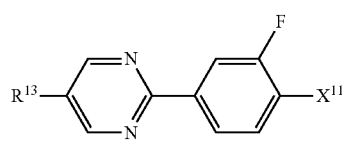 (5-15)
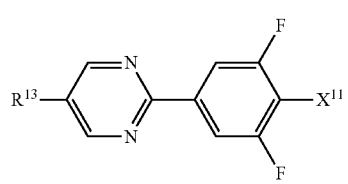 (5-16)
 (6-1)
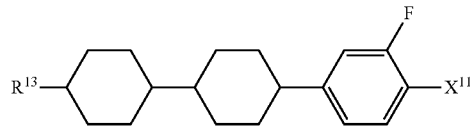 (6-2)
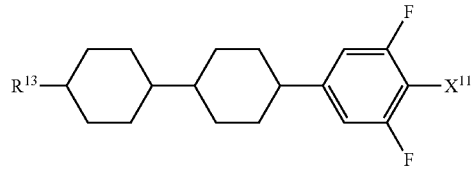 (6-3)
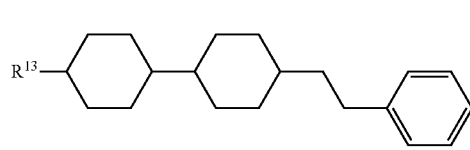 (6-4)
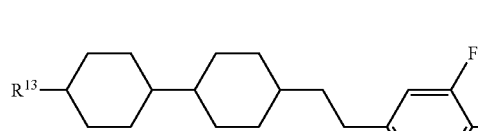 (6-5)
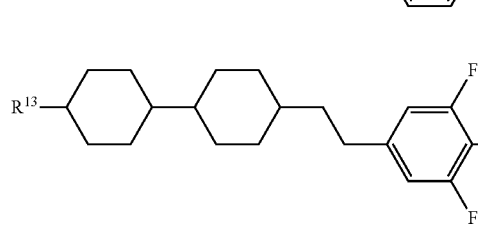 (6-6)

(6-7)
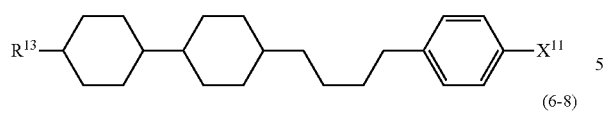
(6-8)
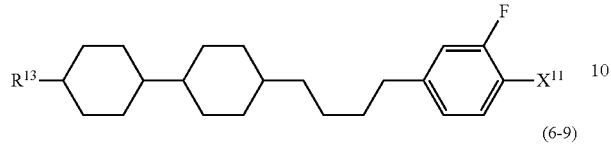
(6-9)
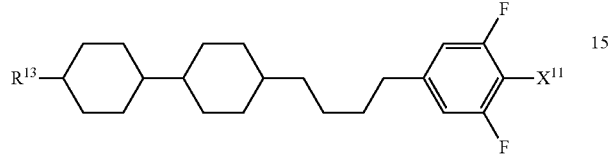
(6-10)
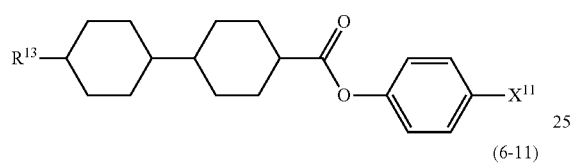
(6-11)
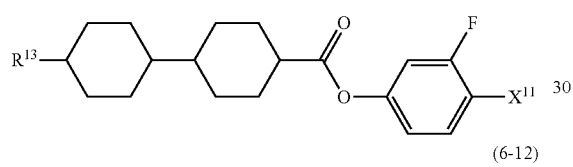
(6-12)
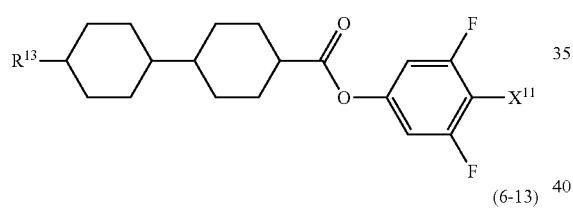
(6-13)
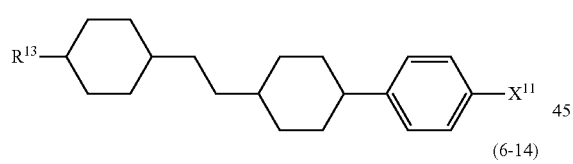
(6-14)
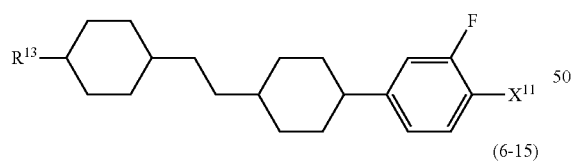
(6-15)
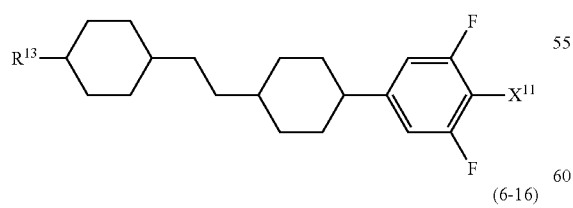
(6-16)
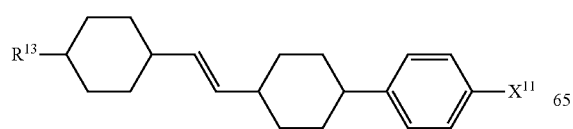
(6-17)
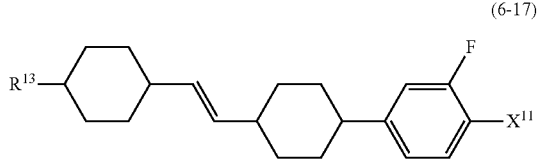
(6-18)
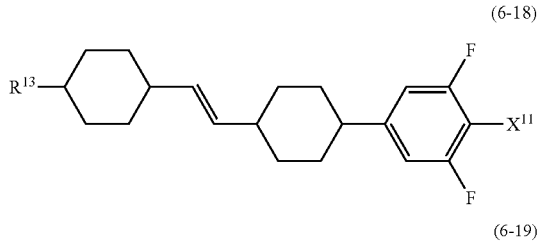
(6-19)
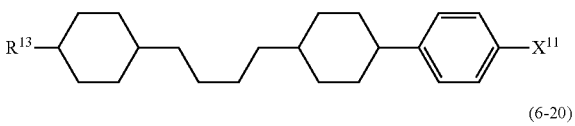
(6-20)
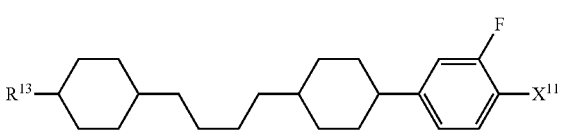
(6-21)
(6-22)
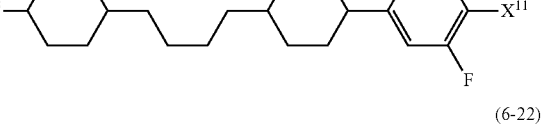
(6-23)
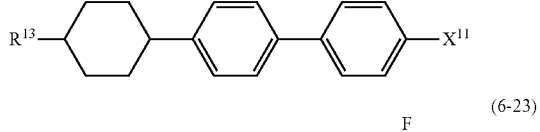
(6-24)
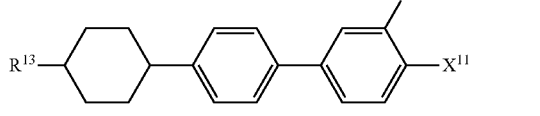
(6-25)
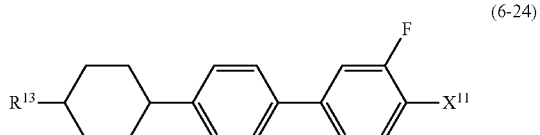
(6-26)

(6-27)
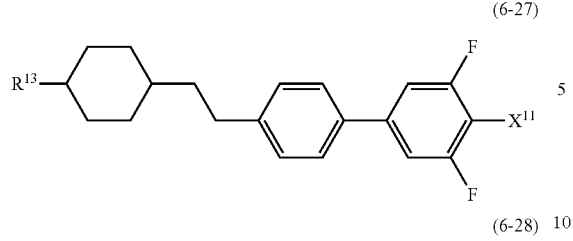
(6-28)
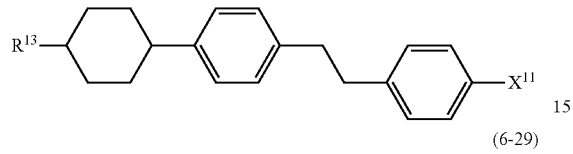
(6-29)
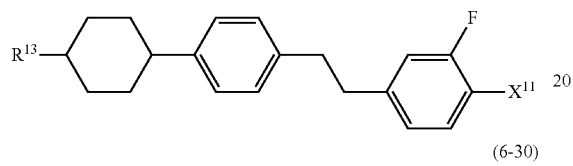
(6-30)
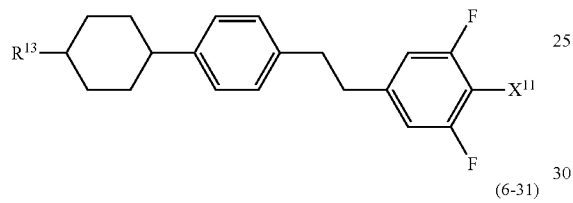
(6-31)
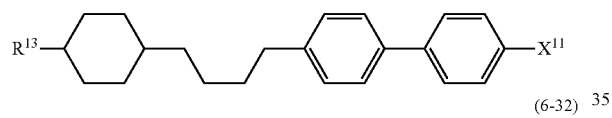
(6-32)
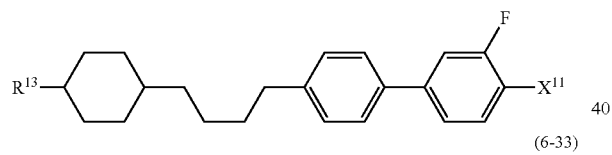
(6-33)
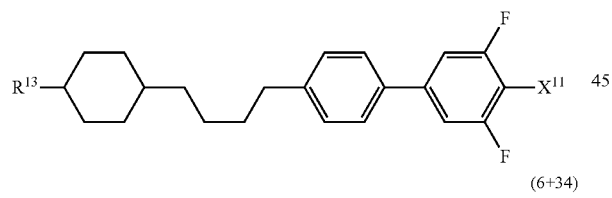
(6+34)
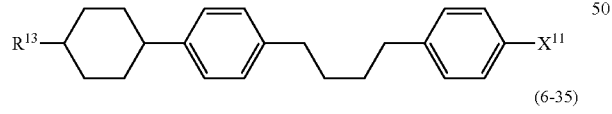
(6-35)
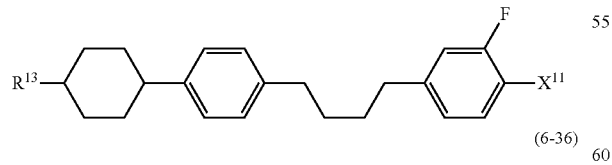
(6-36)
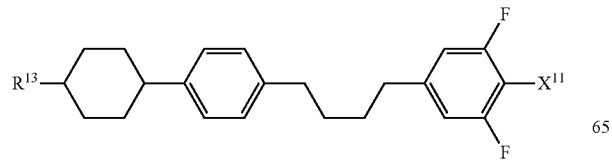
(6-37)
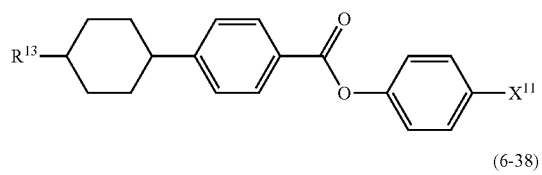
(6-38)
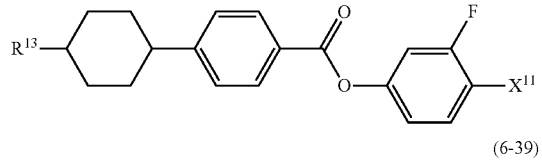
(6-39)
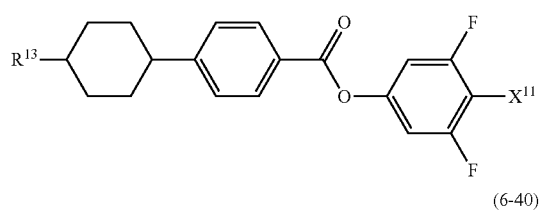
(6-40)
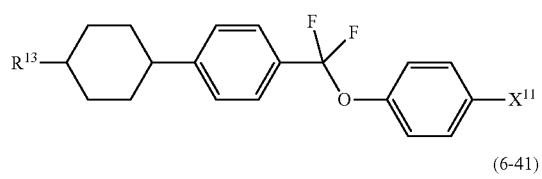
(6-41)
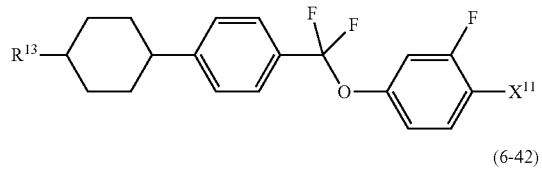
(6-42)
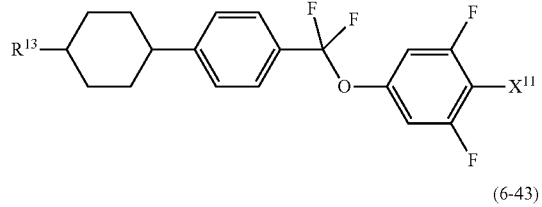
(6-43)
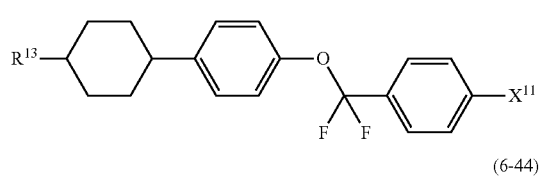
(6-44)
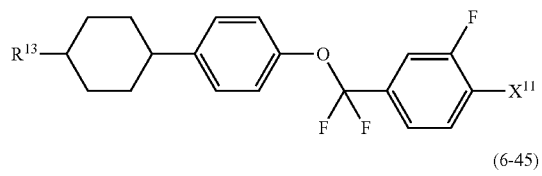
(6-45)
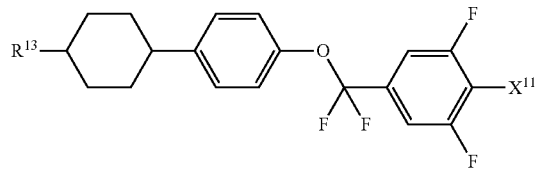

(6-46) 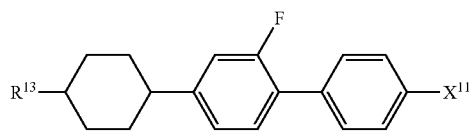
(6-47) 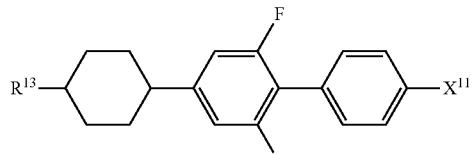
(6-48) 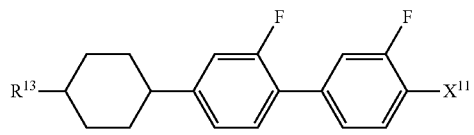
(6-49) 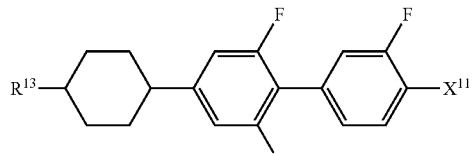
(6-50) 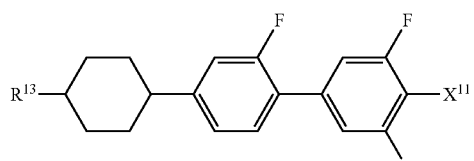
(6-51) 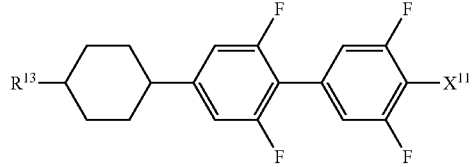
(6-52) 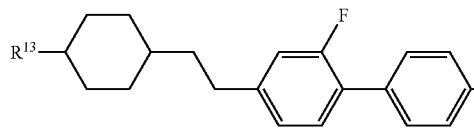
(6-53) 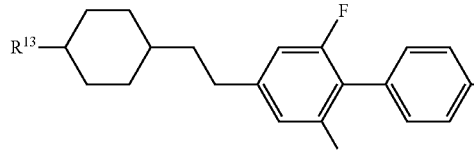
(6-54) 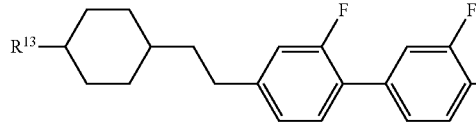
(6-55) 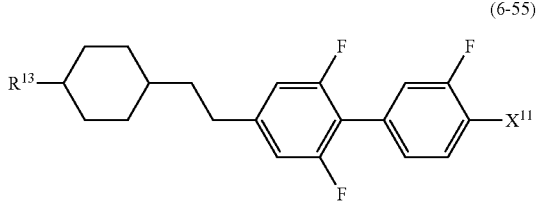
(6-56) 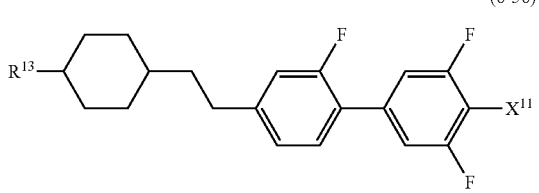
(6-57) 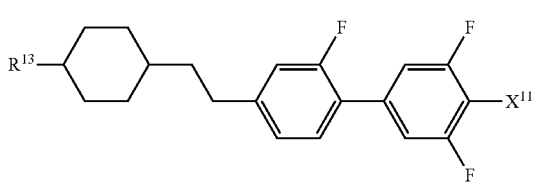
(6-58) 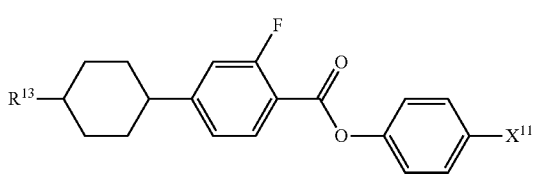
(6-59) 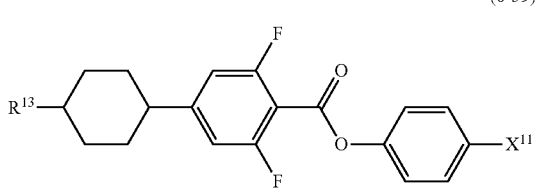
(6-60) 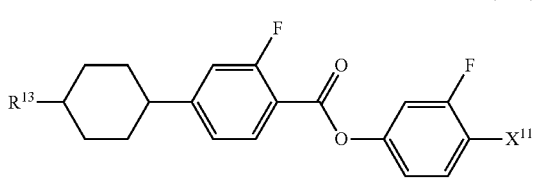
(6-61) 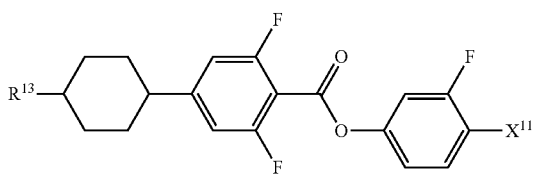
(6-62) 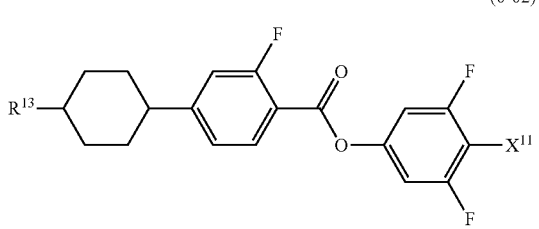

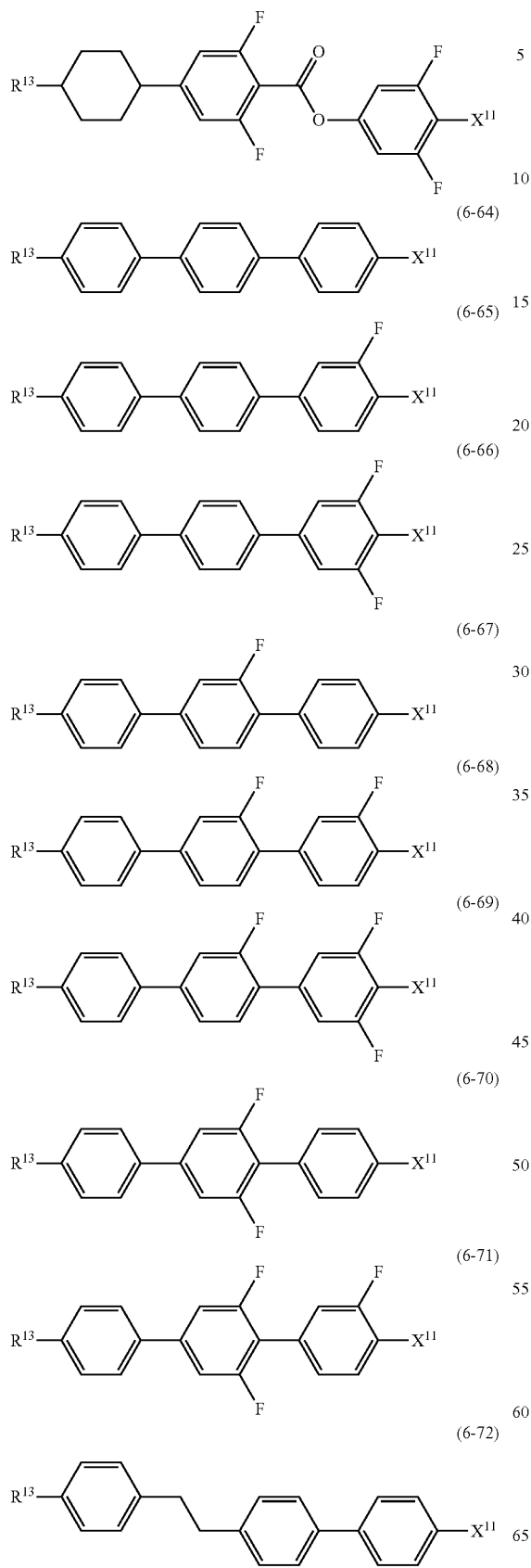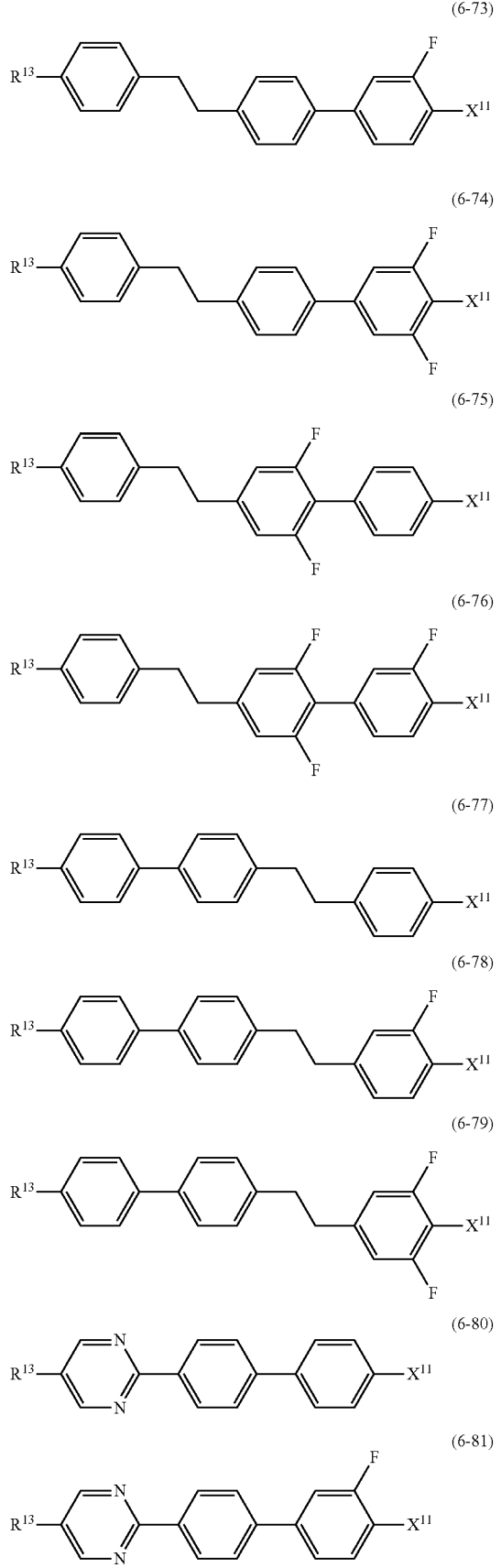

(6-82) 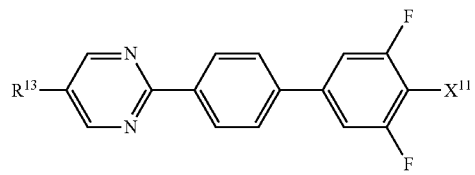
(6-83) 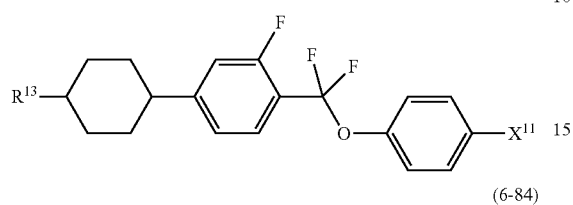
(6-84) 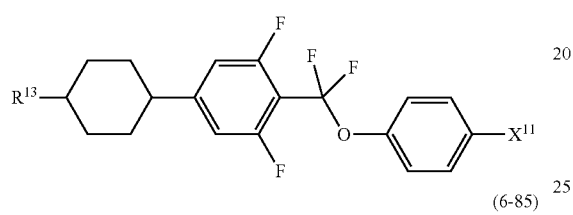
(6-85) 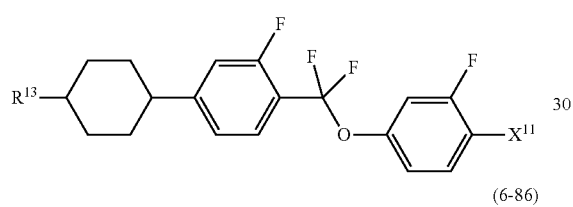
(6-86) 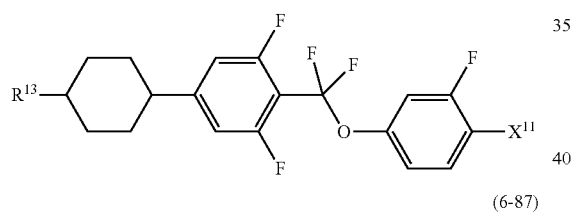
(6-87) 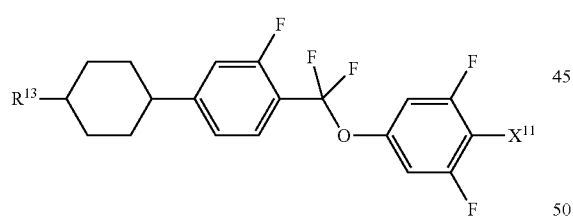
(6-88) 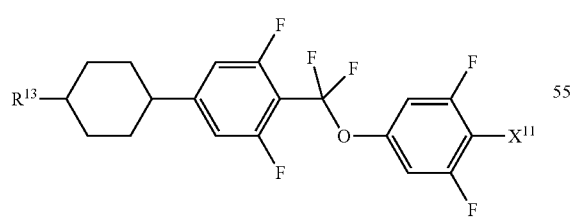
(6-89) 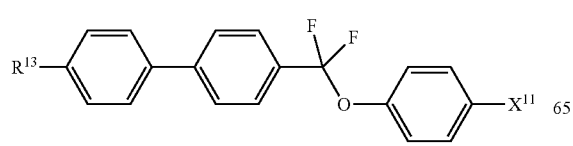
(6-90) 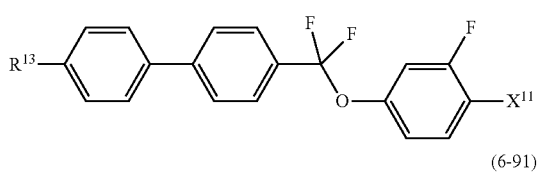
(6-91) 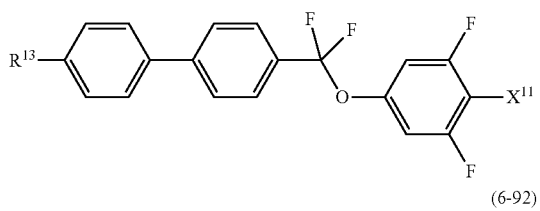
(6-92) 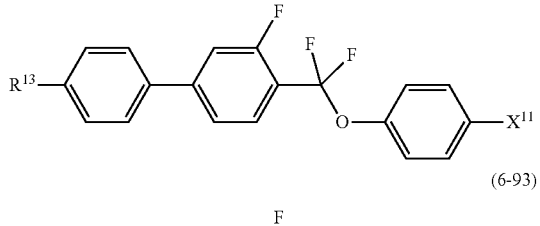
(6-93) 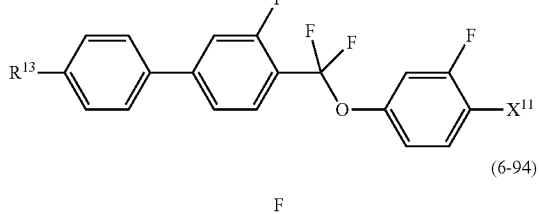
(6-94) 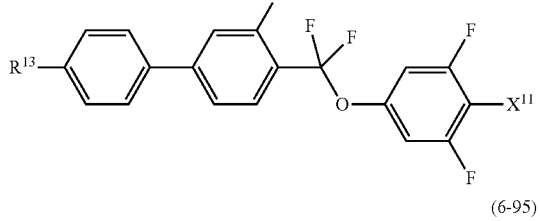
(6-95) 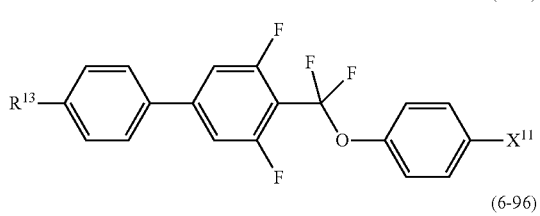
(6-96) 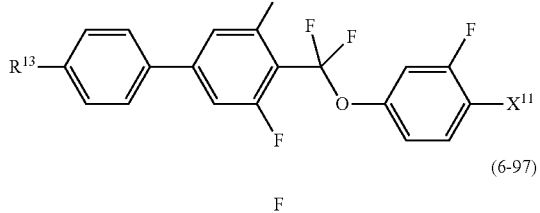
(6-97) 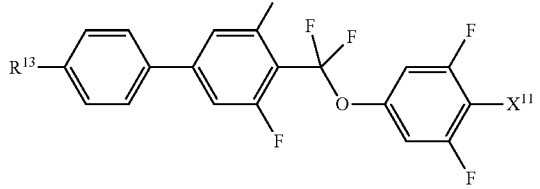

(6-98)
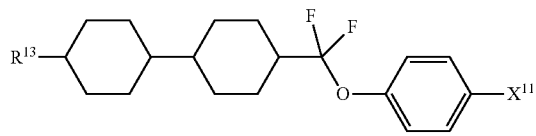
(6-99)
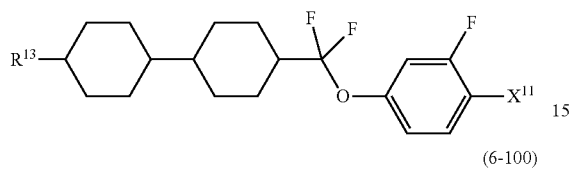
(6-100)
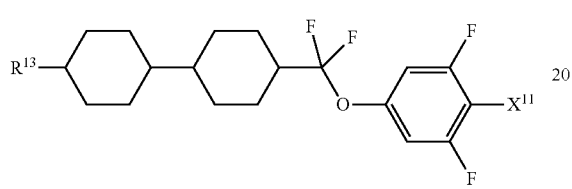
(6-101)
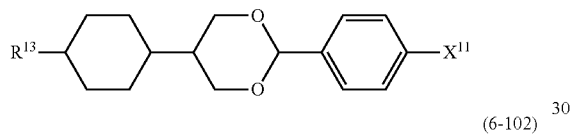
(6-102)
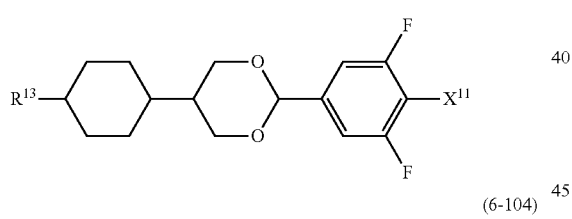
(6-103)
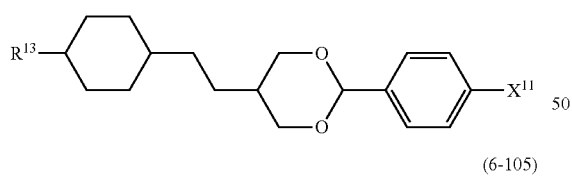
(6-104)
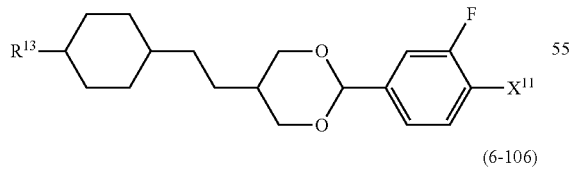
(6-105)
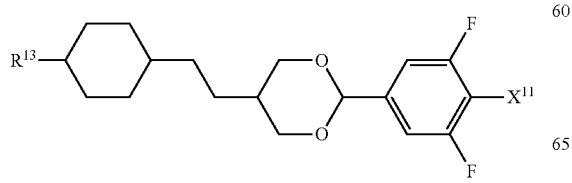
(6-106)
(6-107)
(6-108)
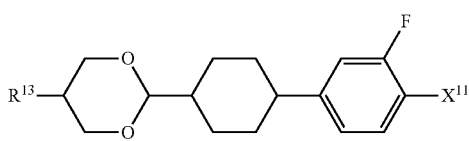
(6-109)
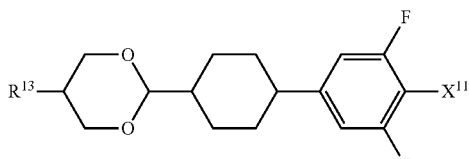
(6-110)
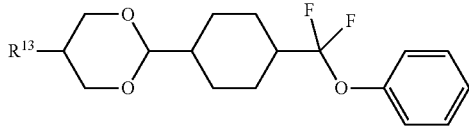
(6-111)
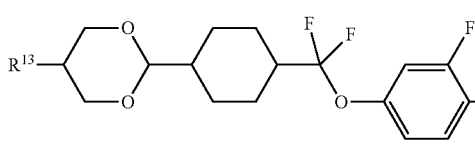
(6-112)
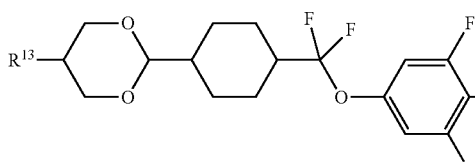
(6-113)
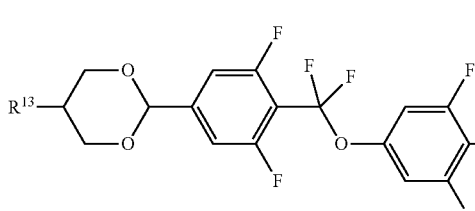
(7-1)
(7-2)
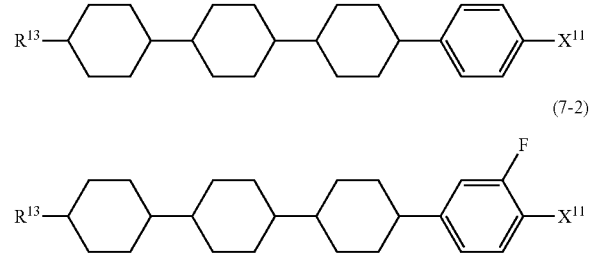

(7-3) 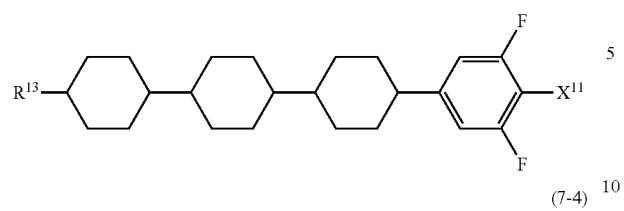
(7-4) 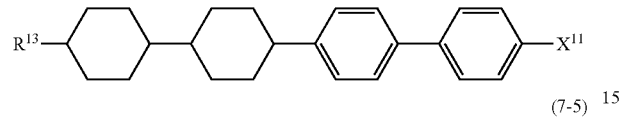
(7-5) 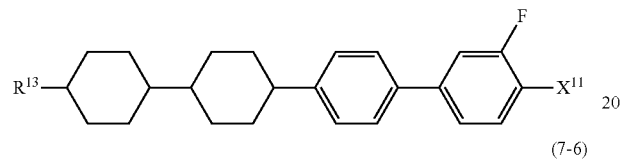
(7-6) 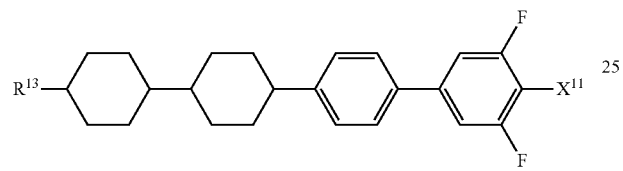
(7-7) 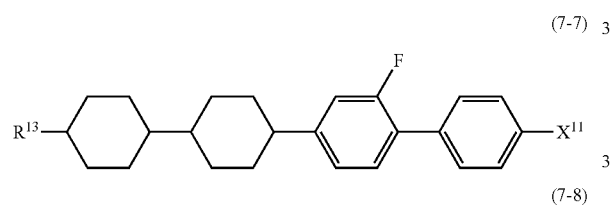
(7-8) 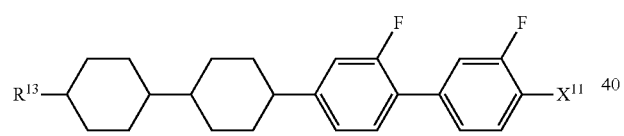
(7-9) 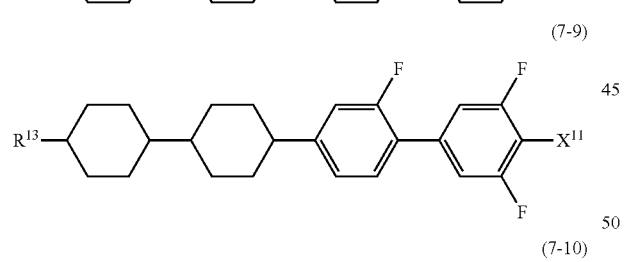
(7-10) 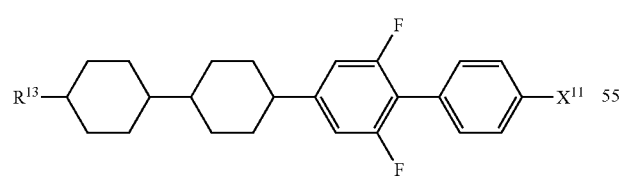
(7-11) 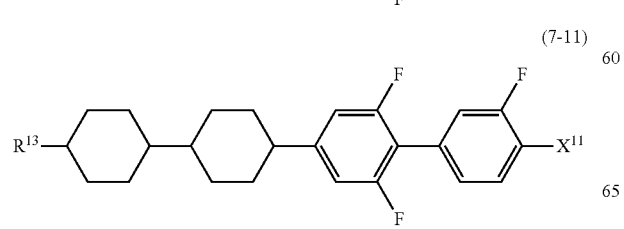
(7-12) 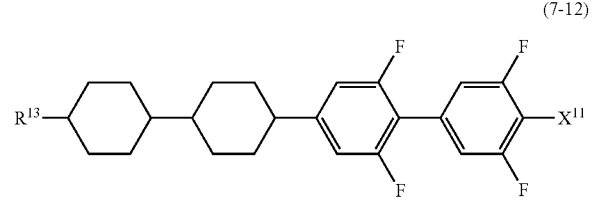
(7-13) 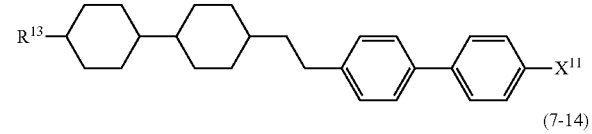
(7-14) 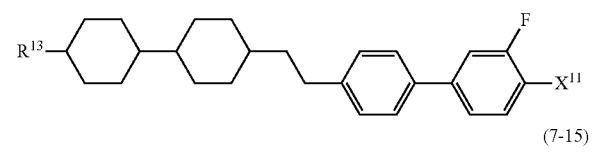
(7-15) 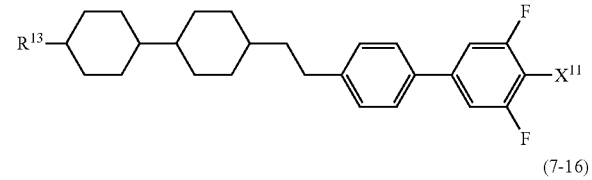
(7-16) 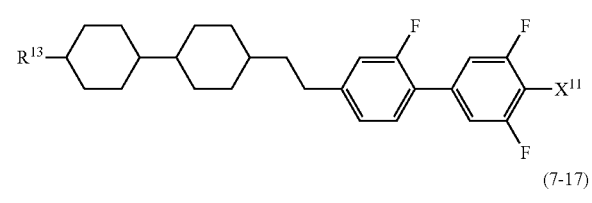
(7-17) 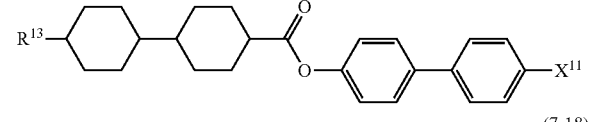
(7-18) 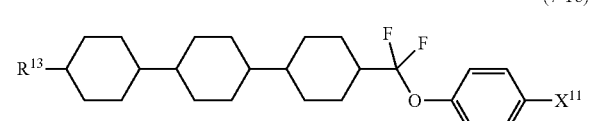
(7-19) 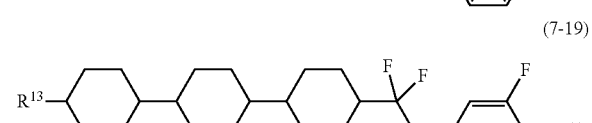
(7-20) 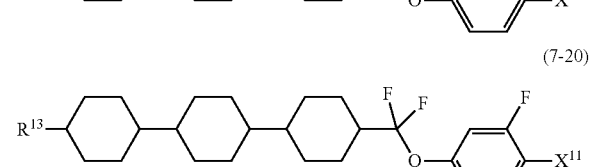
(7-21) 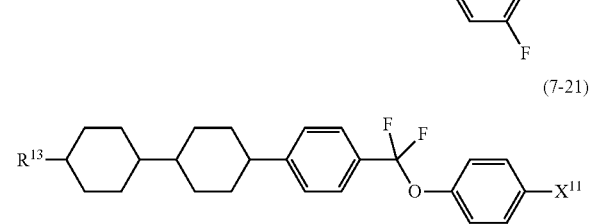

(7-22) 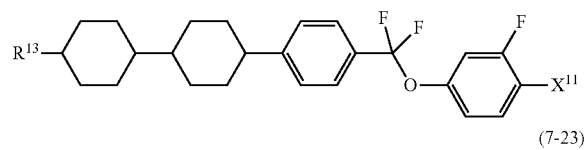
(7-23) 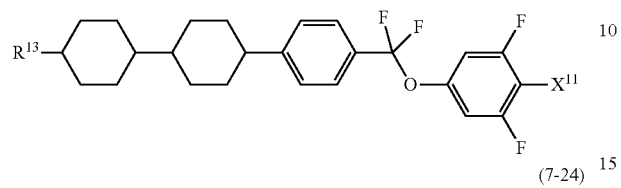
(7-24) 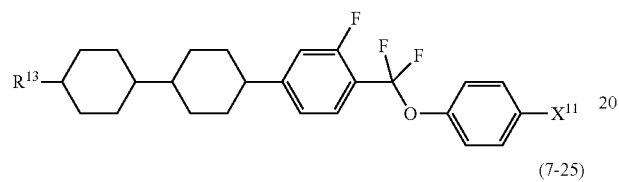
(7-25) 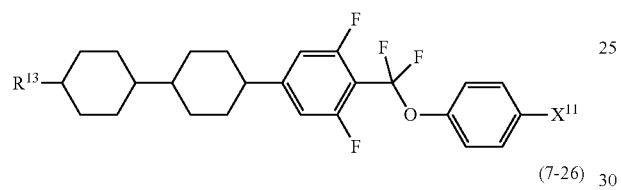
(7-26) 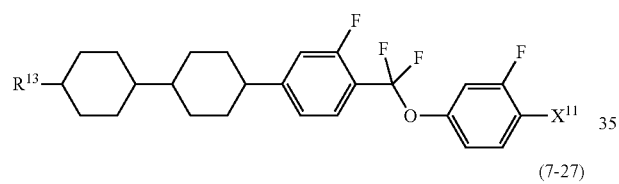
(7-27) 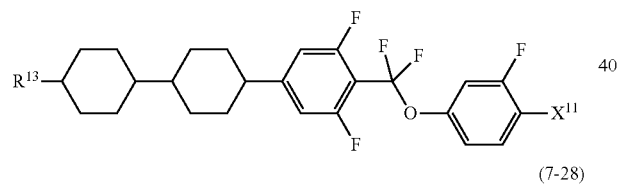
(7-28) 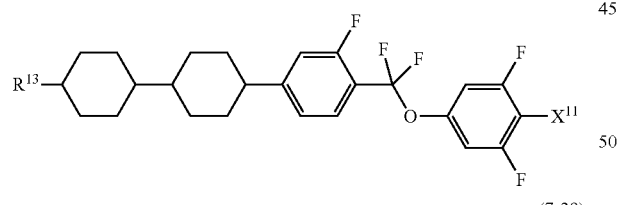
(7-29) 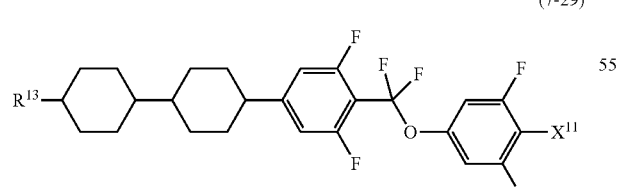
(7-30) 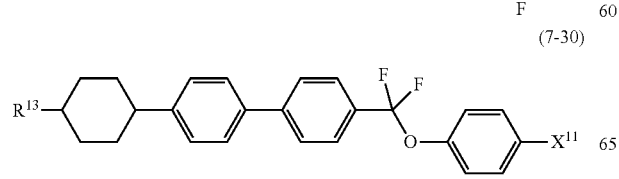
(7-31) 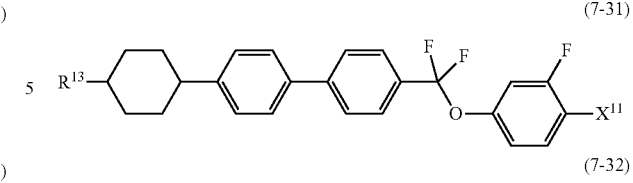
(7-32) 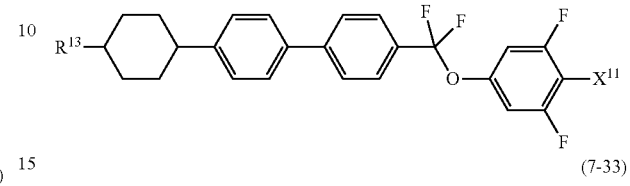
(7-33) 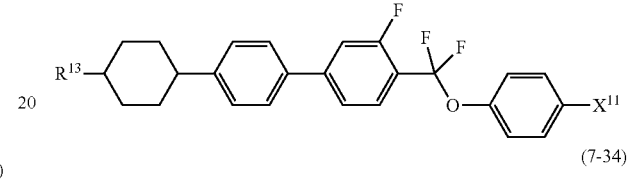
(7-34) 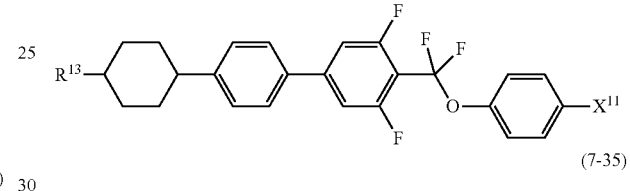
(7-35) 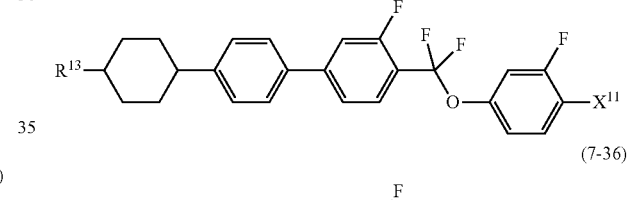
(7-36) 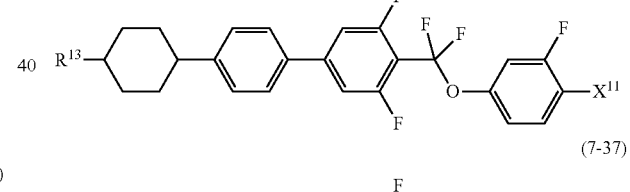
(7-37) 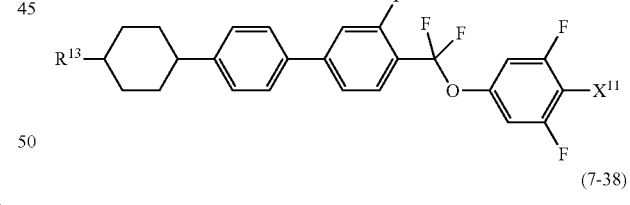
(7-38) 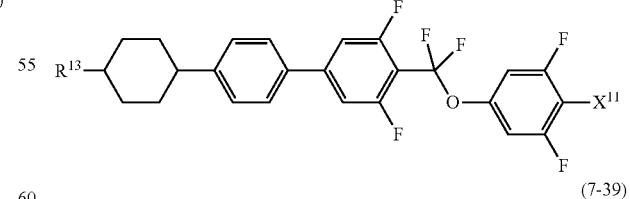
(7-39) 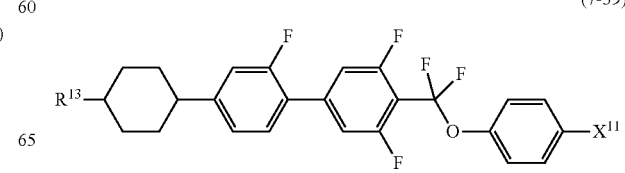

(7-40) 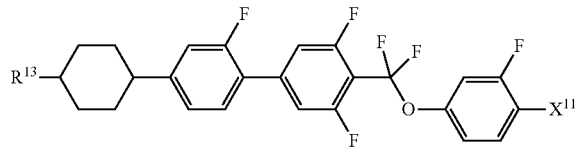
(7-41) 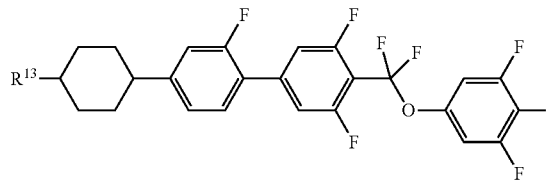
(7-42) 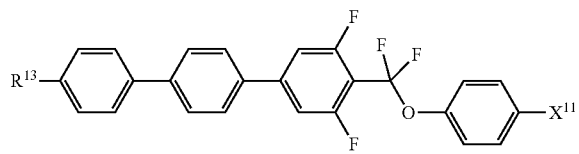
(7-43) 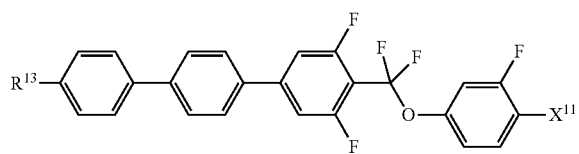
(7-44) 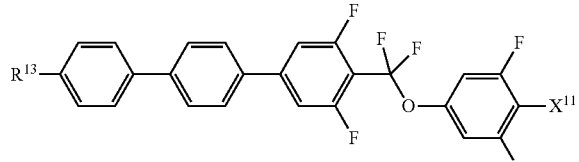
(7-45) 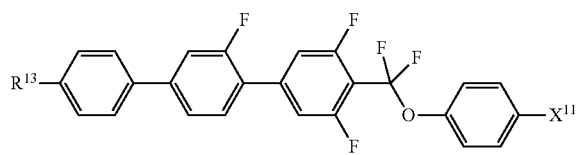
(7-46) 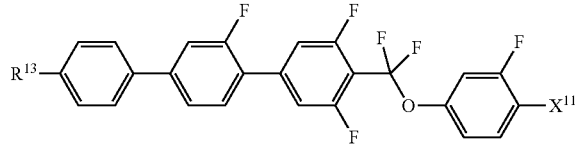
(7-47) 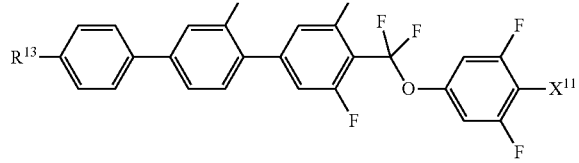
(7-48) 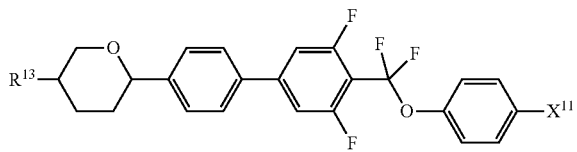
(7-49) 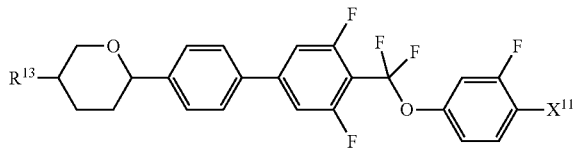
(7-50) 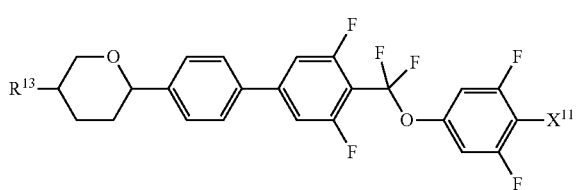
(7-51) 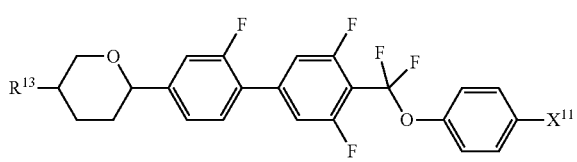
(7-52) 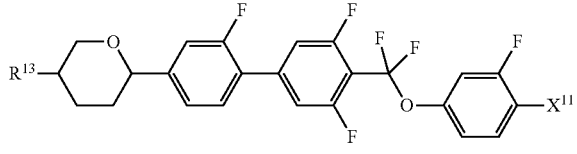
(7-53) 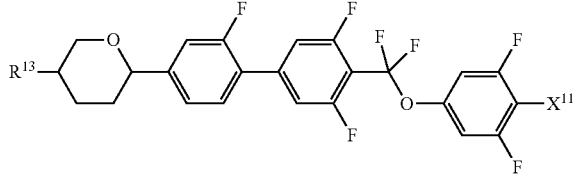
(7-54) 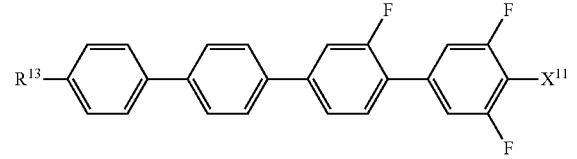
(7-55) 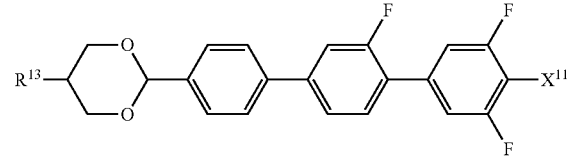

(7-56)
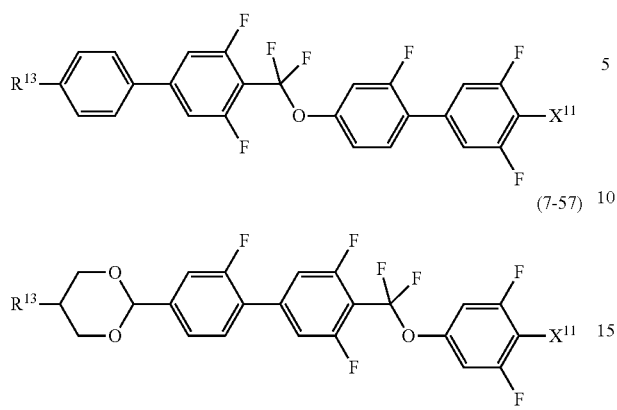

(7-57)

Component C has positive dielectric anisotropy and significantly good stability to heat or light, and therefore is used when a composition for the IPS mode, the FFS mode, the OCB mode or the like is prepared. A proportion of component C is suitably in the range of about 1% by weight to about 99% by weight, preferably in the range of about 10% by weight to about 97% by weight, and further preferably in the range of about 40% by weight to about 95% by weight, based thereon. When component C is added to a composition having negative dielectric anisotropy, the proportion of component C is preferably about 30% by weight or less based thereon. Addition of component C allows adjustment of the elastic constant of the composition and adjustment of a voltage-transmittance curve of the device.

Component D is compound (8) in which a right terminal group is —C≡N or —C≡C—C≡N. Specific examples of preferred component D include compounds (8-1) to (8-64). In the compounds, $R^{14}$ is alkyl having 1 to 10 carbons or alkenyl having 2 to 10 carbons, and in the alkyl and the alkenyl, at least one piece of —CH$_2$— may be replaced by —O—, and in the groups, at least one hydrogen may be replaced by fluorine. $X^{12}$ is —C≡N or —C≡C—C≡N.

(8-1)
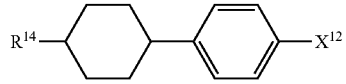

(8-2)
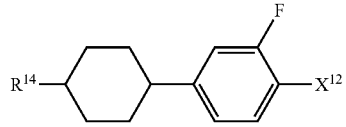

(8-3)
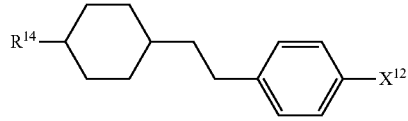

(8-4)
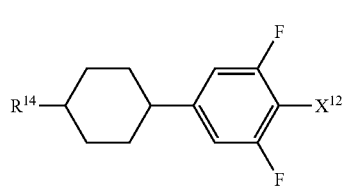

(8-5)

(8-6)
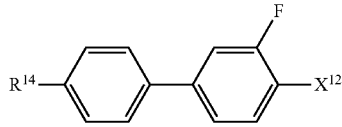

(8-7)
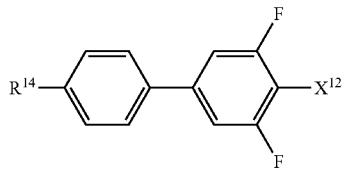

(8-8)
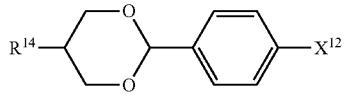

(8-9)
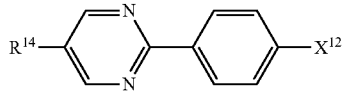

(8-10)
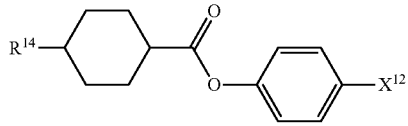

(8-11)
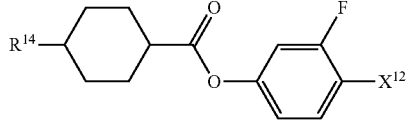

(8-12)
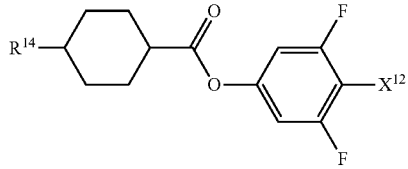

(8-13)
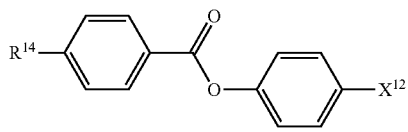

(8-14)
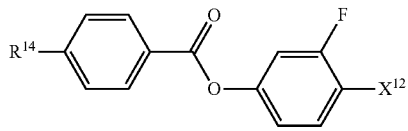

(8-15)
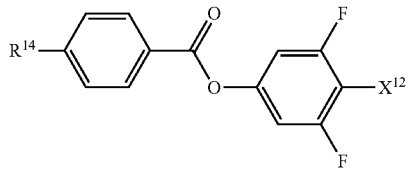

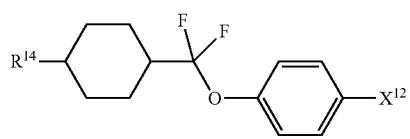 (8-16)
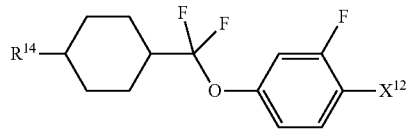 (8-17)
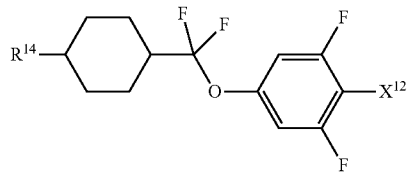 (8-18)
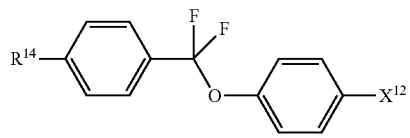 (8-19)
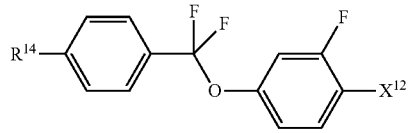 (8-20)
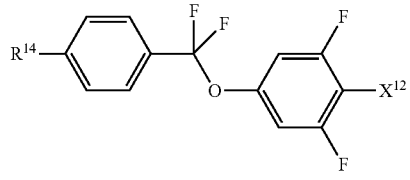 (8-21)
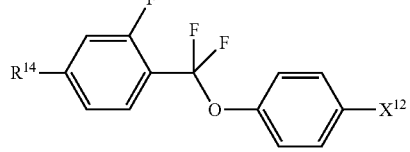 (8-22)
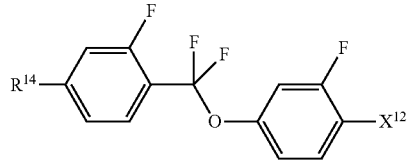 (8-23)
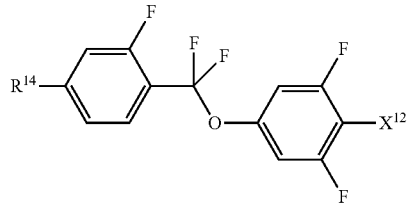 (8-24)
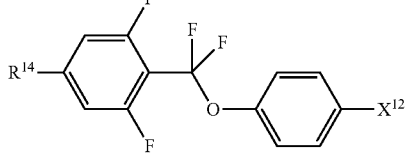 (8-25)
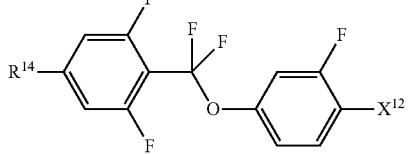 (8-26)
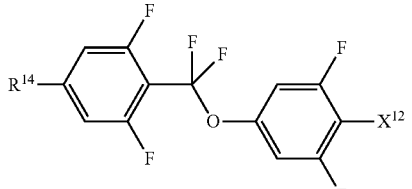 (8-27)
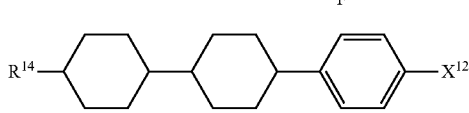 (8-28)
 (8-29)
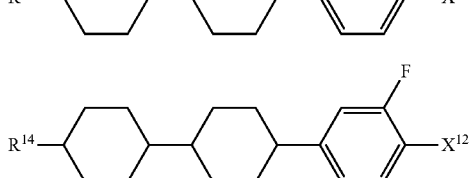 (8-30)
 (8-31)
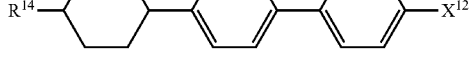 (8-32)
 (8-33)
 (8-34)
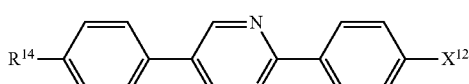 (8-35)

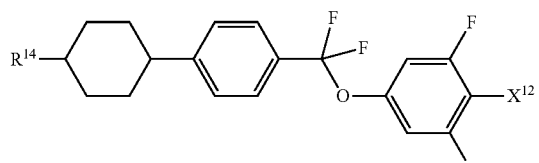
(8-54)

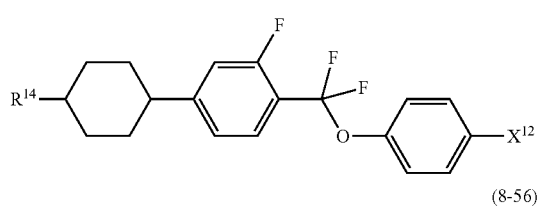
(8-55)

(8-56)

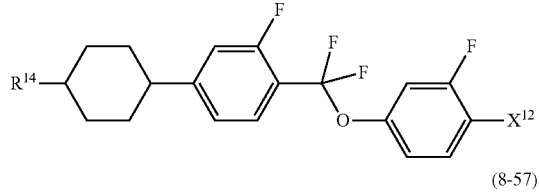
(8-57)

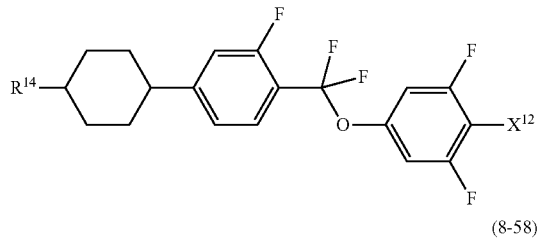
(8-58)

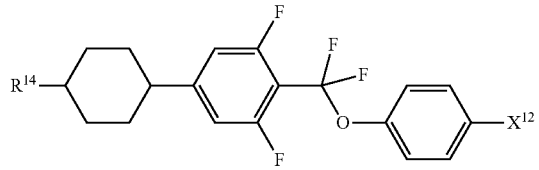
(8-59)

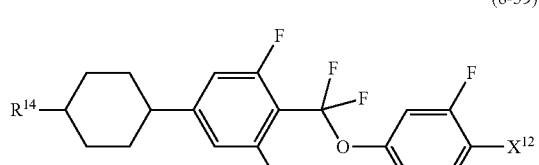
(8-60)

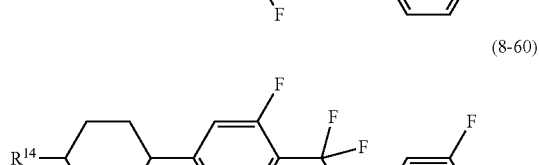
(8-61)

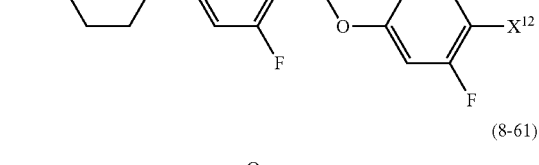

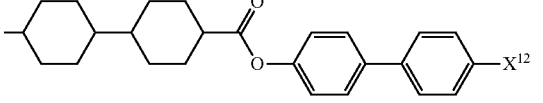

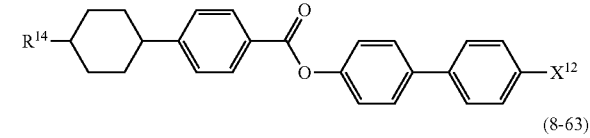
(8-62)

(8-63)

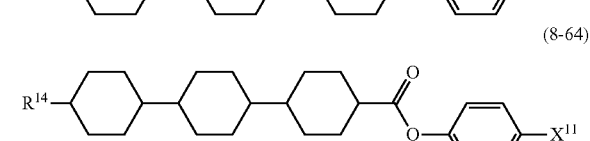
(8-64)

Component D has positive dielectric anisotropy and a value thereof is large, and therefore is used when a composition for the TN mode or the like is prepared. Addition of component D can increase the dielectric anisotropy of the composition. Component D is effective in extending the temperature range of the liquid crystal phase, adjusting the viscosity or adjusting the optical anisotropy. Component D is also useful for adjustment of the voltage-transmittance curve of the device.

When the composition for the TN mode or the like is prepared, a proportion of component D is suitably in the range of about 1% by weight to about 99% by weight, preferably in the range of about 10% by weight to about 97% by weight, and further preferably in the range of about 40% by weight to about 95% by weight, based thereon. When component D is added to a composition having negative dielectric anisotropy, the proportion of component D is preferably about 30% by weight or less based thereon. Addition of component D allows adjustment of the elastic constant of the composition and adjustment of the voltage-transmittance curve of the device.

Component E includes compounds (9) to (15). The compounds have phenylene in which hydrogen in lateral positions are replaced by two halogens, such as 2,3-difluoro-1,4-phenylene. Specific examples of preferred component E include compounds (9-1) to (9-8), compounds (10-1) to (10-17), compound (11-1), compounds (12-1) to (12-3), compounds (13-1) to (13-11), compounds (14-1) to (14-3) and compounds (15-1) to (15-3). In the compounds, $R^5$, $R^{16}$ and $R^{17}$ are independently alkyl having 1 to 10 carbons or alkenyl having 2 to 10 carbons, and in the alkyl and the alkenyl, at least one piece of —CH$_2$— may be replaced by —O—, and in the groups, at least one hydrogen may be replaced by fluorine, and $R^{17}$ may be hydrogen or fluorine.

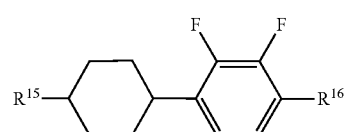
(9-1)

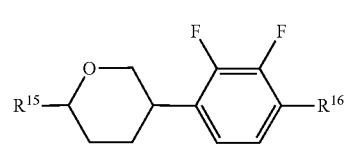
(9-2)

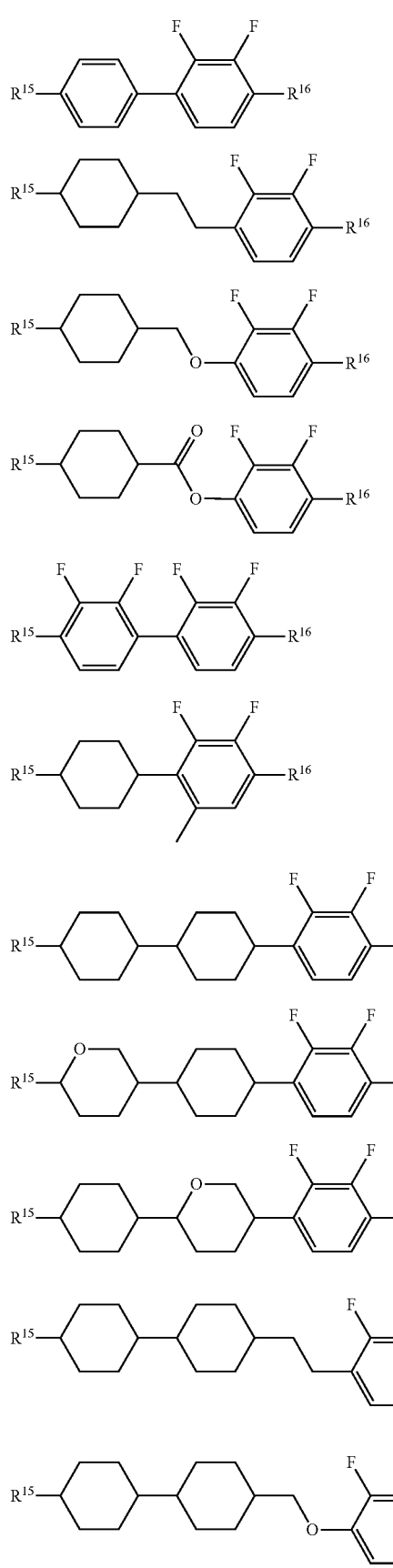
(9-3)
(9-4)
(9-5)
(9-6)
(9-7)
(9-8)
(10-1)
(10-2)
(10-3)
(10-4)
(10-5)
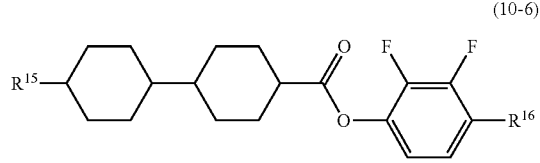
(10-6)
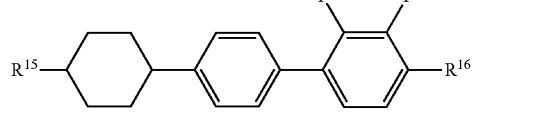
(10-7)
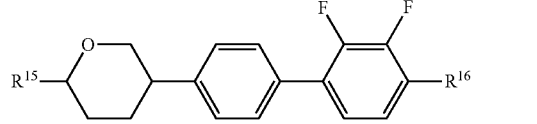
(10-8)
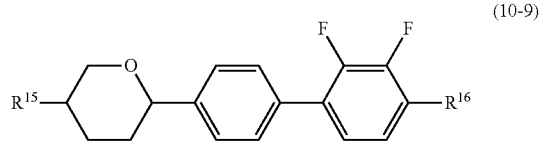
(10-9)
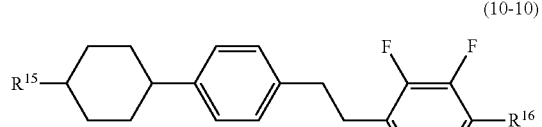
(10-10)
(10-11)
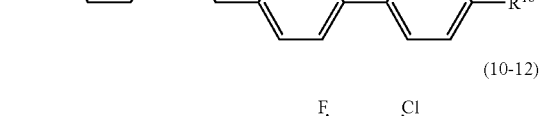
(10-12)
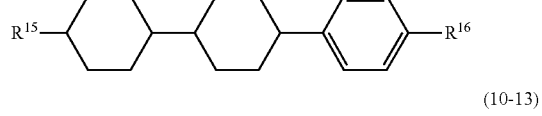
(10-13)
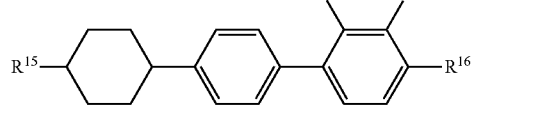
(10-14)
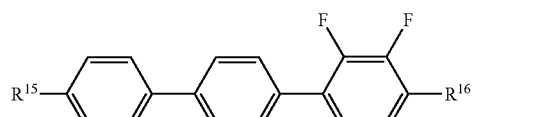
(10-15)
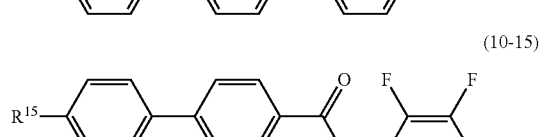

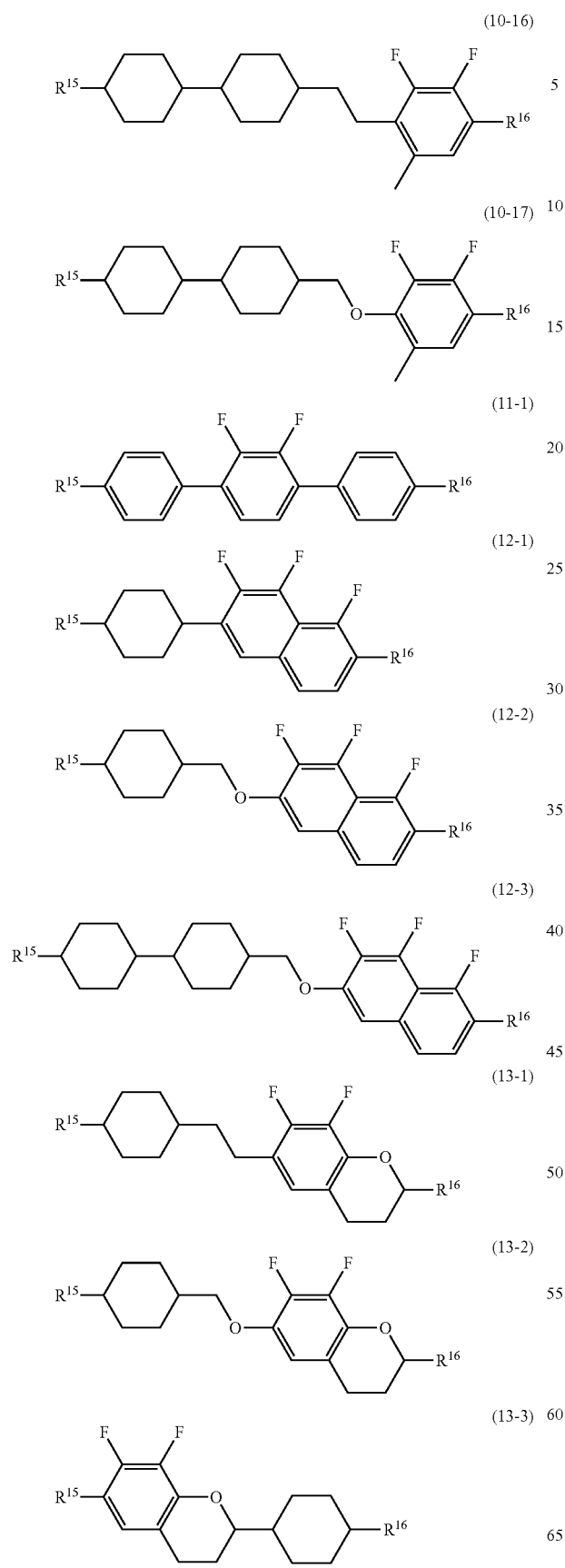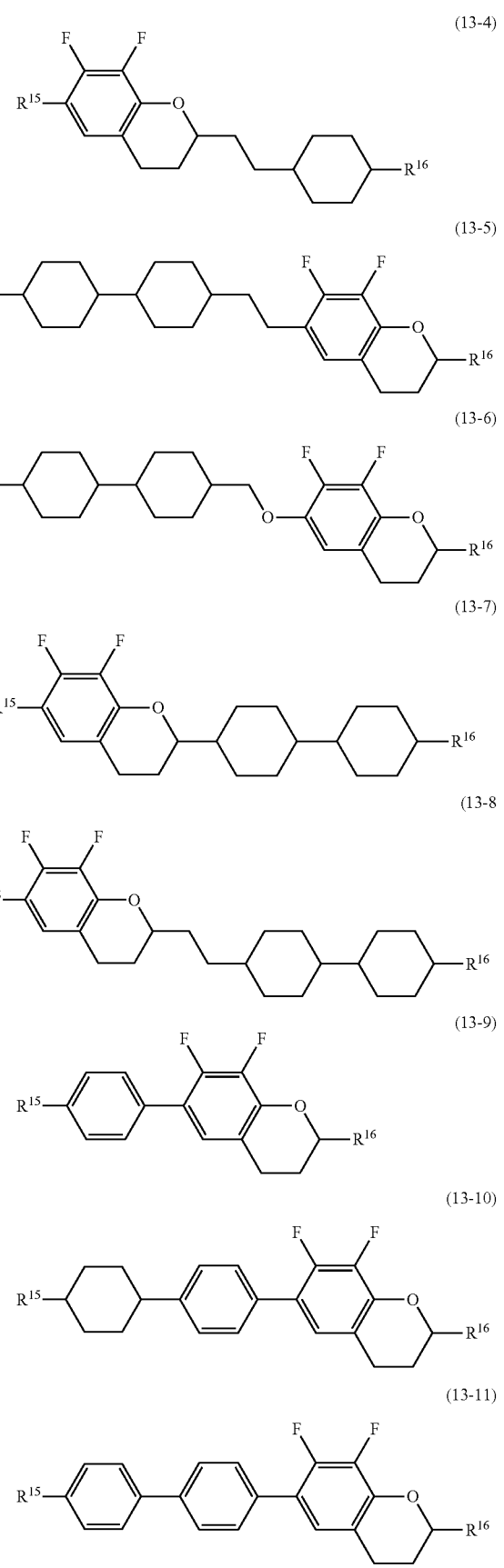

-continued

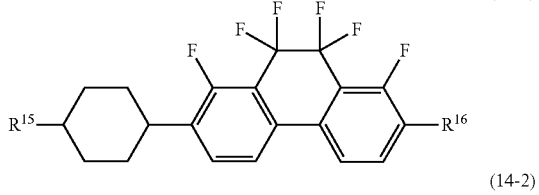
(14-1)

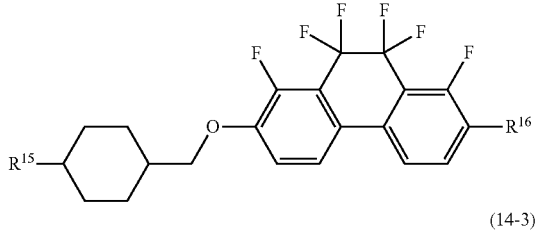
(14-2)

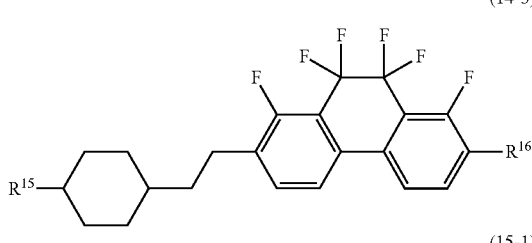
(14-3)

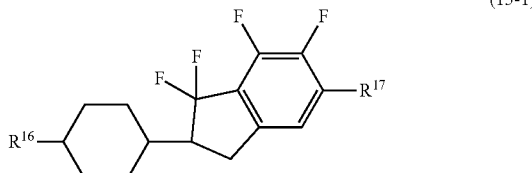
(15-1)

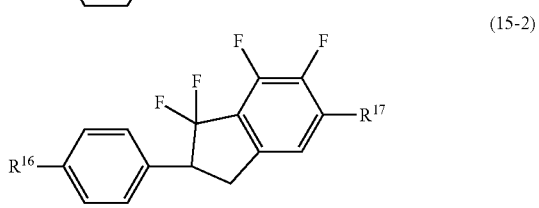
(15-2)

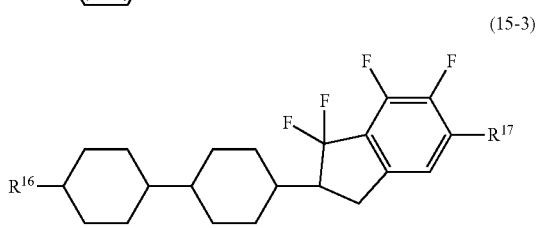
(15-3)

Component E has large negative dielectric anisotropy. Component E is used when a composition for the IPS mode, the VA mode, the PSA mode or the like is prepared. As a proportion of component E is increased, the dielectric anisotropy of the composition is negatively increased, but the viscosity is increased. Thus, as long as a desired value of threshold voltage of the device is met, the proportion is preferably as small as possible. When the dielectric anisotropy at a degree of −5 is taken into account, a proportion thereof is preferably about 40% by weight or more in order to allow sufficient voltage driving, based thereon.

Among types of component E, compound (9) is a bicyclic compound, and therefore is effective in decreasing the viscosity, adjusting the optical anisotropy or increasing the dielectric anisotropy. Compounds (10) and (11) are a tricyclic compound, and therefore are effective in increasing the maximum temperature, the optical anisotropy or the dielectric anisotropy. Compounds (12) to (15) are effective in increasing the dielectric anisotropy.

When a composition for the IPS mode, the VA mode, the PSA mode or the like is prepared, the proportion of component E is preferably about 40% by weight or more, and further preferably in the range of about 50% by weight to about 95% by weight, based thereon. When component E is added to a composition having positive dielectric anisotropy, the proportion of component E is preferably about 30% by weight or less based thereon. Addition of component E allows adjustment of the elastic constant of the composition and adjustment of the voltage-transmittance curve of the device.

A liquid crystal composition satisfying at least one of physical properties such as high stability to heat or light, high maximum temperature, low minimum temperature, small viscosity, suitable optical anisotropy (more specifically, large optical anisotropy or small optical anisotropy), large dielectric anisotropy, large specific resistance and a suitable elastic constant (more specifically, a large elastic constant or a small elastic constant) can be prepared by suitably combining components B, C, D and E with compound (1). A device including such a composition has a wide temperature range in which the device can be used, a short response time, a large voltage holding ratio, low threshold voltage, a large contrast ratio, a small flicker rate and a long service life.

If the device is used for a long period of time, a flicker may be occasionally generated on a display screen. The flicker rate (%) can be represented by a formula (luminance when applying positive voltage−luminance when applying negative voltage)/(average luminance)×100. In a device having the flicker rate in the range of about 0% to about 1%, a flicker is hardly generated on the display screen even if the device is used for a long period of time. The flicker is associated with image persistence, and is presumed to be generated according to a difference in electric potential between a positive frame and a negative frame in driving at alternating current. The composition containing compound (1) is also useful for reducing generation of the flicker.

3-2. Additive

A liquid crystal composition is prepared according to a publicly known method. For example, the component compounds are mixed and dissolved in each other by heating. According to an application, an additive may be added to the composition. Specific examples of the additive include the polymerizable compound, the polymerization initiator, the polymerization inhibitor, the optically active compound, the antioxidant, the ultraviolet light absorber, the light stabilizer, the heat stabilizer, the dye and the antifoaming agent. Such an additive is well known to those skilled in the art, and described in literature.

In a liquid crystal display device having the polymer sustained alignment (PSA) mode, the composition contains a polymer. The polymerizable compound is added for the purpose of forming the polymer in the composition. The polymerizable compound is polymerized by irradiation with ultraviolet light while voltage is applied between electrodes, and thus the polymer is formed in the composition. A suitable pretilt is achieved by the method, and therefore the device in which a response time is shortened and the image persistence is improved is prepared.

Preferred examples of the polymerizable compound include acrylate, methacrylate, a vinyl compound, a vinyloxy compound, propenyl ether, an epoxy compound (oxirane, oxetane) and vinyl ketone. Further preferred examples include a compound having at least one acryloyloxy, and a compound having at least one methacryloyloxy. Still further preferred examples also include a compound having both acryloyloxy and methacryloyloxy.

Still further preferred examples include compounds (M-1) to (M-18). In the compounds, $R^{25}$ to $R^{31}$ are independently hydrogen or methyl; $R^{32}$, $R^{33}$ and $R^{34}$ are independently hydrogen or alkyl having 1 to 5 carbons, and at least one of $R^{32}$, $R^{33}$ and $R^{34}$ is alkyl having 1 to 5 carbons; v, w and x are independently 0 or 1; and u and y are independently an integer from 1 to 10. $L^{21}$ to $L^{26}$ are independently hydrogen or fluorine; and $L^{27}$ and $L^{28}$ are independently hydrogen, fluorine or methyl.

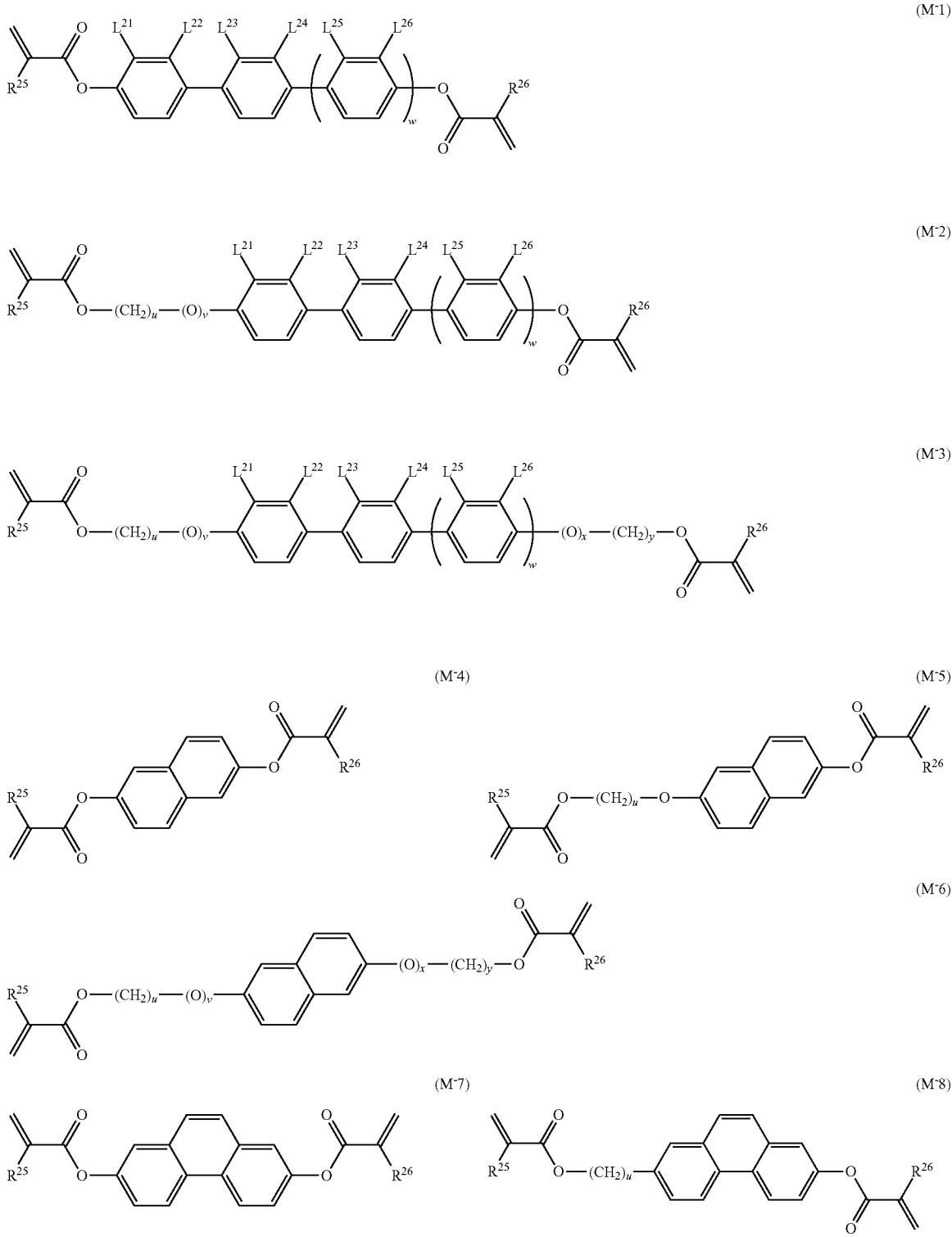

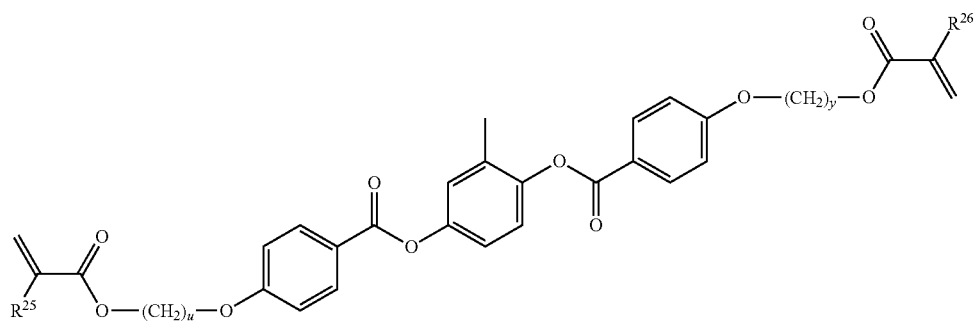
(M-9)
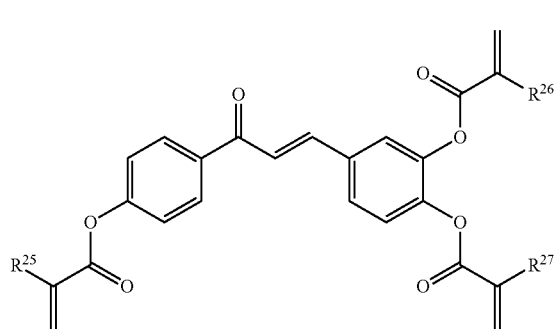
(M-10)
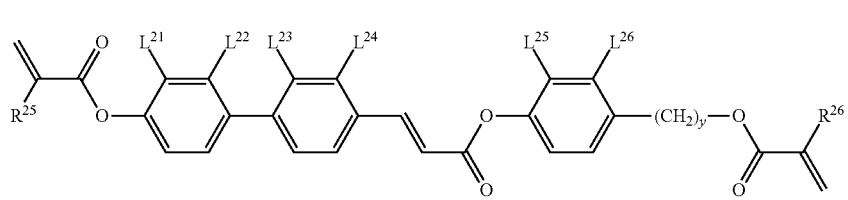
(M-11)
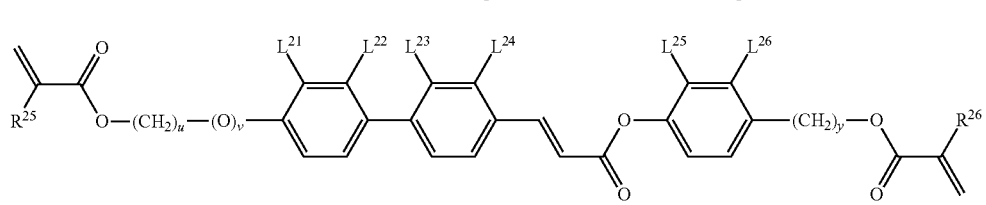
(M-12)
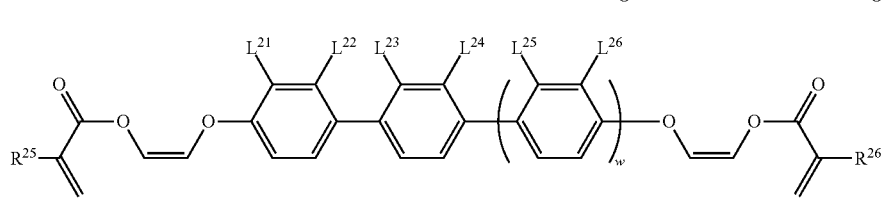
(M-13)
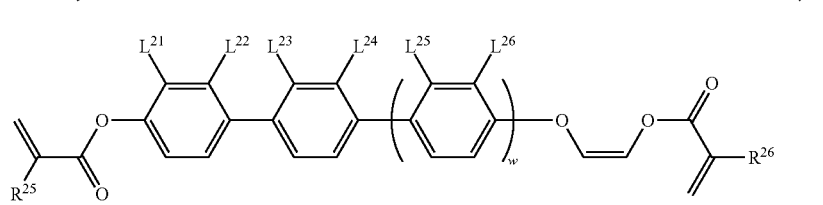
(M-14)

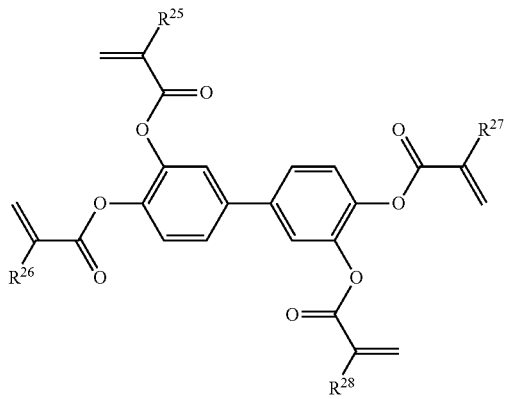

(M-15)

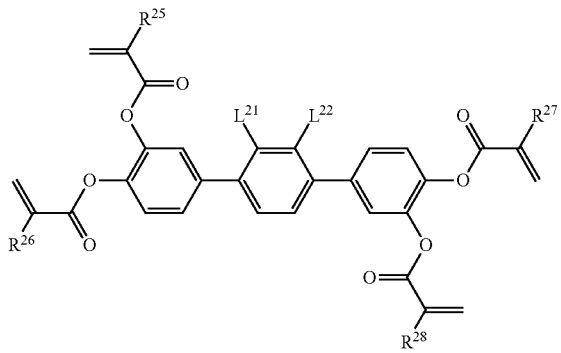

(M-16)

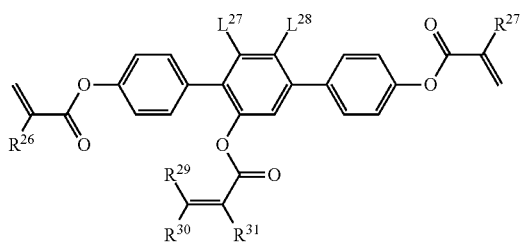

(M-17)

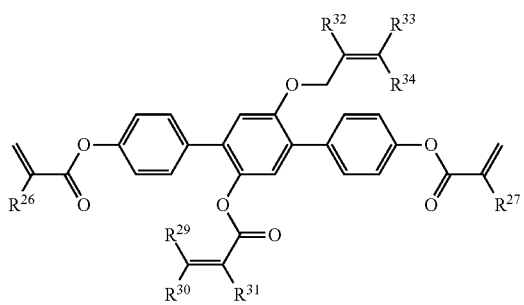

(M-18)

The polymerizable compound can be rapidly polymerized by adding the polymerization initiator. An amount of a remaining polymerizable compound can be reduced by optimizing reaction conditions. Specific examples of a photoradical polymerization initiator include TPO, 1173 and 4265 from Darocur series of BASF SE, and 184, 369, 500, 651, 784, 819, 907, 1300, 1700, 1800, 1850 and 2959 from Irgacure series thereof.

Additional examples of the photoradical polymerization initiator include 4-methoxyphenyl-2,4-bis(trichloromethyl) triazine, 2-(4-butoxystyryl)-5-trichloromethyl-1,3,4-oxadiazole, 9-phenylacridine, 9,10-benzphenazine, a benzophenone-Michler's ketone mixture, a hexaarylbiimidazole-mercaptobenzimidazole mixture, 1-(4-isopropylphenyl)-2-hydroxy-2-methylpropane-1-one, benzyl dimethyl ketal, 2-methyl-1-[4-(methylthio)phenyl]-2-morpholinopropane-1-one, a mixture of 2,4-diethylxanthone and methyl p-dimethylaminobenzoate, and a mixture of benzophenone and methyltriethanolamine.

After the photoradical polymerization initiator is added to the liquid crystal composition, polymerization can be performed by irradiation with ultraviolet light while an electric field is applied. However, an unreacted polymerization initiator or a decomposition product of the polymerization initiator may cause poor display such as image persistence in the device. In order to prevent such an event, photopolymerization may be performed with no addition of the polymerization initiator. A preferred wavelength of irradiation light is in the range of about 150 nanometers to about 500 nanometers. A further preferred wavelength is in the range of about 250 nanometers to about 450 nanometers, and a most preferred wavelength is in the range of about 300 nanometers to about 400 nanometers.

Upon storing the polymerizable compound, the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

The optically active compound is effective in inducing helical structure in liquid crystal molecules to give a required twist angle, and thereby preventing a reverse twist. A helical pitch can be adjusted by adding the optically active compound thereto. Two or more optically active compounds may be added for the purpose of adjusting temperature dependence of the helical pitch. Specific examples of a preferred optically active compound include compounds (Op-1) to (Op-18) described below. In compound (Op-18), ring J is 1,4-cyclohexylene or 1,4-phenylene, and $R^{28}$ is alkyl having 1 to 10 carbons. Asterisk mark (*) represents asymmetrical carbon.

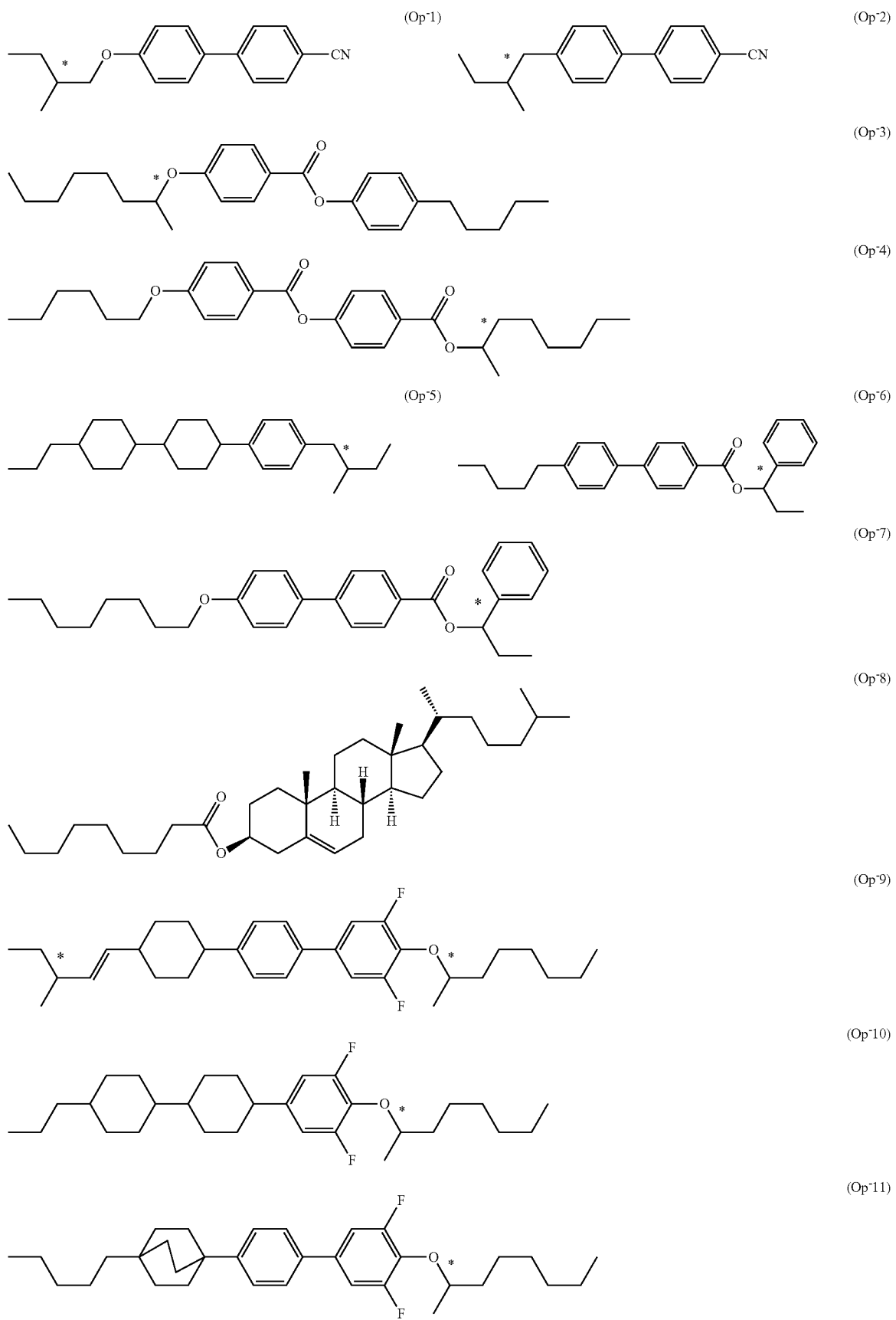

-continued
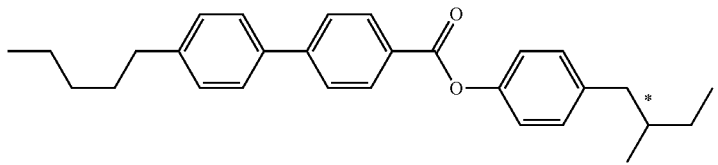
(Op-12)
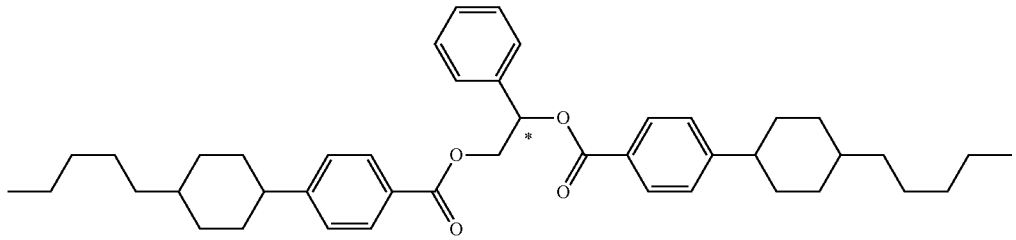
(Op-13)
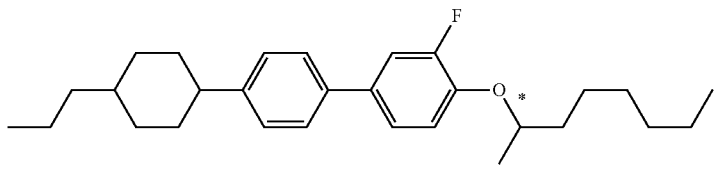
(Op-14)
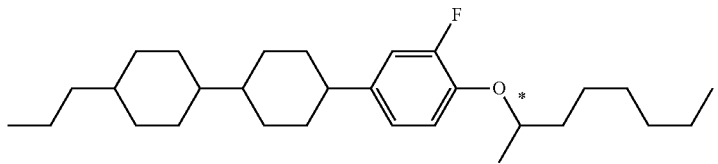
(Op-15)
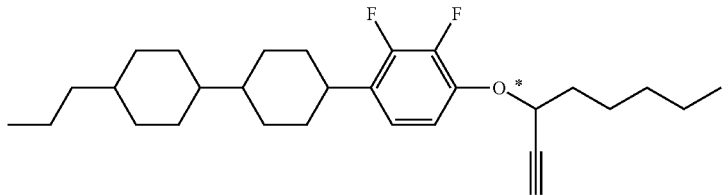
(Op-16)
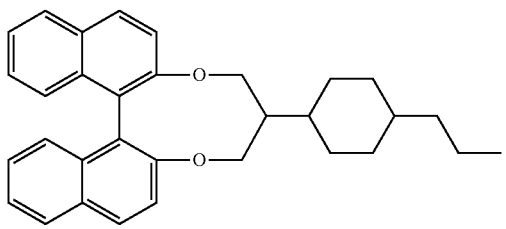
(Op-17)
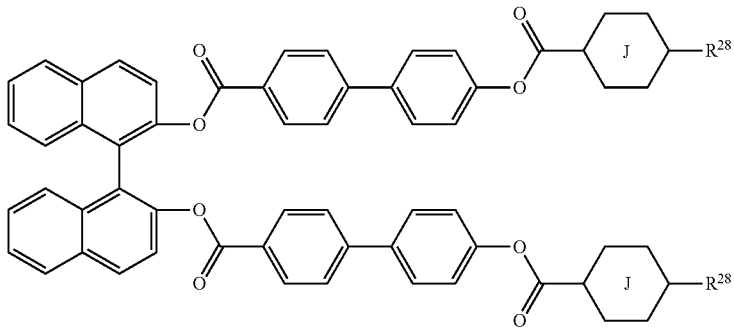
(Op-18)

The antioxidant is effective for maintaining the large voltage holding ratio. Specific examples of a preferred antioxidant include compounds (AO-1) and (AO-2) described below; and Irganox 415, Irganox 565, Irganox 1010, Irganox 1035, Irganox 3114 and Irganox 1098 (trade names; BASF SE). The ultraviolet light absorber is effective for preventing a decrease of the maximum temperature. Preferred examples of the ultraviolet light absorbers include a benzophenone derivative, a benzoate derivative and a triazole derivative, and specific examples include compounds (AO-3) and (AO-4) described below; Tinuvin 329, Tinuvin P, Tinuvin 326, Tinuvin 234, Tinuvin 213, Tinuvin 400, Tinuvin 328 and Tinuvin 99-2 (trade names; BASF SE); and 1,4-diazabicyclo[2.2.2]octane (DABCO).

The light stabilizer such as an amine having steric hindrance is preferred for maintaining the large voltage holding ratio. Specific examples of a preferred light stabilizer include compounds (AO-5), (AO-6) and (AO-7) described below; Tinuvin 144, Tinuvin 765 and Tinuvin 770DF (trade names; BASF SE); and LA-77Y and LA-77G (trade names; ADEKA Corporation). The heat stabilizer is also effective for maintaining the large voltage holding ratio, and specific preferred examples include Irgafos 168 (trade name; BASF SE). A dichroic dye such as an azo dye or an anthraquinone dye is added to the composition to be adapted for a device having a guest host (GH) mode. The antifoaming agent is effective for preventing foam formation. Specific examples of a preferred antifoaming agent include dimethyl silicone oil and methylphenyl silicone oil.

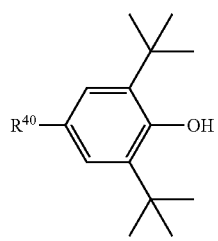
(AO-1)

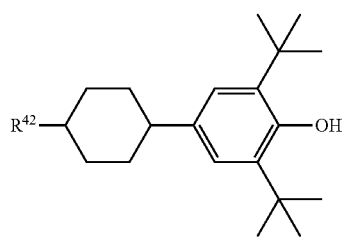
(AO-2)

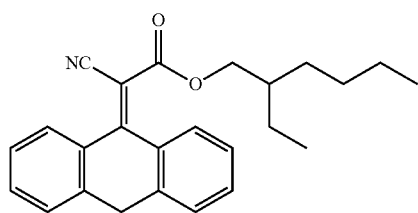
(AO-3)

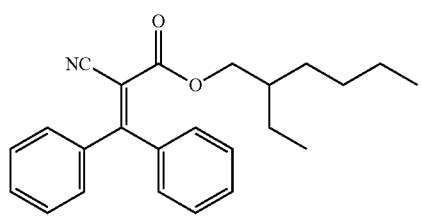
(AO-4)

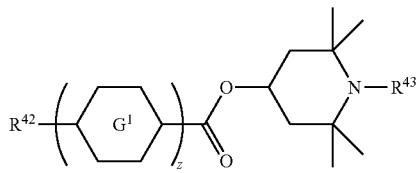
(AO-5)

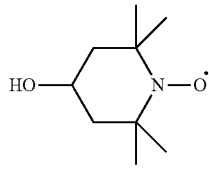
(AO-6)

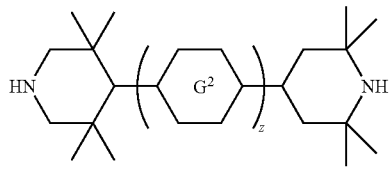
(AO-7)

In compound (AO-1), $R^{40}$ is alkyl having 1 to 20 carbons, alkoxy having 1 to 20 carbons, —COOR$^{41}$ or —CH$_2$CH$_2$COOR$^{41}$, in which $R^{41}$ is alkyl having 1 to 20 carbons. In compounds (AO-2) and (AO-5), $R^{42}$ is alkyl having 1 to 20 carbons. In compound (AO-5), $R^{43}$ is hydrogen, methyl or O. (oxygen radical); and ring $G^1$ is 1,4-cyclohexylene or 1,4-phenylene; and in compound (AO-7), ring $G^2$ is 1,4-cyclohexylene, 1,4-phenylene or 1,4-phenylene in which at least one hydrogen is replaced by fluorine; and in compounds (AO-5) and (AO-7), z is 1, 2 or 3.

4. Liquid Crystal Display Device

The liquid crystal composition can be used in a liquid crystal display device having an operating mode such as the PC mode, the TN mode, the STN mode, the OCB mode and the PSA mode, and driven by an active matrix mode. The composition can also be used in a liquid crystal display device having the operating mode such as the PC mode, the TN mode, the STN mode, the OCB mode, the VA mode and the IPS mode, and driven by a passive matrix mode. The devices can be applied to any of a reflective type, a transmissive type and a transflective type.

The composition is also suitable for a nematic curvilinear aligned phase (NCAP) device, and the composition is microencapsulated herein. The composition can also be used in a polymer-dispersed liquid crystal display device (PDLCD), a polymer-networked liquid crystal display device (PNLCD) and a nanocapsule-dispersed liquid crystal display device. In the compositions, a large amount of polymerizable compound is added. On the other hand, when a proportion of the polymerizable compound is about 10% by weight or less based on the weight of the liquid crystal composition, the liquid crystal display device having the PSA mode can be prepared. A preferred proportion is in the range of about 0.1% by weight to about 2% by weight based thereon. A further preferred proportion is in the range of about 0.2% by weight to about 1.0% by weight based thereon. The device having the PSA mode can be driven by the driving mode such as the active matrix mode and the passive matrix mode. Such devices can be applied to any of the reflective type, the transmissive type and the transflective type.

The liquid crystal composition is suitable also for a liquid crystal display device having a capability of stereoscopic display. In a liquid crystal lens mode, a gradient refractive index lens is combined with an ordinary liquid crystal display device. When the composition is put in the lens and voltage is applied thereto, a distribution is caused in a refractive index in the composition. Thus, a lens effect is developed, and an image is displayed in three dimensions (3D). When no voltage is applied thereto, the image is displayed in two dimensions (2D). Accordingly, switching between 2D and 3D can be performed by electrically turning on or turning off the gradient refractive index lens.

EXAMPLES

1. Example of Compound (1)

The invention will be described in greater detail by way of Examples. The Examples include a typical example, and therefore the invention is not limited by the Examples. The invention includes a mixture of a composition in Use Example 1 and a composition in Use Example 2. The invention also includes a mixture in which at least two compositions in Use Examples are mixed. Compound (1) was prepared according to procedures described below. The thus prepared compound was identified by methods such as an NMR analysis. Physical properties of the compound and the composition, and characteristics of a device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Mass analysis: For measurement, QP-2010 Ultra Gas Chromatograph Mass Spectrometer made by Shimadzu Corporation was used. As a column, a capillary column DB-1 (length 60 m, bore 0.25 mm, film thickness 0.25 μm) made by Agilent Technologies, Inc. was used. As a carrier gas, helium (1 mL/minute) was used. A temperature of a sample vaporizing chamber, a temperature of an ion source, ionizing voltage and emission current were set to 300° C., 200° C., 70 eV and 150 μA, respectively. A sample was dissolved in acetone and prepared to be a 1 weight % solution, and then 1 microliter of the solution obtained was injected into the sample vaporizing chamber. As a recorder, GCMS Solution System made by Shimadzu Corporation was used.

Gas chromatographic analysis: For measurement, GC-2010 Gas Chromatograph made by Shimadzu Corporation was used. As a column, a capillary column DB-1 (length 60 m, bore 0.25 mm, film thickness 0.25 μm) made by Agilent Technologies, Inc. was used. As a carrier gas, helium (1 mL/minute) was used. A temperature of a sample vaporizing chamber and a temperature of a detector (FID) were set to 300° C. and 300° C., respectively. A sample was dissolved in acetone and prepared to be a 1 weight % solution, and then 1 microliter of the solution obtained was injected into the sample vaporizing chamber. As a recorder, GC Solution System made by Shimadzu Corporation or the like was used.

HPLC analysis: For measurement, Prominence (LC-20AD; SPD-20A) made by Shimadzu Corporation was used. As a column, YMC-Pack ODS-A (length 150 mm, bore 4.6 mm, particle diameter 5 μm) made by YMC Co., Ltd. was used. As an eluate, acetonitrile and water were appropriately mixed and used. As a detector, a UV detector, an RI detector, a CORONA detector or the like was appropriately used. When the UV detector was used, a detection wavelength was set to 254 nanometers. A sample was dissolved in acetonitrile and prepared to be a 0.1 weight % solution, and then 1 microliter of the solution was injected into a sample chamber. As a recorder, C-R7Aplus made by Shimadzu Corporation was used.

Ultraviolet-Visible spectrophotometry: For measurement, PharmaSpec UV-1700 made by Shimadzu Corporation was used. A detection wavelength was adjusted in the range of 190 nanometers to 700 nanometers. A sample was dissolved in acetonitrile and prepared to be a 0.01 mmol/L solution, and measurement was carried out by putting the solution in a quartz cell (optical path length: 1 cm).

Sample for measurement: Upon measuring phase structure and a transition temperature (a clearing point, a melting point, a polymerization starting temperature or the like), the compound itself was used as a sample. Upon measuring physical properties such as maximum temperature of a nematic phase, viscosity, optical anisotropy and dielectric anisotropy, a mixture of the compound and a base liquid crystal was used as a sample.

Extrapolation method: When the sample prepared by mixing the compound with the base liquid crystal was used, an extrapolated value was calculated according to the following equation and the calculated value was described: [extrapolated value]=(100×[measured value of a sample]−[% by weight of a base liquid crystal]×[measured value of the base liquid crystal])/[% by weight of a compound].

Base liquid crystal (A): When the dielectric anisotropy of the compound was zero or positive, base liquid crystal (A) described below was used. A proportion of each component was expressed in terms of weight percent (% by weight).

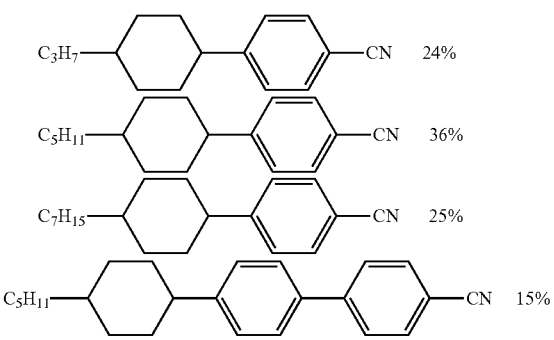

A ratio of the compound to base liquid crystal (A) was adjusted to (15% by weight:85% by weight). When crystals (or a smectic phase) precipitated at 25° C. at the ratio, a ratio of the compound to base liquid crystal (A) was changed in the order of (10% by weight:90% by weight), (5% by weight:95% by weight) and (1% by weight:99% by weight), and the sample was measured at a ratio at which no crystal (or no smectic phase) precipitated at 25° C. In addition, unless otherwise noted, the ratio of the compound to base liquid crystal (A) was (15% by weight:85% by weight).

Base liquid crystal (B): When the dielectric anisotropy of the compound was zero or negative, base liquid crystal (B)

described below was used. A proportion of each component was expressed in terms of weight percent (% by weight).

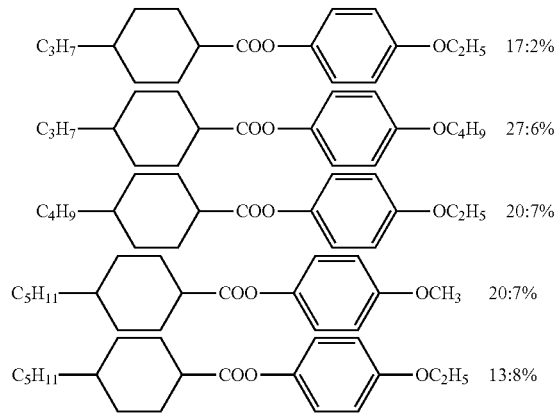

A ratio of the compound to base liquid crystal (B) was adjusted to (20% by weight:80% by weight). When crystals (or a smectic phase) precipitated at 25° C. at the ratio, a ratio of the compound to base liquid crystal (B) was changed in the order of (15% by weight:85% by weight), (10% by weight:90% by weight), (5% by weight:95% by weight) and (1% by weight:99% by weight), and physical properties of the sample were measured at a ratio at which no crystal (or no smectic phase) precipitated at 25° C. In addition, unless otherwise noted, the ratio of the compound to base liquid crystal (B) was (20% by weight:80% by weight).

Base liquid crystal (C): Base liquid crystal (B) containing a fluorine type compound described below as a component was occasionally used. A proportion of each component was expressed in terms of weight percent (% by weight).

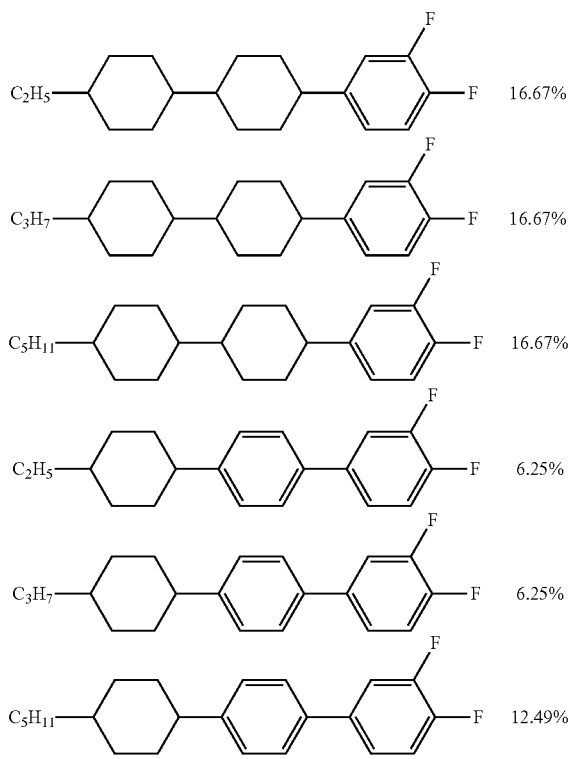

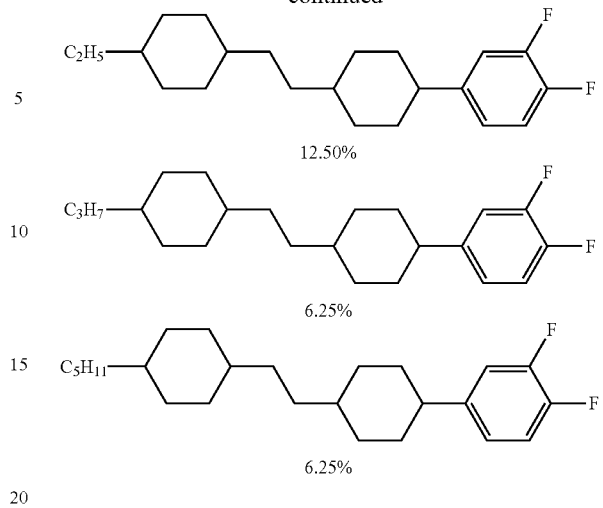

Measuring method: Physical properties were measured according to methods described below. Most of the methods are described in the Standard of Japan Electronics and Information Technology Industries Association (JEITA) discussed and established in JEITA (JEITA ED-2521B). A modified method was also applied. No thin film transistor (TFT) was attached to a TN device used for measurement.

(1) Phase structure: A sample was placed on a hot plate in a melting point apparatus (FP-52 Hot Stage made by Mettler-Toledo International Inc.) equipped with a polarizing microscope. A state of phase and a change thereof were observed with the polarizing microscope while the sample was heated at a rate of 3° C. per minute, and a kind of the phase was specified.

(2) Transition temperature (° C.): For measurement, a differential scanning calorimeter, Diamond DSC System, made by PerkinElmer, Inc., or a high sensitivity differential scanning calorimeter, X-DSC7000, made by SII NanoTechnology Inc. was used. A sample was heated and then cooled at a rate of 3° C. per minute, and a starting point of an endothermic peak or an exothermic peak caused by a phase change of the sample was determined by extrapolation, and thus a transition temperature was determined. A melting point and a polymerization starting temperature of a compound were also measured using the apparatus. Temperature at which a compound undergoes transition from a solid to a liquid crystal phase such as the smectic phase and the nematic phase may be occasionally abbreviated as "minimum temperature of the liquid crystal phase." Temperature at which the compound undergoes transition from the liquid crystal phase to liquid may be occasionally abbreviated as "clearing point."

A crystal was expressed as C. When the crystals were distinguishable into two kinds, each of the crystals was expressed as $C_1$ or $C_2$. The smectic phase or the nematic phase was expressed as S or N. When a phase such as smectic A phase, smectic B phase, smectic C phase and smectic F phase was distinguishable, the phase was expressed as $S_A$, $S_B$, $S_C$ and $S_F$ respectively. A liquid (isotropic) was expressed as I. A transition temperature was expressed as "C 50.0 N 100.0 I," for example. The expression indicates that a transition temperature from the crystals to the nematic phase is 50.0° C., and a transition temperature from the nematic phase to the liquid is 100.0° C.

(3) Compatibility of compound: Samples in which the base liquid crystal and the compound were mixed for proportions of the compounds to be 20% by weight, 15% by weight, 10% by weight, 5% by weight, 3% by weight or 1% by weight were prepared. The samples were put in glass vials, and kept in freezers at −20° C. or −30° C. for a predetermined period of time. Whether a nematic phase of the samples was maintained or crystals (or a smectic phase) precipitated was observed. Conditions on which the nematic phase was maintained were used as a measure of the compatibility. Proportions of the compounds and each temperature in the freezers may be occasionally changed when necessary.

(4) Maximum temperature of nematic phase ($T_{NI}$ or NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. When the sample was a mixture of compound (1) and the base liquid crystal, the maximum temperature was expressed in terms of a symbol $T_{NI}$. The value was calculated from the measured value by using the extrapolation method described above. When the sample was a mixture of compound (1) and a compound selected from compounds (2) to (15), the measured value was expressed in terms of a symbol NI. A maximum temperature of the nematic phase may be occasionally abbreviated as "maximum temperature."

(5) Minimum temperature of nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample was maintained in the nematic phase at −20° C. and changed to crystals or a smectic phase at −30° C., $T_c$ was expressed as $T_c<-20°$ C. A minimum temperature of the nematic phase may be occasionally abbreviated as "minimum temperature."

(6) Viscosity (bulk viscosity; η; measured at 20° C.; mPa·s): For measurement, a cone-plate (E type) rotational viscometer made by Tokyo Keiki Inc. was used.

(7) Viscosity (rotational viscosity; γ1; measured at 25° C.; mPa·s): Measurement was carried out according to a method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. Voltage was applied stepwise to the device from 16 V to 19.5 V at an increment of 0.5 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and equation (8) on page 40 of the paper presented by M. Imai et al. A value of dielectric anisotropy required for the calculation was determined using the device by which the rotational viscosity was measured and by a method described below.

(8) Optical anisotropy (refractive index anisotropy; measured at 25° C.; Δn): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy (Δn) was calculated from an equation:

$$\Delta n = n_\| - n_\perp.$$

(9) Dielectric anisotropy (Δε; measured at 25° C.): A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (ε∥) of liquid crystal molecules in a major axis direction was measured. Sine waves (0.5 V, 1 kHz) were applied to the device, and after 2 seconds, a dielectric constant (ε⊥) of liquid crystal molecules in a minor axis direction was measured. A value of dielectric anisotropy was calculated from an equation:

$$\Delta\varepsilon = \varepsilon_\| - \varepsilon_\perp.$$

(10) Elastic constant (K; measured at 25° C.; pN): For measurement, HP4284A LCR Meter made by Yokogawa-Hewlett-Packard Co. was used. A sample was put in a horizontal alignment device in which a distance (cell gap) between two glass substrates was 20 micrometers. An electric charge from 0 V to 20 V was applied to the device, and electrostatic capacity (C) and applied voltage (V) were measured. The measured values were fitted to equation (2.98) and equation (2.101) on page 75 of "Liquid Crystal Device Handbook (Ekisho Debaisu Handobukku in Japanese; Nikkan Kogyo Shimbun, Ltd.)," and values of $K_{11}$ and $K_{33}$ were obtained from equation (2.99). Next, $K_{22}$ was calculated using the previously determined values of $K_{11}$ and $K_{33}$ in equation (3.18) on page 171. Elastic constant K was expressed in terms of a mean value of the thus determined $K_{11}$, $K_{22}$ and $K_{33}$.

(11) Threshold voltage (Vth; measured at 25° C.; V): For measurement, an LCD-5100 luminance meter made by Otsuka Electronics Co., Ltd. was used. A light source was a halogen lamp. A sample was put in a normally white mode TN device in which a distance (cell gap) between two glass substrates was 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of voltage at 90% transmittance.

(12) Voltage holding ratio (VHR-1; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. The device was charged by applying a pulse voltage (60 microseconds at 5 V) at 25° C. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(13) Voltage holding ratio (VHR-2; measured at 80° C.; %): A voltage holding ratio was measured according to a method described above except that the voltage holding ratio was measured at 80° C. in place of 25° C. The results obtained were expressed in terms of a symbol VHR-2.

(14) Specific resistance (p; measured at 25° C.; Ωcm): Into a vessel equipped with electrodes, 1.0 milliliter of sample was injected. A direct current voltage (10 V) was applied to the vessel, and a direct current after 10 seconds was measured. Specific resistance was calculated from the following equation:

(specific resistance)={(voltage)×(electric capacity of a vessel)}/{(direct current)×(dielectric constant of vacuum)}.

(15) Response time (T; measured at 25° C.; ms): For measurement, an LCD-5100 luminance meter made by Otsuka Electronics Co., Ltd. was used. A light source was a halogen lamp. A low-pass filter was set to 5 kHz. A sample was put in a normally white mode TN device in which a distance (cell gap) between two glass substrates was 5.0 micrometers and a twist angle was 80 degrees. A voltage (rectangular waves; 60 Hz, 5 V, 0.5 second) was applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A rise time (τr; millisecond) was expressed in terms of time required for a change from 90% transmittance to 10% transmittance. A fall time (τf; millisecond) was expressed in terms of time required for a change from 10% transmittance to 90% transmittance. A response time was expressed by a sum of the rise time and the fall time thus determined.

(16) Flicker rate (measured at 25° C.; %): For measurement, 3298F Multimedia Display Tester made by Yokogawa Electric Corporation was used. A light source was LED. A sample was put in a normally black mode FFS device in which a distance (cell gap) between two glass substrates was 3.5 micrometers and a rubbing direction was anti-parallel. The device was sealed with an ultraviolet-curable adhesive. Voltage was applied to the device, and a voltage having a maximum amount of light transmitted through the device was measured. A flicker rate displayed thereon was read by bringing a sensor unit close to the device while voltage was applied to the device.

Raw material: Solmix (registered trademark) A-11 is a mixture of ethanol (85.5%), methanol (13.4%) and isopropanol (1.1%), and was purchased from Japan Alcohol Trading Co., Ltd.

Synthesis Example 1

Synthesis of compound (No.49)

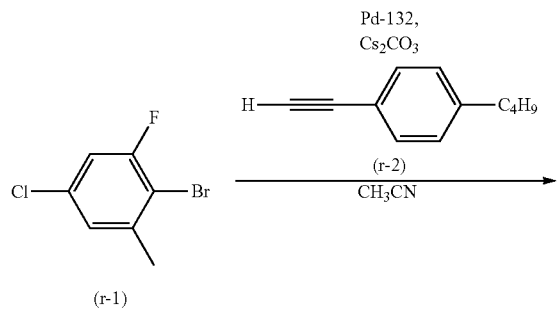

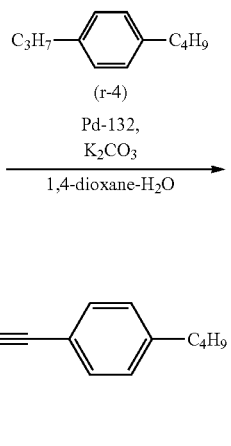

First Step

In a reaction vessel, 0.079 g (0.11 mmol) of dichlorobis[di-t-butyl(p-dimethylaminophenyl)phosphino]palladium (II) (abbreviated as Pd-132) and 14.6 g of cesium carbonate were put, and then the reaction vessel was decompressed, and argon was introduced thereinto. The operation was repeated 3 times. Compound (r-1) (5.0 g, 22.4 mmol) dissolved in 50 mL of acetonitrile and compound (r-2) (3.54 g, 22.4 mmol) dissolved in 50 mL of acetonitrile were added thereto, and the resulting mixture was stirred and heated at 80° C. for 4 hours. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane) to obtain 4.4 g of compound (r-3).

Second Step

In a reaction vessel, compound (r-3) (3.4 g, 11.3 mmol) dissolved in 60 mL of 1,4-dioxane was put, and 0.08 g (0.11 mmol) of Pd-132, 3.1 g (22.6 mmol) of potassium carbonate and 8 mL of a distilled water were added thereinto. Compound (r-4) (2.78 g, 17.0 mmol) dissolved in 20 mL of 1,4-dioxane was added thereto, and the resulting mixture was stirred and heated under reflux for 4 hours under a nitrogen atmosphere. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane), and further recrystallized from a mixed solvent (heptane/Solmix A-11=1/4 in a volume ratio) to obtain 3.20 g of compound (No. 49).

$^1$H-NMR (δ ppm; CDCl$_3$): 7.49 (d, 2H), 7.47 (d, 2H), 7.24 (d, 2H), 7.22 (d, 1H), 7.17-7.15 (m, 3H), 2.62 (t, 4H), 2.55 (s, 3H), 1.67 (sex, 2H), 1.60 (quin, 2H), 1.35 (sex, 2H), 0.96 (t, 3H), 0.93 (t, 3H).

For measurement of the transition temperature, compound (No. 49) was used as a sample as was. For measurement of the maximum temperature (T$_{NI}$), the dielectric anisotropy (Δε) and the optical anisotropy (Δn), a mixture of compound (No. 49) and base liquid crystal (A) was used as a sample. The measurement method was applied also to a compound prepared as described below.

Transition temperature: C 77.1 N 133.1 I. $T_{NI}$=116.4° C., Δε=6.1, Δn=0.310.

Synthesis Example 2

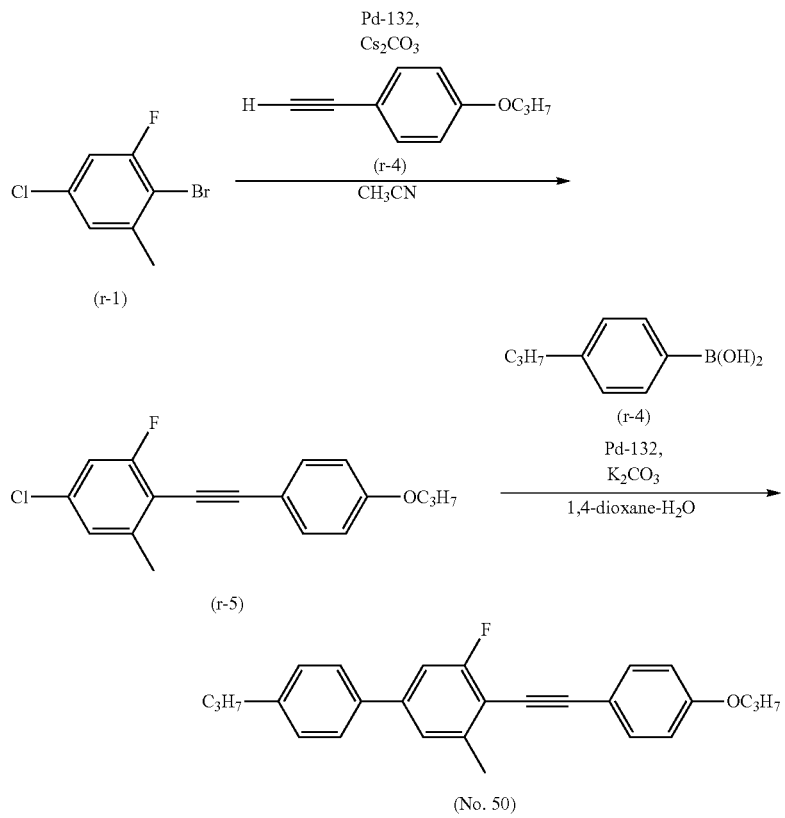

First Step

In a reaction vessel, 0.079 g (0.11 mmol) of Pd-132 and 14.6 g of cesium carbonate were put, and then the reaction vessel was decompressed, and argon was introduced thereinto. The operation was repeated 3 times. Compound (r-1) (5.0 g, 22.4 mmol) dissolved in 50 mL of acetonitrile and compound (r-4) (3.58 g, 22.4 mmol) dissolved in 50 mL of acetonitrile were added thereto, and the resulting mixture was stirred and heated at 80° C. for 4 hours under an argon atmosphere. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane) to obtain 3.63 g of compound (r-5).

Second Step

In a reaction vessel, compound (r-5) (3.6 g, 11.3 mmol) dissolved in 60 mL of 1,4-dioxane was put, and 0.084 g (0.12 mmol) of Pd-132, 3.31 g (24.0 mmol) of potassium carbonate and 8 mL of distilled water were added thereinto, and compound (r-4) (2.95 g, 18.0 mmol) dissolved in 20 mL of 1,4-dioxane was added thereto, and the resulting mixture was stirred and heated under reflux for 4 hours under a nitrogen atmosphere. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane/toluene=1/4 in a volume ratio), and further recrystallized from a mixed solvent (heptane/Solmix A-11=1/5 in a volume ratio) to obtain 2.74 g of compound (No. 50).

$^1$H-NMR (δ ppm; CDCl$_3$): 7.49 (d, 2H), 7.48 (d, 2H), 7.23 (d, 3H), 7.15 (d, 1H), 6.87 (d, 2H), 3.92 (t, 2H), 2.61 (t, 2H), 2.55 (s, 3H), 1.67 (sex, 2H), 1.60 (quin, 2H), 1.35 (sex, 2H), 0.96 (t, 3H), 0.93 (t, 3H).

For measurement of the transition temperature, compound (No. 50) was used as a sample as was. For measurement of the maximum temperature ($T_{NI}$), the dielectric anisotropy (Δε) and the optical anisotropy (Δn), a mixture of compound (No. 50) and base liquid crystal (A) was used as a sample. The measurement method was applied also to a compound prepared as described below.

Transition temperature: C 133.0 N 177.2 I. $T_{NI}$=137.7° C., Δε=6.4, Δn=0.357.

Synthesis Example 3
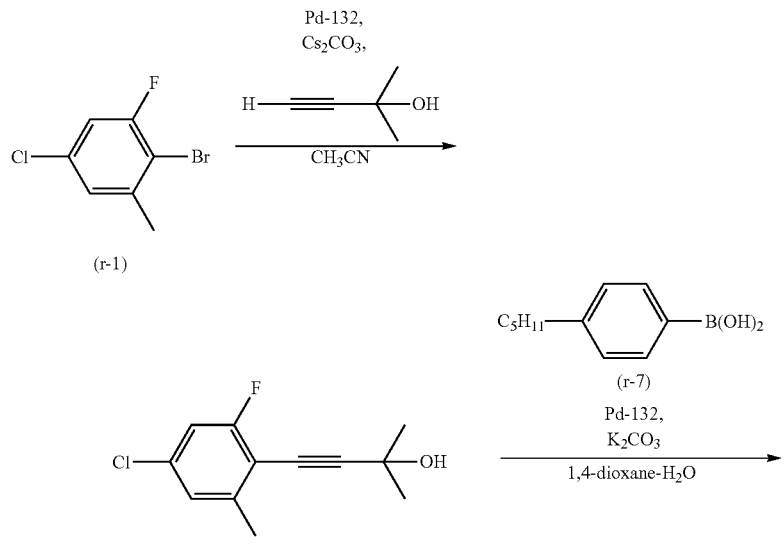
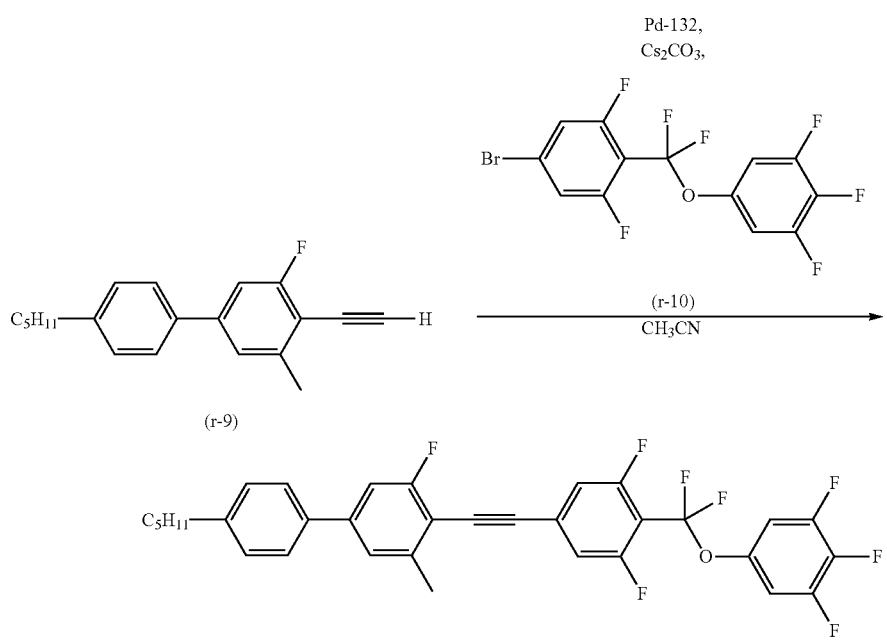

First Step

In a reaction vessel, 0.134 g (0.19 mmol) of Pd-132 and 24.7 g of cesium carbonate were put, and then the reaction vessel was decompressed, and argon was introduced thereinto. The operation was repeated 3 times. Compound (r-1) (8.46 g, 37.9 mmol) dissolved in 100 mL of acetonitrile and 3.18 g (37.9 mmol) of 2-methyl-3-butyn-2-ol dissolved in 100 mL of acetonitrile were added thereto, and the resulting mixture was stirred and heated at 80° C. for 2 hours under an argon atmosphere. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane/ethyl acetate=6/4 in a volume ratio) to obtain 5.33 g of compound (r-6).

Second Step

In a reaction vessel, compound (r-6) (3.18 g, 16.5 mmol) dissolved in 60 mL of 1,4-dioxane was put, and 0.078 g (0.11 mmol) of Pd-132, 3.05 g (22.1 mmol) of potassium carbonate and 8 mL of a distilled water were added thereto, and compound (r-7) (3.18 g, 16.5 mmol) dissolved in 20 mL of 1,4-dioxane was added thereto, and the resulting mixture was stirred and heated under reflux for 4 hours under a nitrogen atmosphere. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane/ethyl acetate=6/4 in a volume ratio) to obtain 2.98 g of compound (r-8).

Third Step

In a reaction vessel, compound (r-8) (2.98 g, 8.80 mmol) dissolved in 60 mL of toluene was put, and 0.54 g (9.60 mmol) of potassium hydroxide grounded by a mortar was added thereinto, and the resulting mixture was stirred and heated under reflux for 3 hours. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane/toluene=9/1 in a volume ratio) to obtain 1.42 g of compound (r-9).

Fourth Step

In a reaction vessel, 0.018 g (0.03 mmol) of Pd-132 and 3.30 g of cesium carbonate were put, and then the reaction vessel was decompressed, and argon was introduced thereinto. The operation was repeated 3 times. Compound (r-9) (1.42 g, 5.06 mmol) dissolved in 25 mL of acetonitrile and compound (r-10) (1.97 g, 5.06 mmol) dissolved in 25 mL of acetonitrile were added thereto, and the resulting mixture was stirred and heated at 80° C. for 4 hours under an argon atmosphere. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane), and further recrystallized from a mixed solvent (heptane/Solmix A-11=1/5 in a volume ratio) to obtain 1.00 g of compound (No. 114).

$^1$H-NMR (δ ppm; $CDCl_3$): 7.49 (d, 2H), 7.28 (d, 2H), 7.26 (d, 1H), 7.20 (d, 1H), 7.17 (d, 2H), 6.97 (dd, 2H), 2.65 (t, 2H), 2.55 (s, 3H), 1.65 (quin, 2H), 1.38-1.32 (m, 4H), 0.91 (t, 3H).

For measurement of the transition temperature, compound (No. 114) was used as a sample as was. For measurement of the maximum temperature ($T_{NI}$), the dielectric anisotropy (Δε) and the optical anisotropy (Δn), a mixture of compound (No. 114) and base liquid crystal (A) was used as a sample. The measurement method was applied also to a compound prepared as described below.

Transition temperature: C 101.1 N 122.7 I. $T_{NI}$=97.0° C., Δε=36.6, Δn=0.257.

Synthesis Example 4

Synthesis of compound (No. 115)

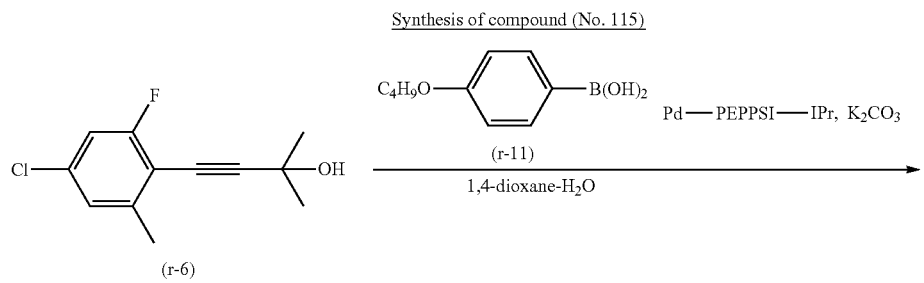

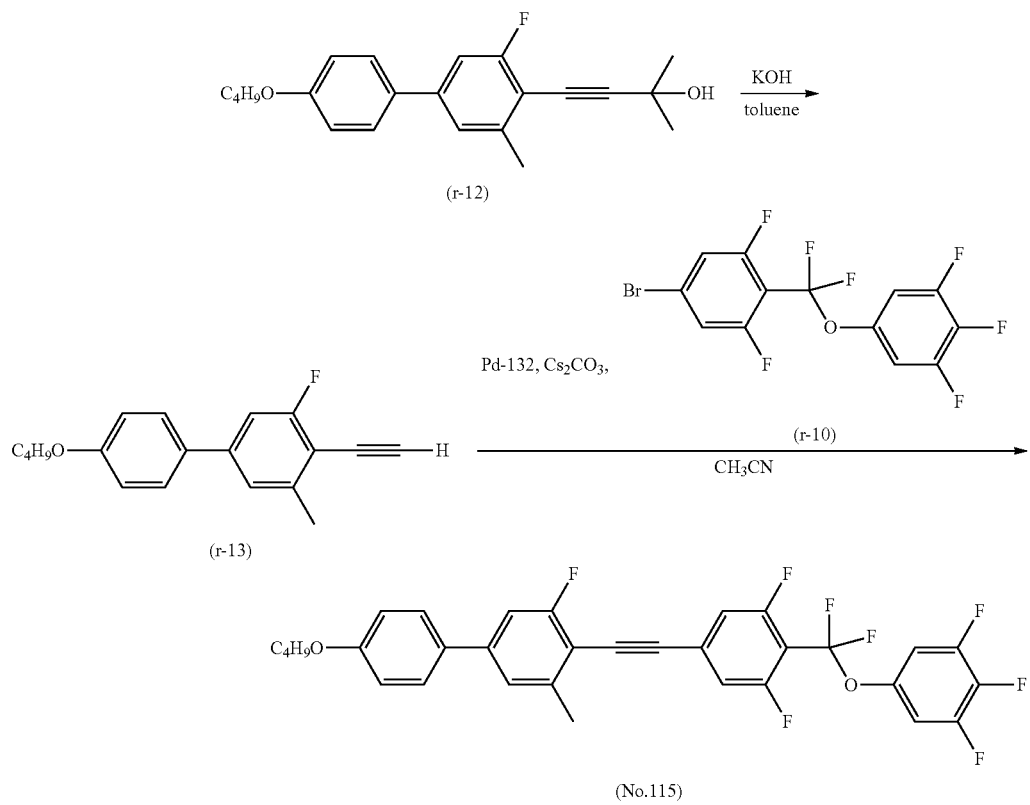

(No.115)

First Step

In a reaction vessel, compound (r-6) (2.50 g, 11.0 mmol) dissolved in 60 mL of 1,4-dioxane was put, and 0.075 g (0.11 mmol) of [1,3-bis(2,6-diisopropylphenyl)imidazol-2-ylidene](3-chloropyridyl)Palladium(II) dichloride (abbreviated as Pd-PEPPSI-IPr), 3.05 g (22.1 mmol) of potassium carbonate and 8 mL of a distilled water were added thereinto, and compound (r-11) (3.21 g, 16.5 mmol) dissolved in 20 mL of 1,4-dioxane was added thereto, and the resulting mixture was stirred and heated under reflux for 4 hours under a nitrogen atmosphere. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane/ethyl acetate=7/3 in a volume ratio) to obtain 3.49 g of compound (r-12).

Second Step

In a reaction vessel, compound (r-12) (3.49 g, 10.25 mmol) dissolved in 60 mL of toluene was put, and then 0.63 g (11.2 mmol) of potassium hydroxide grounded by a mortar was added thereto, and the resulting mixture was stirred and heated under reflux for 3 hours. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane/toluene=7/3 in a volume ratio) to obtain 2.24 g of compound (r-13).

Third Step

In a reaction vessel, 0.028 g (0.04 mmol) of Pd-132 and 5.17 g of cesium carbonate were put, and then the reaction vessel was decompressed, and argon was introduced thereinto. The operation was repeated 3 times. Compound (r-13) (2.24 g, 7.93 mmol) dissolved in 37 mL of acetonitrile and compound (r-10) (3.09 g, 7.93 mmol) dissolved in 37 mL of acetonitrile were added thereto, and the resulting mixture was stirred and heated at 80° C. for 4 hours under an argon atmosphere. The resulting reaction solution was cooled to room temperature, and then a distilled water was added thereto to stop the reaction, and an aqueous layer thereof was subjected to extraction with toluene. Combined organic layers were washed with saturated brine, and dried over anhydrous magnesium carbonate. A solvent was distilled off under reduced pressure, and the resulting residue was purified by silica gel chromatography (heptane), and further recrystallized from a mixed solvent (heptane/Solmix A-11=1/5 in a volume ratio) to obtain 0.71 g of compound (No. 115).

$^1$H-NMR (δ ppm; CDCl$_3$): 7.51 (d, 2H), 7.25 (d, 1H), 7.17-7.15 (m, 3H), 6.99-6.96 (m, 4H), 4.01 (t, 2H), 2.54 (s, 3H), 1.79 (quin, 2H), 1.52 (Sex, 2H), 0.99 (t, 3H).

For measurement of the transition temperature, compound (No. 115) was used as a sample as was. For measurement of the maximum temperature ($T_{NI}$), the dielectric anisotropy (Δε) and the optical anisotropy (Δn), a mixture of compound (No. 115) and base liquid crystal (A) was used as a sample. The measurement method was applied also to a compound prepared as described below.

Transition temperature: C 111.9 N 156.5 I. $T_{NI}$=121.7° C., Δε=37.9, Δn=0.297.

Example 1

Stability to Light

Stability of compound (No. 49) described in Synthesis Example 1 to ultraviolet light was examined.

Measurement Method

Stability to ultraviolet light was measured as described below. A sample for measurement was prepared by mixing compound (No. 49) and base liquid crystal (A) at a proportion of 15% by weight and 85% by weight, respectively. A maximum temperature ($T_{NI}$) of the sample was measured according to a method in measurement method (4). A current amount was measured according to a method of measuring specific resistance as described in measurement method (14). Next, the sample was put in a display device for measuring physical properties, in which silica was obliquely vapor-deposited thereto, and the display device was irradiated with 12 mW/cm$^2$ of ultraviolet light for 20 minutes. For irradiation, an ultra high-pressure mercury lamp made by Ushio, Inc. was used. A distance between the light source and the device was set to 20 centimeters. A maximum temperature (NI) and a current amount were measured also for a sample after irradiation. The results were summarized in Table 2.

Comparative Example 1

Comparative compound (C-1) was selected in order to compare with compound (No. 49) described in Example 1 in stability to ultraviolet light. The reason of selecting the compound is that the compound has no alkyl group in a tolan skeleton part.

Synthesis of Comparative Compound (C-1)

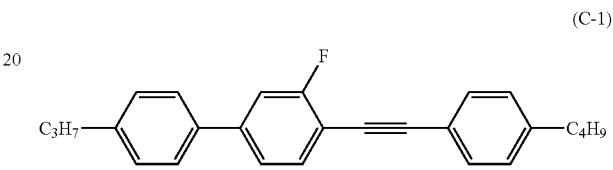

(C-1)

$^1$H-NMR (δ ppm; CDCl$_3$) of comparative compound (C-1): 7.52 (t, 1H), 7.48 (dd, 4H), 7.32 (td, 2H), 7.24 (d, 2H), 7.16 (d, 2H), 2.61 (t, 4H), 1.66 (sex, 2H), 1.59 (quin, 2H), 1.35 (sex, 2H), 0.97 (t, 3H), 0.92 (t, 3H).

Physical properties of comparative compound (C-1). Transition temperature: C 72.5 S$_A$ 182.5 N 184.5 I. Maximum temperature ($T_{NI}$)=151.0° C. Dielectric anisotropy (Δε)=6.77. Optical anisotropy (Δn)=0.330.

Stability to ultraviolet light was also measured in comparative compound (C-1) in a manner similar to Example 1. The results were summarized in Table 2.

TABLE 2

| | Stability to ultraviolet light | | | |
|---|---|---|---|---|
| | Maximum temperature (NI; ° C.) | | Current amount (μA) | |
| Compound contained in sample | Before irradiation | After irradiation | Before irradiation | After irradiation |
| Compound (No. 49) | 78.4 | 77.9 | 0.37 | 0.42 |
| Comparative compound (C-1) | 83.6 | 77.8 | 0.39 | 4.70 |

Notes:
In the maximum temperature, measured values are directly described (without extrapolation).

Even if the sample of compound (No. 49) was irradiated with ultraviolet light, the maximum temperature was decreased only by 0.5° C., but the sample of comparative compound (C-1) was decreased by as high as 5.8° C. in the maximum temperature. In the sample of comparative compound (C-1), the current amount after irradiation was significantly increased. The results show that the stability of compound (No. 49) to ultraviolet light was increased in comparison with comparative compound (C-1). In a liquid crystal display device, a backlight is set up on a reverse side of a liquid crystal cell, and a liquid crystal composition is irradiated with the light. Accordingly, a liquid crystal compound that is further stable to ultraviolet light is important from a viewpoint of a service life of the device.

Example 2

Stability to Light

A stability of compound (No. 114) described in Synthesis Example 3 to ultraviolet light was examined. A stability to ultraviolet light was measured in a manner similar to Example 1. The results were summarized in Table 3.

Comparative Example 2

Comparative compound (C-2) was selected in order to compare with compound (No. 114) described in Example 2 in stability to ultraviolet light. The reason of selecting the compound is that the compound has no alkyl group in a tolan skeleton part. Synthesis of comparative compound (C-2)

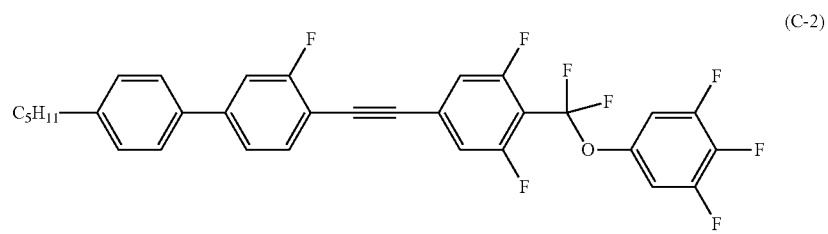

(C-2)

$^1$H-NMR (δ ppm; CDCl$_3$) of comparative compound (C-2): 7.55 (1H, t, J=7.6 Hz), 7.51 (d, 2H), 7.40 (dd, 1H), 7.36 (dd, 1H), 7.27 (t, 2H), 7.18 (d, 2H), 6.98 (dd, 2H), 2.66 (t, 2H), 1.65 (quin, 2H), 1.36-1.34 (m, 4H), 0.91 (t, 3H).

Transition temperature of comparative compound (C-2): C 60.3 S$_A$ 81.8 N 161.5 I. Maximum temperature (T$_{NI}$)=125.7° C. Dielectric anisotropy (Δε)=39.5, optical anisotropy (Δn)=0.270.

TABLE 3

Stability to ultraviolet light

| Compound contained in sample | Maximum temperature (NI; ° C.) | | Current amount (μA) | |
|---|---|---|---|---|
| | Before irradiation | After irradiation | Before irradiation | After irradiation |
| 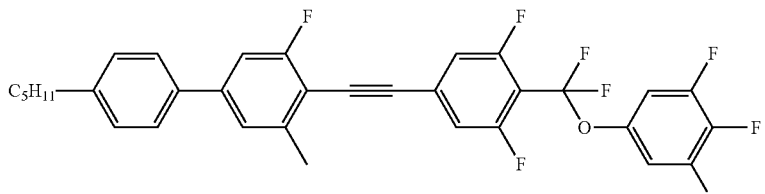 Compound (No. 114) | 75.5 | 74.9 | 0.44 | 0.52 |
| 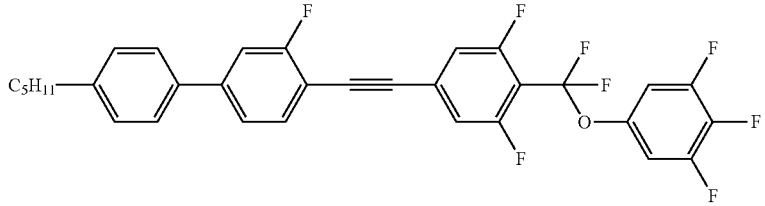 Comparative compound (C-2) | 79.2 | 73.8 | 0.48 | 6.57 |

Notes:
In the maximum temperature, measured values are directly described (without extrapolation).

Stability of comparative compound (C-2) to ultraviolet light was measured in a manner similar to Example 1. The results were summarized in Table 3. As is obvious from Table 3, in a tolan having a bonding group such as —CF$_2$O—, a similar result with Comparative Example 1 was obtained. The above results show that the stability of compound (No. 114) to ultraviolet light was increased in comparison with comparative compound (C-2).

Compound (1) was prepared according to "2. Synthesis of compound (1)" and the Synthesis Examples described above. Examples of such a compound is as described below. In addition, for example, in a description such as C$_3$H$_7$—, carbon chain is straight-chain, unless otherwise specifically described.

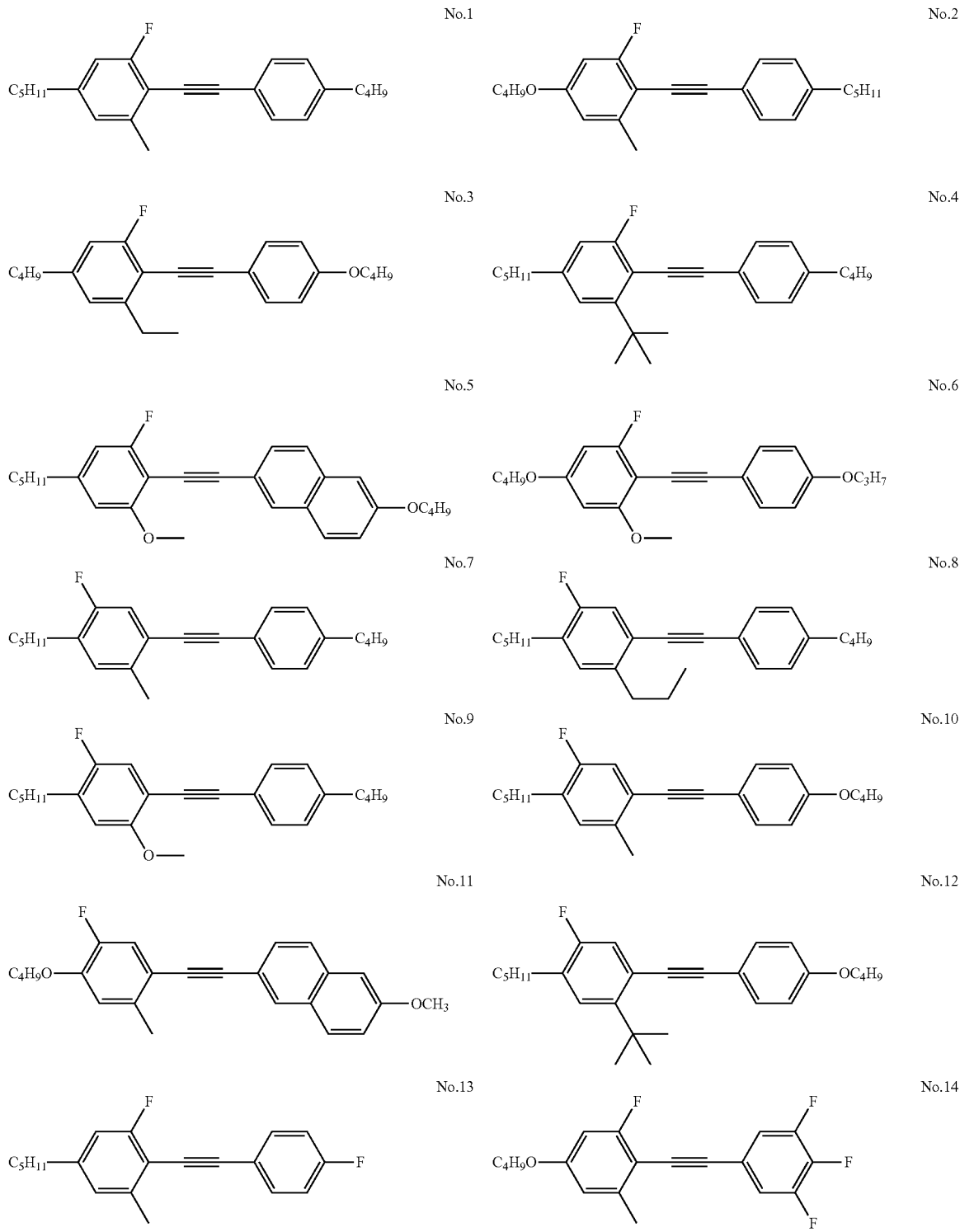

-continued

-continued
No.31
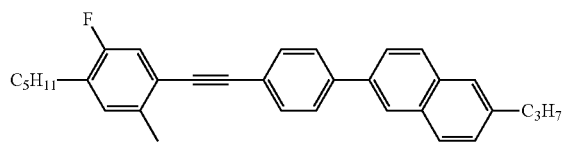
No.32
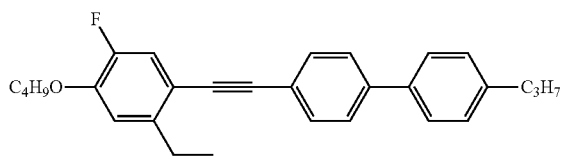
No.33
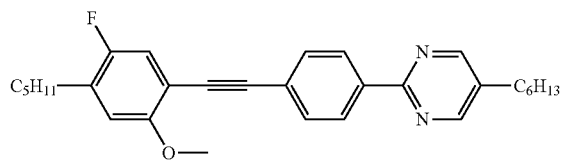
No.34
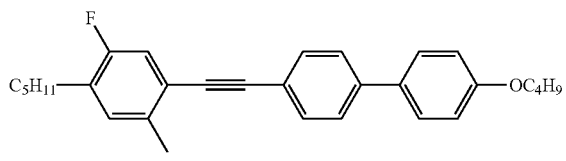
No.35
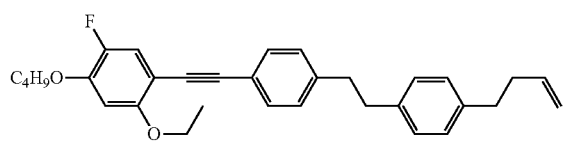
No.36
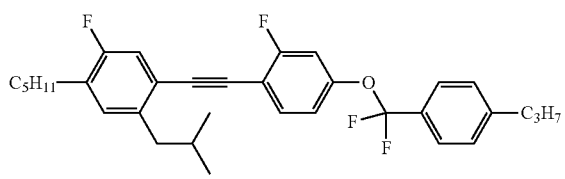
No.37
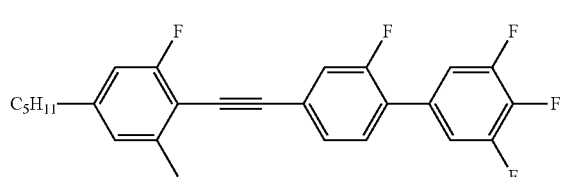
No.38
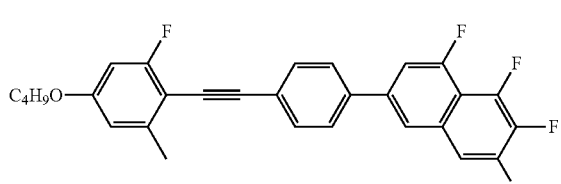
No.39
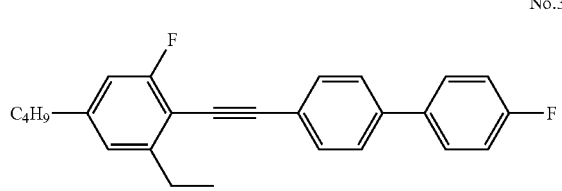
No.40
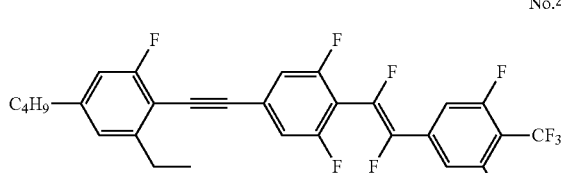
No.41
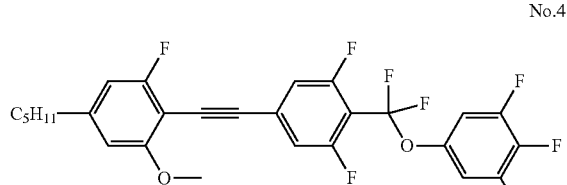
No.42
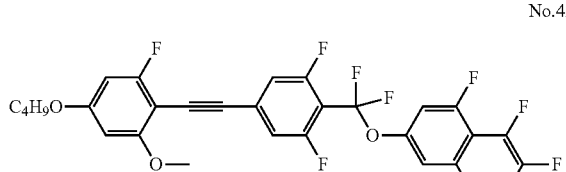
No.43
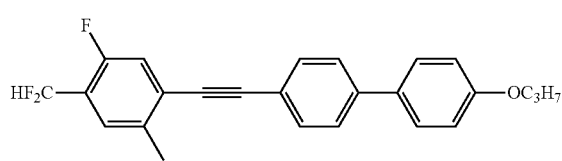
No.44
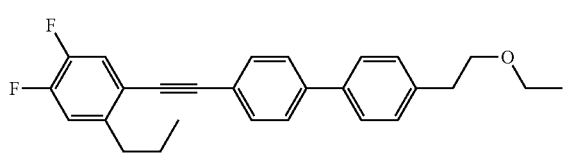
No.45
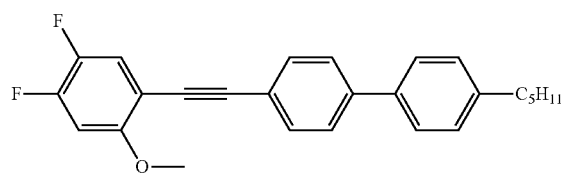
No.46
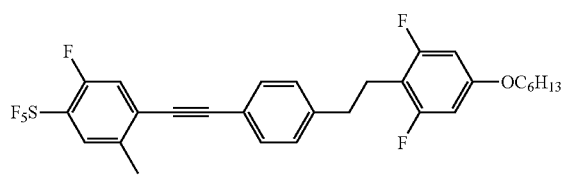

-continued
No.47
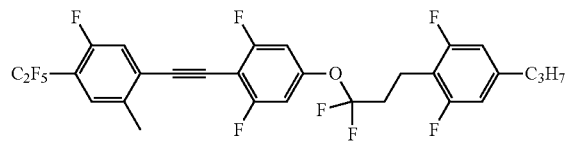
No.48
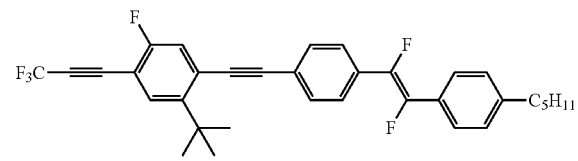
No.49
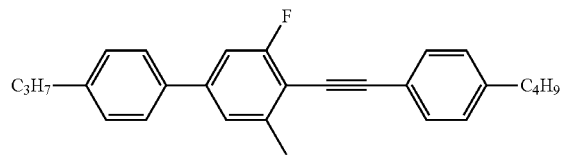
No.50
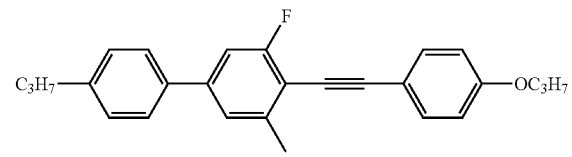
No.51
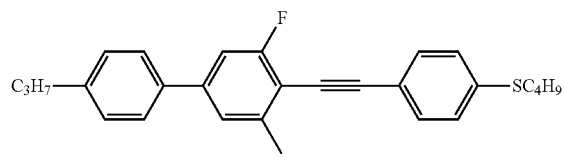
No.52
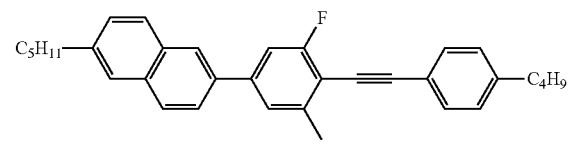
No.53
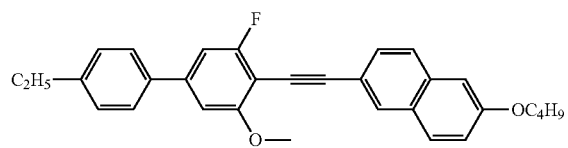
No.54
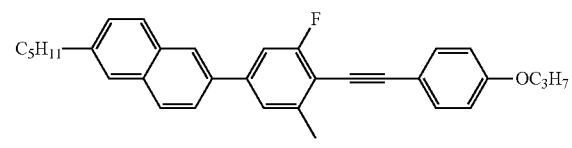
No.55
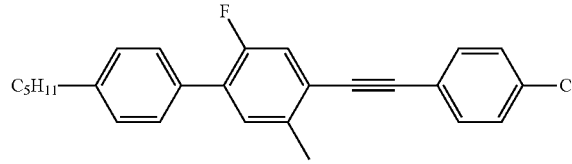
No.56
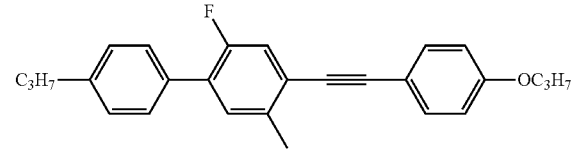
No.57
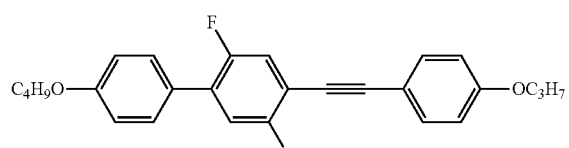
No.58
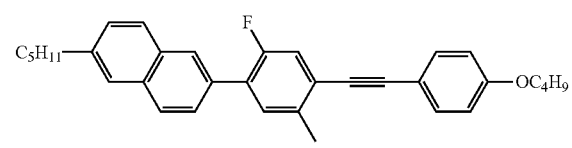
No.59
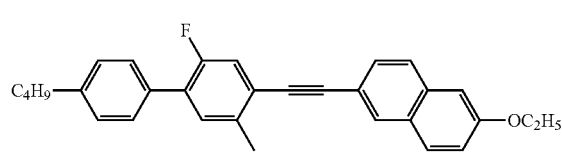
No.60
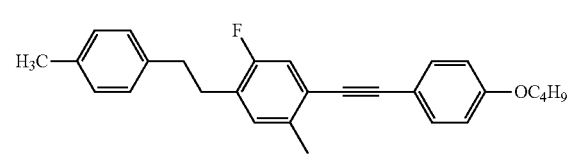
No.61
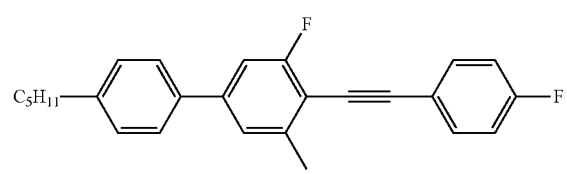
No.62
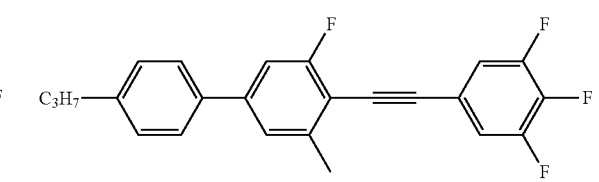

-continued
No.63
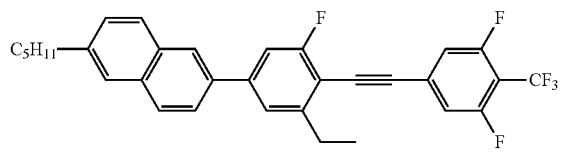
No.64
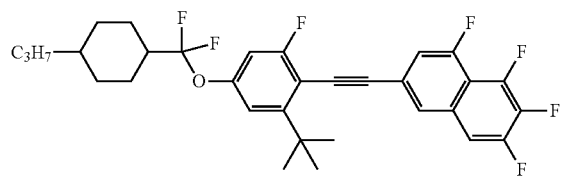
No.65
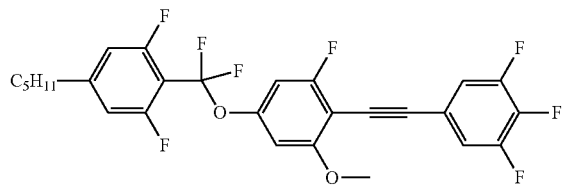
No.66
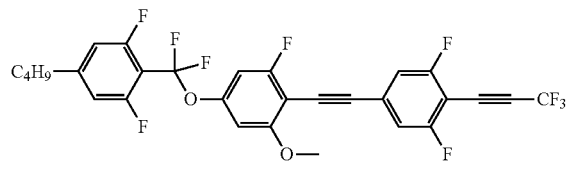
No.67
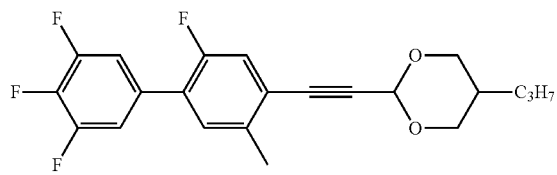
No.68
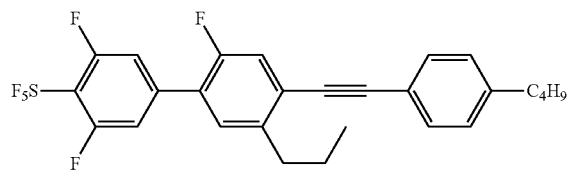
No.69
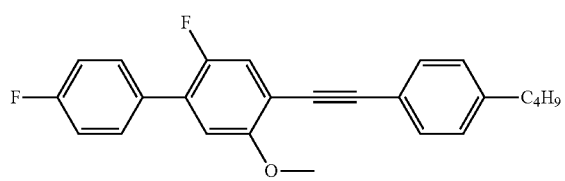
No.70
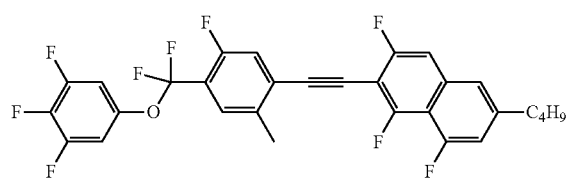
No.71
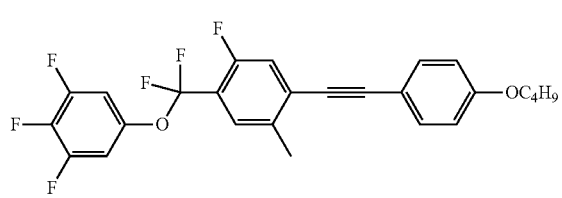
No.72
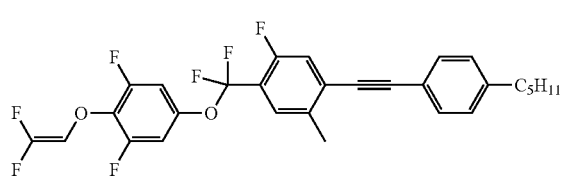
No.73
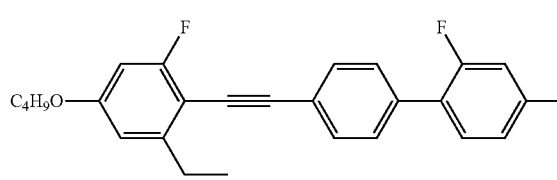
No.74
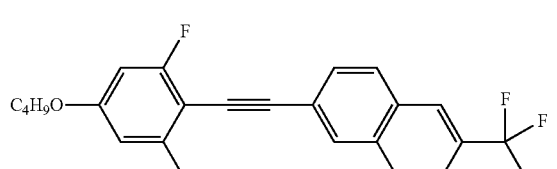
No.75
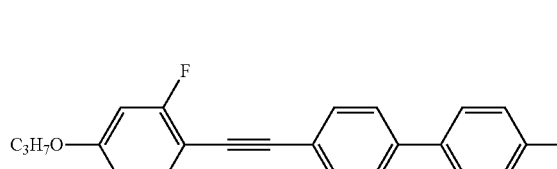

-continued
No.76
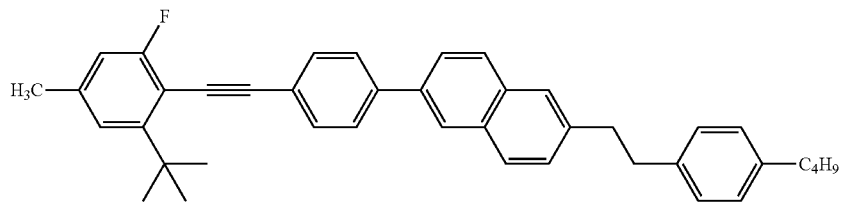
No.77
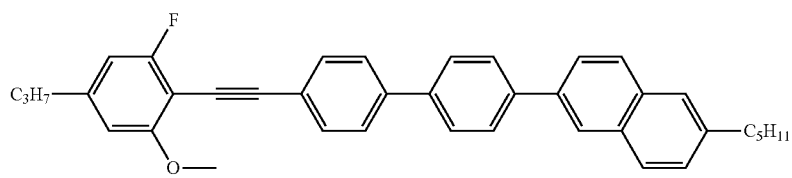
No.78
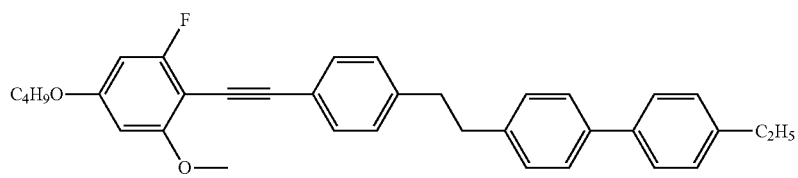
No.79
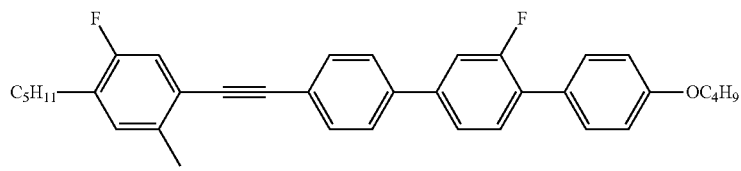
No.80
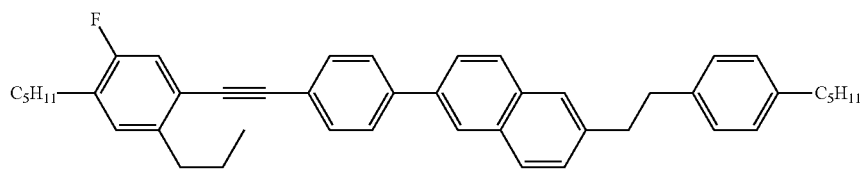
No.81
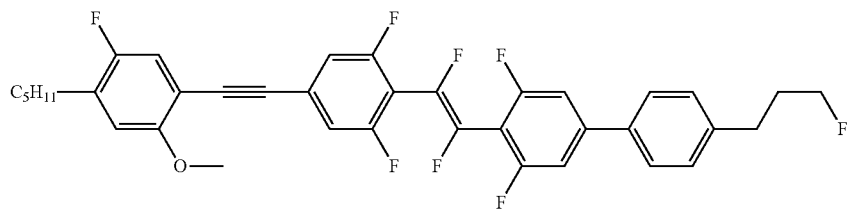
No.82
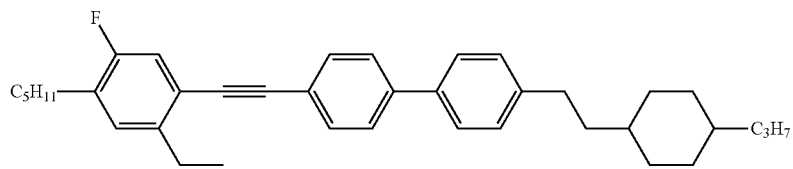
No.83
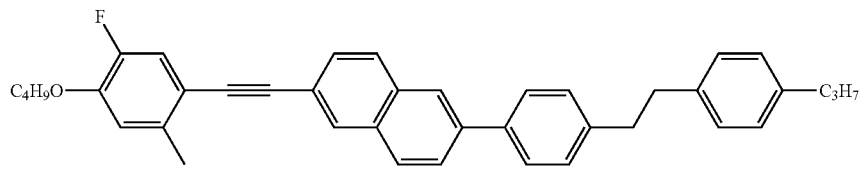

-continued
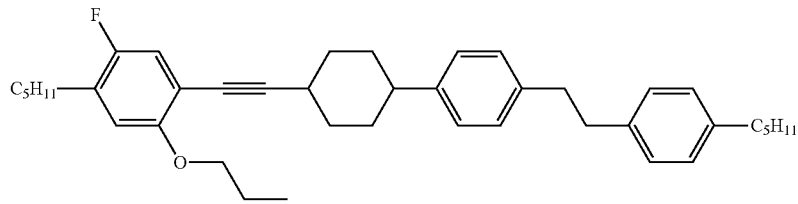
No.84
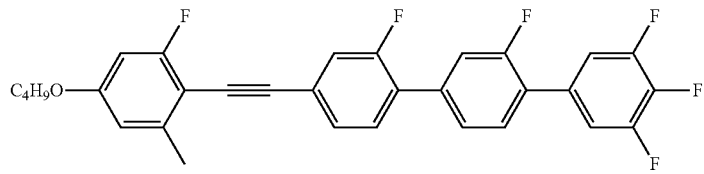
No.85
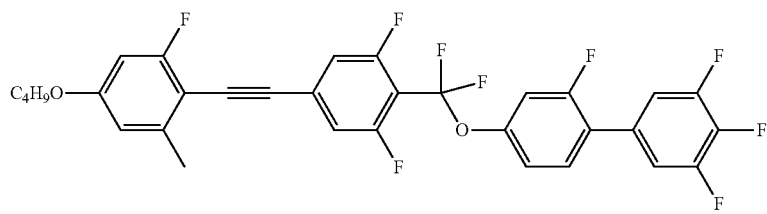
No.86
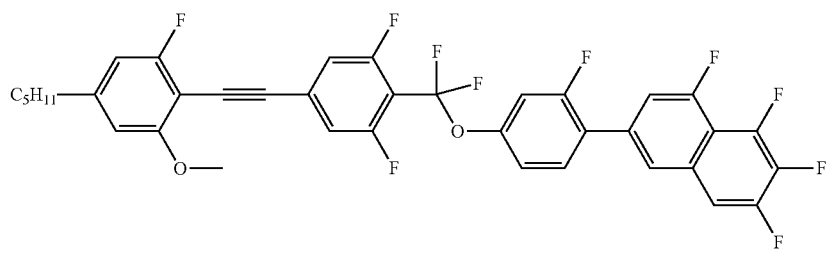
No.87
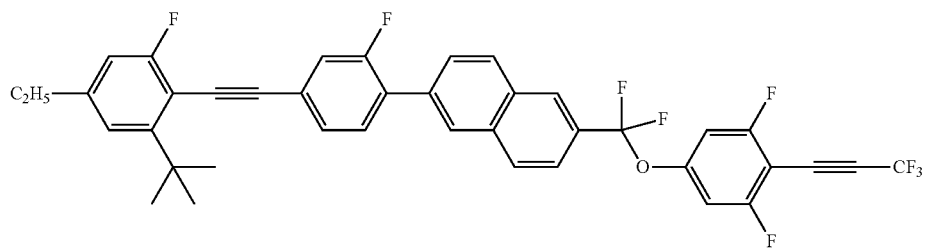
No.88
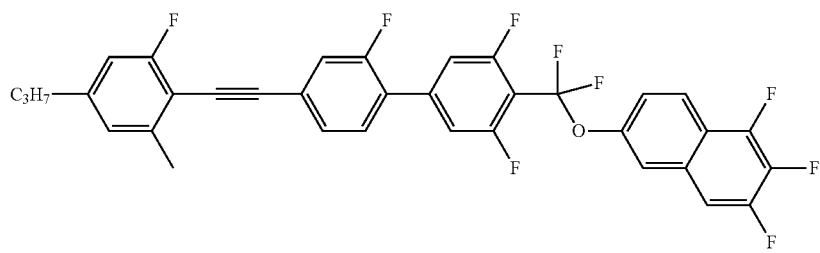
No.89
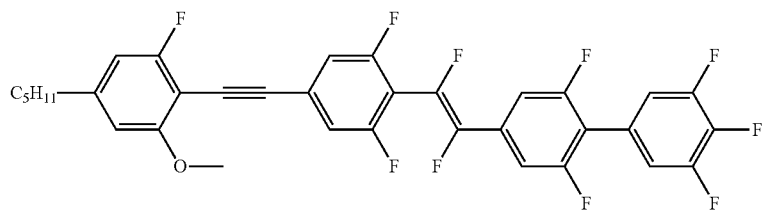
No.90

-continued
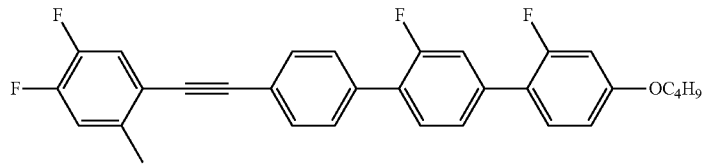
No.91
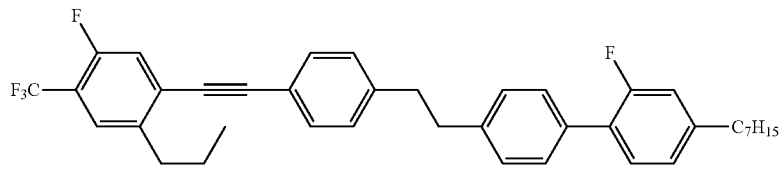
No.92
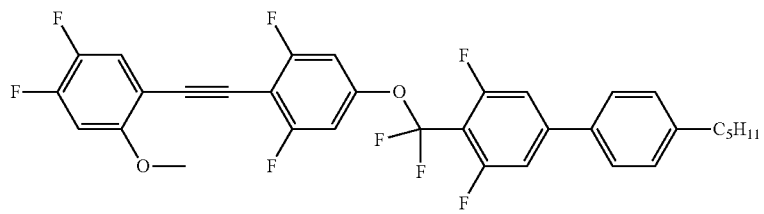
No.93
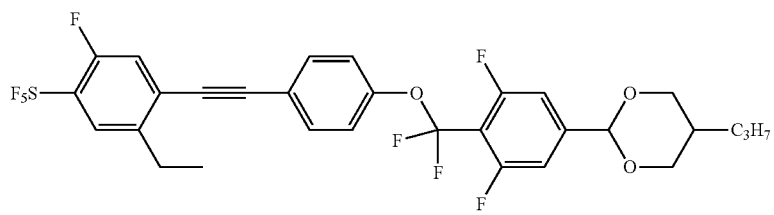
No.94
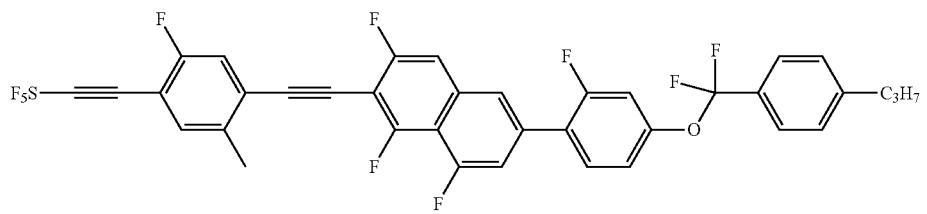
No.95
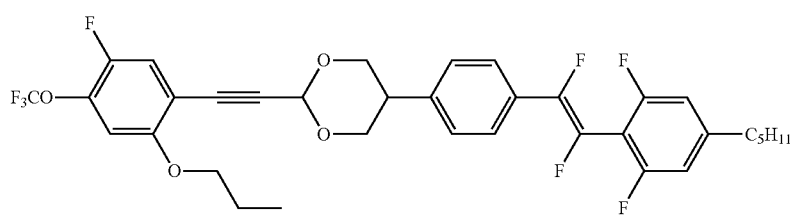
No.96
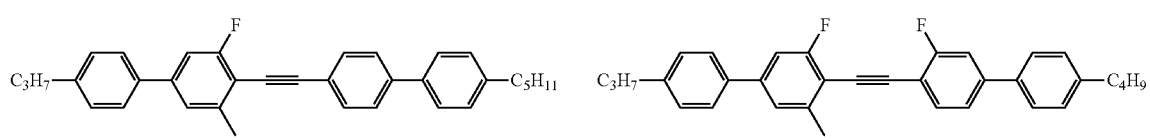
No.97        No.98
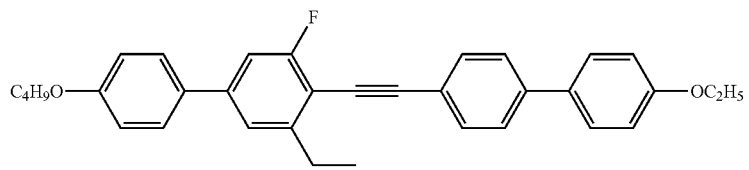
No.99

-continued
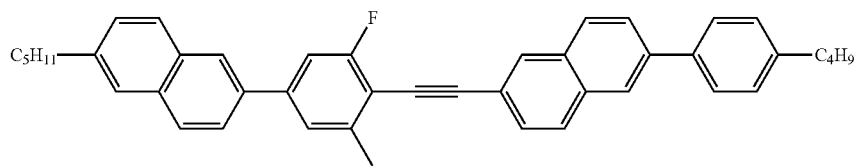 No.100
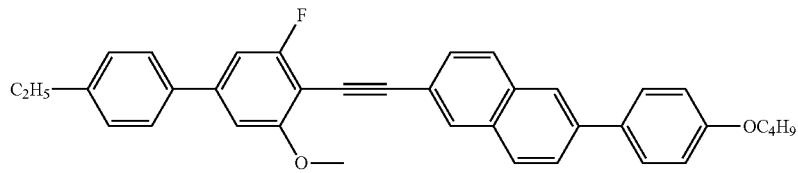 No.101
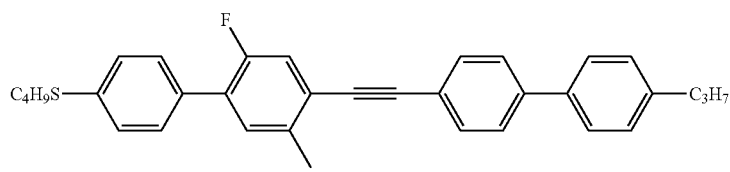 No.102
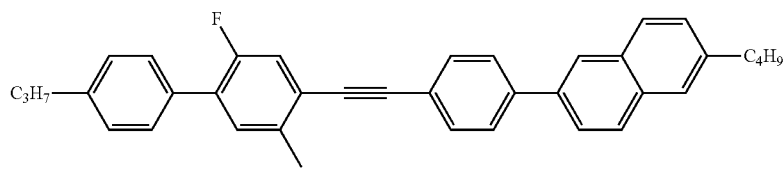 No.103
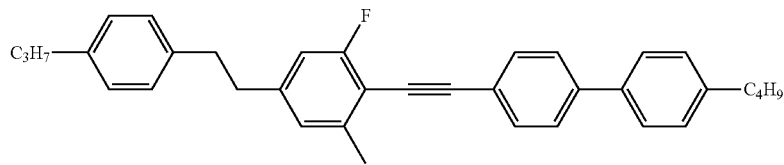 No.104
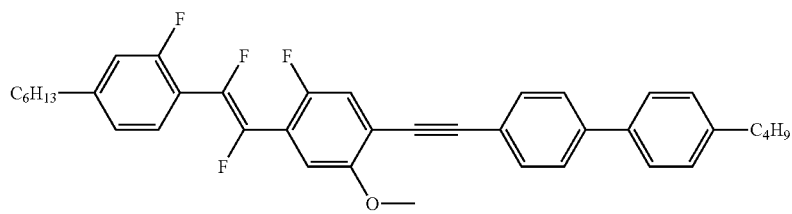 No.105
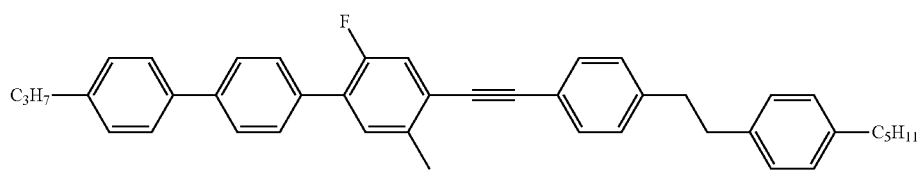 No.106
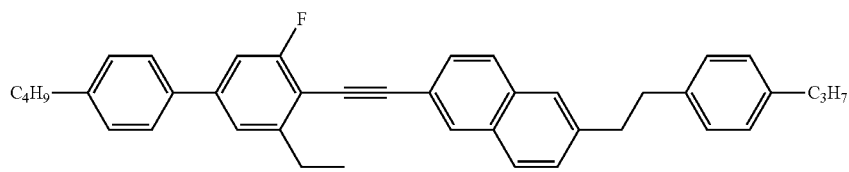 No.107
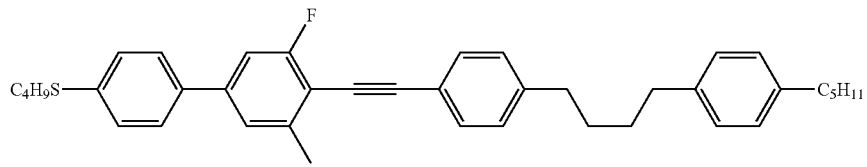 No.108

-continued
No.109
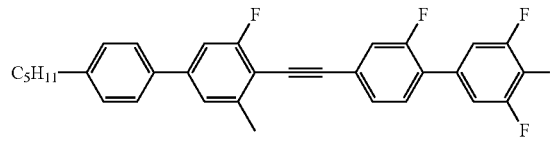
No.110
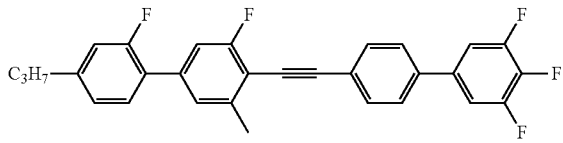
No.111
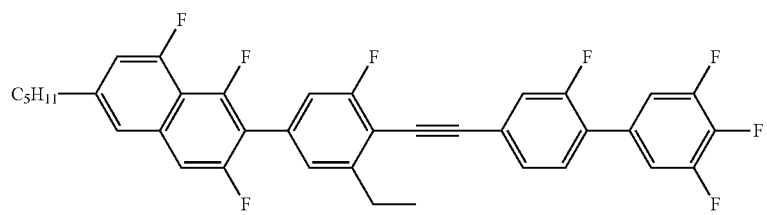
No.112
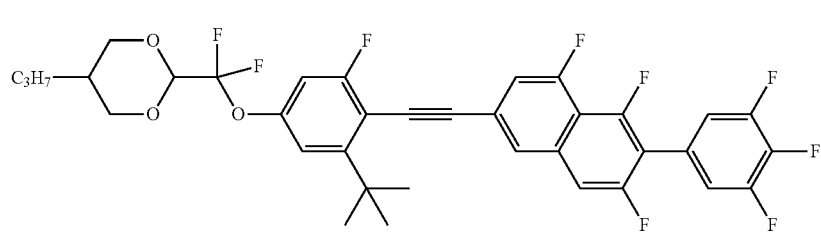
No.113
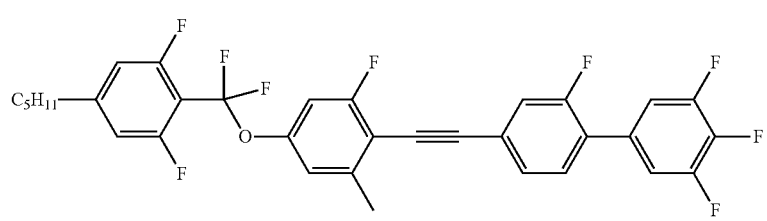
No.114
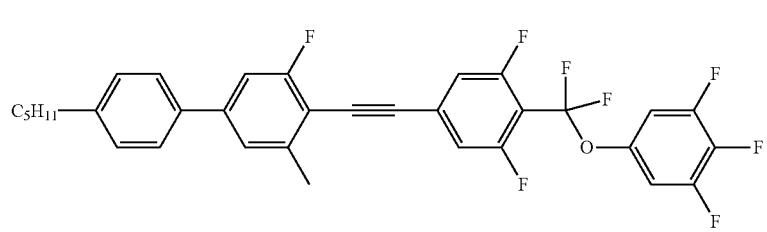
No.115
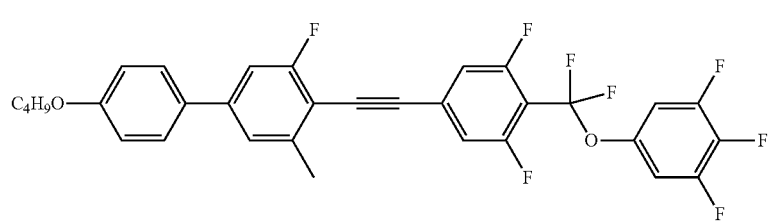
No.116
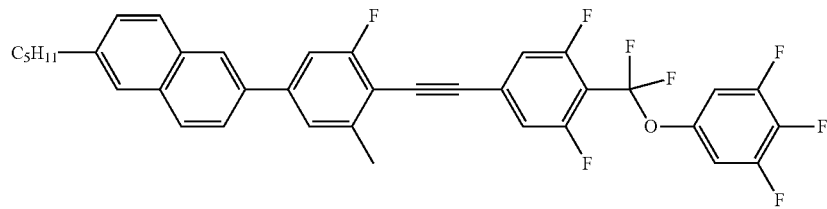

-continued
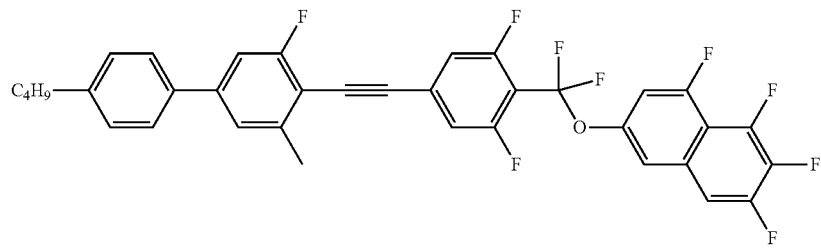
No.117
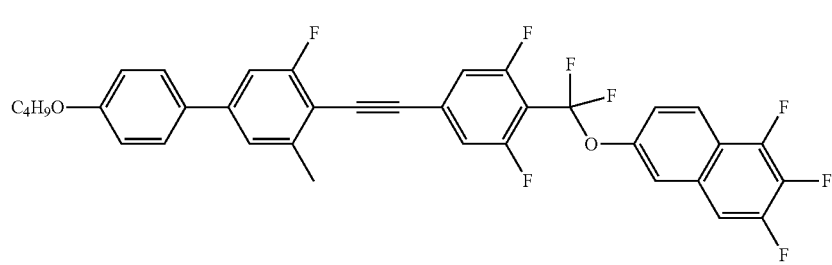
No.118
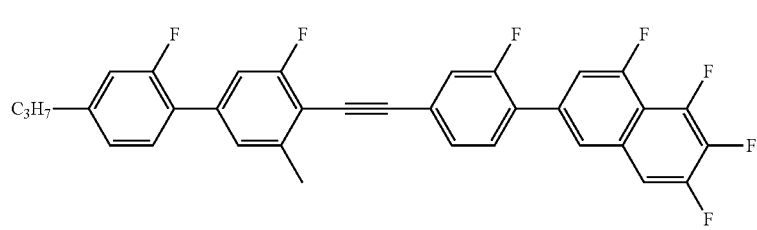
No.119
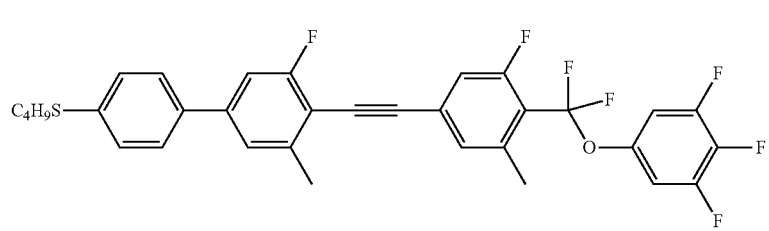
No.120
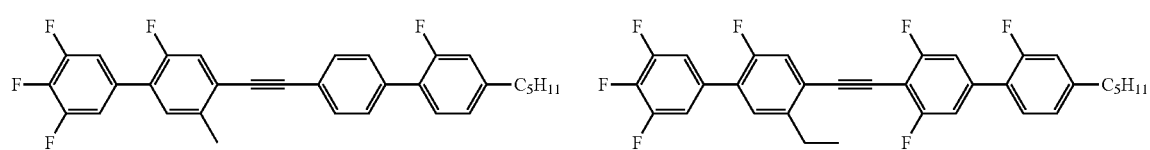
No.121   No.122
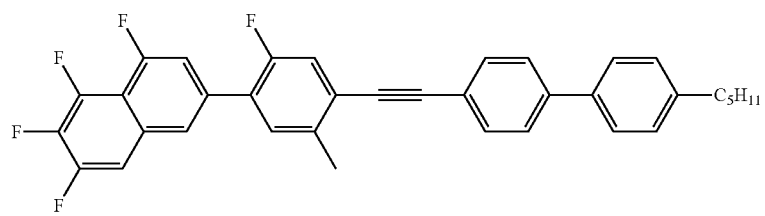
No.123
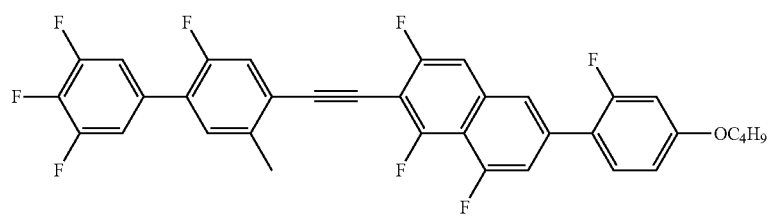
No.124

-continued
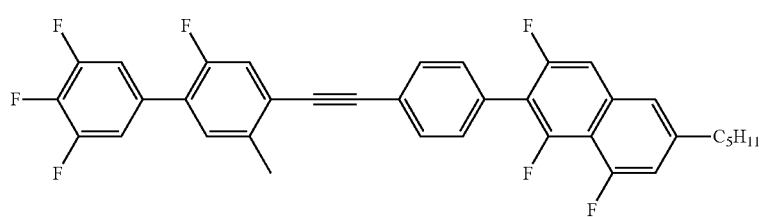
No.125
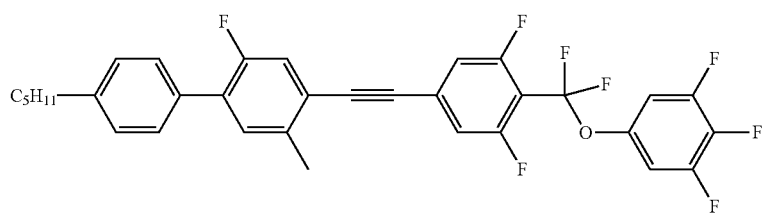
No.126
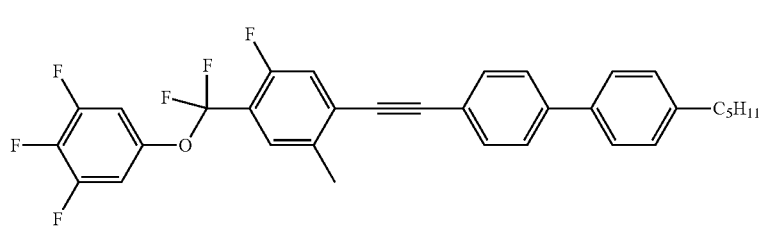
No.127
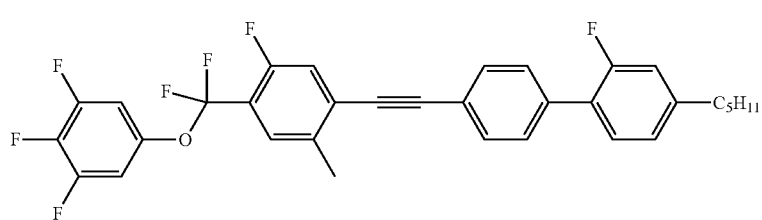
No.128
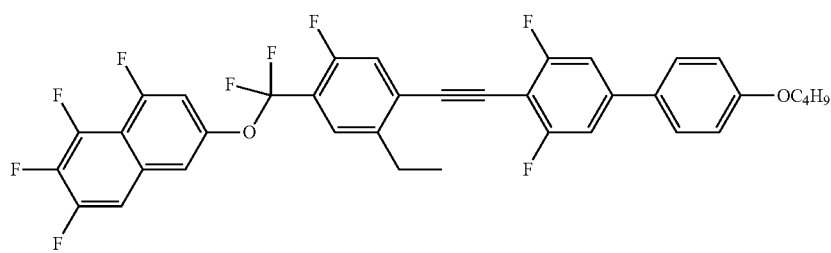
No.129
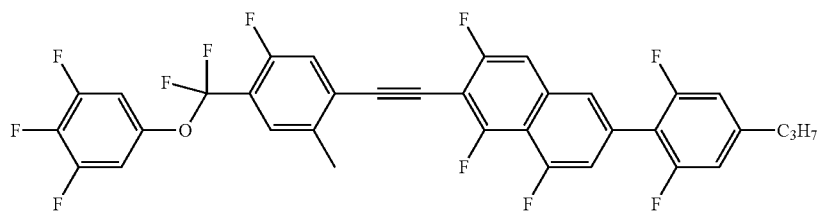
No.130
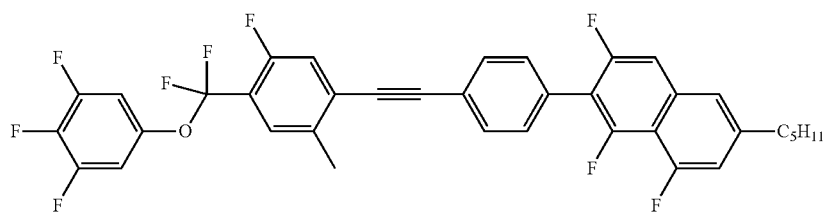
No.131

-continued
No.132
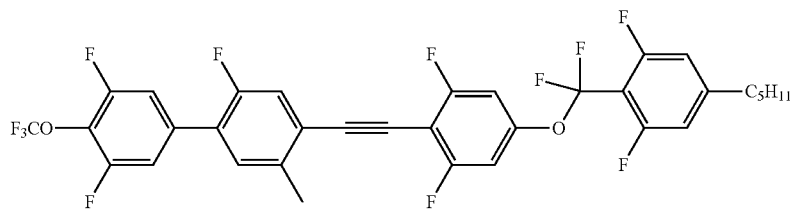
No.133
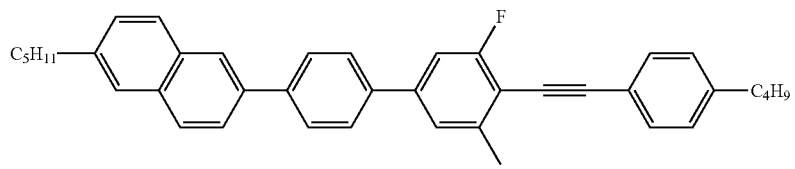
No.134 No.135
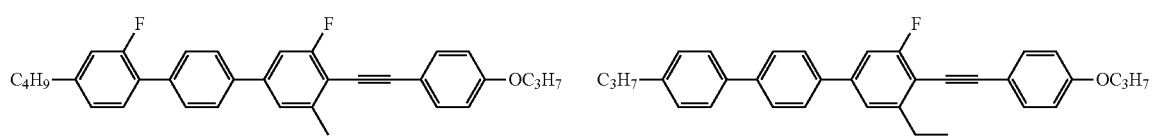
No.136
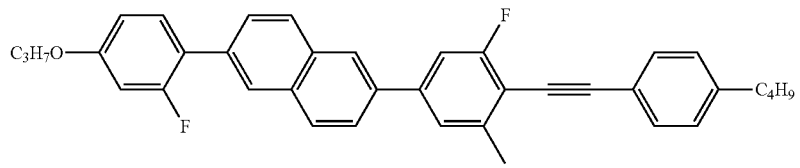
No.137
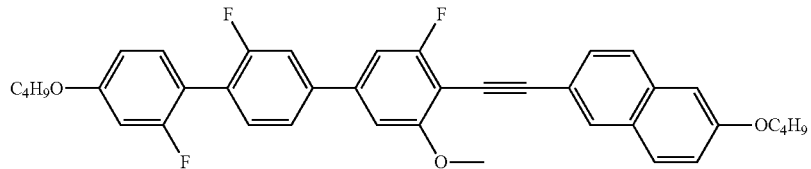
No.138
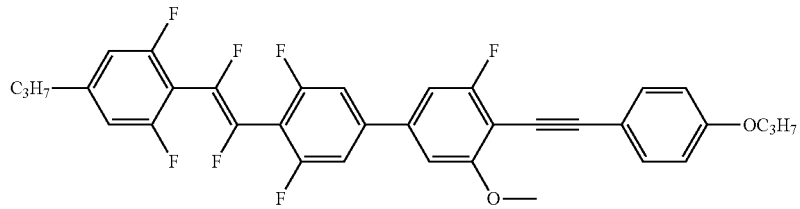
No.139
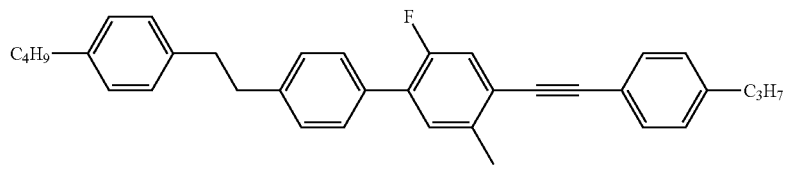
No.140
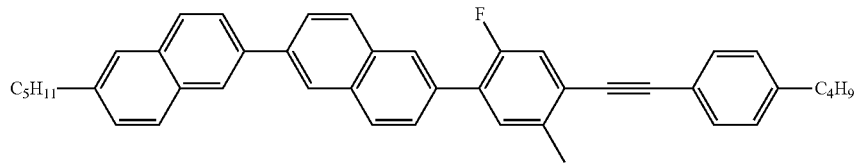

-continued
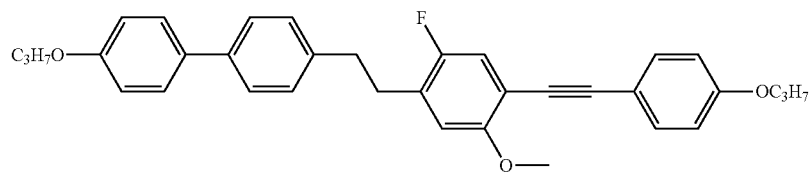
No.141
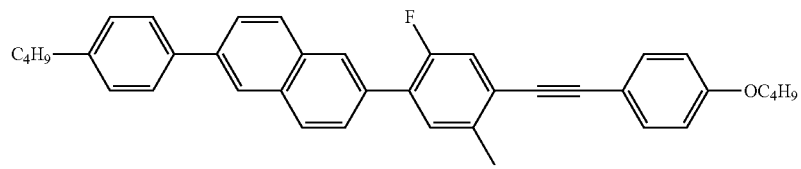
No.142
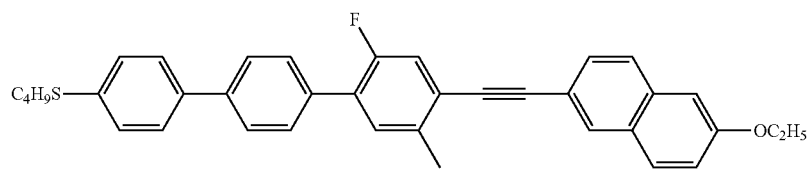
No.143
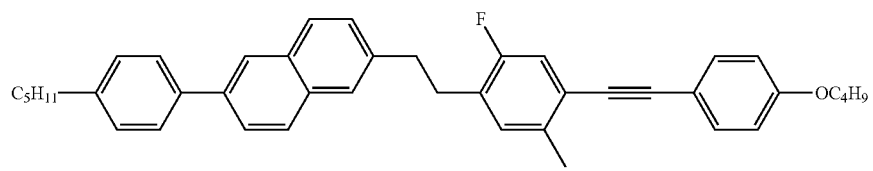
No.144
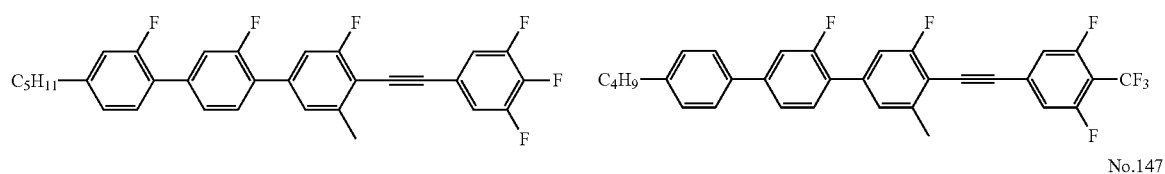
No.145  No.146
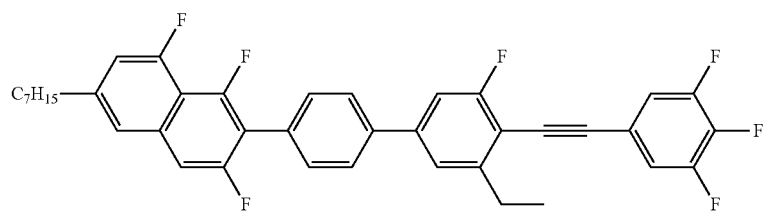
No.147
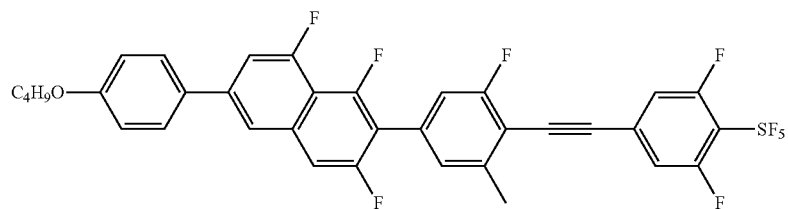
No.148
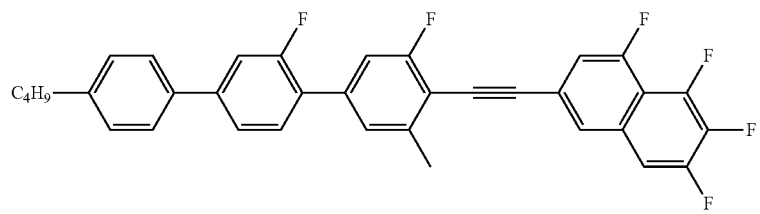
No.149

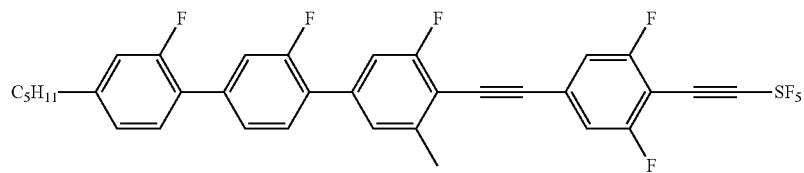
No.150
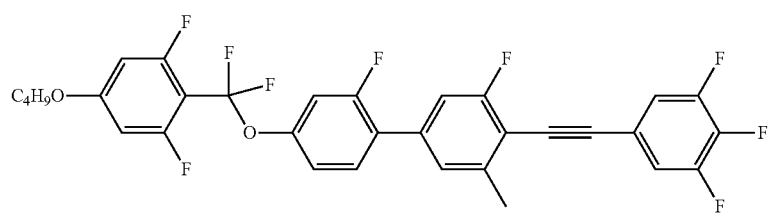
No.151
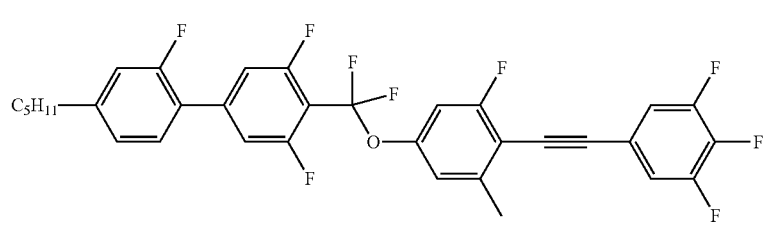
No.152
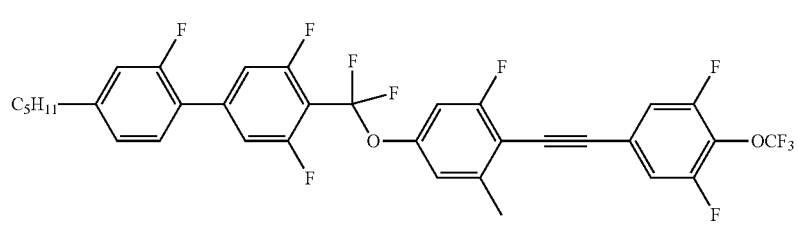
No.153
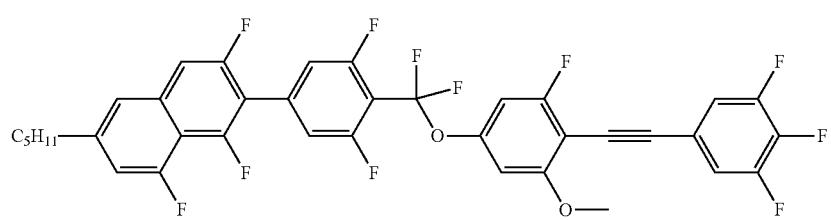
No.154
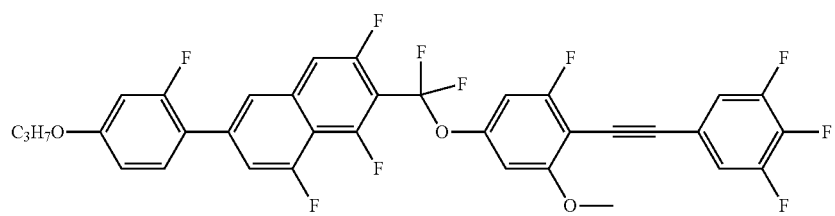
No.155
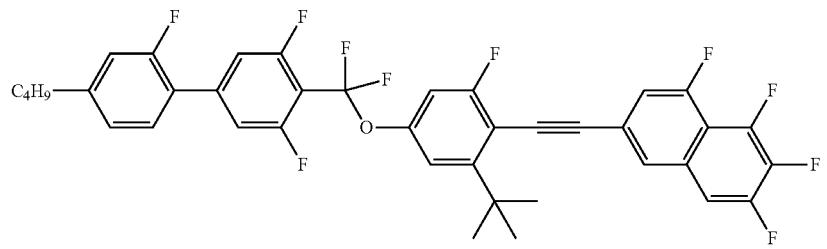
No.156

-continued
No.157
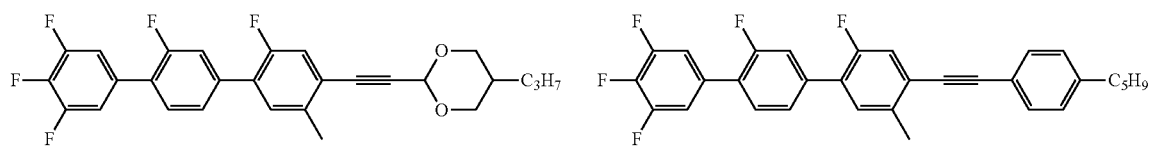
No.158
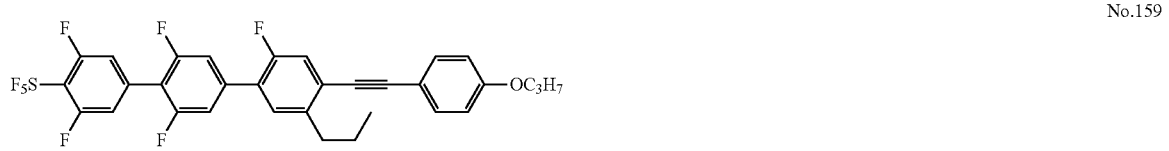
No.159
No.160
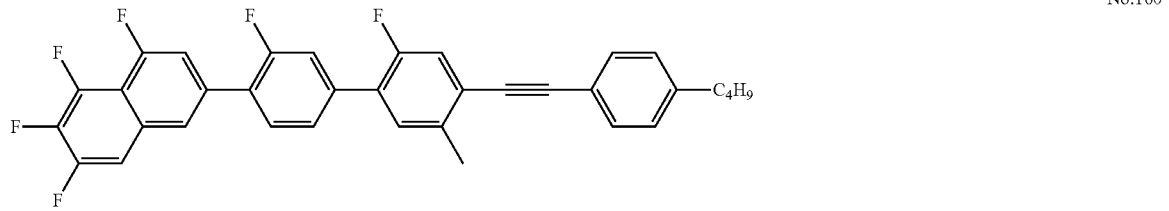
No.161
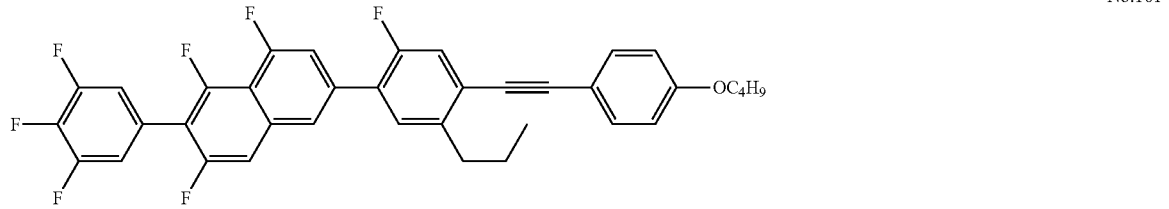
No.162
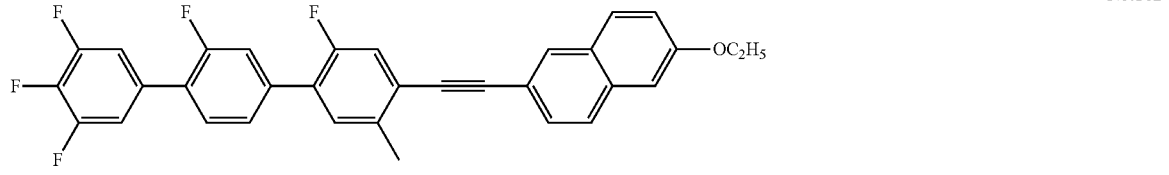
No.163
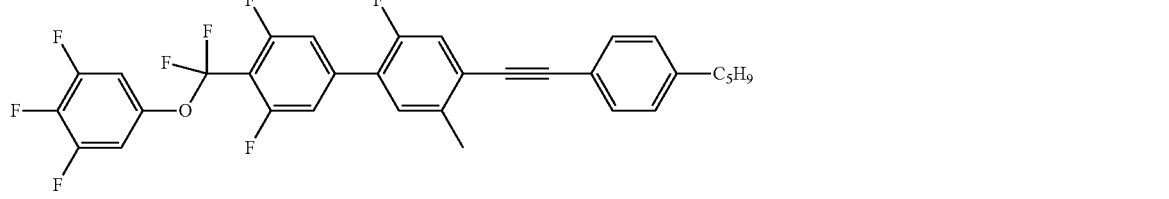
No.164
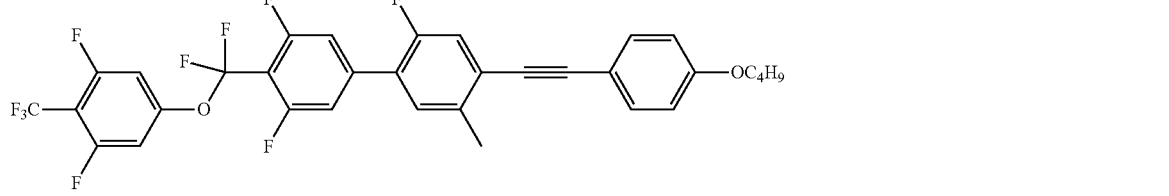
No.165
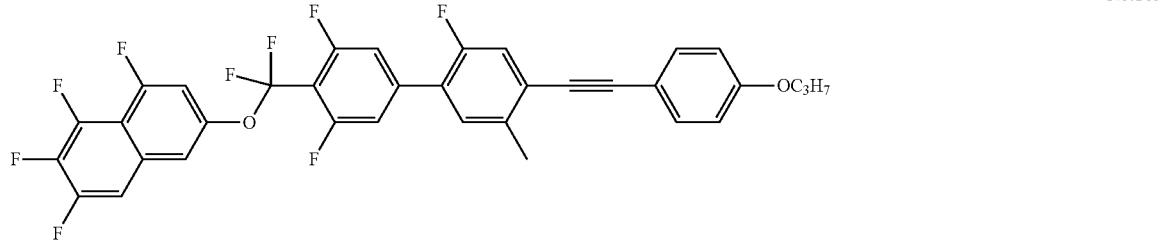

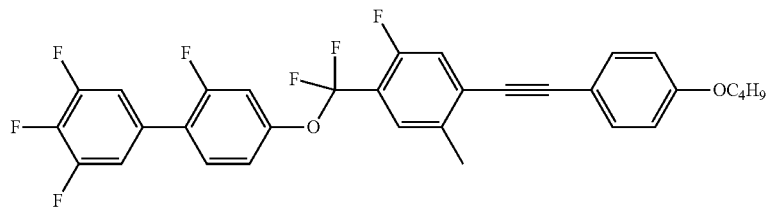 No.166
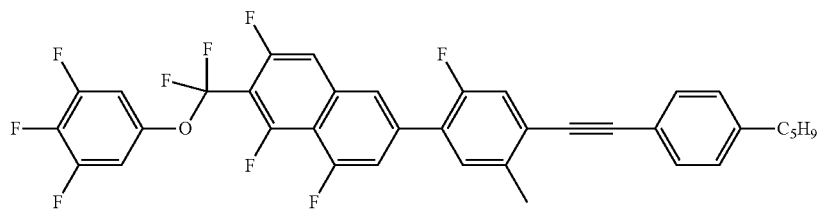 No.167
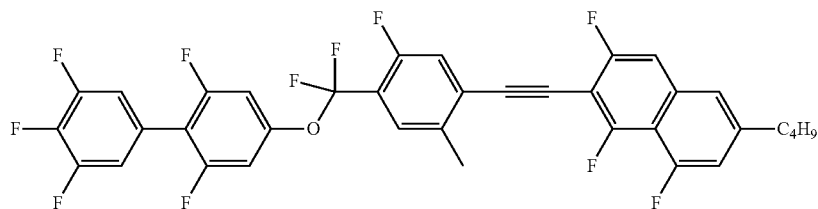 No.168
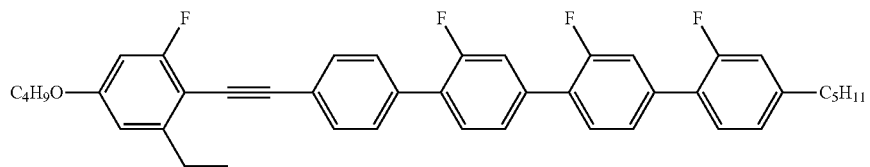 No.169
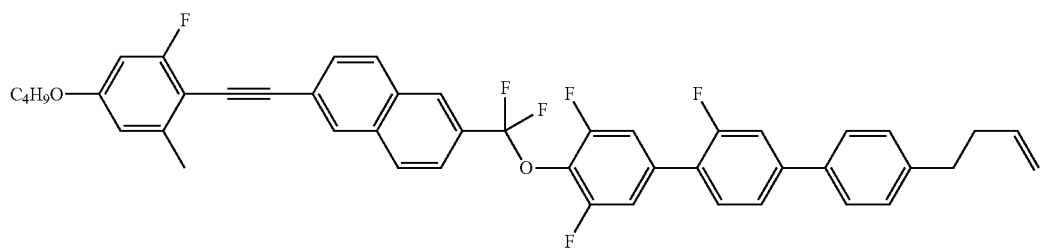 No.170
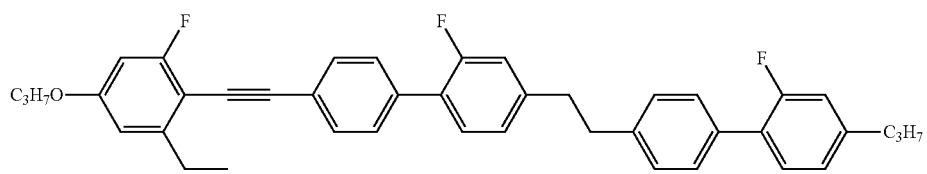 No.171
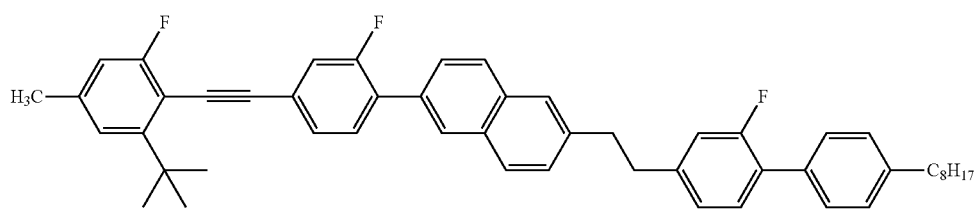 No.172

-continued
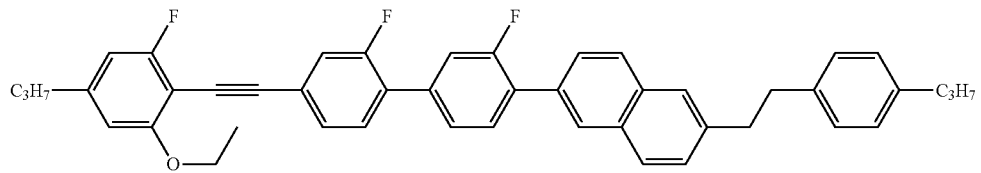
No.173
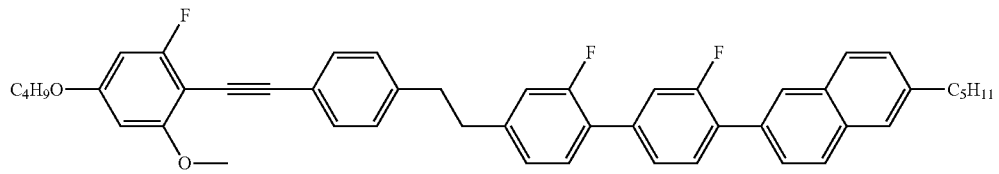
No.174
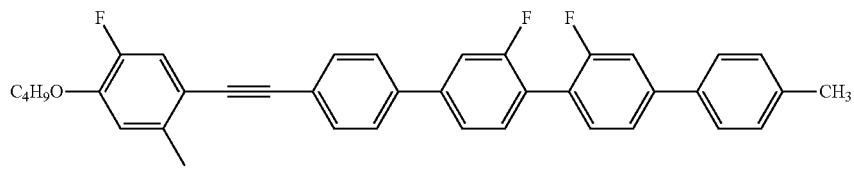
No.175
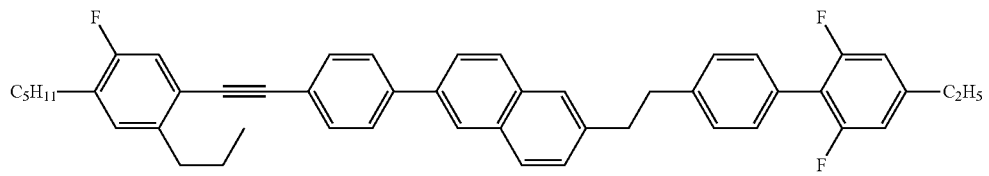
No.176
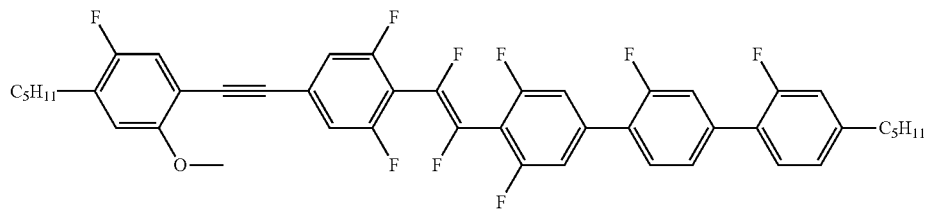
No.177
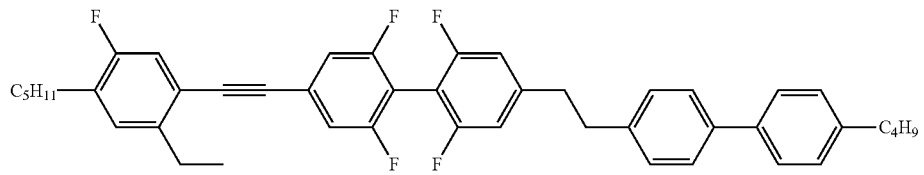
No.178
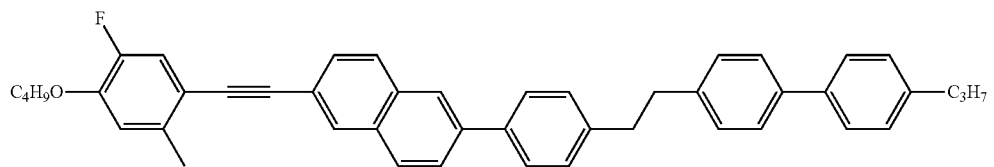
No.179
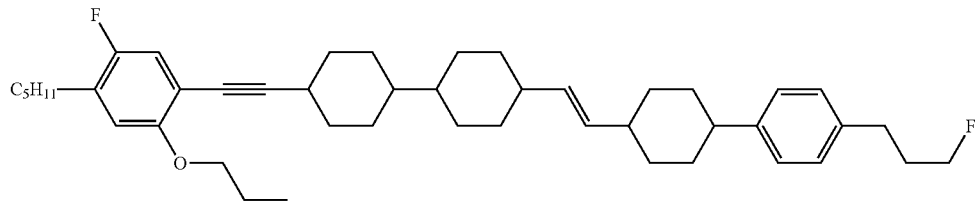
No.180

-continued
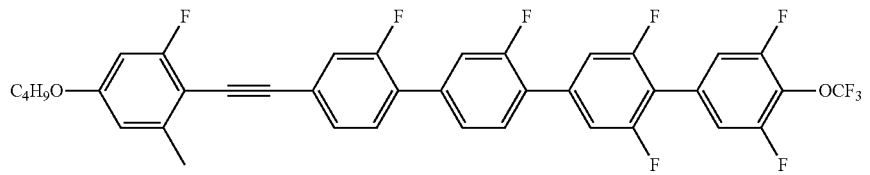
No.181
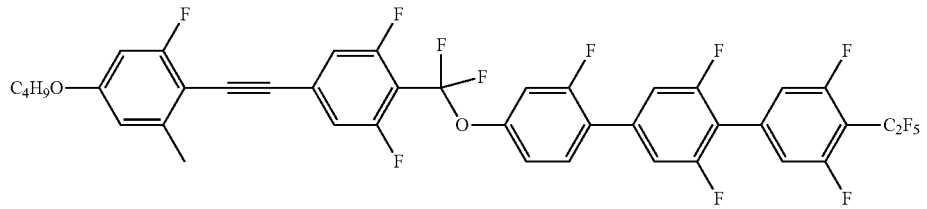
No.182
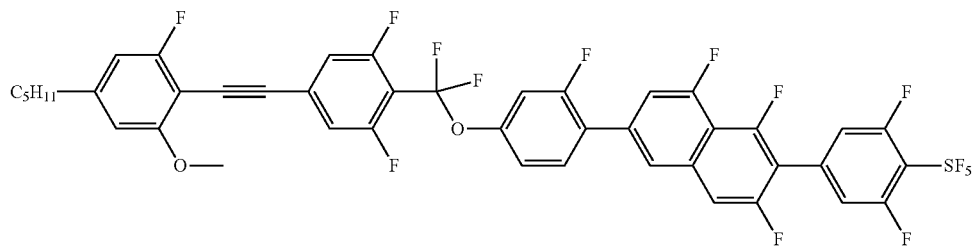
No.183
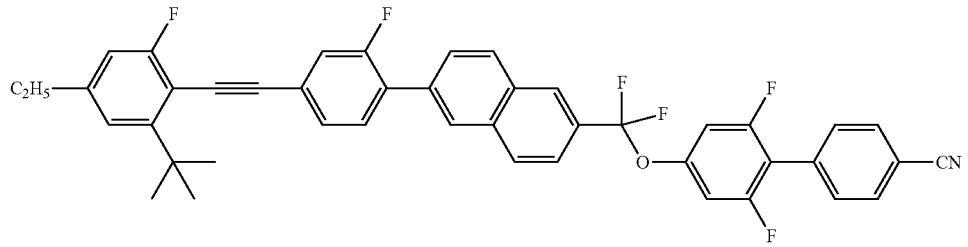
No.184
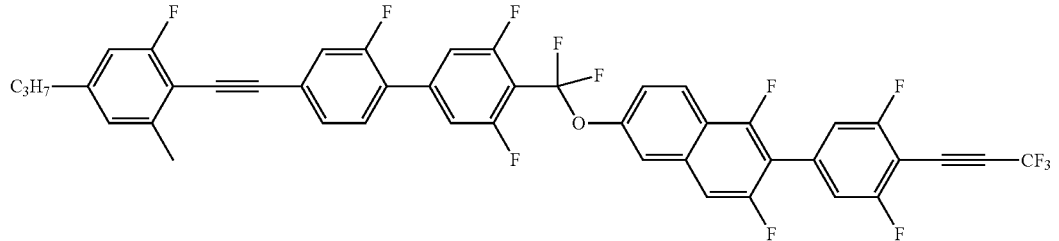
No.185
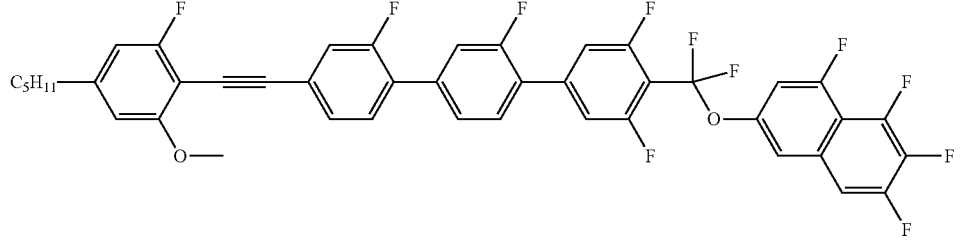
No.186
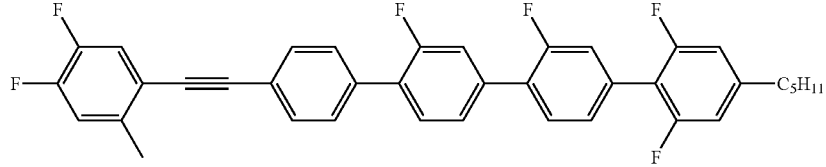
No.187

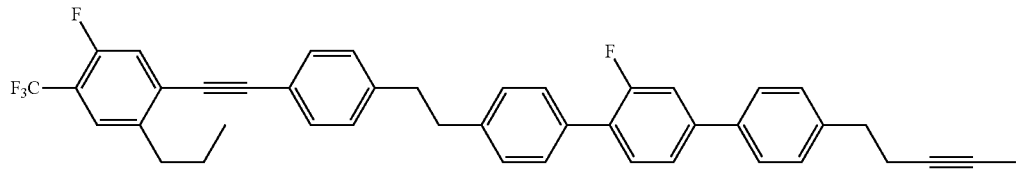
No.188
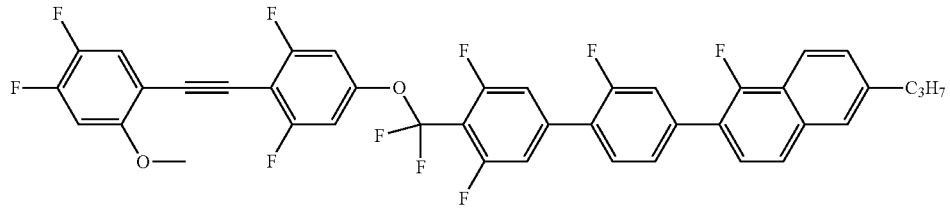
No.189
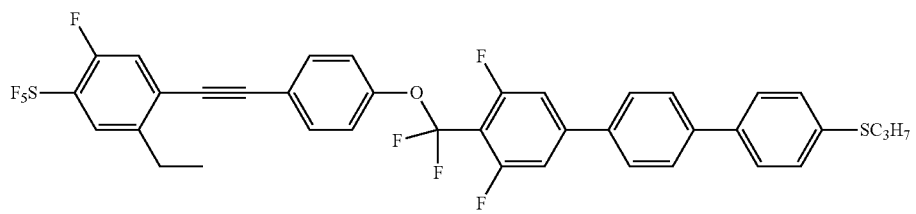
No.190
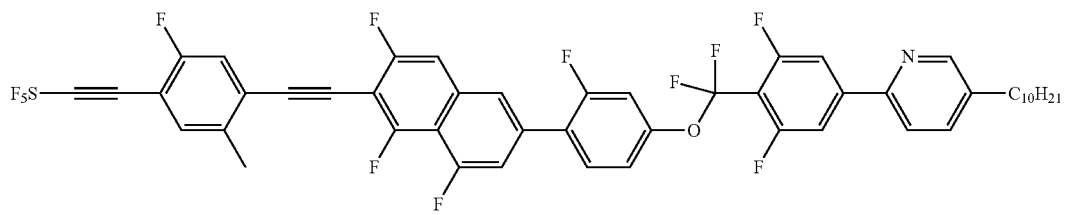
No.191
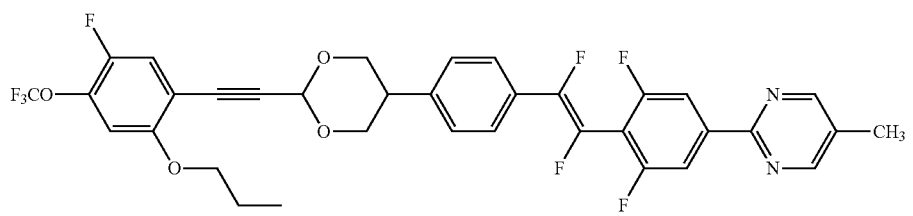
No.192
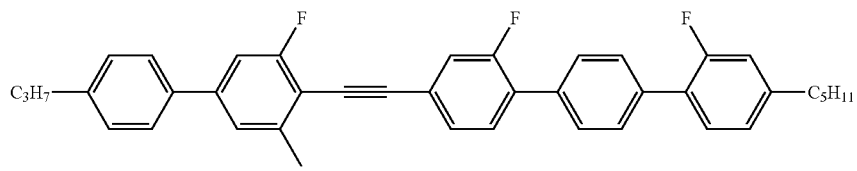
No.193
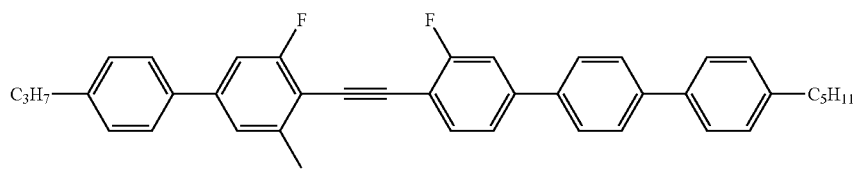
No.194
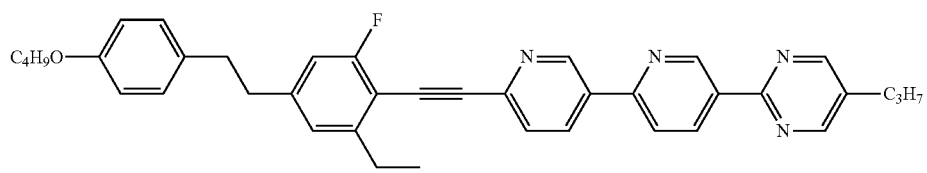
No.195

-continued
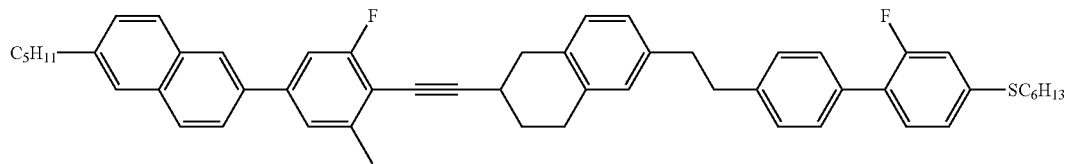
No.196
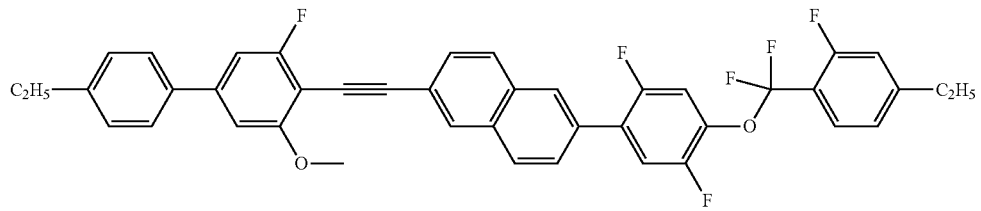
No.197
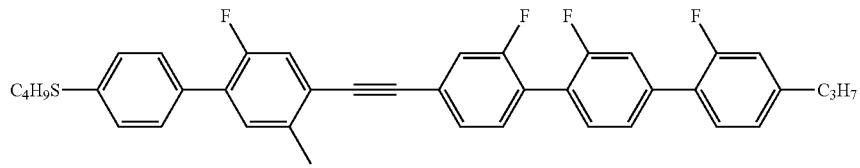
No.198
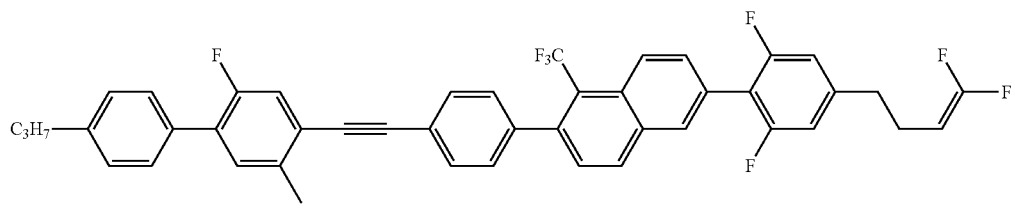
No.199
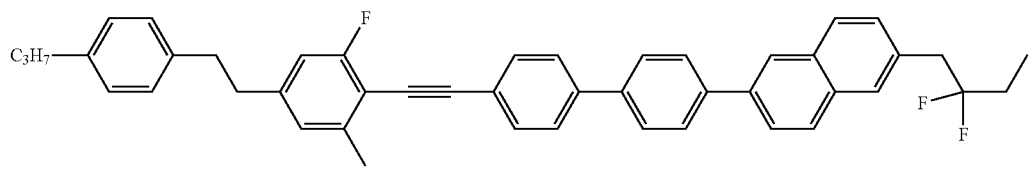
No.200
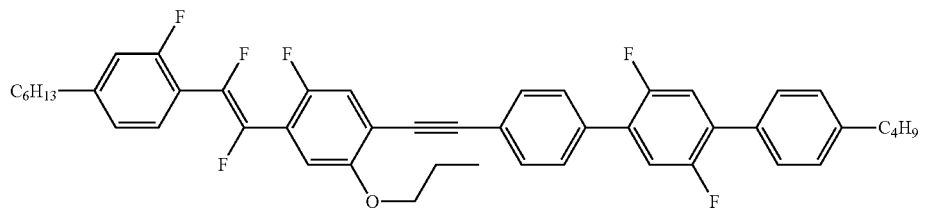
No.201
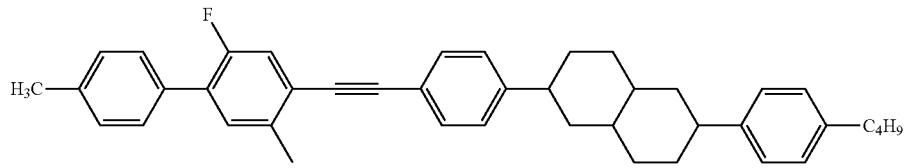
No.202
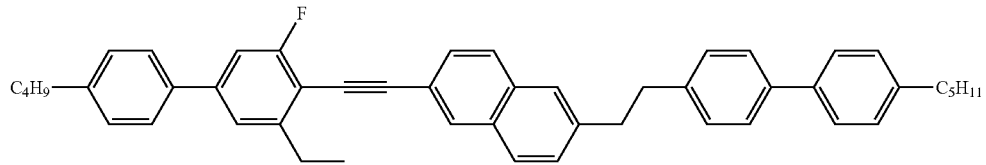
No.203

-continued
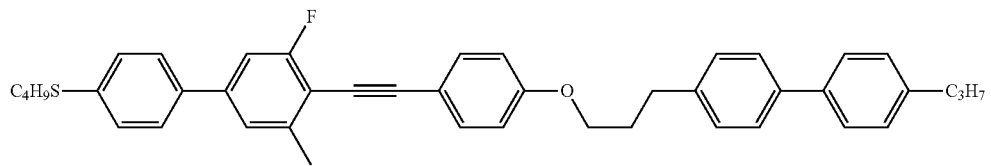
No.204
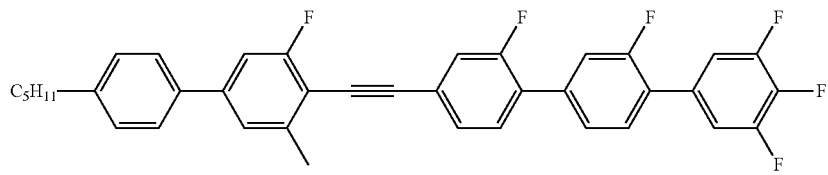
No.205
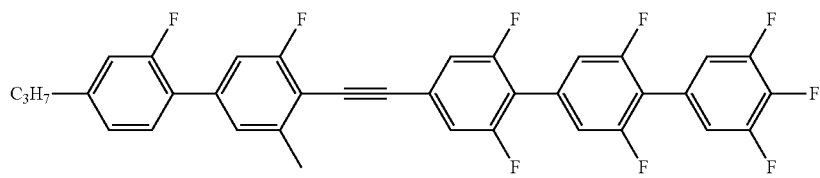
No.206
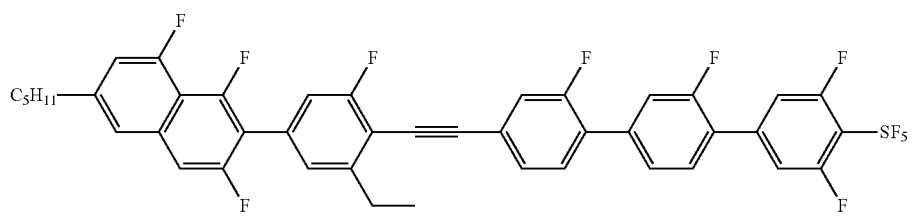
No.207
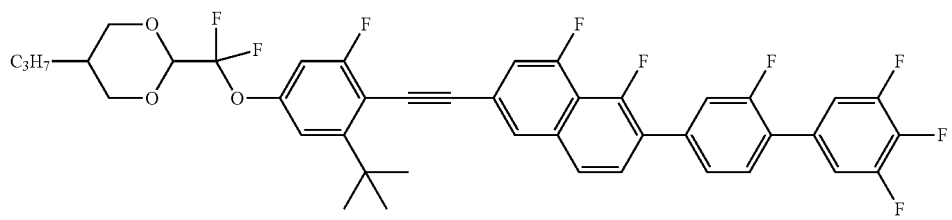
No.208
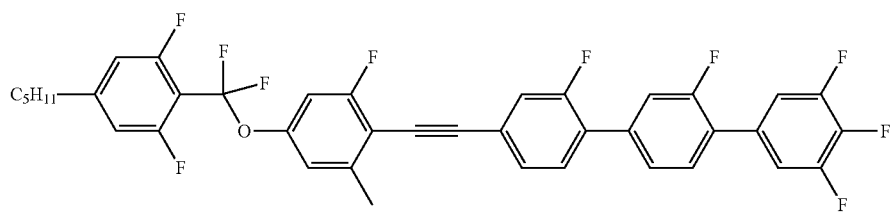
No.209
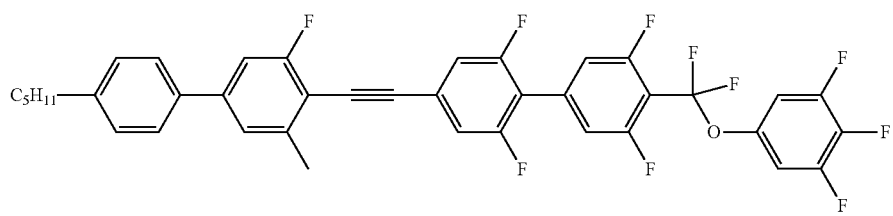
No.210
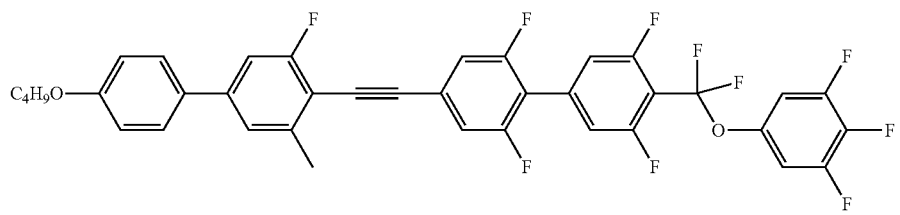
No.211

-continued
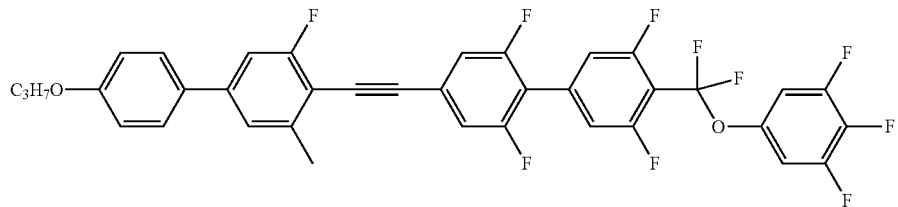
No.212
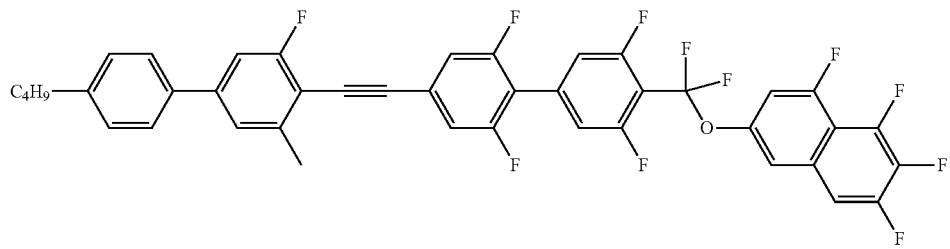
No.213
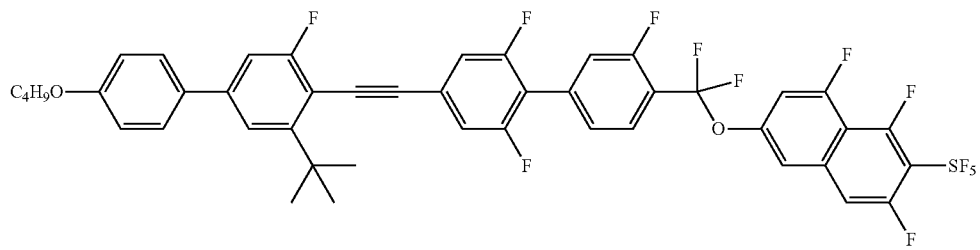
No.214
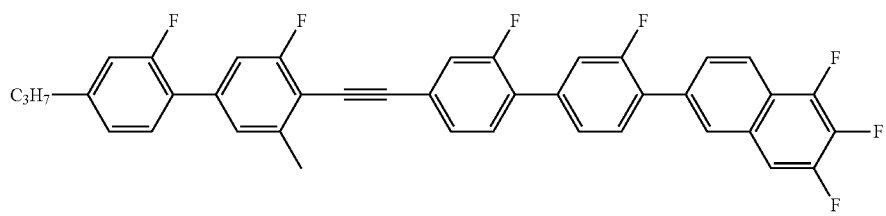
No.215
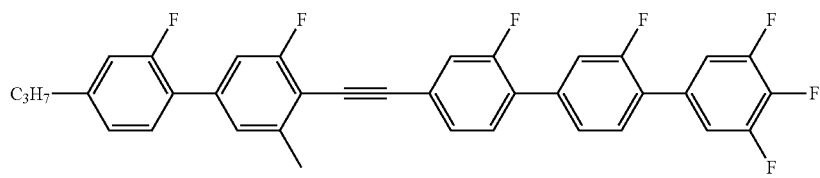
No.216
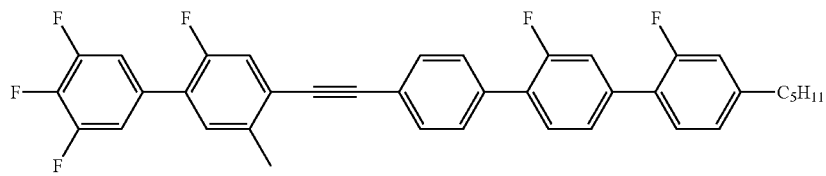
No.217
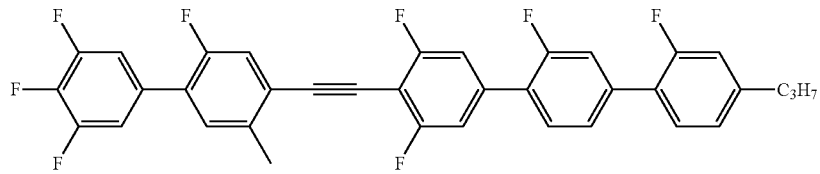
No.218

-continued
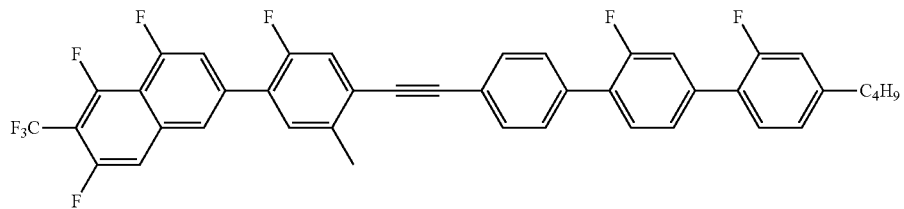
No.219
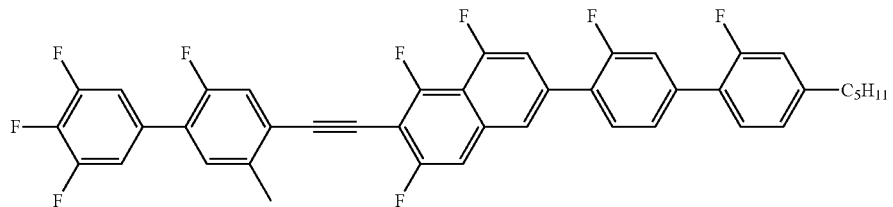
No.220
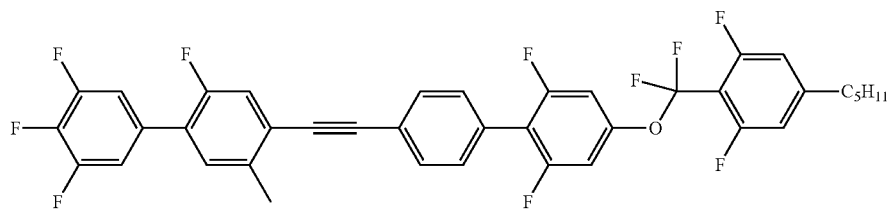
No.221
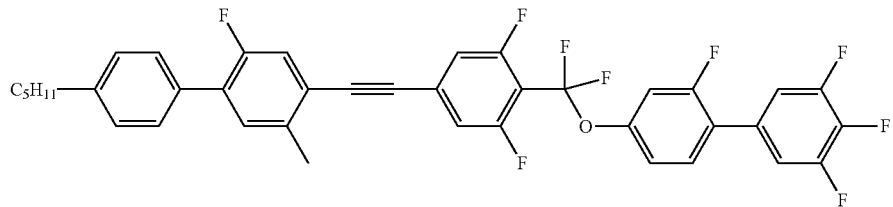
No.222
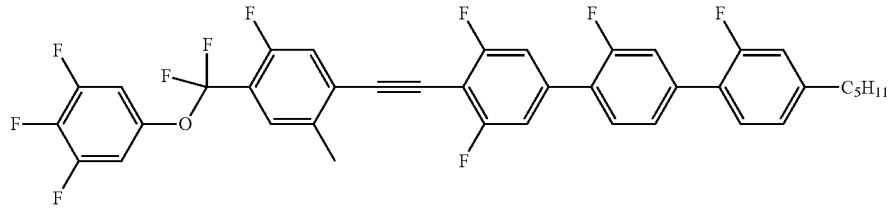
No.223
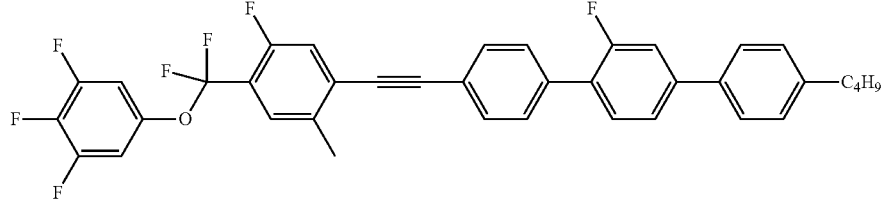
No.224
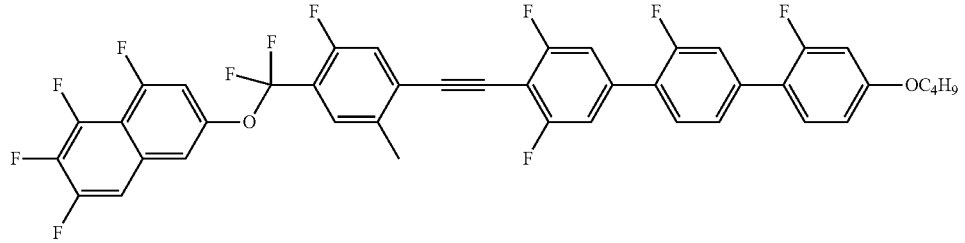
No.225

-continued
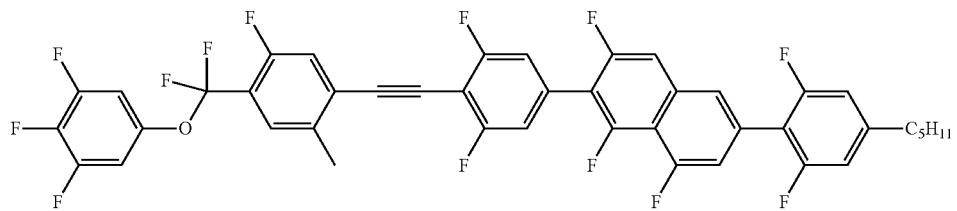
No.226
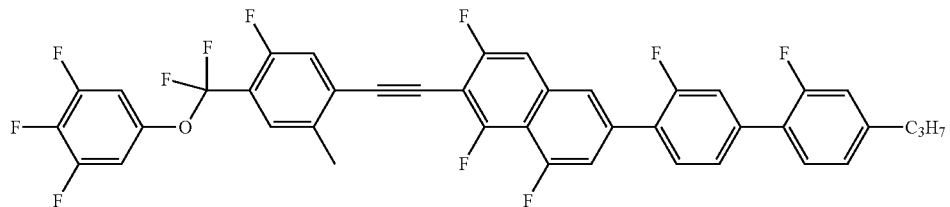
No.227
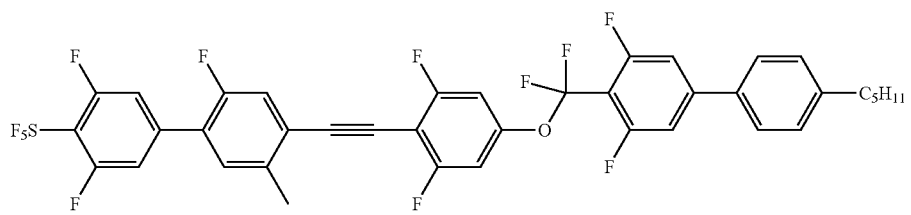
No.228
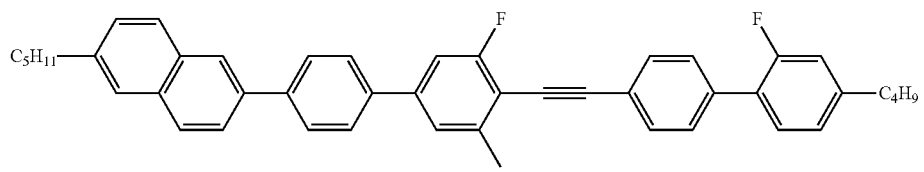
No.229
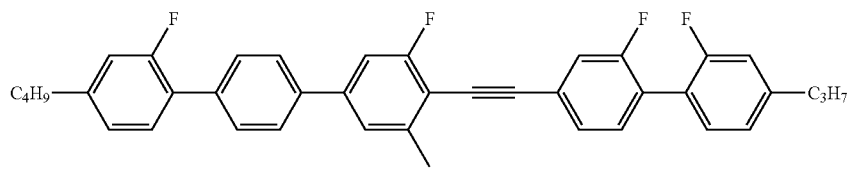
No.230
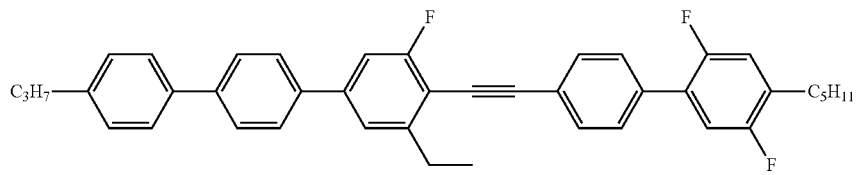
No.231
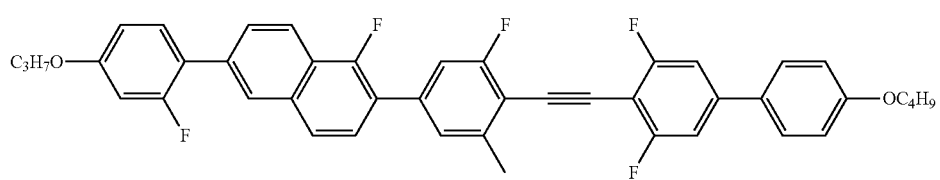
No.232
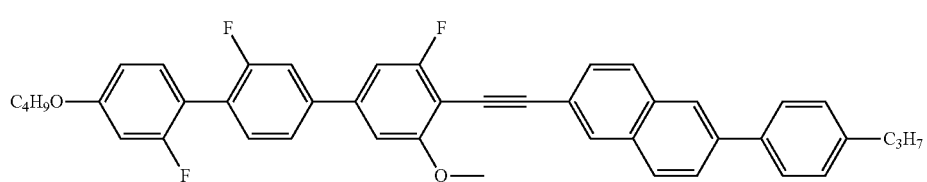
No.233

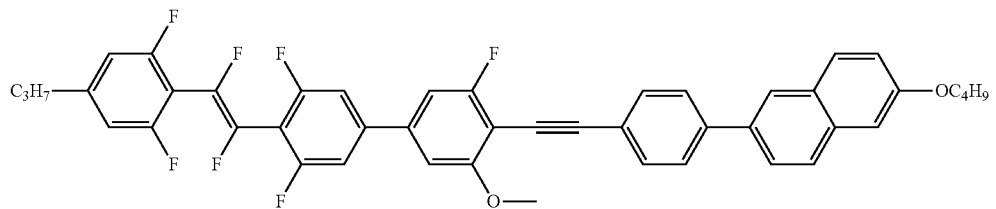
No. 234
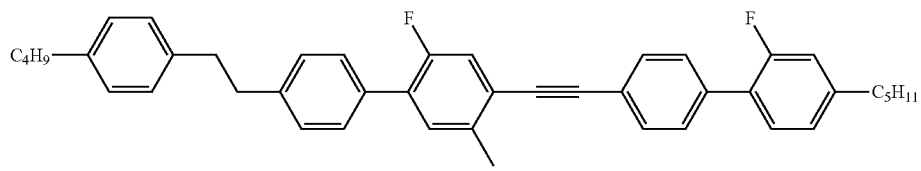
No. 235
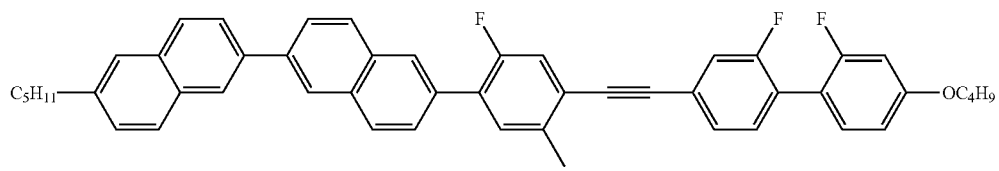
No. 236
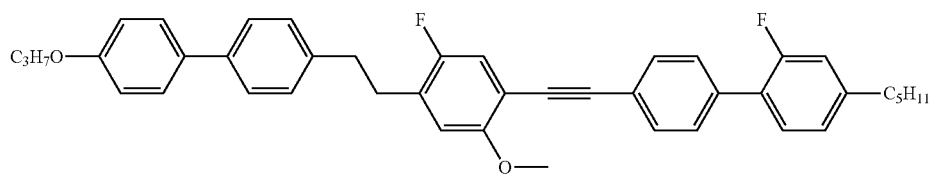
No. 237
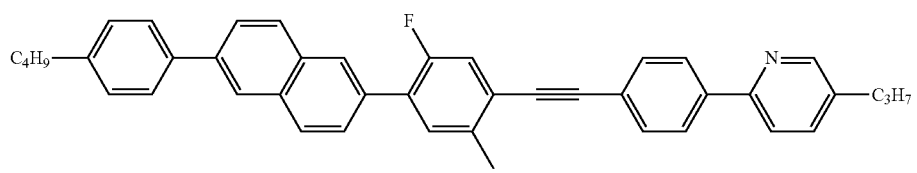
No. 238
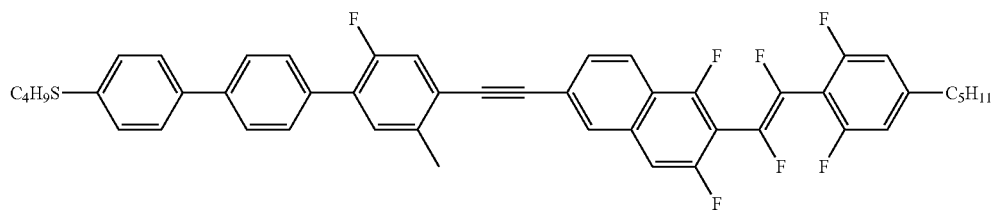
No. 239
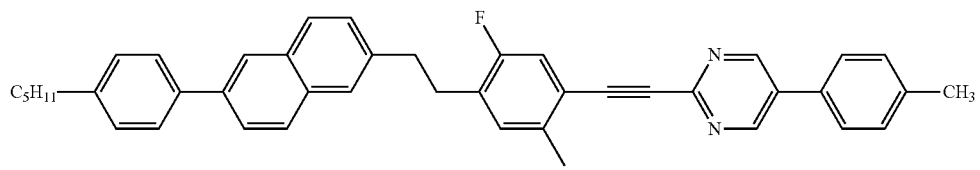
No. 240
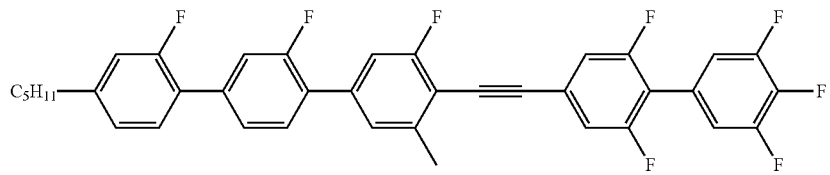
No. 241

-continued
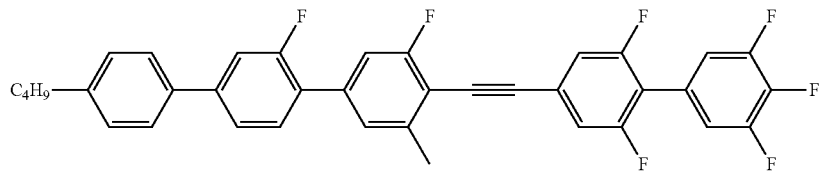
No.242
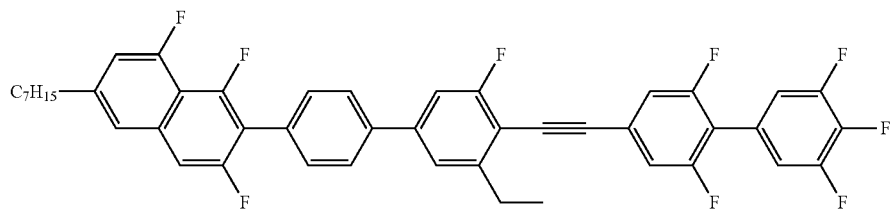
No.243
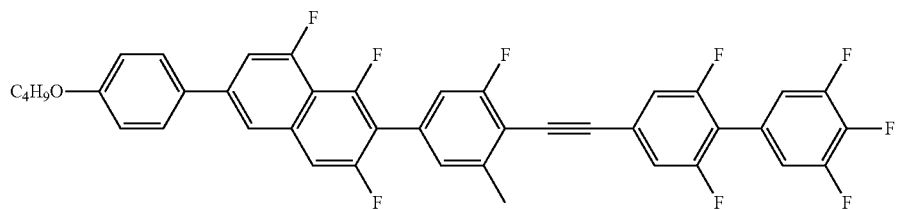
No.244
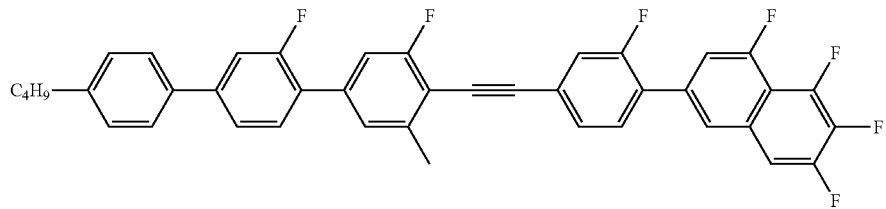
No.245
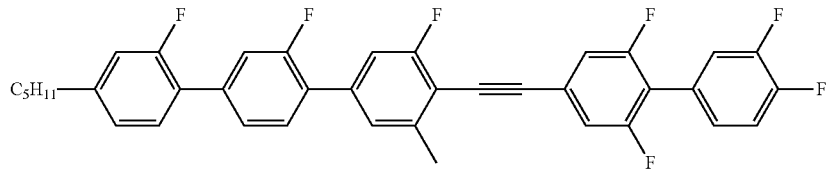
No.246
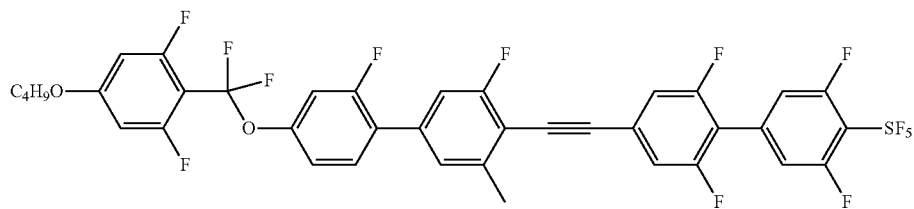
No.247
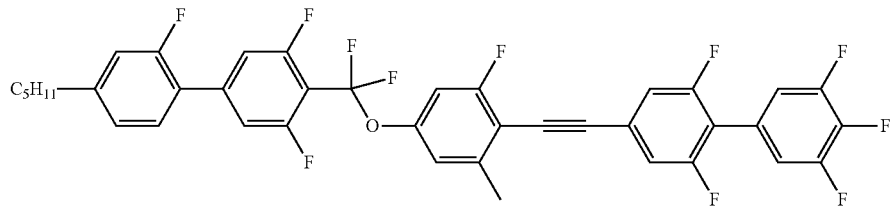
No.248

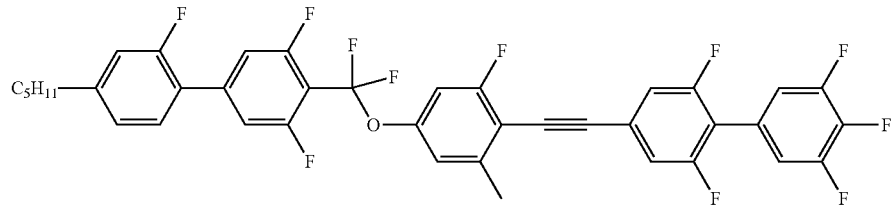
No.249
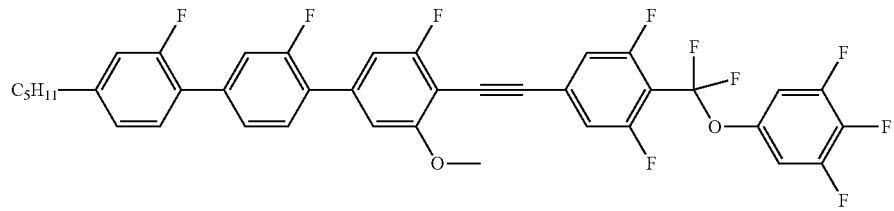
No.250
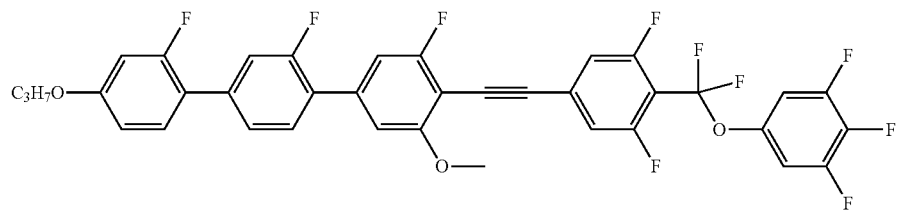
No.251
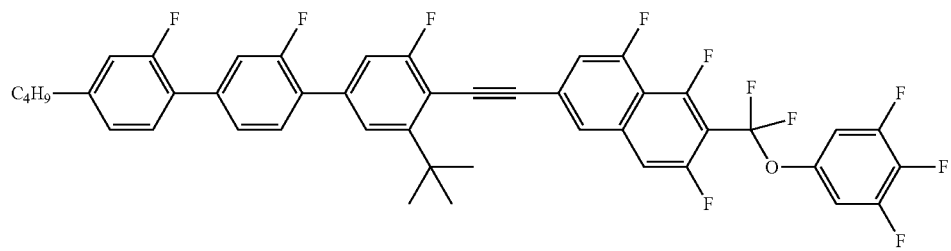
No.252
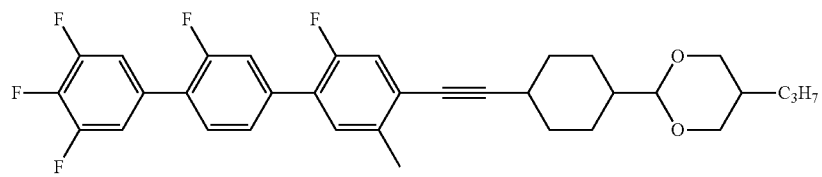
No.253
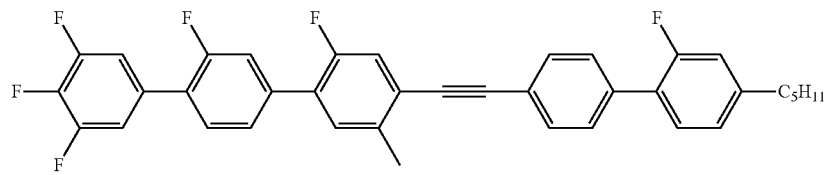
No.254
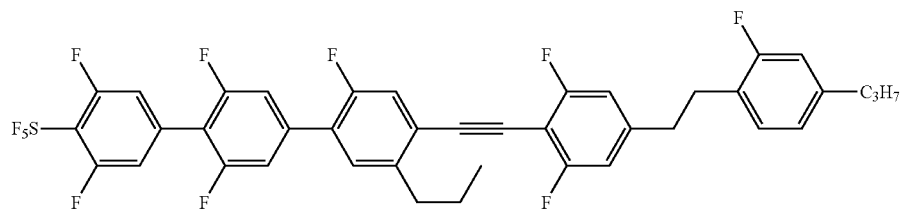
No.255

-continued
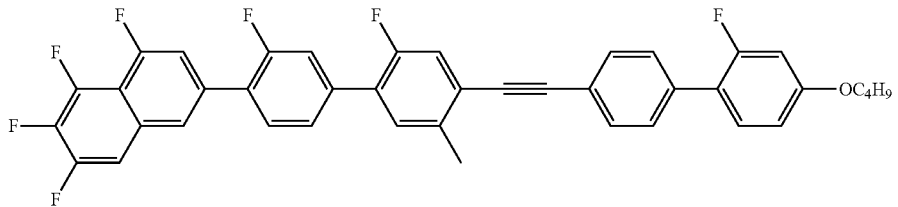
No.256
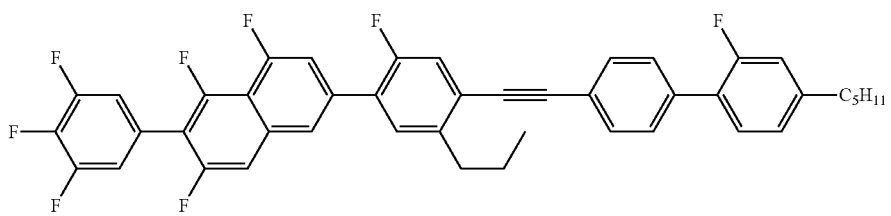
No.257
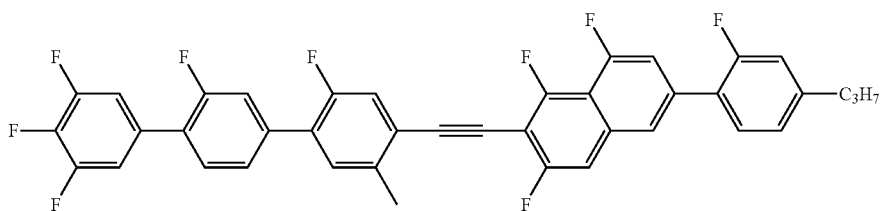
No.258
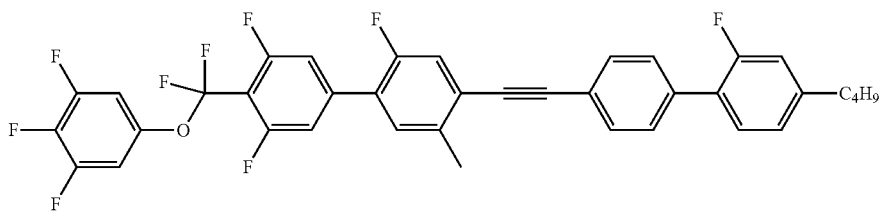
No.259
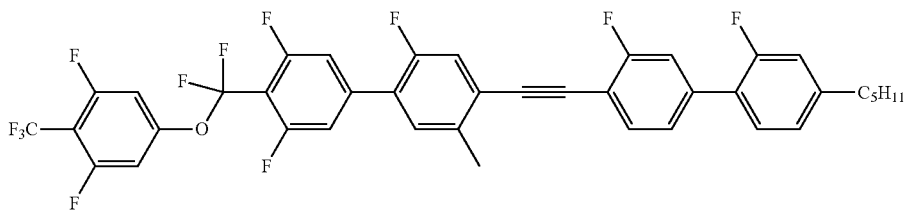
No.260
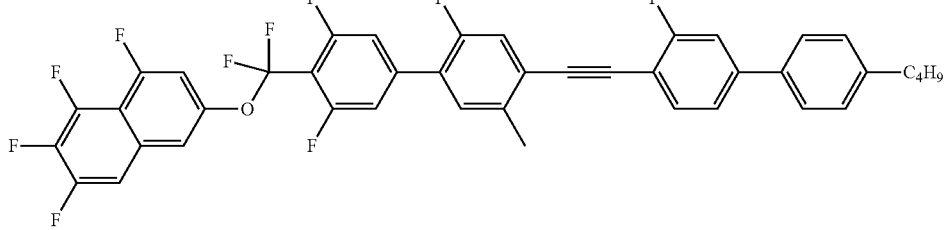
No.261
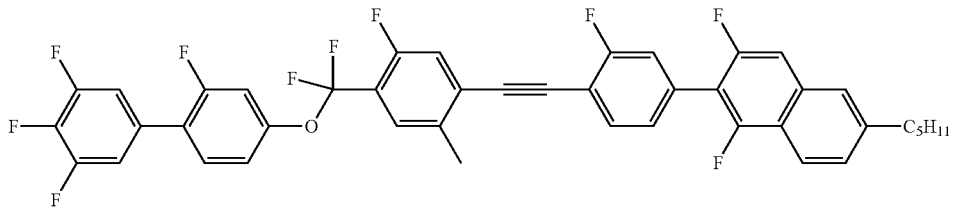
No.262

-continued
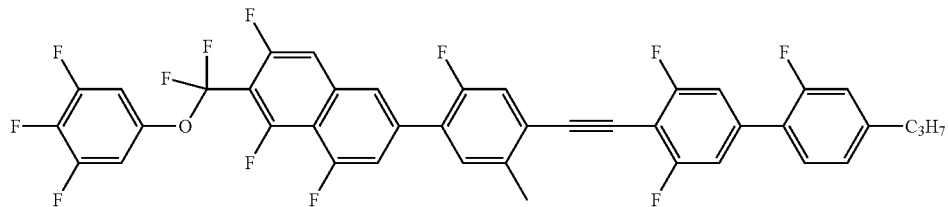
No.263
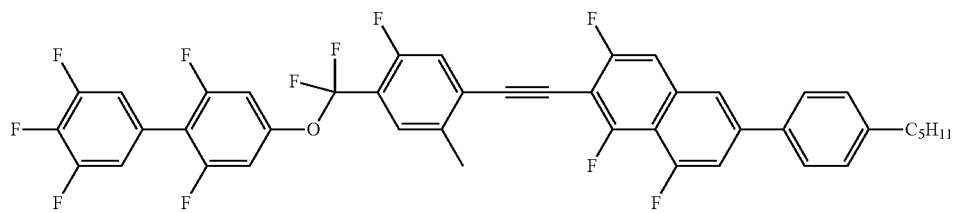
No.264
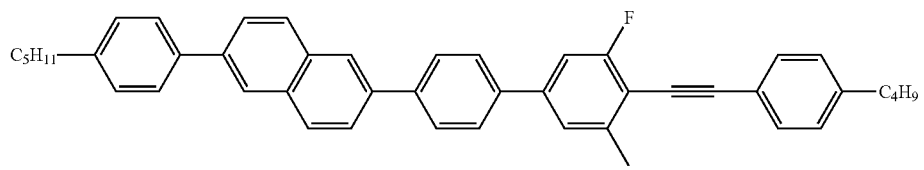
No.265
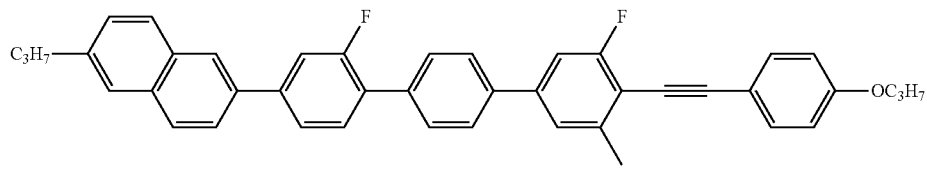
No.266
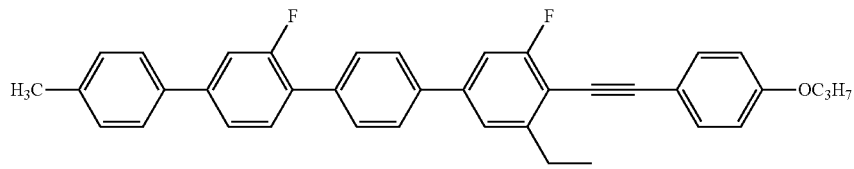
No.267
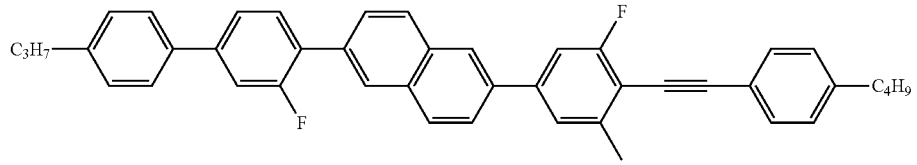
No.268
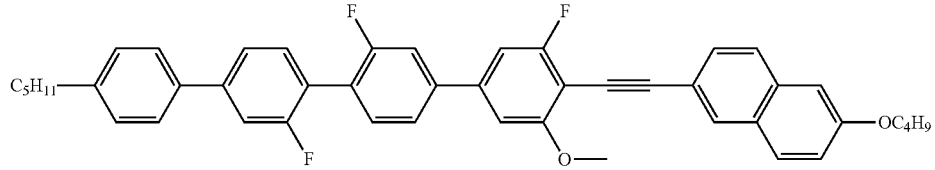
No.269
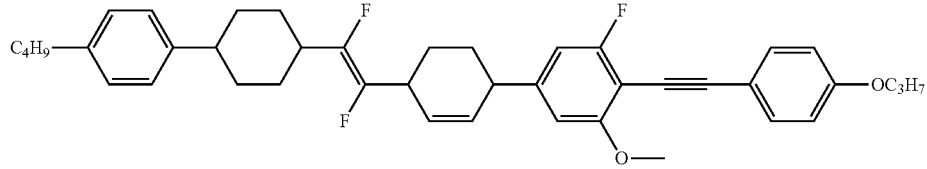
No.270

-continued
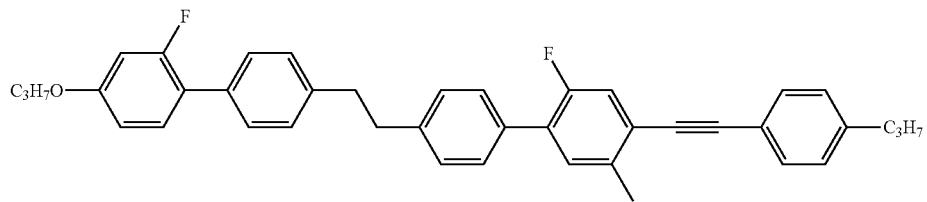
No.271
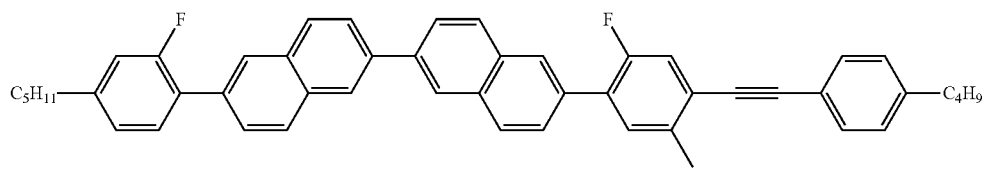
No.272
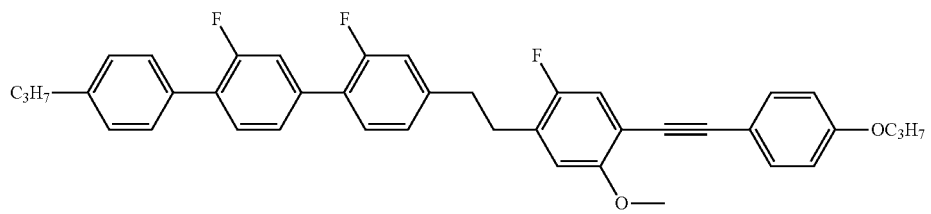
No.273
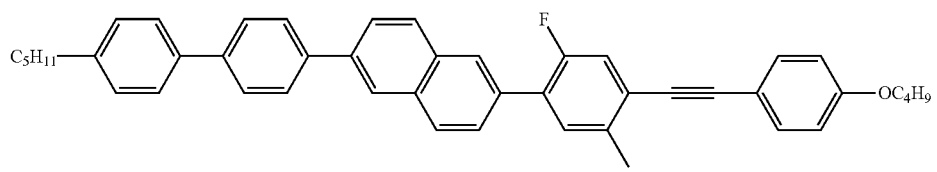
No.274
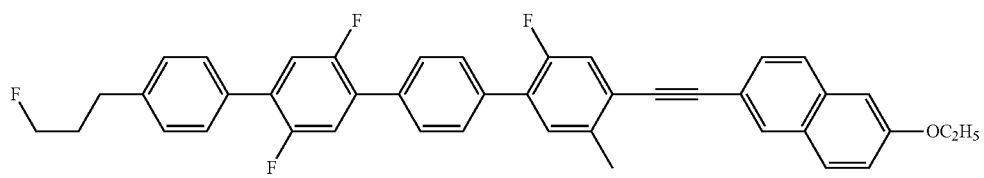
No.275
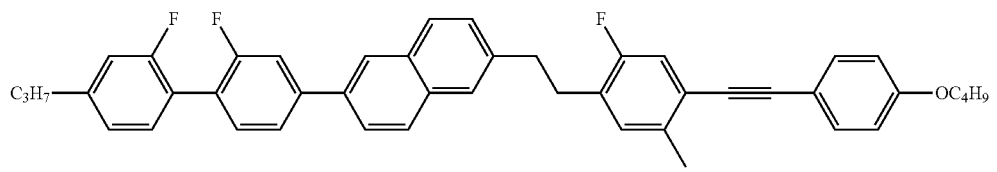
No.276
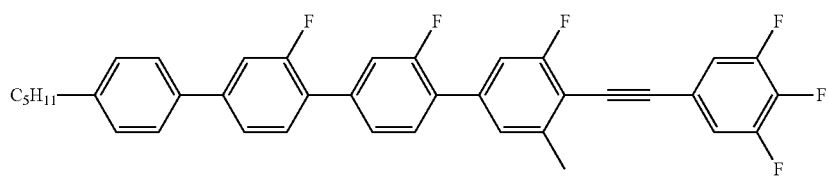
No.277
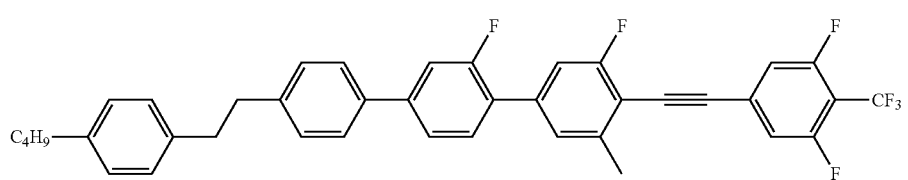
No.278

-continued
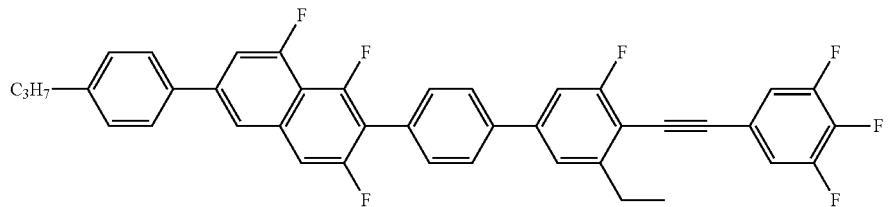
No.279
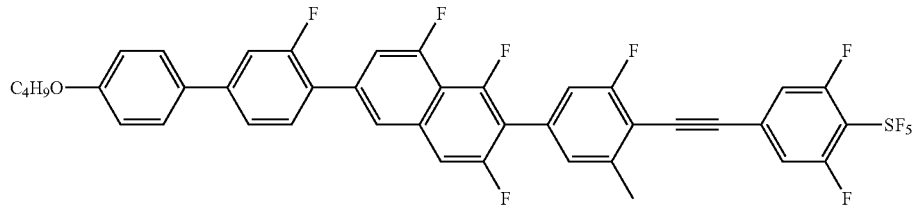
No.280
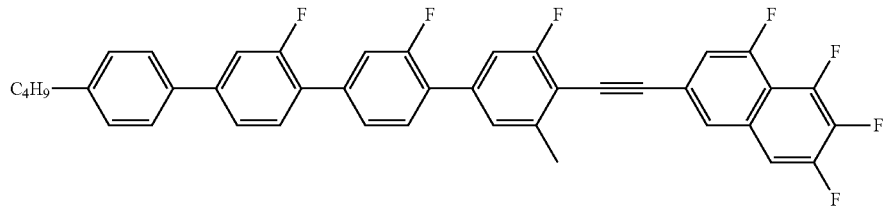
No.281
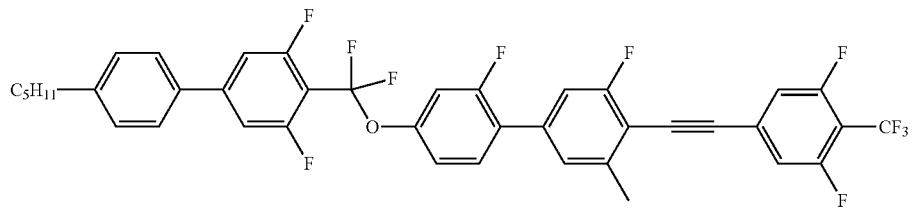
No.282
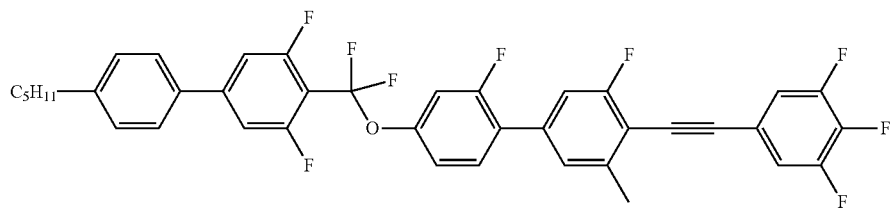
No.283
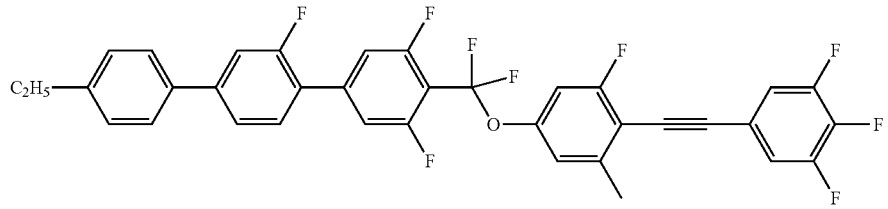
No.284
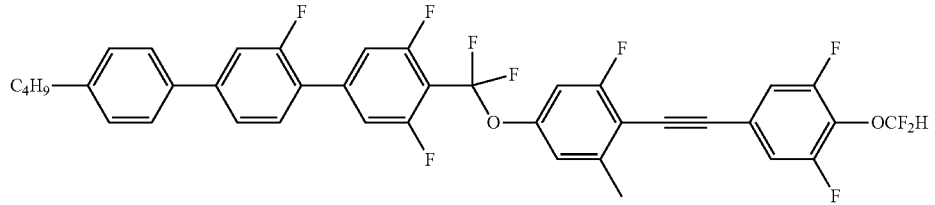
No.285

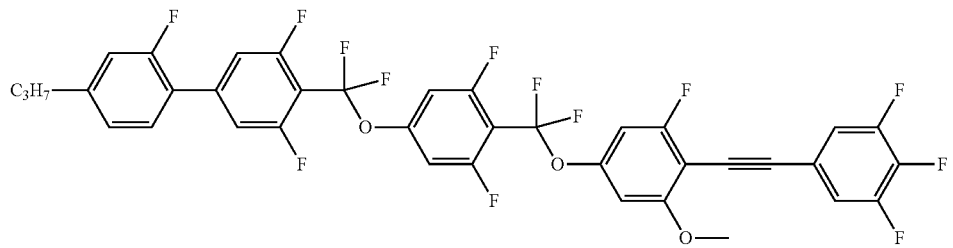
No.286
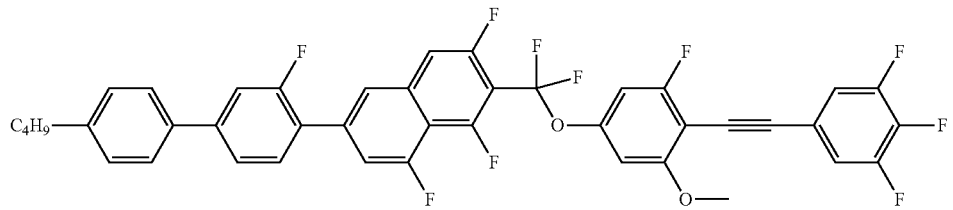
No.287
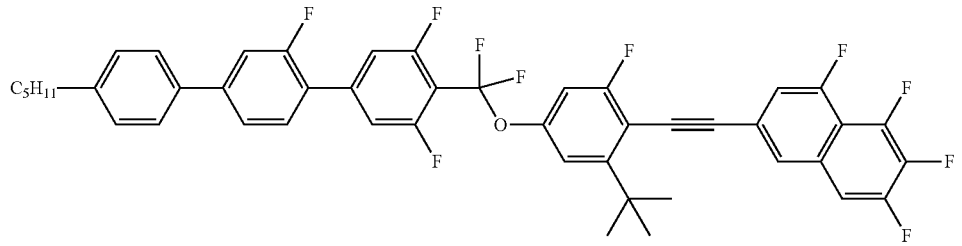
No.288
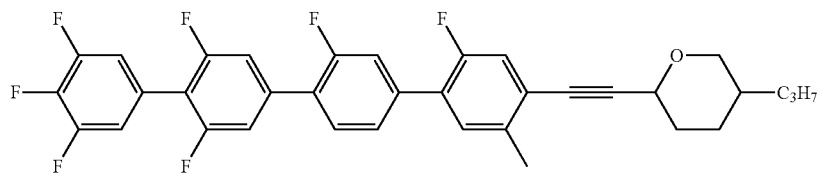
No.289
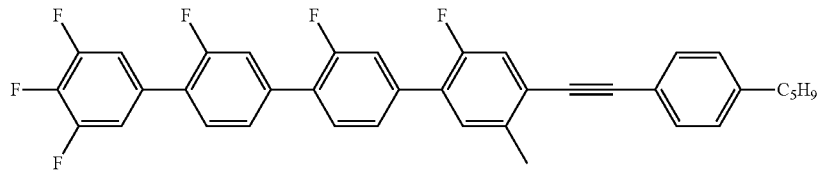
No.290
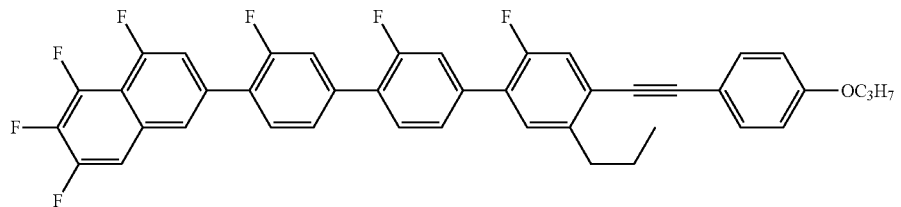
No.291
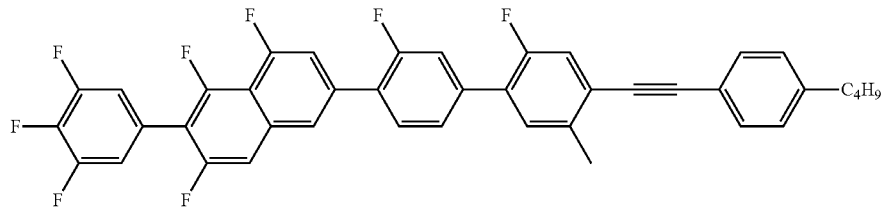
No.292

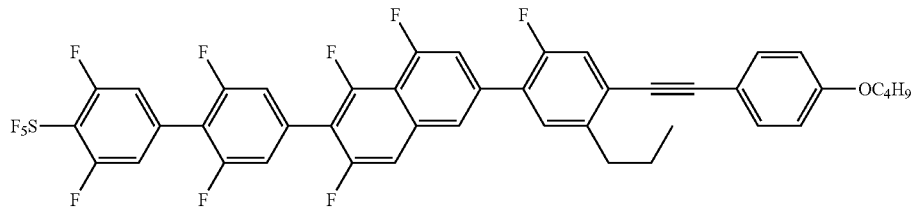
No.293
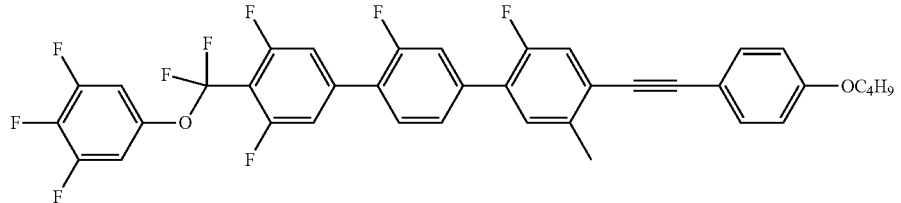
No.294
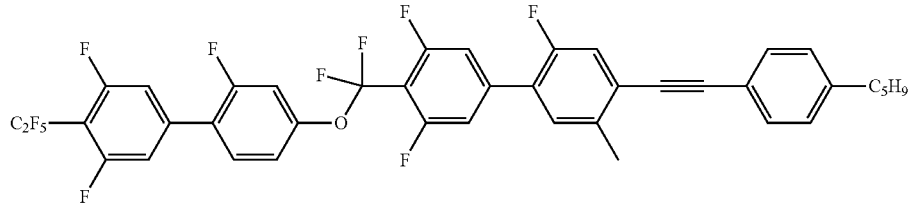
No.295
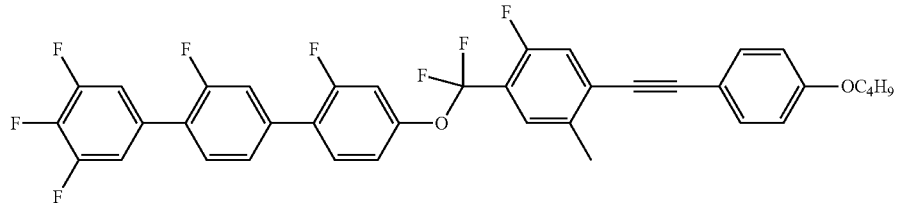
No.296
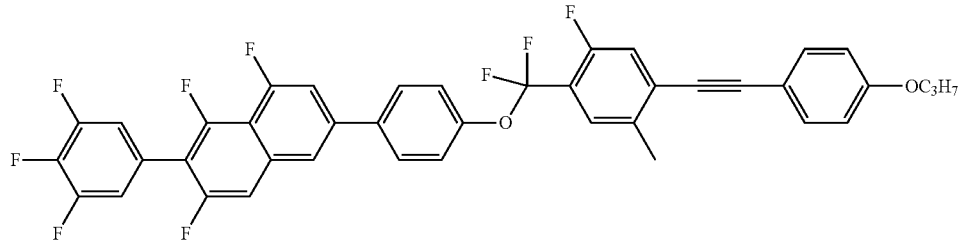
No.297
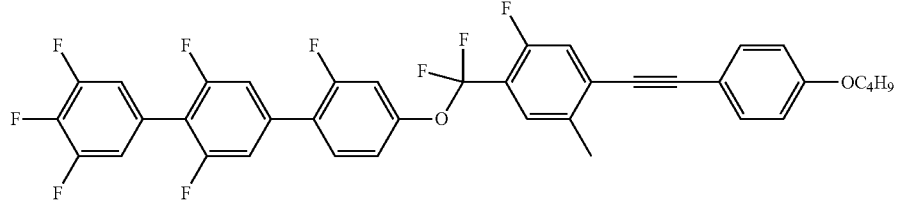
No.298
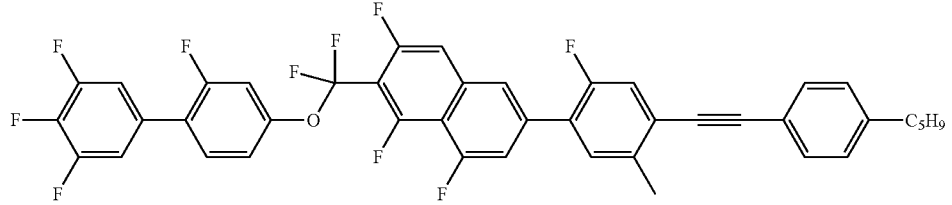
No.299

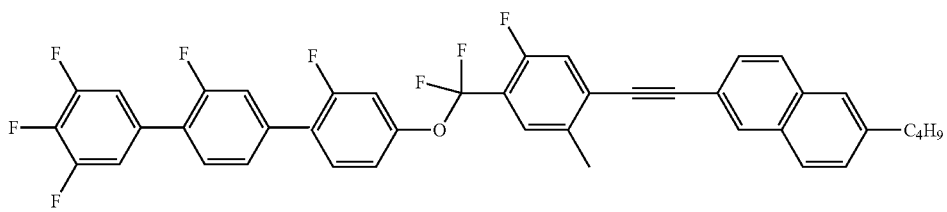

No.300

2. Examples of Composition

The invention will be described in greater detail by way of Examples. The Examples include a typical example, and therefore the invention is not limited by the Examples. For example, in addition to compositions in Use Examples, the invention includes a mixture of the composition in Use Example 1 and the composition in Use Example 2. The invention also includes a mixture prepared by mixing at least two compositions in Use Examples. Compounds in Use Examples were represented using symbols according to definitions in Table 4 described below. In Table 4, the configuration with regard to 1,4-cyclohexylene is trans. A parenthesized number next to a symbolized compound represents a chemical formula to which the compound belongs. A symbol (—) means a liquid crystal compound different from compounds (1) to (15). A proportion (percentage) of the liquid crystal compound is expressed in terms of weight percent (% by weight) based on the weight of the liquid crystal composition containing no additive. Values of the physical properties of the composition are summarized in a last part. The physical properties were measured according to the methods described above, and measured values are directly described (without extrapolation).

TABLE 4

Method for description of compounds using symbols
R—(A₁)—Z₁— . . . —Zₙ—(Aₙ)—R'

| 1) Left-terminal group R— | Symbol |
|---|---|
| $C_nH_{2n+1}$— | n- |
| $C_nH_{2n+1}O$— | nO— |
| $C_mH_{2m+1}OC_nH_{2n}$— | mOn— |
| $C_nH_{2n+1}S$— | nS— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |

| 2) Right-terminal group —R' | Symbol |
|---|---|
| —$C_nH_{2n+1}$ | -n |
| —$OC_nH_{2n+1}$ | —On |
| —$SC_nH_{2n+1}$ | —Sn |
| —$COOCH_3$ | —EMe |
| —CH=$CH_2$ | —V |
| —CH=CH—$C_nH_{2n+1}$ | —Vn |
| —$C_nH_{2n}$—CH=$CH_2$ | —nV |
| —$C_mH_{2m}$—CH=CH—$C_nH_{2n+1}$ | —mVn |
| —CH=$CF_2$ | —VFF |
| —F | —F |
| —Cl | —CL |
| —$OCF_3$ | —OCF3 |
| —$OCF_2H$ | —OCF2H |
| —$CF_3$ | —CF3 |
| —OCH=CH—$CF_3$ | —OVCF3 |
| —C≡N | —C |

TABLE 4-continued

Method for description of compounds using symbols
R—(A₁)—Z₁— . . . —Zₙ—(Aₙ)—R'

| 3) Bonding group —Zₙ— | Symbol |
|---|---|
| —$C_nH_{2n}$— | n |
| —COO— | E |
| —CH=CH— | V |
| —$CH_2O$— | 1O |
| —$OCH_2$— | O1 |
| —$CF_2O$— | X |
| —C≡C— | T |

| 4) Ring Structure —Aₙ— | Symbol |
|---|---|
| (cyclohexane) | H |
| (benzene) | B |
| (fluorobenzene) | B(F) |
| (2-fluorobenzene) | B(2F) |
| (difluorobenzene) | B(F,F) |
| (2,5-difluorobenzene) | B(2F,5F) |
| (2,3-difluorobenzene) | B(2F,3F) |

TABLE 4-continued

Method for description of compounds using symbols
R—(A₁)—Z₁— . . . —Zₙ—(Aₙ)—R'

| | |
|---|---|
| 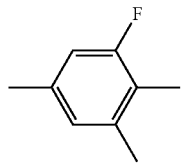 | B(F,Me) |
| 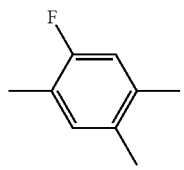 | B(2F,5Me) |
| 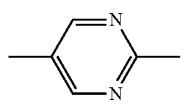 | Py |
| 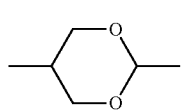 | G |
| 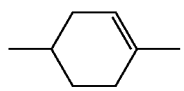 | ch |
| 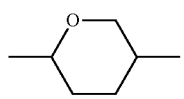 | Dh |
| 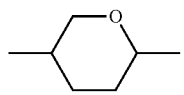 | dh |
| 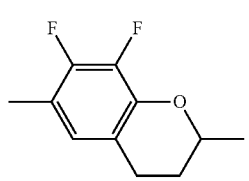 | Cro(7F,8F) |
| 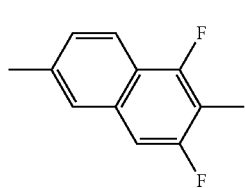 | Np(1F,3F) |
| 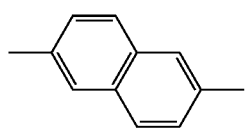 | Np |

5) Examples of description

Example 1  3-BB(F,Me)TB-4

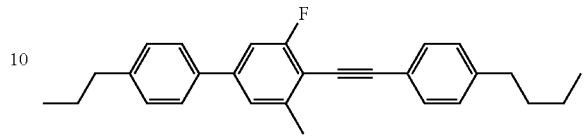

Example 2  3-BB(F,F)XB(F,F)—F

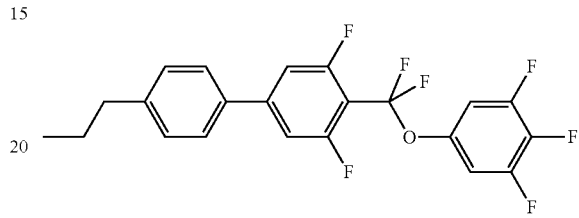

Example 3  3-HB—O2

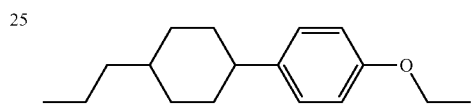

Example 4  3-HBB(2F,3F)—O2

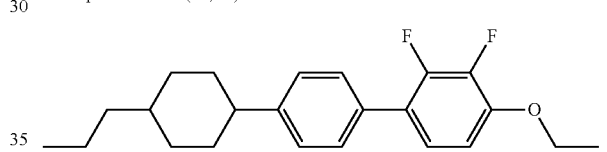

Use Example 1

| | | |
|---|---|---|
| 3-BB(F,Me)TB-4 | (No. 49) | 8% |
| 7-HB(F,F)-F | (5-4) | 3% |
| 3-HB-O2 | (2-5) | 7% |
| 2-HHB(F)-F | (6-2) | 8% |
| 3-HHB(F)-F | (6-2) | 7% |
| 5-HHB(F)-F | (6-2) | 9% |
| 2-HBB(F)-F | (6-23) | 8% |
| 3-HBB(F)-F | (6-23) | 10% |
| 5-HBB(F)-F | (6-23) | 15% |
| 2-HBB-F | (6-22) | 4% |
| 3-HBB-F | (6-22) | 3% |
| 5-HBB-F | (6-22) | 3% |
| 3-HBB(F,F)-F | (6-24) | 5% |
| 5-HBB(F,F)-F | (6-24) | 10% |

NI=87.0° C.; η=26.0 mPa·s; Δn=0.132; Δε=5.7.

Use Example 2

| | | |
|---|---|---|
| 3-BB(F,Me)TB-O3 | (No. 50) | 3% |
| 5-HB-CL | (5-2) | 16% |
| 7-HB(F,F)-F | (5-4) | 3% |
| 3-HH-4 | (2-1) | 10% |
| 3-HH-5 | (2-1) | 6% |
| 3-HB-O2 | (2-5) | 12% |
| 3-HHB-1 | (3-1) | 8% |
| 3-HHB-O1 | (3-1) | 4% |

-continued

| | | |
|---|---|---|
| 2-HHB(F)-F | (6-2) | 5% |
| 3-HHB(F)-F | (6-2) | 7% |
| 5-HHB(F)-F | (6-2) | 7% |
| 3-HHB(F,F)-F | (6-3) | 7% |
| 3-H2HB(F,F)-F | (6-15) | 6% |
| 4-H2HB(F,F)-F | (6-15) | 6% |

NI=73.9° C.; η=15.5 mPa·s; Δn=0.082; Δε=3.1.

Use Example 3

| | | |
|---|---|---|
| 5-BB(F,Me)TB(F,F)XB(F,F)-F | (No. 114) | 10% |
| 5-HB-CL | (5-2) | 14% |
| 3-HH-4 | (2-1) | 12% |
| 3-HH-5 | (2-1) | 3% |
| 3-HHB-F | (6-1) | 3% |
| 3-HHB-CL | (6-1) | 3% |
| 4-HHB-CL | (6-1) | 4% |
| 3-HHB(F)-F | (6-2) | 9% |
| 4-HHB(F)-F | (6-2) | 6% |
| 5-HHB(F)-F | (6-2) | 6% |
| 7-HHB(F)-F | (6-2) | 10% |
| 5-HBB(F)-F | (6-23) | 3% |
| 1O1-HBBH-5 | (4-1) | 3% |
| 3-HHBB(F,F)-F | (7-6) | 2% |
| 4-HHBB(F,F)-F | (7-6) | 3% |
| 5-HHBB(F,F)-F | (7-6) | 3% |
| 3-HH2BB(F,F)-F | (7-15) | 3% |
| 4-HH2BB(F,F)-F | (7-15) | 3% |

NI=115.4° C.; r=26.6 mPa·s; Δn=0.108; Δε=6.8.

Use Example 4

| | | |
|---|---|---|
| 4O-BB(F,Me)TB(F,F)XB(F,F)-F | (No. 115) | 3% |
| 2-HH-5 | (2-1) | 3% |
| 3-HH-4 | (2-1) | 14% |
| 3-HH-5 | (2-1) | 3% |
| 3-HB-O2 | (2-5) | 11% |
| 2-BB(2F,3F)-O2 | (9-3) | 12% |
| 5-H2B(2F,3F)-O2 | (9-4) | 15% |
| 3-HHB(2F,3CL)-O2 | (10-12) | 5% |
| V-HBB(2F,3F)-O2 | (10-7) | 6% |
| 3-HBB(2F,3F)-O2 | (10-7) | 7% |
| 5-HBB(2F,3F)-O2 | (10-7) | 5% |
| 3-HHB-1 | (3-1) | 3% |
| 3-HHB-3 | (3-1) | 4% |
| 3-HHB-O1 | (3-1) | 3% |
| 3-HH2B(2F,3F)-O2 | (10-4) | 3% |
| 3-DhB(2F,3F)-O2 | (9-2) | 3% |

Use Example 5

| | | |
|---|---|---|
| 3-BB(F,Me)TB-S4 | (No. 51) | 3% |
| 3-HHB(F,F)-F | (6-3) | 8% |
| 3-H2HB(F,F)-F | (6-15) | 7% |
| 4-H2HB(F,F)-F | (6-15) | 7% |
| 5-H2HB(F,F)-F | (6-15) | 7% |
| 3-HBB(F,F)-F | (6-24) | 20% |
| 5-HBB(F,F)-F | (6-24) | 21% |
| 3-H2BB(F,F)-F | (6-27) | 11% |
| 5-HHBB(F,F)-F | (7-6) | 4% |
| 5-HHEBB-F | (7-17) | 3% |
| 3-HH2BB(F,F)-F | (7-15) | 3% |
| 1O1-HBBH-4 | (4-1) | 3% |
| 1O1-HBBH-5 | (4-1) | 3% |

Use Example 6

| | | |
|---|---|---|
| 5-NpB(F,Me)TB-O3 | (No. 54) | 3% |
| 3-GB(F)B(F,F)XB(F,F)-F | (7-57) | 5% |
| 4-GB(F)B(F,F)XB(F,F)-F | (7-57) | 4% |
| 5-GB(F)B(F,F)XB(F,F)-F | (7-57) | 3% |
| 3-GB(F)B(F,F)XB(F,F)-F | (7-57) | 4% |
| 4-BB(F)B(F,F)XB(F,F)-F | (7-57) | 3% |
| 3-HH-V | (2-1) | 34% |
| 3-HH-V1 | (2-1) | 8% |
| 3-HHEH-5 | (3-13) | 4% |
| 3-HHB-1 | (3-1) | 5% |
| V-HHB-1 | (3-1) | 5% |
| V2-BB(F)B-1 | (3-6) | 5% |
| 1V2-BB-F | (5-1) | 3% |
| 3-BB(F,F)XB(F,F)-F | (6-97) | 6% |
| 3-GB(F,F)XB(F,F)-F | (6-113) | 5% |
| 3-HHBB(F,F)-F | (7-6) | 3% |

Use Example 7

| | | |
|---|---|---|
| 5-NpB(F,Me)TB(F,F)XB(F,F)-F | (No. 116) | 5% |
| 5-HB-CL | (5-2) | 8% |
| 3-HH-4 | (2-1) | 7% |
| 3-HHB-1 | (3-1) | 6% |
| 3-HHB(F,F)-F | (6-3) | 5% |
| 3-HBB(F,F)-F | (6-24) | 16% |
| 5-HBB(F,F)-F | (6-24) | 14% |
| 3-HHEB(F,F)-F | (6-12) | 11% |
| 4-HHEB(F,F)-F | (6-12) | 5% |
| 5-HHEB(F,F)-F | (6-12) | 5% |
| 2-HBEB(F,F)-F | (6-39) | 6% |
| 3-HBEB(F,F)-F | (6-39) | 4% |
| 5-HBEB(F,F)-F | (6-39) | 3% |
| 3-HHBB(F,F)-F | (7-6) | 5% |

Use Example 8

| | | |
|---|---|---|
| 4O-BB(F,Me)TB(F,F)XNp(1F,3F)-F | (No. 118) | 3% |
| 2-dhBB(F,F)XB(F,F)-F | (7-50) | 4% |
| 3-dhBB(F,F)XB(F,F)-F | (7-50) | 5% |
| 5-HB(F)B(F,F)XB(F,F)-F | (7-41) | 3% |
| 3-BB(F)B(F,F)XB(F,F)-F | (7-47) | 3% |
| 4-BB(F)B(F,F)XB(F,F)-F | (7-47) | 3% |
| 5-BB(F)B(F,F)XB(F,F)-F | (7-47) | 3% |
| 3-HH-V | (2-1) | 38% |
| 3-HH-V1 | (2-1) | 5% |
| 3-HHEH-5 | (3-13) | 5% |
| 3-HHB-1 | (3-1) | 5% |
| V-HHB-1 | (3-1) | 4% |
| V2-BB(F)B-1 | (3-6) | 4% |
| 1V2-BB-F | (5-1) | 3% |
| 3-BB(F,F)XB(F,F)-F | (6-97) | 9% |
| 3-HHBB(F,F)-F | (7-6) | 3% |

Use Example 9

| | | |
|---|---|---|
| 4S-BB(F,Me)TB(F,F)XB(F,F)-F | (No. 120) | 3% |
| 5-HB-CL | (5-2) | 4% |
| 7-HB(F)-F | (5-3) | 5% |
| 3-HH-4 | (2-1) | 7% |
| 3-HH-5 | (2-1) | 8% |
| 3-HB-O2 | (2-5) | 11% |
| 3-HHEB-F | (6-10) | 10% |
| 5-HHEB-F | (6-10) | 10% |

-continued

| | | |
|---|---|---|
| 3-HHEB(F,F)-F | (6-12) | 6% |
| 4-HHEB(F,F)-F | (6-12) | 6% |
| 3-GHB(F,F)-F | (6-109) | 6% |
| 4-GHB(F,F)-F | (6-109) | 6% |
| 5-GHB(F,F)-F | (6-109) | 6% |
| 2-HHB(F,F)-F | (6-3) | 6% |
| 3-HHB(F,F)-F | (6-3) | 6% |

| | | |
|---|---|---|
| 3-BB(2F,5Me)TB-O3 | (No. 56) | 3% |
| 2-HB-C | (8-1) | 6% |
| 3-HB-C | (8-1) | 14% |
| 3-HB-O2 | (2-5) | 12% |
| 2-BTB-1 | (2-10) | 4% |
| 3-HHB-F | (6-1) | 5% |
| 3-HHB-1 | (3-1) | 7% |
| 3-HHB-O1 | (3-1) | 4% |
| 3-HHB-3 | (3-1) | 13% |
| 3-HHEB-F | (6-10) | 5% |
| 5-HHEB-F | (6-10) | 3% |
| 2-HHB(F)-F | (6-2) | 8% |
| 3-HHB(F)-F | (6-2) | 6% |
| 5-HHB(F)-F | (6-2) | 6% |
| 3-HHB(F,F)-F | (6-3) | 4% |

Use Example 10

| | | |
|---|---|---|
| 3-BB(F,Me)TB-4 | (No. 49) | 5% |
| 5-HB-F | (5-2) | 12% |
| 6-HB-F | (5-2) | 9% |
| 7-HB-F | (5-2) | 7% |
| 2-HHB-OCF3 | (6-1) | 5% |
| 3-HHB-OCF3 | (6-1) | 5% |
| 4-HHB-OCF3 | (6-1) | 7% |
| 5-HHB-OCF3 | (6-1) | 6% |
| 3-HH2B-OCF3 | (6-4) | 3% |
| 5-HH2B-OCF3 | (6-4) | 4% |
| 3-HHB(F,F)-OCF2H | (6-3) | 5% |
| 3-HHB(F,F)-OCF3 | (6-3) | 3% |
| 3-HH2B(F)-F | (6-5) | 3% |
| 3-HBB(F)-F | (6-23) | 8% |
| 5-HBB(F)-F | (6-23) | 10% |
| 5-HBBH-3 | (4-1) | 5% |
| 3-HB(F)BH-3 | (4-2) | 3% |

NI=89.7° C.; η=16.2 mPa·s; Δn=0.104; Δε=4.2.

Use Example 12

| | | |
|---|---|---|
| 3-BB(F,Me)TB-O3 | (No. 50) | 3% |
| 3-HB-CL | (5-2) | 10% |
| 3-HH-4 | (2-1) | 10% |
| 3-HB-O2 | (2-5) | 10% |
| 3-HHB(F,F)-F | (6-3) | 5% |
| 3-HBB(F,F)-F | (6-24) | 25% |
| 5-HBB(F,F)-F | (6-24) | 25% |
| 5-HBB(F)B-2 | (4-5) | 6% |
| 5-HBB(F)B-3 | (4-5) | 6% |

NI=78.3° C.; ρ=21.4 mPa·s; Δn=0.127; Δε=5.5.

Use Example 13

| | | |
|---|---|---|
| 5-BB(F,Me)TB(F,F)XB(F,F)-F | (No. 114) | 9% |
| 2-HH-3 | (2-1) | 5% |
| 2-HH-5 | (2-1) | 10% |
| 3-HH-4 | (2-1) | 4% |
| 7-HB-1 | (2-5) | 8% |
| 5-HB-O2 | (2-5) | 6% |
| 3-HB(2F,3F)-O2 | (9-1) | 14% |
| 5-HB(2F,3F)-O2 | (9-1) | 15% |
| 3-HHB(2F,3CL)-O2 | (10-12) | 3% |
| 4-HHB(2F,3CL)-O2 | (10-12) | 3% |
| 5-HHB(2F,3CL)-O2 | (10-12) | 3% |
| 5-HBB(2F,3F)-O2 | (10-7) | 4% |
| 3-HH1OCro(7F,8F)-5 | (13-6) | 3% |
| 5-HBB(F)B-2 | (4-5) | 7% |
| 5-HBB(F)B-3 | (4-5) | 6% |

Use Example 14

| | | |
|---|---|---|
| 4O-BB(F,Me)TB(F,F)XB(F,F)-F | (No. 115) | 3% |
| 3-HB-O1 | (2-5) | 13% |
| 3-HH-4 | (2-1) | 5% |
| 3-HH-VFF | (2-1) | 10% |
| V-HB(2F,3F)-O2 | (9-1) | 10% |
| 5-HB(2F,3F)-O2 | (9-1) | 10% |
| 2-HHB(2F,3F)-1 | (10-1) | 10% |
| 3-HHB(2F,3F)-1 | (10-1) | 10% |
| 3-HHB(2F,3F)-O2 | (10-1) | 10% |
| 5-HHB(2F,3F)-O2 | (10-1) | 10% |
| 3-HHB-1 | (3-1) | 4% |
| 1-BB-5 | (2-8) | 5% |

Use Example 15

| | | |
|---|---|---|
| 3-BB(F,Me)TB-S4 | (No. 51) | 3% |
| 3-HB-O1 | (2-5) | 12% |
| 3-HH-4 | (2-1) | 8% |
| 3-HB(2F,3F)-O2 | (9-1) | 10% |
| 5-HB(2F,3F)-O2 | (9-1) | 10% |
| 2-HHB(2F,3F)-1 | (10-1) | 13% |
| 3-HHB(2F,3F)-1 | (10-1) | 11% |
| 3-HHB(2F,3F)-O2 | (10-1) | 11% |
| 5-HHB(2F,3F)-O2 | (10-1) | 14% |
| 3-HHB-1 | (3-1) | 8% |

Use Example 16

| | | |
|---|---|---|
| 5-NpB(F,Me)TB-O3 | (No. 54) | 2% |
| 2-HH-5 | (2-1) | 5% |
| 3-HH-4 | (2-1) | 13% |
| 3-HH-5 | (2-1) | 5% |
| 3-HB-O2 | (2-5) | 10% |
| 3-H2B(2F,3F)-O2 | (9-4) | 14% |
| 5-H2B(2F,3F)-O2 | (9-4) | 13% |
| 3-HHB(2F,3CL)-O2 | (10-12) | 5% |
| 2-HBB(2F,3F)-O2 | (10-7) | 5% |
| 3-HBB(2F,3F)-O2 | (10-7) | 8% |
| 5-HBB(2F,3F)-O2 | (10-7) | 8% |
| 3-HHB-1 | (3-1) | 5% |
| 3-HHB-3 | (3-1) | 4% |
| 3-HHB-O1 | (3-1) | 3% |

Use Example 17

| | | |
|---|---|---|
| 5-NpB(F,Me)TB(F,F)XB(F,F)-F | (No. 116) | 6% |
| 2-HH-3 | (2-1) | 18% |
| 3-HH-4 | (2-1) | 7% |
| 1-BB-3 | (2-8) | 8% |
| 3-HB-O2 | (2-5) | 3% |
| 3-BB(2F,3F)-O2 | (9-3) | 10% |
| 5-BB(2F,3F)-O2 | (9-3) | 5% |
| 2-HH1OB(2F,3F)-O2 | (10-5) | 15% |
| 3-HH1OB(2F,3F)-O2 | (10-5) | 20% |
| 3-HHB-1 | (3-1) | 3% |
| 3-HHB-O1 | (3-1) | 3% |
| 5-B(F)BB-2 | (3-8) | 2% |

Use Example 18

| | | |
|---|---|---|
| 4O-BB(F,Me)TB(F,F)XNp(1F,3F)-F | (No. 118) | 3% |
| 1-BB-3 | (2-8) | 10% |
| 3-HH-V | (2-1) | 25% |
| 3-BB(2F,3F)-O2 | (9-3) | 10% |
| 2-HH1OB(2F,3F)-O2 | (10-5) | 22% |
| 3-HH1OB(2F,3F)-O2 | (10-5) | 15% |
| 3-HHB-1 | (3-1) | 8% |
| 5-B(F)BB-2 | (3-8) | 7% |

Use Example 19

| | | |
|---|---|---|
| 4S-BB(F,Me)TB(F,F)XB(F,F)-F | (No. 120) | 3% |
| 3-HB-CL | (5-2) | 5% |
| 5-HB-CL | (5-2) | 5% |
| 3-HHB-OCF3 | (6-1) | 4% |
| 3-H2HB-OCF3 | (6-4) | 3% |
| 5-H4HB-OCF3 | (6-7) | 13% |
| V-HHB(F)-F | (6-2) | 6% |
| 3-HHB(F)-F | (6-2) | 6% |
| 5-HHB(F)-F | (6-2) | 6% |
| 3-H4HB(F,F)-CF3 | (6-21) | 7% |
| 5-H4HB(F,F)-CF3 | (6-21) | 8% |
| 5-H2HB(F,F)-F | (6-15) | 6% |
| 5-H4HB(F,F)-F | (6-21) | 8% |
| 2-H2BB(F)-F | (6-26) | 4% |
| 3-H2BB(F)-F | (6-26) | 10% |
| 3-HBEB(F,F)-F | (6-39) | 6% |

Use Example 20

| | | |
|---|---|---|
| 3-BB(2F,5Me)TB-O3 | (No. 56) | 3% |
| 1V2-BEB(F,F)-C | (8-15) | 8% |
| 3-HB-C | (8-1) | 15% |
| 2-BTB-1 | (2-10) | 8% |
| 5-HH-VFF | (2-1) | 26% |
| 3-HHB-1 | (3-1) | 5% |
| VFF-HHB-1 | (3-1) | 9% |
| VFF2-HHB-1 | (3-1) | 13% |
| 3-H2BTB-2 | (3-17) | 4% |
| 3-H2BTB-3 | (3-17) | 5% |
| 3-H2BTB-4 | (3-17) | 4% |

Use Example 21

| | | |
|---|---|---|
| 3-BB(F,Me)TB-4 | (No. 49) | 4% |
| 2-HH-3 | (2-1) | 14% |
| 7-HB-1 | (2-1) | 8% |
| 5-HB-O2 | (2-5) | 10% |
| 3-HB(2F,3F)-O2 | (9-1) | 12% |
| 5-HB(2F,3F)-O2 | (9-1) | 16% |
| V-HHB(2F,3F)-O2 | (10-1) | 4% |
| V2-HHB(2F,3F)-O2 | (10-1) | 4% |
| 5-HHB(2F,3CL)-O2 | (10-12) | 3% |
| 2-H1OB(2F,3F)-O2 | (9-5) | 3% |
| 3-H1OB(2F,3F)-O2 | (9-5) | 3% |
| 3-HH1OCro(7F,8F)-5 | (13-6) | 4% |
| 5-HBB(F)B-2 | (4-5) | 7% |
| 5-HBB(F)B-3 | (4-5) | 8% |

NI=71.5° C.; η=23.3 mPa·s; Δn=0.107; Δε=−2.8.

Use Example 22

| | | |
|---|---|---|
| 3-BB(F,Me)TB-O3 | (No. 50) | 3% |
| 2-HH-3 | (2-1) | 5% |
| 3-HH-V1 | (2-1) | 8% |
| 1V2-HH-1 | (2-1) | 8% |
| 1V2-HH-3 | (2-1) | 8% |
| 3-BB(2F,3F)-O2 | (9-3) | 7% |
| 5-BB(2F,3F)-O2 | (9-3) | 5% |
| 3-H1OB(2F,3F)-O2 | (9-5) | 6% |
| 2-HH1OB(2F,3F)-O2 | (10-5) | 7% |
| 3-HH1OB(2F,3F)-O2 | (10-5) | 16% |
| 3-HDhB(2F,3F)-O2 | (10-3) | 7% |
| 2-HBB(2F,3F)-O2 | (10-7) | 3% |
| 3-HBB(2F,3F)-O2 | (10-7) | 5% |
| 3-HHB-1 | (3-1) | 3% |
| 3-HHB-3 | (3-1) | 2% |
| 2-BB(2F,3F)B-3 | (11-1) | 7% |

NI=90.7° C.; η=23.4 mPa·s; Δn=0.118; Δε=−4.4.

Use Example 23

| | | |
|---|---|---|
| 5-BB(F,Me)TB(F,F)XB(F,F)-F | (No. 114) | 7% |
| 3-GB(F)B(F,F)XB(F,F)-F | (7-57) | 5% |
| 3-BB(F)B(F,F)XB(F,F)-F | (7-47) | 3% |
| 4-BB(F)B(F,F)XB(F,F)-F | (7-47) | 7% |
| 5-BB(F)B(F,F)XB(F,F)-F | (7-47) | 4% |
| 3-HH-V | (2-1) | 35% |
| 3-HH-V1 | (2-1) | 5% |
| 3-HHEH-5 | (3-13) | 3% |
| 3-HHB-1 | (3-1) | 4% |
| V-HHB-1 | (3-1) | 5% |
| V2-BB(F)B-1 | (3-6) | 5% |
| 1V2-BB-F | (5-1) | 3% |
| 3-BB(F,F)XB(F,F)-F | (6-97) | 5% |
| 3-GB(F,F)XB(F,F)-F | (6-113) | 5% |
| 3-HHBB(F,F)-F | (7-6) | 4% |

Use Example 24

| | | |
|---|---|---|
| 4O-BB(F,Me)TB(F,F)XB(F,F)-F | (No. 115) | 3% |
| 3-GBB(F,F)XB(F,F)-F | (7) | 5% |
| 4-GBB(F,F)XB(F,F)-F | (7) | 5% |
| 5-GBB(F,F)XB(F,F)-F | (7) | 4% |
| 3-GB(F)B(F,F)XB(F,F)-F | (7-57) | 4% |
| 3-BB(F)B(F,F)XB(F,F)-F | (7-47) | 3% |

-continued

| | | |
|---|---|---|
| 4-BB(F)B(F,F)XB(F,F)-F | (7-47) | 4% |
| 5-BB(F)B(F,F)XB(F,F)-F | (7-47) | 3% |
| 3-HH-V | (2-1) | 35% |
| 3-HH-V1 | (2-1) | 5% |
| 3-HHEH-5 | (3-13) | 3% |
| 3-HHB-1 | (3-1) | 4% |
| V-HHB-1 | (3-1) | 4% |
| V2-BB(F)B-1 | (3-6) | 3% |
| 1V2-BB-F | (5-1) | 3% |
| 3-BB(F,F)XB(F,F)-F | (6-97) | 5% |
| 3-GB(F,F)XB(F,F)-F | (6-113) | 4% |
| 3-HHBB(F,F)-F | (7-6) | 3% |

Use Example 25

| | | |
|---|---|---|
| 3-BB(F,Me)TB-S4 | (No. 1) | 3% |
| 2-HH-3 | (2-1) | 4% |
| 3-HH-V1 | (2-1) | 8% |
| 1V2-HH-1 | (2-1) | 7% |
| 1V2-HH-3 | (2-1) | 6% |
| V2-BB(2F,3F)-O2 | (9-3) | 6% |
| 5-BB(2F,3F)-O2 | (9-3) | 4% |
| 3-H1OB(2F,3F)-O2 | (9-5) | 8% |
| 3-HchB(2F,3F)-O2 | (—) | 9% |
| 3-HH1OB(2F,3F)-O2 | (10-5) | 15% |
| 3-HDhB(2F,3F)-O2 | (10-3) | 6% |
| 3-dhBB(2F,3F)-O2 | (10-9) | 3% |
| V-HHB-1 | (3-1) | 4% |
| V2-HHB-1 | (3-1) | 5% |
| 3-HHB-1 | (3-1) | 3% |
| 3-HHB-3 | (3-1) | 2% |
| 2-BB(2F,3F)B-3 | (11-1) | 7% |

Use Example 26

| | | |
|---|---|---|
| 5-NpB(F,Me)TB-O3 | (No. 54) | 3% |
| 5-HB(F)B(F,F)XB(F,F)-F | (7-41) | 5% |
| 3-BB(F)B(F,F)XB(F,F)-F | (7-47) | 3% |
| 4-BB(F)B(F,F)XB(F,F)-F | (7-47) | 7% |
| 5-BB(F)B(F,F)XB(F,F)-F | (7-47) | 3% |
| 3-HH-V | (2-1) | 38% |
| 3-HH-V1 | (2-1) | 7% |
| 3-HHEH-5 | (3-13) | 3% |
| 3-HHB-1 | (3-1) | 4% |
| V-HHB-1 | (3-1) | 5% |
| V2-BB(F)B-1 | (3-6) | 5% |
| 1V2-BB-F | (5-1) | 3% |
| 3-BB(F,F)XB(F,F)-F | (6-97) | 11% |
| 3-HHBB(F,F)-F | (7-6) | 3% |

Use Example 27

| | | |
|---|---|---|
| 5-NpB(F,Me)TB(F,F)XB(F,F)-F | (No. 116) | 4% |
| 2-HH-3 | (2-1) | 19% |
| 3-HH-4 | (2-1) | 8% |
| 1-BB-3 | (2-8) | 7% |
| 3-HB-O2 | (2-5) | 5% |
| 3-BB(2F,3F)-O2 | (9-3) | 10% |
| 5-BB(2F,3F)-O2 | (9-3) | 7% |
| 2-HH1OB(2F,3F)-O2 | (10-5) | 11% |
| 3-HH1OB(2F,3F)-O2 | (10-5) | 10% |
| 3-HBB(2F,3CL)-O2 | (10-13) | 3% |
| 5-HBB(2F,3CL)-O2 | (10-13) | 3% |
| 3-HHB-1 | (3-1) | 3% |
| 3-HHB-O1 | (3-1) | 3% |

| | | |
|---|---|---|
| 5-B(F)BB-2 | (3-8) | 3% |
| V-HBB-2 | (3-4) | 4% |

INDUSTRIAL APPLICABILITY

A liquid crystal compound of the invention has good physical properties. A liquid crystal composition containing the compound can be widely utilized to a liquid crystal display device used in a computer monitor, a television and so forth.

What is claimed is:

1. A compound, represented by formula (1):

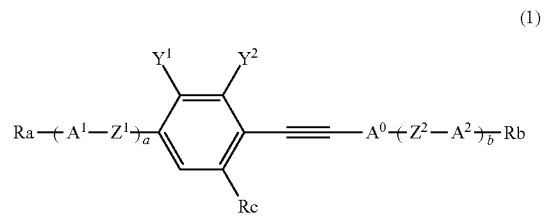

wherein, in formula (1), Ra and Rb are independently hydrogen, fluorine, chlorine, —CN, —SF$_5$, —C≡C—≡SF$_5$ or alkyl having 1 to 20 carbons, and in Ra and Rb, at least one piece of —CH$_2$— may be replaced by —O—, —S—, —CO— or —SiH$_2$—, and at least one piece of —CH$_2$CH$_2$— may be replaced by —CH=CH— or —C≡C—, and in the groups, at least one hydrogen may be replaced by fluorine or chlorine; A$^0$, A$^1$ and A$^2$ are independently 1,4-cyclohexylene, 1,4-phenylene, pyridine-2,5-diyl, pyrimidine-2,5-diyl, pyridazine-3,6-diyl, decahydronaphthalene-2,6-diyl, 1,2,3,4-tetrahydronaphthalene-2,6-diyl or naphthalene-2,6-diyl, and in A$^0$, A$^1$ and A$^2$, at least one piece of —CH$_2$— may be replaced by —O—, —S—, —CO— or —SiH$_2$—, and at least one piece of —CH$_2$CH$_2$— may be replaced by —CH=CH—, and in the groups, at least one hydrogen may be replaced by fluorine, chlorine, —CF$_3$, —CHF$_2$, —CH$_2$F, —OCF$_3$, —OCHF$_2$ or —OCH$_2$F; Z$^1$ and Z$^2$ are independently a single bond or alkylene having 1 to 4 carbons, and in Z$^1$ and Z$^2$, at least one piece of —CH$_2$— may be replaced by —O—, —S—, —CO— or —SiH$_2$—, and at least one piece of —CH$_2$CH$_2$— may be replaced by —CH=CH—, and in the groups, at least one hydrogen may be replaced by fluorine or chlorine; one of Y$^1$ and Y$^2$ is fluorine, and the other is hydrogen; Rc is alkyl having 1 to 4 carbons, and in Rc, at least one piece of —CH$_2$— may be replaced by —O—, —S—, —CO— or —SiH$_2$—, and at least one piece of —CH$_2$CH$_2$— may be replaced by —CH=CH— or —C≡C—; and a and b are independently 0, 1, 2 or 3, and a sum of a and b is 0, 1, 2 or 3.

2. The compound according to claim 1, wherein, in formula (1), Ra and Rb are independently fluorine, chlorine, alkyl having 1 to 20 carbons, alkoxy having 1 to 19 carbons, alkoxyalkyl having 2 to 19 carbons, alkenyl having 2 to 20 carbons, alkynyl having 2 to 20 carbons, fluoroalkyl having 1 to 20 carbons or fluoroalkoxy having 1 to 19 carbons; A$^0$, A$^1$ and A$^2$ are independently 1,4-cyclohexylene, 1,3-dioxane-2,5-diyl, 1,4-phenylene, 2-fluoro-1,4-phenylene, 2,5-difluoro-1,4-phenylene, 2,6-difluoro-1,4-phenylene, pyridine-2,5-diyl, pyrimidine-2,5-diyl, pyridazine-3,6-diyl, naphthalene-2,6-diyl, 1-fluoronaphthalene-2,6-diyl, 1,3-difluoronaphthalene-2,6-diyl or 1,3,8-trifluoronaphthalene-2,6-diyl; $Z^1$ and $Z^2$ are independently a single bond, —CH$_2$CH$_2$—, —COO—, —OCO—, —CH$_2$O—, —OCH$_2$—, —CF$_2$O—, —OCF$_2$—, —CH=CH—, —CF=CF—, —CH$_2$CO—, —COCH$_2$—, —CH$_2$SiH$_2$—, —SiH$_2$CH$_2$—, —(CH$_2$)$_2$COO—, —OCO(CH$_2$)$_2$—, —(CH$_2$)$_2$CF$_2$O—, —OCF$_2$(CH$_2$)$_2$—, —(CH$_2$)$_3$O—, —O(CH$_2$)$_3$— or —(CH$_2$)$_4$—; one of $Y^1$ and $Y^2$ is fluorine, and the other is hydrogen; Rc is alkyl having 1 to 4 carbons, alkoxy having 1 to 3 carbons, alkoxyalkyl having 2 to 3 carbons or alkenyl having 2 to 4 carbons; and a and b are independently 0, 1, 2 or 3, and a sum of a and b is 0, 1, 2 or 3.

3. The compound according to claim 1, wherein, in formula (1), Ra and Rb are independently fluorine, alkyl having 1 to 20 carbons, alkoxy having 1 to 19 carbons, alkoxyalkyl having 2 to 19 carbons, alkenyl having 2 to 20 carbons, fluoroalkyl having 1 to 20 carbons or fluoroalkoxy having 1 to 19 carbons; $A^0$, $A^1$ and $A^2$ are independently 1,4-cyclohexylene, 1,3-dioxane-2,5-diyl, 1,4-phenylene, 2-fluoro-1,4-phenylene, 2,6-difluoro-1,4-phenylene, pyridine-2,5-diyl, pyrimidine-2,5-diyl, pyridazine-3,6-diyl, naphthalene-2,6-diyl, 1-fluoronaphthalene-2,6-diyl, 1,3-difluoronaphthalene-2,6-diyl or 1,3,8-trifluoronaphthalene-2,6-diyl; $Z^1$ and $Z^2$ are independently a single bond, —CH$_2$CH$_2$—, —CH$_2$O—, —OCH$_2$—, —CF$_2$O—, —OCF$_2$—, —CH=CH—, —CF=CF—, —(CH$_2$)$_2$CF$_2$O— or —OCF$_2$(CH$_2$)$_2$—; one of $Y^1$ and $Y^2$ is fluorine, and the other is hydrogen; Rc is alkyl having 1 to 4 carbons or alkoxy having 1 to 3 carbons; and a and b are independently 0, 1, 2 or 3, and a sum of a and b is 0, 1 or 2.

4. The compound according to claim 1, represented by any one of formula (1-1) to formula (1-10):

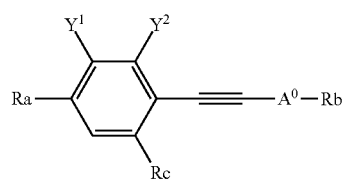
(1-1)

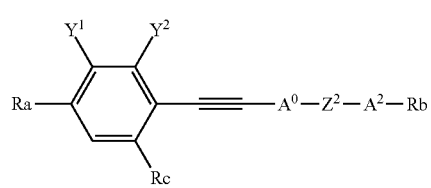
(1-2)

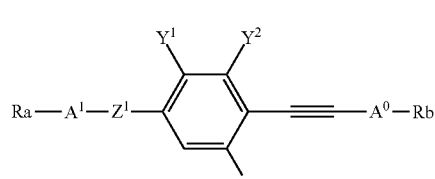
(1-3)

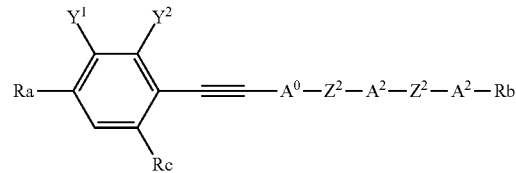
(1-4)

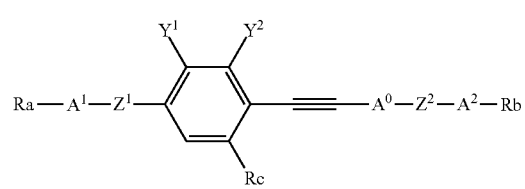
(1-5)

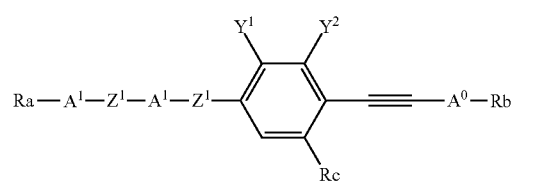
(1-6)

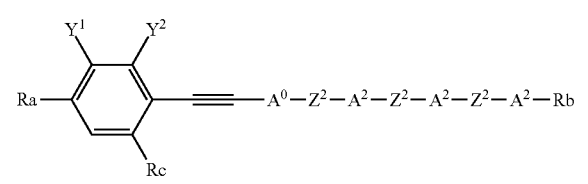
(1-7)

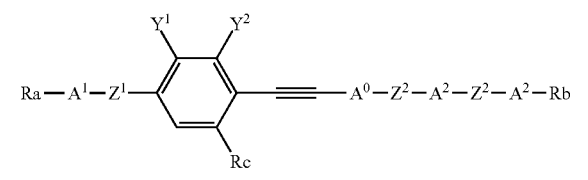
(1-8)

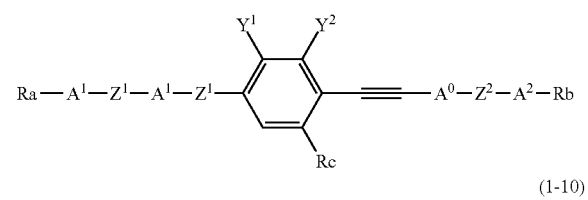
(1-9)

(1-10)

wherein, in formula (1-1) to formula (1-10), Ra and Rb are independently hydrogen, fluorine, chlorine or alkyl having 1 to 10 carbons, and in Ra and Rb, at least one piece of —CH$_2$— may be replaced by —O—, and at least one piece of —CH$_2$CH$_2$— may be replaced by —CH=CH— or —C≡C—, and in the groups, at least one hydrogen may be replaced by fluorine or chlorine; $A^0$, $A^1$ and $A^2$ are independently 1,4-cyclohexylene, 1,4-phenylene, decahydronaphthalene-2,6-diyl, 1,2,3,4-tetrahydronaphthalene-2,6-diyl or naphthalene-2,6- diyl, and in the rings, at least one piece of —CH$_2$— may be replaced by —O—, and at least one piece of —CH$_2$CH$_2$— may be replaced by —CH=CH—, and in the rings, at least one hydrogen may be replaced by fluorine, chlorine, —CF$_3$, —CHF$_2$ or —CH$_2$F; $Z^1$ and $Z^2$ are independently a single bond or alkylene having 1 to 4 carbons, and in the alkylene, at least one piece of —CH$_2$— may be replaced by —O— or —CO—, and at least one piece of —CH$_2$CH$_2$— may be replaced by —CH=CH—, and in the groups, at least one hydrogen may be replaced by fluorine or chlorine; one of $Y^1$ and $Y^2$ is fluorine, and the other is hydrogen; and Rc is alkyl having 1 to 4 carbons, and in the alkyl, at least one piece of —CH$_2$— may be replaced by —O—, and at least one piece of —CH$_2$CH$_2$— may be replaced by —CH=CH— or —C≡C—.

5. The compound according to claim 4, wherein, in formula (1-1) to formula (1-10), Ra and Rb are independently fluorine, alkyl having 1 to 10 carbons, alkoxy having 1 to 9 carbons, alkoxyalkyl having 2 to 9 carbons, alkenyl having 2 to 10 carbons, alkynyl having 2 to 10 carbons, fluoroalkyl having 1 to 10 carbons or fluoroalkoxy having 2 to 10 carbons; $A^0$, $A^1$ and $A^2$ are independently 1,4-cyclohexylene, 1,3-dioxane-2,5-diyl, 1,4-phenylene, 2-fluoro-1,4-phenylene, 2,5-difluoro-1,4-phenylene, 2,6-difluoro-1,4-phenylene, naphthalene-2,6-diyl, 1-fluoronaphthalene-2,6-diyl, 1,3-difluoronaphthalene-2,6-diyl, 1,3,8-trifluoronaphthalene-2,6-diyl; $Z^1$ and $Z^2$ are independently a single bond, —CH$_2$CH$_2$—, —COO—, —OCO—, —CH$_2$O—, —OCH$_2$—, —CF$_2$O—, —OCF$_2$—, —CH=CH—, —CF=CF—, —(CH$_2$)$_2$COO—, —OCO(CH$_2$)$_2$—, —(CH$_2$)$_2$CF$_2$O—, —OCF$_2$(CH$_2$)$_2$—, —(CH$_2$)$_3$O—, —O(CH$_2$)$_3$— or —(CH$_2$)$_4$—; one of $Y^1$ and $Y^2$ is fluorine, and the other is hydrogen; and Rc is alkyl having 1 to 4 carbons, alkoxy having 1 to 4 carbons, alkoxyalkyl having 2 to 4 carbons or alkenyl having 2 to 4 carbons.

6. The compound according to claim 4, wherein, in formula (1-1) to formula (1-10), Ra and Rb are independently fluorine, alkyl having 1 to 10 carbons, alkoxy having 1 to 9 carbons, alkenyl having 2 to 10 carbons, fluoroalkyl having 1 to 10 carbons or fluoroalkoxy having 2 to 10 carbons; $A^0$, $A^1$ and $A^2$ are independently 1,3-dioxane-2,5-diyl, 1,4-phenylene, 2-fluoro-1,4-phenylene, 2,5-difluoro-1,4-phenylene, 2,6-difluoro-1,4-phenylene, naphthalene-2,6-diyl, 1-fluoronaphthalene-2,6-diyl, 1,3-difluoronaphthalene-2,6-diyl or 1,3,8-trifluoronaphthalene-2,6-diyl; $Z^1$ and $Z^2$ are independently a single bond, —CH$_2$CH$_2$—, —CH$_2$O—, —OCH$_2$—, —CF$_2$O—, —OCF$_2$—, —CH=CH—, —CF=CF—, —(CH$_2$)$_2$CF$_2$O—, —OCF$_2$(CH$_2$)$_2$—, —(CH$_2$)$_3$O—, —O(CH$_2$)$_3$— or —(CH$_2$)$_4$—; one of $Y^1$ and $Y^2$ is fluorine, and the other is hydrogen; and Rc is alkyl having 1 to 4 carbons, alkoxy having 1 to 4 carbons, alkoxyalkyl having 2 to 4 carbons or alkenyl having 2 to 4 carbons.

7. The compound according to claim 4, wherein, in formula (1-1) to formula (1-10), Ra and Rb are independently fluorine, alkyl having 1 to 8 carbons, alkoxy having 1 to 8 carbons, alkenyl having 2 to 8 carbons, fluoroalkyl having 1 to 8 carbons or fluoroalkoxy having 1 to 8 carbons; $A^0$, $A^1$ and $A^2$ are independently 1,4-phenylene, 2-fluoro-1,4-phenylene, 2,6-difluoro-1,4-phenylene, naphthalene-2,6-diyl, 1-fluoronaphthalene-2,6-diyl, 1,3-difluoronaphthalene-2,6-diyl or 1,3,8-trifluoronaphthalene-2,6-diyl; $Z^1$ and $Z^2$ are independently a single bond, —CF$_2$O—, —OCF$_2$—, —CH=CH—, —CF=CF—, —(CH$_2$)$_2$CF$_2$O— or —OCF$_2$(CH$_2$)$_2$—; one of $Y^1$ and $Y^2$ is fluorine, and the other is hydrogen; and Rc is alkyl having 1 to 4 carbons or alkoxy having 1 to 4 carbons.

8. The compound according to claim 4, wherein, in formula (1-1) to formula (1-6), Ra and Rb are independently fluorine, alkyl having 1 to 8 carbons, alkoxy having 1 to 8 carbons or fluoroalkyl having 1 to 8 carbons; $A^0$, $A^1$ and $A^2$ are independently 1,4-phenylene, 2-fluoro-1,4-phenylene or 2,6-difluoro-1,4-phenylene; $Z^1$ and $Z^2$ are independently a single bond, —CF$_2$O— or —OCF$_2$—; one of $Y^1$ and $Y^2$ is fluorine, and the other is hydrogen; and Rc is alkyl having 1 to 4 carbons.

9. The compound according to claim 1, represented by any one of formula (1-1A) to formula (1-1B), formula (1-2A) to formula (1-2C), formula (1-3A) to formula (1-3C), formula (1-4A) to formula (1-4D), formula (1-5A) to formula (1-5D) and formula (1-6A) to formula (1-6D):

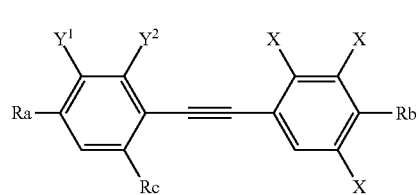

(1-1A)

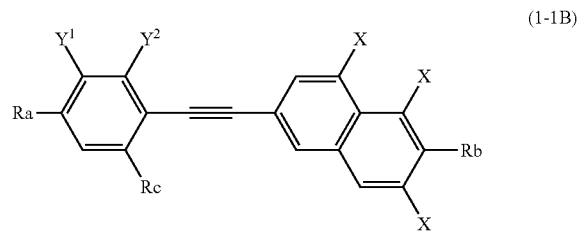

(1-1B)

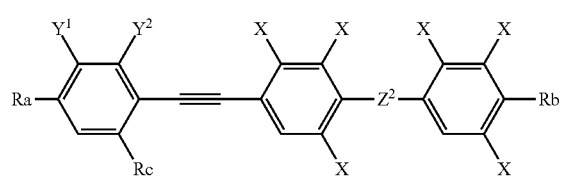

(1-2A)

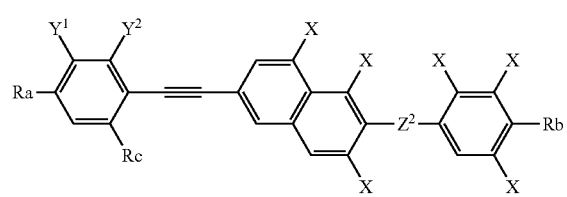

(1-2B)

-continued
(1-2C)
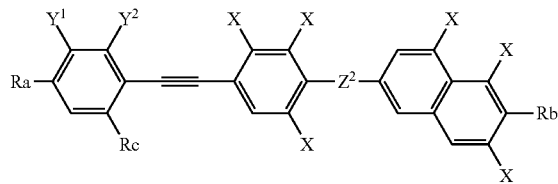
(1-3A)
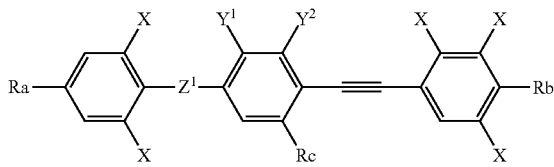
(1-3B)
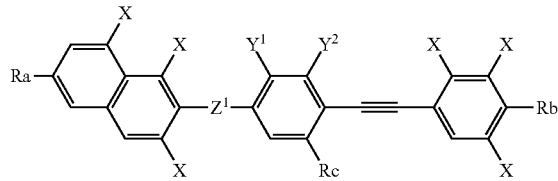
(1-3C)
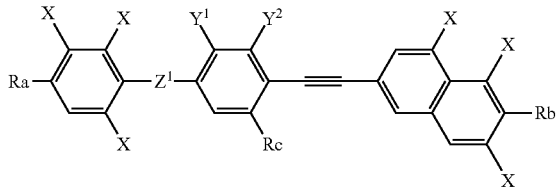
(1-4A)
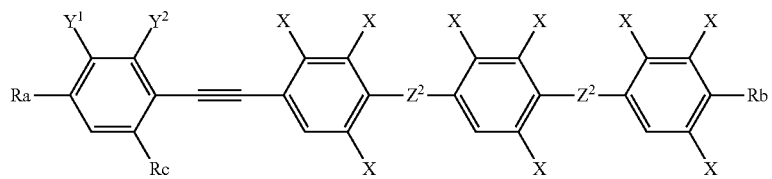
(1-4B)
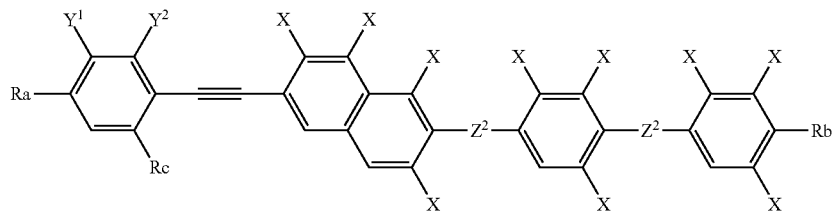
(1-4C)
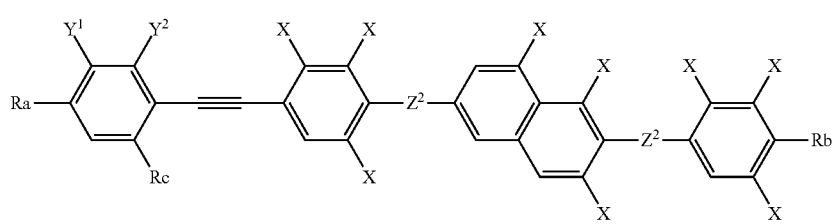
(1-4D)
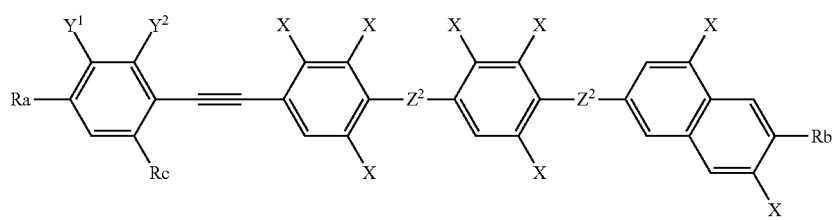
(1-5A)
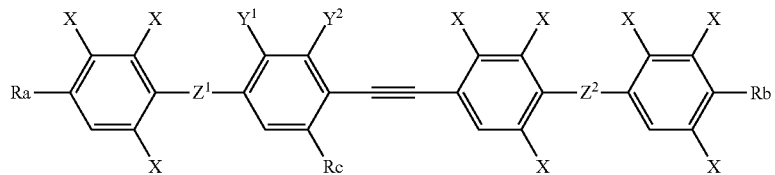

-continued
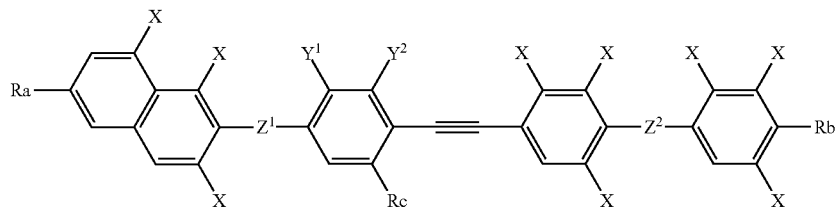
(1-5B)
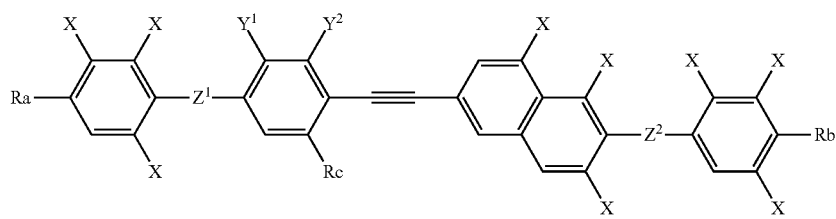
(1-5C)
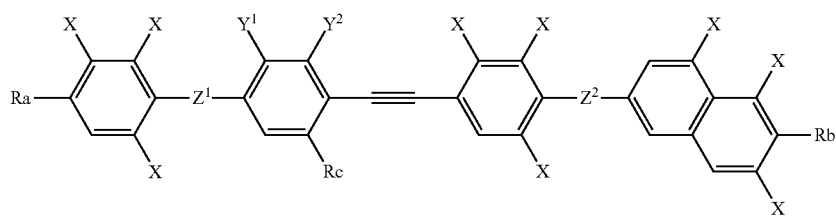
(1-5D)
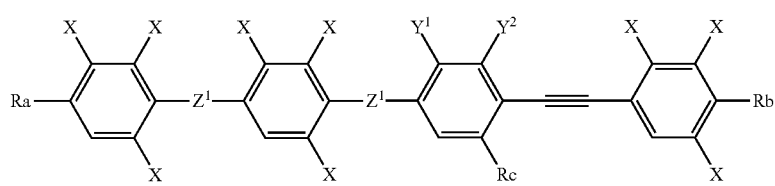
(1-6A)
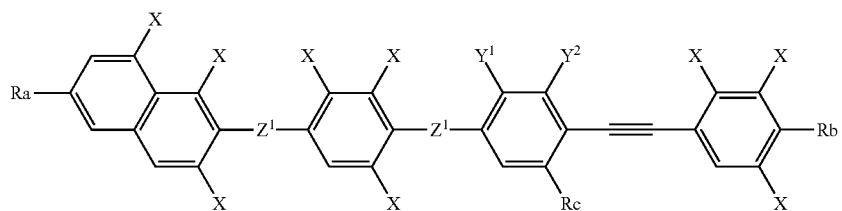
(1-6B)
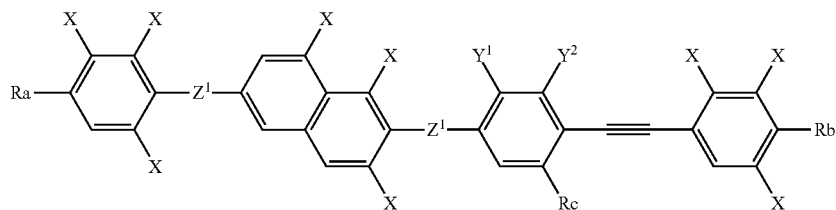
(1-6C)
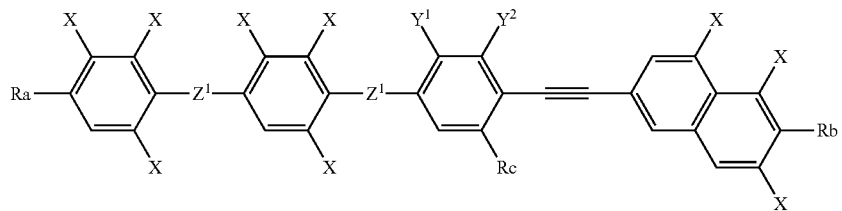
(1-6D)

wherein, in formula (1-1A) to formula (1-1B), formula (1-2A) to formula (1-2C), formula (1-3A) to formula (1-3C), formula (1-4A) to formula (1-4D), formula (1-5A) to formula (1-5D) and formula (1-6A) to formula (1-6D), Ra and Rb are independently hydrogen, fluorine, —CF$_3$, —CHF$_2$, —CH$_2$F, —OCF$_3$, —OCHF$_2$, —OCF$_2$CHF$_2$, —OCF$_2$CHFCF$_3$ or alkyl having 1 to 10 carbons, and in the alkyl, at least one piece of —CH$_2$— may be replaced by —O—, and at least one piece of —CH$_2$CH$_2$— may be replaced by —CH=CH—; $Z^1$ and $Z^2$ are independently a single bond, —CF$_2$O— or —OCF$_2$—; one of $Y^1$ and $Y^2$ is fluorine, and the other is hydrogen; Rc is methyl, ethyl or propyl; and X is hydrogen or fluorine.

10. The compound according to claim 9, wherein, in formula (1-1A), formula (1-2A), formula (1-3A), formula (1-4A), formula (1-5A) or formula (1-6A), Ra and Rb are alkyl having 1 to 10 carbons or alkoxy having 1 to 10 carbons; $Z^1$ and $Z^2$ are a single bond; one of $Y^1$ and $Y^2$ is fluorine, and the other is hydrogen; Rc is methyl, ethyl or propyl; and X is hydrogen or fluorine.

11. The compound according to claim 9, wherein, in formula (1-1B), formula (1-2B), formula (1-2C), formula (1-3B), formula (1-3C), formula (1-4B), formula (1-4C), formula (1-4D), formula (1-5B), formula (1-5C), formula (1-5D), formula (1-6B), formula (1-6C) or formula (1-6D), Ra and Rb are alkyl having 1 to 10 carbons or alkoxy having 1 to 10 carbons; $Z^1$ and $Z^2$ are a single bond; Rc is methyl, ethyl or propyl; one of $Y^1$ and $Y^2$ is fluorine, and the other is hydrogen; and X is hydrogen or fluorine.

12. The compound according to claim 9, wherein, in formula (1-1A), formula (1-2A), formula (1-3A), formula (1-4A), formula (1-5A) or formula (1-6A), one of Ra and Rb is fluorine, —CF$_3$ or —OCF$_3$, and the other is alkyl having 1 to 10 carbons or alkoxy having 1 to 10 carbons; $Z^1$ and $Z^2$ are a single bond, —CF$_2$O— or —OCF$_2$—; Rc is methyl, ethyl or propyl; one of $Y^1$ and $Y^2$ is fluorine, and the other is hydrogen; and X is hydrogen or fluorine.

13. The compound according to claim 9, wherein, in formula (1-1B), formula (1-2B), formula (1-2C), formula (1-3B), formula (1-3C), formula (1-4B), formula (1-4C), formula (1-4D), formula (1-5B), formula (1-5C), formula (1-5D), formula (1-6B), formula (1-6C) or formula (1-6D), one of Ra and Rb is fluorine, —CF$_3$ or —OCF$_3$, and the other is alkyl having 1 to 10 carbons or alkoxy having 1 to 10 carbons; $Z^1$ and $Z^2$ are a single bond, —CF$_2$O— or —OCF$_2$—; Rc is methyl, ethyl or propyl; one of $Y^1$ and $Y^2$ is fluorine, and the other is hydrogen; and X is hydrogen or fluorine.

14. A liquid crystal composition, containing at least one compound according to claim 1.

15. The liquid crystal composition according to claim 14, further containing at least one compound selected from the group of compounds represented by formulas (2) to (4):

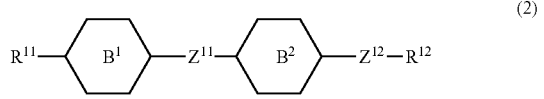
(2)

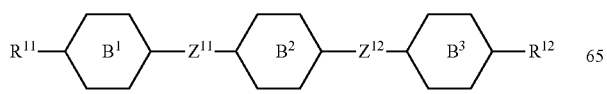
(3)

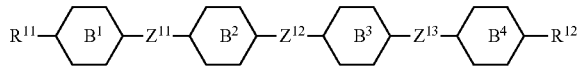
(4)

wherein, in formulas (2) to (4),
$R^{11}$ and $R^{12}$ are independently, alkyl having 1 to 10 carbons or alkenyl having 2 to 10 carbons, and in $R^{11}$ and $R^{12}$, at least one piece of —CH$_2$— may be replaced by —O—, and in the groups, at least one hydrogen may be replaced by fluorine;
ring $B^1$, ring $B^2$, ring $B^3$ and ring $B^4$ are independently 1,4-cyclohexylene, 1,4-phenylene, 2-fluoro-1,4-phenylene, 2,5-difluoro-1,4-phenylene or pyrimidine-2,5-diyl; and
$Z^{11}$, $Z^{12}$ and $Z^{13}$ are independently a single bond, —COO—, —CH$_2$CH$_2$—, —CH=CH— or —C≡C—.

16. The liquid crystal composition according to claim 14, further containing at least one compound selected from the group of compounds represented by formulas (5) to (8):

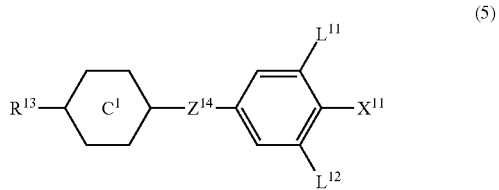
(5)

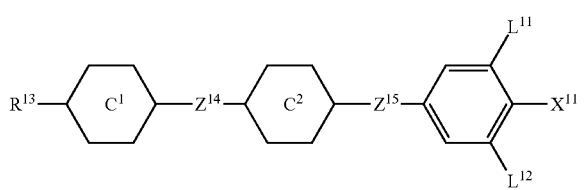
(6)

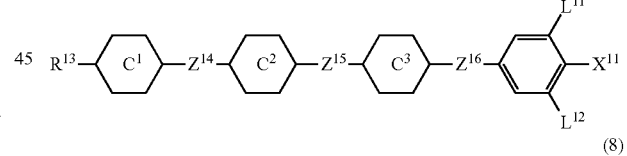
(7)

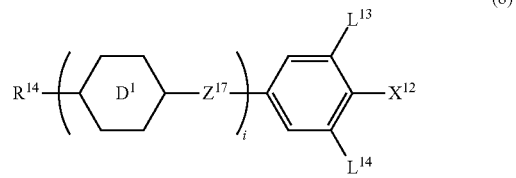
(8)

wherein, in formulas (5) to (7),
$R^{13}$ is alkyl having 1 to 10 carbons or alkenyl having 2 to 10 carbons, and in the alkyl and the alkenyl, at least one piece of —CH$_2$— may be replaced by —O—, and in the groups, at least one hydrogen may be replaced by fluorine;
$X^1$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;
ring $C^1$, ring $C^2$ and ring $C^3$ are independently 1,4-cyclohexylene, 1,4-phenylene, 1,4-phenylene in which at least one hydrogen is replaced by fluorine, tetrahydropyran-2,5-diyl, 1,3-dioxane-2,5-diyl or pyrimidine-2,5-diyl;

$Z^{14}$, $Z^{15}$ and $Z^{16}$ are independently a single bond, —COO—, —OCO—, —CH$_2$O—, —OCH$_2$—, —CF$_2$O—, —OCF$_2$—, —CH$_2$CH$_2$—, —CH=CH—, —C≡C— or —(CH$_2$)$_4$—;

$L^{11}$ and $L^{12}$ are independently hydrogen or fluorine; and $Z^{17}$ is a single bond, —COO—, —OCO—, —CH$_2$O—, —OCH$_2$—, —CF$_2$O—, —OCF$_2$—, —CH$_2$CH$_2$— or —C≡C—;

$L^{13}$ and $L^{14}$ are independently hydrogen or fluorine; and i is 1, 2, 3 or 4.

17. The liquid crystal composition according to claim 14, further containing at least one compound selected from the group of compounds represented by formulas (9) to (15):

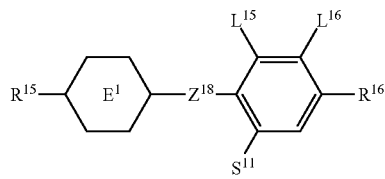
(9)

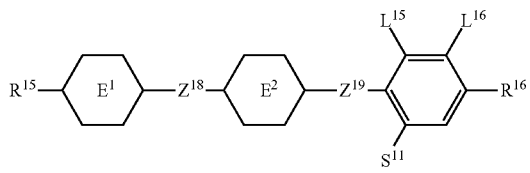
(10)

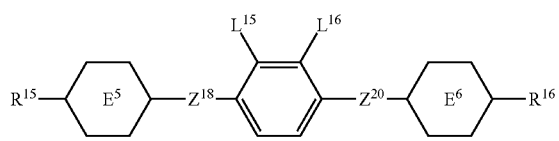
(11)

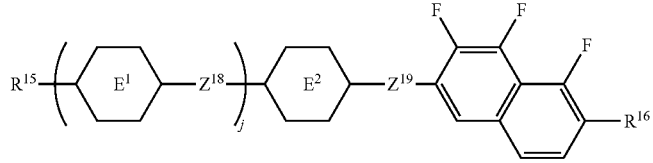
(12)

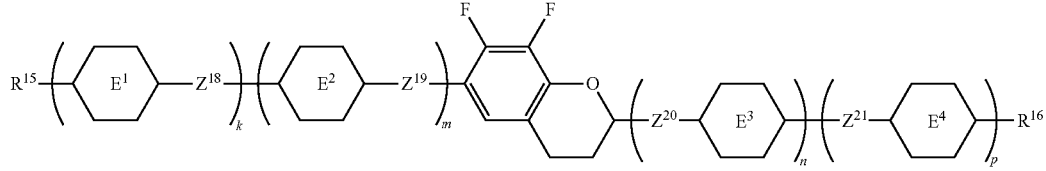
(13)

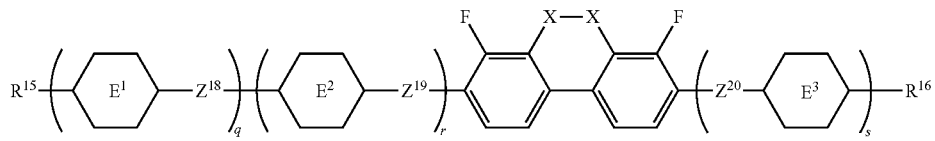
(14)

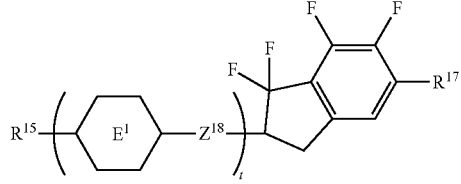
(15)

wherein, in formula (8),
R$^{14}$ is alkyl having 1 to 10 carbons or alkenyl having 2 to 10 carbons, and in R$^{14}$, at least one piece of —CH$_2$— may be replaced by —O—, and in the groups, at least one hydrogen may be replaced by fluorine;

X$^{12}$ is —C≡N or —C≡C—C≡N;

ring D$^1$ is 1,4-cyclohexylene, 1,4-phenylene, 1,4-phenylene in which at least one hydrogen is replaced by fluorine, tetrahydropyran-2,5-diyl, 1,3-dioxane-2,5-diyl or pyrimidine-2,5-diyl;

wherein, in formulas (9) to (15),
R$^{15}$, R$^{16}$ and R$^7$ are independently alkyl having 1 to 10 carbons or alkenyl having 2 to 10 carbons, and in R$^5$, R$^{16}$ and R$^{17}$, at least one piece of —CH$_2$— may be replaced by —O—, and in the groups, at least one hydrogen may be replaced by fluorine, in which R$^{17}$ may be hydrogen or fluorine;

ring E$^1$, ring E$^2$, ring E$^3$ and ring E$^4$ are independently 1,4-cyclohexylene, 1,4-cyclohexenylene, 1,4-phenylene, 1,4-phenylene in which at least one hydrogen is replaced by fluorine, tetrahydropyran-2,5-diyl or decahydronaphthalene-2,6-diyl;

ring $E^5$ and ring $E^6$ are independently 1,4-cyclohexylene, 1,4-cyclohexenylene, 1,4-phenylene, tetrahydropyran-2,5-diyl or decahydronaphthalene-2,6-diyl;

$Z^{18}$, $Z^{19}$, $Z^{20}$ and $Z^{21}$ are independently a single bond, —COO—, —OCO—, —CH$_2$O—, —OCH$_2$—, —CF$_2$O—, —OCF$_2$—, —CH$_2$CH$_2$—, —CF$_2$OCH$_2$CH$_2$— or —OCF$_2$CH$_2$CH$_2$—;

$L^{15}$ and $L^{16}$ are independently fluorine or chlorine;

$S^{11}$ is hydrogen or methyl;

X is —CHF— or —CF$_2$—; and j, k, m, n, p, q, r and s are independently 0 or 1, a sum of k, m, n and p is 1 or 2, a sum of q, r and s is 0, 1, 2 or 3, and t is 1, 2 or 3.

18. A liquid crystal display device, including the liquid crystal composition according to claim 14.

19. The liquid crystal display device according to claim 18, wherein the liquid crystal composition is encapsulated.

20. The liquid crystal display device according to claim 18, wherein the liquid crystal composition is used in a lens to be utilized in switching between 2D and 3D.

* * * * *